US005999698A

United States Patent [19]

Nakai et al.

[11] Patent Number: 5,999,698

[45] Date of Patent: Dec. 7, 1999

[54] MULTIANGLE BLOCK REPRODUCTION SYSTEM

[75] Inventors: Masatoshi Nakai, Kawasaki; Takeshi Hagio, Yokohama, both of Japan

[73] Assignee: Kabushiki Kaisha Toshiba, Kawasaki, Japan

[21] Appl. No.: 08/941,080

[22] Filed: Sep. 30, 1997

[30] Foreign Application Priority Data

Sep. 30, 1996 [JP] Japan .................................... 8-278882

[51] Int. Cl.[6] ............................ H04N 5/781; H04N 5/85; H04N 5/90; H04N 5/91

[52] U.S. Cl. ............................................ 386/125; 386/126

[58] Field of Search .............................. 386/45, 125, 126, 386/46; 348/7, 13, 734

[56] References Cited

U.S. PATENT DOCUMENTS

| | | | |
|---|---|---|---|
| 5,630,006 | 5/1997 | Hirayama et al. | 386/92 |
| 5,724,091 | 3/1998 | Freeman et al. | 348/12 |
| 5,819,003 | 10/1998 | Hirayama et al. | 386/95 |

*Primary Examiner*—Thai Tran
*Assistant Examiner*—Christopher Onuaku
*Attorney, Agent, or Firm*—Pillsbury Madison & Sutro, LLP

[57] ABSTRACT

In reproduction of a predetermined title recorded on an optical disk, when multiangle video images are recorded on the optical disk, an angle mark having a form of a camera is turned on. During reproduction of this title, when reproduction reaches a multiangle video image recorded portion, the angle mark flashes so that a viewer or user of the video can be notified of a state in which video reproduction at an angle different from that of the currently reproduced video image is possible.

27 Claims, 78 Drawing Sheets

EXAMPLE OF TITLE STRUCTURE FOR
ONE SEQUENTIAL PGC TITLE OR ONE RANDOM PGC TITLE

ENTRY PGC

EXAMPLE OF TITLE STRUCTURE FOR
MULTI PGC TITLE

VMGI_MAT 751

| BYTE POS. | SYMBOL | CONTENTS | NUMBER OF BYTES |
|---|---|---|---|
| 0 – 11 | VMG_ID | VMG IDENTIFIER | 12 |
| 12 – 15 | VMG_EA | END ADR OF VMG | 4 |
| 16 – 27 | RESERVED | RESERVED | 12 |
| 28 – 31 | VMGI_EA | END ADR OF VMGI | 4 |
| 32 – 33 | VERN | VER. OF DVD | 2 |
| 34 – 37 | VMG_CAT | VMG CATEGORY | 4 |
| 38 – 45 | VLMS_ID | VOLUME SET ID | 8 |
| 46 – 61 | RESERVED | RESERVED | 16 |
| 62 – 63 | VTS_Ns | NUMBER OF VTS | 2 |
| 64 – 95 | PVR_ID | PROVIDER UNIQUE ID | 32 |
| 96 – 127 | RESERVED | RESERVED | 32 |
| 128 – 131 | VMGI_MAT_EA | END ADR OF VMGI_MAT | 4 |
| 132 – 135 | FP_PGCI_SA | START ADR OF FP_PGCI | 4 |
| 136 – 191 | RESERVED | RESERVED | 56 |
| 192 – 195 | VMGM_VOBS_SA | START ADR OF VMGM_VOBS | 4 |
| 196 – 199 | TT_SRPT_SA | START ADR OF TT_SRPT | 4 |
| 200 – 203 | VMGM_PGCI_UT_SA | START ADR OF PGCI_UT | 4 |
| 204 – 207 | PTL_MAIT_SA | START ADR OF PTL_MAIT | 4 |
| 208 – 211 | VTS_ATRT_SA | START ADR OF VTS_ATRT | 4 |
| 212 – 215 | TXTDT_MG_SA | START ADR OF TXTDT_MG | 4 |
| 216 – 219 | VMGM_C_ADT_SA | START ADR OF VMGM_C_ADT | 4 |
| 220 – 223 | VMGM_VOBU_ADMAP_SA | START ADR OF VMGM_VOBU_ADMAP | 4 |
| 224 – 255 | RESERVED | RESERVED | 32 |
| 256 – 257 | VMGM_V_ATR | VIDEO ATTRIB OF VMGM | 2 |
| 258 – 259 | VMGM_AST_Ns | NO. OF AUDIO STREAMS | 2 |
| 260 – 267 | VMGM_AST_ATR | AUDIO STREAM ATTRIB | 8 |
| 268 – 323 | RESERVED | RESERVED | 56 |
| 324 – 339 | RESERVED | RESERVED | 16 |
| 340 – 341 | VMGM_SPST_Ns | NO. OF SP STREAMS | 2 |
| 342 – 347 | VMGM_SPST_ATR | SP STREAM ATTRIB | 6 |
| 348 – 1023 | RESERVED | RESERVED | 676 |
| 1024 – 2291(MAX) | FP_PGCI | FIRST PLAY PGCI | 0 OR 236～268 |

FIG. 15

CONTENTS OF TITLE SEARCH POINTER TABLE INFORMATION
TT_SRPTI 752A

| SYMBOL | CONTENTS | NUMBER OF BYTES |
|---|---|---|
| TT_Ns | NUMBER OF TITLE SEARCH POINTERS | 2 |
| RESERVED | RESERVED | 2 |
| TT_SRPT_EA | END ADDRESS OF TT_SRPT | 4 |

FIG. 17

CONTENTS OF TITLE SEARCH POINTER
TT_SRP 752B

| SYMBOL | CONTENTS | NUMBER OF BYTES |
|---|---|---|
| TT_PB_TY | TITLE PLAYBACK TYPE | 1 |
| AGL_Ns | NUMBER OF ANGLES | 1 |
| PTT_Ns | NUMBER OF PART_OF_TITLES | 2 |
| TT_PTL_ID_FLD | PARENTAL ID FIELD FOR TITLE | 2 |
| VTSN | VTS NUMBER | 1 |
| VTS_TTN | VTS TITLE NUMBER | 1 |
| VTS_SA | START ADDRESS OF VTS | 4 |

FIG. 18

VIDEO MANAGER MENU PGCI UNIT TABLE INFORMATION
VMGM_PGCI_UTI 753A

| SYMBOL | CONTENTS | NUMBER OF BYTES |
|---|---|---|
| VMGM_LU_Ns | NUMBER OF VIDEO MANAGER LANGUAGE UNITS | 2 |
| RESERVED | RESERVED | 2 |
| VMGM_PGCI_UT_EA | END ADDRESS OF VMGM_PGCI_UT | 4 |

FIG. 20

VIDEO MANAGER MENU LANGUAGE UNIT SEARCH POINTER
VMGM_LU_SRP 753B

| SYMBOL | CONTENTS | NUMBER OF BYTES |
|---|---|---|
| VMGM_LCD | VMGM LANGUAGE CODE | 2 |
| RESERVED | RESERVED (FOR VMGM_LCD) | 1 |
| VMGM_EXST | VIDEO MANAGER MENU EXISTENCE | 1 |
| VMGM_LU_SA | START ADDRESS OF VMGM_LU | 4 |

FIG. 21

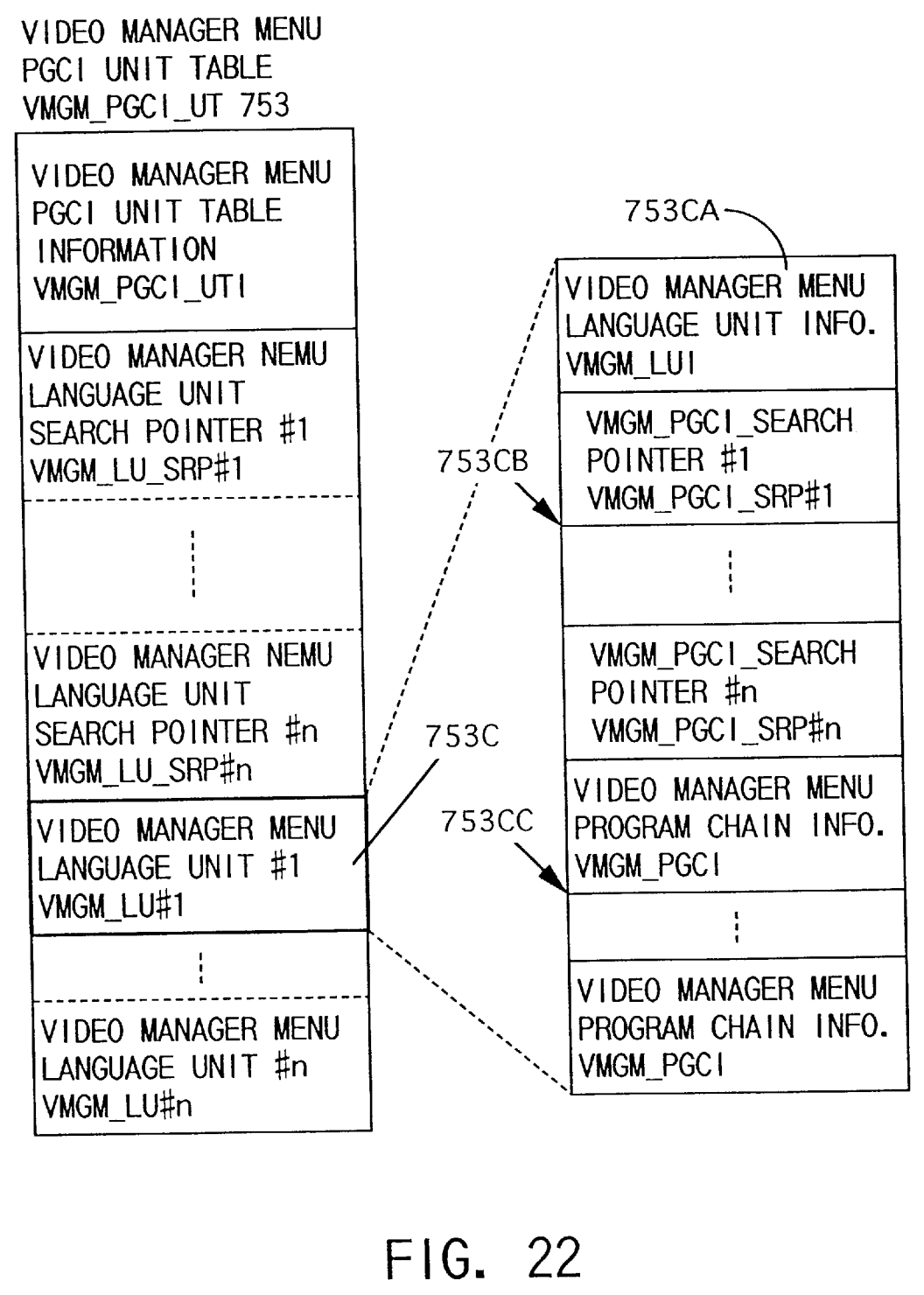

VIDEO MANAGER MENU
PGCI UNIT TABLE
VMGM_PGCI_UT 753

VIDEO MANAGER MENU
PGCI UNIT TABLE
INFORMATION
VMGM_PGCI_UTI

VIDEO MANAGER NEMU
LANGUAGE UNIT
SEARCH POINTER #1
VMGM_LU_SRP#1

VIDEO MANAGER NEMU
LANGUAGE UNIT
SEARCH POINTER #n
VMGM_LU_SRP#n

VIDEO MANAGER MENU
LANGUAGE UNIT #1
VMGM_LU#1

VIDEO MANAGER MENU
LANGUAGE UNIT #n
VMGM_LU#n

753C

753CA

VIDEO MANAGER MENU
LANGUAGE UNIT INFO.
VMGM_LUI

753CB

VMGM_PGCI_SEARCH
POINTER #1
VMGM_PGCI_SRP#1

VMGM_PGCI_SEARCH
POINTER #n
VMGM_PGCI_SRP#n

753CC

VIDEO MANAGER MENU
PROGRAM CHAIN INFO.
VMGM_PGCI

VIDEO MANAGER MENU
PROGRAM CHAIN INFO.
VMGM_PGCI

FIG. 22

VIDEO MANAGER MENU LANGUAGE UNIT INFORMATION
VMGM_LUI 753CA

| SYMBOL | CONTENTS | NUMBER OF BYTES |
|---|---|---|
| VMGM_PGCI_SRP_Ns | NUMBER OF VMGM_PGCI_SRPs | 2 |
| RESERVED | RESERVED | 2 |
| VMGM_LU_EA | END ADDRESS OF VMGM_LU | 4 |

FIG. 23

VIDEO MANAGER MENU PROGRAM CHAIN INFORMATION
SEARCH POINTER VMGM_PGCI_SRP 753CB

| SYMBOL | CONTENTS | NUMBER OF BYTES |
|---|---|---|
| VMGM_PGC_CAT | VMGM_PGC CATEGORY | 4 |
| VMGM_PGCI_SA | START ADDRESS OF VMGM_PGCI | 4 |

FIG. 24

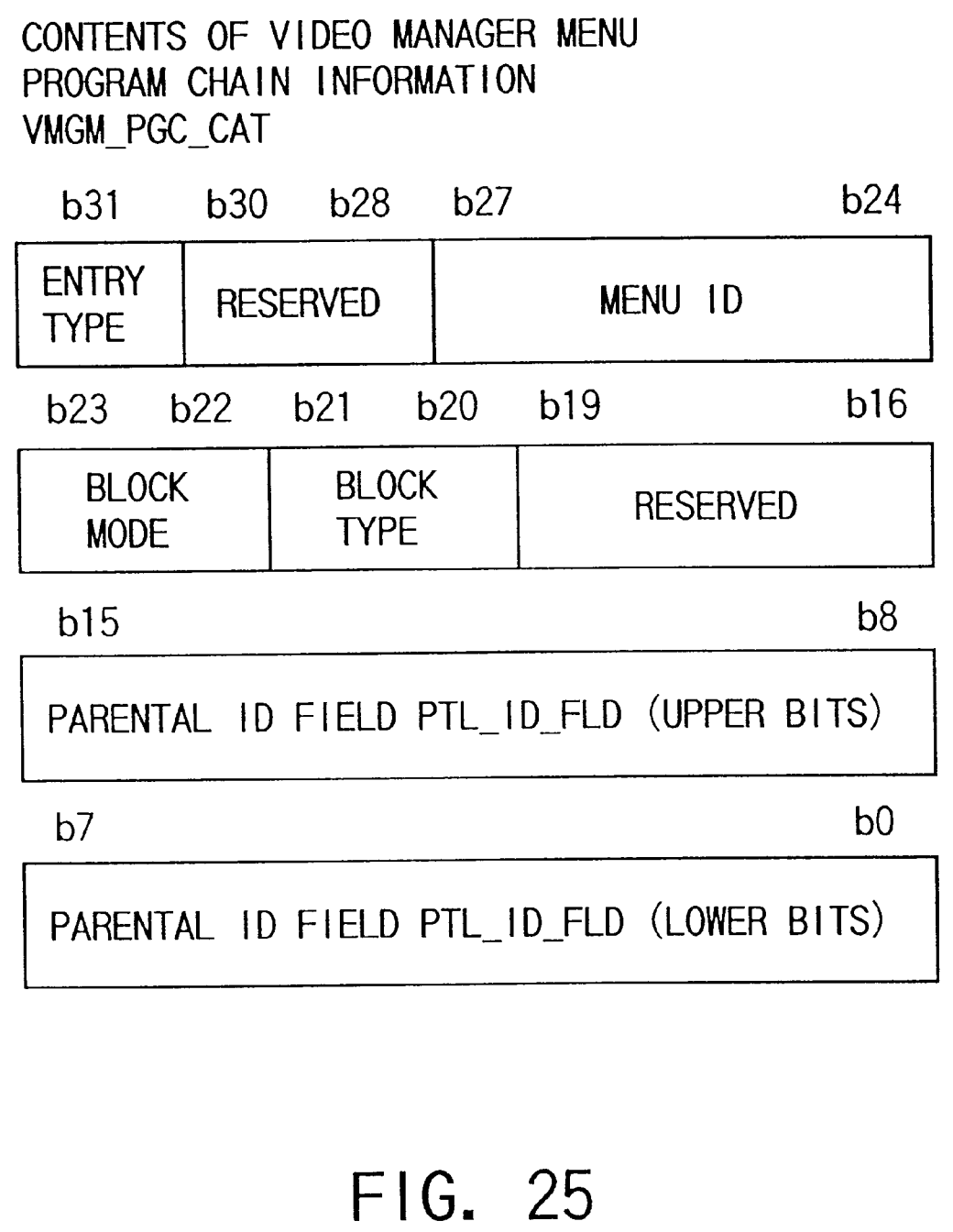

CONTENTS OF VIDEO MANAGER MENU PROGRAM CHAIN INFORMATION VMGM_PGC_CAT

| b31 | b30 b28 | b27 b24 |
|---|---|---|
| ENTRY TYPE | RESERVED | MENU ID |

| b23 b22 | b21 b20 | b19 b16 |
|---|---|---|
| BLOCK MODE | BLOCK TYPE | RESERVED |

| b15 b8 |
|---|
| PARENTAL ID FIELD PTL_ID_FLD (UPPER BITS) |

| b7 b0 |
|---|
| PARENTAL ID FIELD PTL_ID_FLD (LOWER BITS) |

FIG. 25

CONTENTS OF PRESENTATION CONTROL INFORMATION PCI

| SYMBOL | CONTENTS | NUMBER OF BYTES |
|---|---|---|
| PCI_GI | PCI GENERAL INFORMATION | 60 |
| NSML_AGLI | ANGLE INFO. FOR NONSEAMLESS | 36 |
| HLI | HIGHLIGHT INFORMATION | 694 |
| RECI | RECORDING INFORMATION | 189 |

CONTENTS OF PRESENTATION CONTROL INFORMATION GENERAL INFORMATION PCI_GI

| SYMBOL | CONTENTS | NUMBER OF BYTES |
|---|---|---|
| NV_PCK_LBN | LOGICAL BLOCK NUMBER OF NAVIGATION PACK | 4 |
| VOBU_CAT | CATEGORY OF VOBU | 2 |
| RESERVED | RESERVED | 2 |
| VOBU_UOP_CTL | USER OPERATION CONTROL OF VOBU | 4 |
| VOBU_S_PTM | START PTM OF VOBU | 4 |
| VOBU_E_PTM | END PTM OF VOBU | 4 |
| VOBU_SE_E_PTM | END PTM OF SEQUENCE END IN VOBU | 4 |
| C_ELTM | CELL ELAPSE TIME | 4 |
| RESERVED | RESERVED | 32 |

FIG. 29

CONTENTS OF NONSEAMLESS ANGLE INFORMATION NSML_AGLI

| SYMBOL | CONTENTS | NUMBER OF BYTES |
|---|---|---|
| NSML_AGL_C1_DSTA | ADDRESS OF DESTINATION VOBU IN AGL_C1 | 4 |
| NSML_AGL_C2_DSTA | ADDRESS OF DESTINATION VOBU IN AGL_C2 | 4 |
| NSML_AGL_C3_DSTA | ADDRESS OF DESTINATION VOBU IN AGL_C3 | 4 |
| NSML_AGL_C4_DSTA | ADDRESS OF DESTINATION VOBU IN AGL_C4 | 4 |
| NSML_AGL_C5_DSTA | ADDRESS OF DESTINATION VOBU IN AGL_C5 | 4 |
| NSML_AGL_C6_DSTA | ADDRESS OF DESTINATION VOBU IN AGL_C6 | 4 |
| NSML_AGL_C7_DSTA | ADDRESS OF DESTINATION VOBU IN AGL_C7 | 4 |
| NSML_AGL_C8_DSTA | ADDRESS OF DESTINATION VOBU IN AGL_C8 | 4 |
| NSML_AGL_C9_DSTA | ADDRESS OF DESTINATION VOBU IN AGL_C9 | 4 |

FIG. 30

CONTENTS OF DATA SEARCH INFORMATION DSI

| SYMBOL | CONTENTS | NUMBER OF BYTES |
|---|---|---|
| DSI_GI | DSI GENERAL INFORMATION | 32 |
| SML_PBI | SEAMLESS PLAYBACK INFO. | 148 |
| SML_AGLI | ANGLE INFO. FOR SEAMLESS | 54 |
| VOBU_SRI | VOBU SEARCH INFORMATION | 168 |
| SYNCI | SYNCHRONOUS INFORMATION | 144 |
| RESERVED | RESERVED | 471 |

CONTENTS OF DATA SEARCH INFORMATION
GENERAL INFORMATION DSI_GI

| SYMBOL | CONTENTS | NUMBER OF BYTES |
|---|---|---|
| NV_PCK_SCR | SYSTEM CLOCK REFERENCE BASED OF NV_PCK | 4 |
| NV_PCK_LBN | LOGICAL BLOCK NUMBER OF NAVIGATION PACK | 4 |
| VOBU_EA | END ADDRESS OF VOBU | 4 |
| VOBU_1STREF_EA | END ADDRESS OF 1ST REF. PICTURE IN VOBU | 4 |
| VOBU_2NDREF_EA | END ADDRESS OF 2ND REF. PICTURE IN VOBU | 4 |
| VOBU_3RDREF_EA | END ADDRESS OF 3RD REF. PICTURE IN VOBU | 4 |
| VOBU_VOB_IDN | VOB ID NUMBER OF VOBU | 2 |
| RESERVED | RESERVED | 1 |
| VOBU_C_IDN | CELL ID NUMBER OF VOBU | 1 |
| C_ELTM | CELL ELAPSE TIME | 4 |

FIG. 35

CONTENTS OF SEAMLESS ANGLE INFORMATION SML_AGLI

| SYMBOL | CONTENTS | NUMBER OF BYTES |
|---|---|---|
| SML_AGL_C1_DSTA | ADDRESS & SIZE OF DESTINATION ILVU IN AGL_C1 | 6 |
| SML_AGL_C2_DSTA | ADDRESS & SIZE OF DESTINATION ILVU IN AGL_C2 | 6 |
| SML_AGL_C3_DSTA | ADDRESS & SIZE OF DESTINATION ILVU IN AGL_C3 | 6 |
| SML_AGL_C4_DSTA | ADDRESS & SIZE OF DESTINATION ILVU IN AGL_C4 | 6 |
| SML_AGL_C5_DSTA | ADDRESS & SIZE OF DESTINATION ILVU IN AGL_C5 | 6 |
| SML_AGL_C6_DSTA | ADDRESS & SIZE OF DESTINATION ILVU IN AGL_C6 | 6 |
| SML_AGL_C7_DSTA | ADDRESS & SIZE OF DESTINATION ILVU IN AGL_C7 | 6 |
| SML_AGL_C8_DSTA | ADDRESS & SIZE OF DESTINATION ILVU IN AGL_C8 | 6 |
| SML_AGL_C9_DSTA | ADDRESS & SIZE OF DESTINATION ILVU IN AGL_C9 | 6 |

FIG. 36

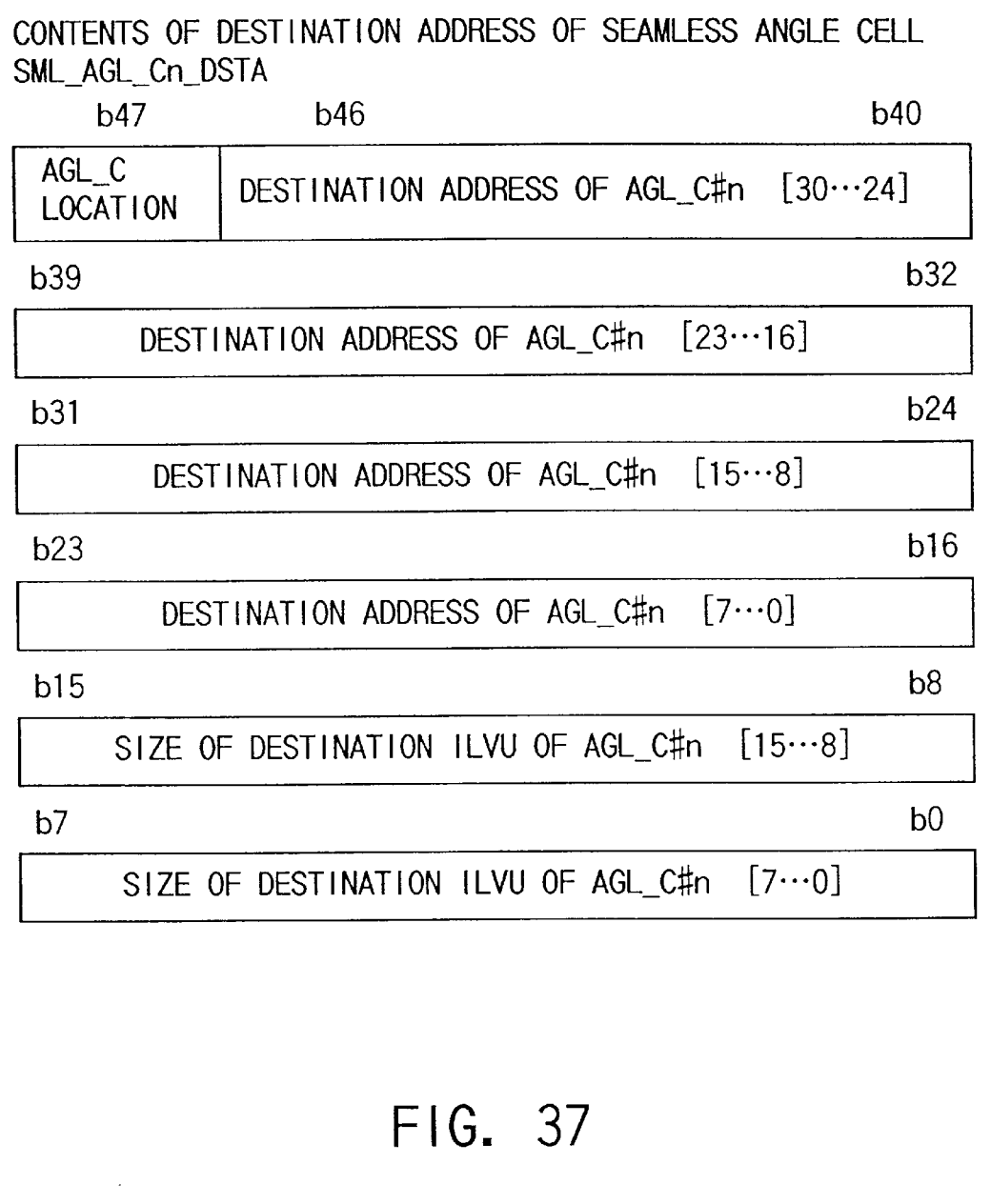

CONTENTS OF DESTINATION ADDRESS OF SEAMLESS ANGLE CELL
SML_AGL_Cn_DSTA

| b47 | b46 … b40 |
|---|---|
| AGL_C LOCATION | DESTINATION ADDRESS OF AGL_C#n [30…24] |

| b39 … b32 |
|---|
| DESTINATION ADDRESS OF AGL_C#n [23…16] |

| b31 … b24 |
|---|
| DESTINATION ADDRESS OF AGL_C#n [15…8] |

| b23 … b16 |
|---|
| DESTINATION ADDRESS OF AGL_C#n [7…0] |

| b15 … b8 |
|---|
| SIZE OF DESTINATION ILVU OF AGL_C#n [15…8] |

| b7 … b0 |
|---|
| SIZE OF DESTINATION ILVU OF AGL_C#n [7…0] |

FIG. 37

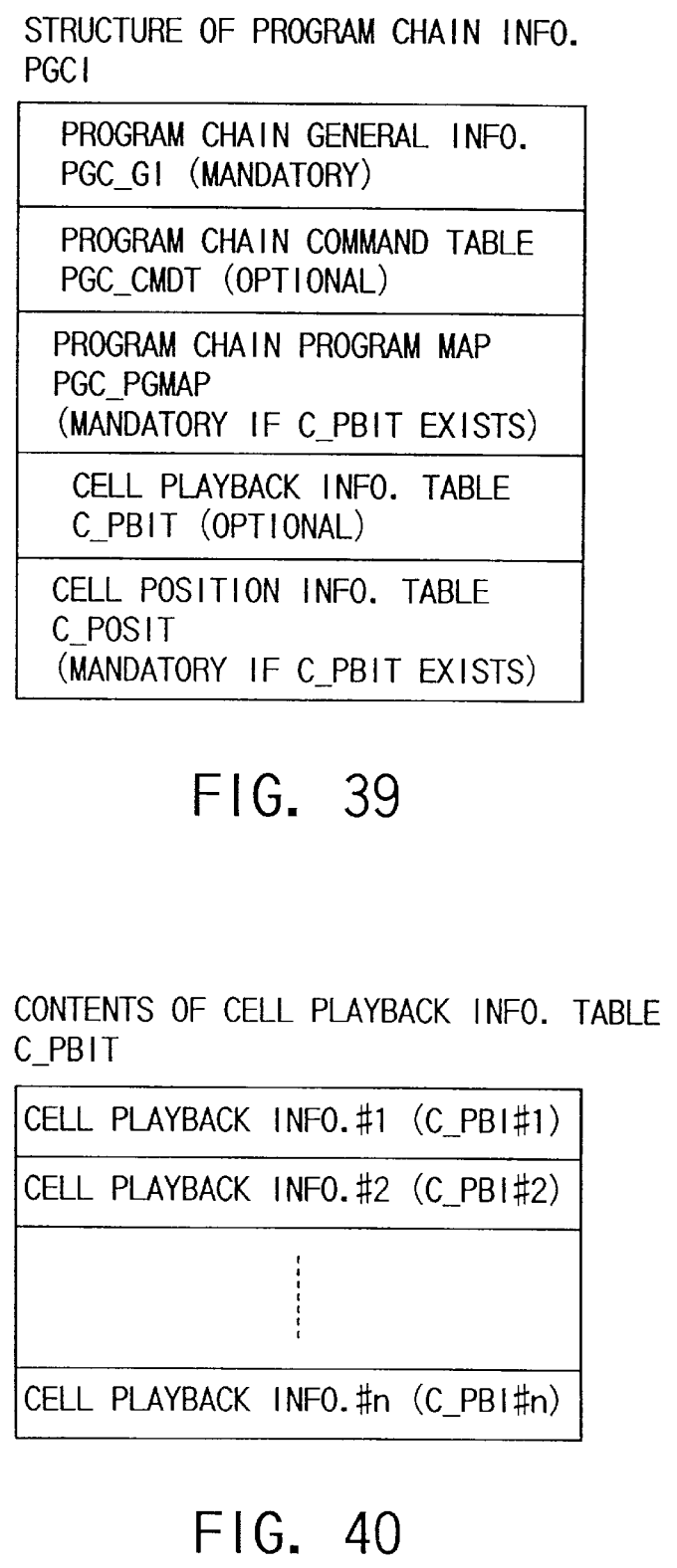

STRUCTURE OF PROGRAM CHAIN INFO.
PGCI

| PGCI |
|---|
| PROGRAM CHAIN GENERAL INFO. PGC_GI (MANDATORY) |
| PROGRAM CHAIN COMMAND TABLE PGC_CMDT (OPTIONAL) |
| PROGRAM CHAIN PROGRAM MAP PGC_PGMAP (MANDATORY IF C_PBIT EXISTS) |
| CELL PLAYBACK INFO. TABLE C_PBIT (OPTIONAL) |
| CELL POSITION INFO. TABLE C_POSIT (MANDATORY IF C_PBIT EXISTS) |

FIG. 39

CONTENTS OF CELL PLAYBACK INFO. TABLE
C_PBIT

| C_PBIT |
|---|
| CELL PLAYBACK INFO.#1 (C_PBI#1) |
| CELL PLAYBACK INFO.#2 (C_PBI#2) |
| ⋮ |
| CELL PLAYBACK INFO.#n (C_PBI#n) |

FIG. 40

CONTENTS OF CELL PLAYBACK INFORMATION C_PBI

| SYMBOL | CONTENTS | NUMBER OF BYTES |
|---|---|---|
| C_CAT | CELL CATEGORY | 4 |
| C_PBTM | CELL PLAYBACK TIME | 4 |
| C_FVOBU_SA | START ADR. OF 1ST VOBU IN CELL | 4 |
| C_FILVU_EA | END ADR. OF 1ST ILVU IN CELL | 4 |
| C_LVOBU_SA | START ADR. OF LAST VOBU IN CELL | 4 |
| C_LVOBU_EA | END ADR. OF LAST VOBU IN CELL | 4 |

FIG. 41

CONTENTS OF CELL CATEGORY C_CAT

| b31 b30 | b29 b28 | b27 | b26 | b25 | b24 |
|---|---|---|---|---|---|
| CELL BLOCK MODE | CELL BLOCK TYPE | SEAMLESS PLAYBACK FLAG | INTERLEAVED ALLOCATION FLAG | STC DIS-CONTINUITY FLAG | SEAMLESS ANGLE CHANGE FLAG |

| b23 | b22 | b21 | b20 … b16 |
|---|---|---|---|
| RESERVED | CELL PLAY-BACK MODE | ACCESS RESTRICTION FLAG | CELL TYPE |

| b15 … b8 |
|---|
| CELL STILL TIME |

| b7 … b0 |
|---|
| CELL COMMAND NUMBER |

FIG. 42

RESTRICTION OF SEAMLESS PLAYBACK FLAG &
STC DISCONTINUITY FLAG (IN CASE OF ANGLE BLOCK)

| PREVIOUS CELL | CURRENT CELL | SEAMLESS PLAYBACK FLAG | STC DIS-CONTINUITY FLAG | RESTRICTION & REMARKS |
|---|---|---|---|---|
| CELL IN ANGLE BLOCK | SINGLE CELL | 1 | 1 | END OF ANGLE BLOCK SHALL BE PRESENTED SEAMLESSLY |
| SINGLE CELL | CELL IN ANGLE BLOCK | 1 | 1 | BEGINNING OF ANGLE BLOCK SHALL BE PRESENTED SEAMLESSLY |
| NO CELL | | 0 | 1 | |
| CELL IN ANGLE BLOCK | CELL IN ANGLE BLOCK | 1 | 0 | CELLS WITH THE SAME ANGLE NUMBER SHALL BE PRESENTED SEAMLESSLY |

FIG. 43

CONTENTS OF VTSI_MAT 941

| BYTE POS. | SYMBOL | CONTENTS | NUMBER OF BYTES |
|---|---|---|---|
| 0 - 11 | VTS_ID | VTS IDENTIFIER | 12 |
| 12 - 15 | VTS_EA | END ADDRESS OF VTS | 4 |
| 16 - 27 | RESERVED | RESERVED | 12 |
| 28 - 31 | VTSI_EA | END ADDRESS OF VTSI | 4 |
| 32 - 33 | VERN | VERSION NUMBER OF DVD SPEC | 2 |
| 34 - 37 | VTS_CAT | VTS CATEGORY | 4 |
| 38 - 127 | RESERVED | RESERVED | 90 |
| 128 - 131 | VTSI_MAT_EA | END ADR. OF VTSI_MAT | 4 |
| 132 - 191 | RESERVED | RESERVED | 60 |
| 192 - 195 | VTSM_VOBS_SA | START ADR. OF VTSM_VOBS | 4 |
| 196 - 199 | VTSTT_VOBS_SA | START ADR. OF VTSTT_VOBS | 4 |
| 200 - 203 | VTS_PTT_SRPT_SA | STA ADR OF VTS_PTT_SRPT | 4 |
| 204 - 207 | VTS_PGCIT_SA | START ADR. OF VTS_PGCIT | 4 |
| 208 - 211 | VTSM_PGCI_UT_SA | STA ADR OF VTSM_PGCI_UT | 4 |
| 212 - 215 | VTS_TMAPT_SA | START ADR. OF VTS_TMAPT | 4 |
| 216 - 219 | VTSM_C_ADT_SA | STA ADR OF VTSM_C_ADT | 4 |
| 220 - 223 | VTSM_VOBU_ADMAP_SA | STA ADR VTSM_VOBU_ADMAP | 4 |
| 224 - 227 | VTS_C_ADT_SA | STA ADR OF VTS_C_ADT | 4 |
| 228 - 231 | VTS_VOBU_ADMAP_SA | STA ADR VTS_VOBU_ADMAP | 4 |
| 232 - 255 | RESERVED | RESERVED | 24 |
| 256 - 257 | VTSM_V_ATR | VIDEO ATTRIB. OF VTSM | 2 |
| 258 - 259 | VTSM_AST_Ns | NUMBER OF VTSM AUDIO STREAMS | 2 |
| 260 - 267 | VTSM_AST_ATR | AUDIO STREAM ATTRIB. OF VTSM | 8 |
| 268 - 339 | RESERVED | RESERVED | 72 |
| 340 - 341 | VTSM_SPST_Ns | NUMBER OF VTSM SP STREAMS | 2 |
| 342 - 347 | VTSM_SPST_ATR | SP STREAM ATTRIB. OF VTSM | 6 |
| 348 - 511 | RESERVED | RESERVED | 164 |
| 512 - 513 | VTS_V_ATR | VIDEO ATTRIBUTE OF VTS | 2 |
| 514 - 515 | VTS_AST_Ns | NUMBER OF VTS AUDIO STREAMS | 2 |
| 516 - 579 | VTS_AST_ATRT | VTS AUDIO STREAM ATTRIB TABLE | 64 |
| 580 - 595 | RESERVED | RESERVED | 16 |
| 596 - 597 | VTS_SPST_Ns | NUMBER OF VTS SP STREAMS | 2 |
| 598 - 789 | VTS_SPST_ATRT | VTS SP STREAM ATTRIB TABLE | 192 |
| 790 - 791 | RESERVED | RESERVED | 2 |
| 792 - 983 | VTS_MU_ AST_ATRT | MULTICHANNEL AUDIO STREAM ATTRIBUTE TABLE OF VTS | 192 |
| 984 - 2047 | RESERVED | RESERVED | 1064 |

FIG. 45

CONTENTS OF PART_OF_TITLE SEARCH POINTER TABLE PTT_SRPTI 942A

| SYMBOL | CONTENTS | NUMBER OF BYTES |
|---|---|---|
| VTS_TTU_Ns | NUMBER OF TTUs IN VTS | 2 |
| RESERVED | RESERVED | 2 |
| VTS_PTT_SRPT_EA | END ADDRESS OF VTS_PTT_SRPT | 4 |

FIG. 47

CONTENTS OF TITLE UNIT SEARCH POINTER TTU_SRP 942B

| SYMBOL | CONTENTS | NUMBER OF BYTES |
|---|---|---|
| TTU_SA | START ADDRESS OF TTU | 4 |

FIG. 48

CONTENTS OF PART_OF_TITLE SEARCH POINTER 942C

| SYMBOL | CONTENTS | NUMBER OF BYTES |
|---|---|---|
| PGCN | PROGRAM CHAIN NUMBER | 2 |
| RESERVED | RESERVED | 1 |
| PGN | PROGRAM NUMBER | 1 |

FIG. 49

CONTENTS OF VIDEO TITLE SET PROGRAM CHAIN INFO.
TABLE INFORMATION VTS_PGCITI 943A

| SYMBOL | CONTENTS | NUMBER OF BYTES |
| --- | --- | --- |
| VTS_PGCI_SRP_Ns | NUMBER OF VTS_PGCI_SRPs | 2 |
| RESERVED | RESERVED | 2 |
| VTS_PGCIT_EA | END ADDRESS OF VTS_PGCIT | 4 |

FIG. 51

CONTENTS OF VIDEO TITLE SET PROGRAM CHAIN INFO.
SEARCH POINTER VTS_PGCI_SRP 943B

| SYMBOL | CONTENTS | NUMBER OF BYTES |
| --- | --- | --- |
| VTS_PGC_CAT | VTS_PGC CATEGORY | 4 |
| VTS_PGCI_SA | START ADDRESS OF VTS_PGCI | 4 |

FIG. 52

CONTENTS OF VIDEO TITLE SET MENU PROGRAM CHAIN INFO. UNIT TABLE INFORMATION VTSM_PGCI_UTI 944A

| SYMBOL | CONTENTS | NUMBER OF BYTES |
|---|---|---|
| VTSM_LU_Ns | NUMBER OF VTSM LANGUAGE UNITS | 2 |
| RESERVED | RESERVED | 2 |
| VTSM_PGCI_UT_EA | END ADDRESS OF VTSM_PGCI_UT | 4 |

FIG. 55

CONTENTS OF VIDEO TITLE SET MENU LANGUAGE UNIT SEARCH POINTER VTSM_LU_SRP 944B

| SYMBOL | CONTENTS | NUMBER OF BYTES |
|---|---|---|
| VTSM_LCD | VTSM LANGUAGE CODE | 2 |
| RESERVED | RESERVED | 1 |
| VTSM_EXST | VTSM EXISTENCE | 1 |
| VTSM_LU_SA | START ADDRESS OF VTSM_LU | 4 |

FIG. 56

CONTENTS OF VIDEO TITLE SET MENU LANGUAGE UNIT INFO.
VTSM_LUI 944CA

| SYMBOL | CONTENTS | NUMBER OF BYTES |
|---|---|---|
| VTSM_PGCI_SRP_Ns | NUMBER OF VTSM_PGCI_SRPs | 2 |
| RESERVED | RESERVED | 2 |
| VTSM_LU_EA | END ADDRESS OF VTSM_LU | 4 |

FIG. 58

CONTENTS OF VIDEO TITLE SET MENU PROGRAM CHAIN INFO.
SEARCH POINTER VTSM_PGCI_SRP 944CB

| SYMBOL | CONTENTS | NUMBER OF BYTES |
|---|---|---|
| VTSM_PGC_CAT | VTSM_PGC CATEGORY | 4 |
| VTSM_PGCI_SA | START ADDRESS OF VTSM_PGCI | 4 |

FIG. 59

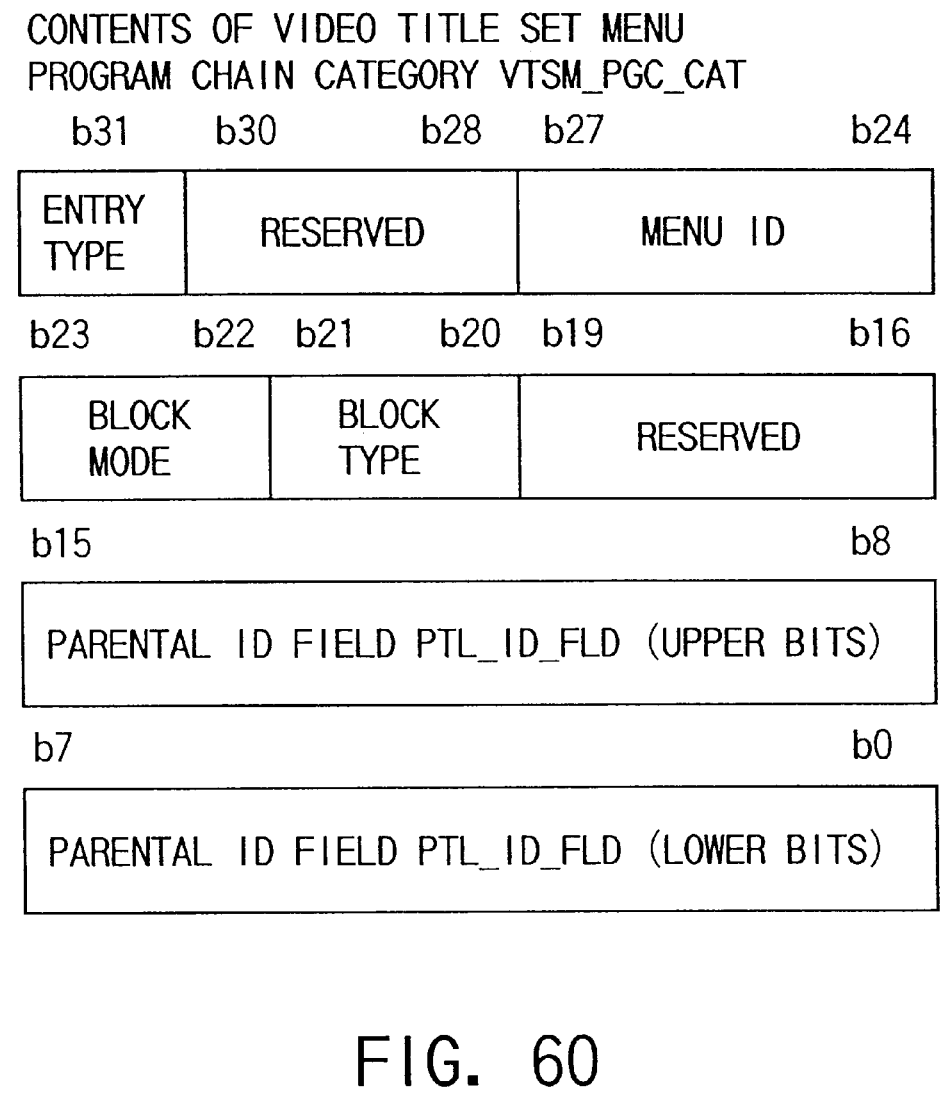

CONTENTS OF VIDEO TITLE SET MENU PROGRAM CHAIN CATEGORY VTSM_PGC_CAT

| b31 | b30 – b28 | b27 – b24 |
|---|---|---|
| ENTRY TYPE | RESERVED | MENU ID |

| b23 – b22 | b21 – b20 | b19 – b16 |
|---|---|---|
| BLOCK MODE | BLOCK TYPE | RESERVED |

| b15 – b8 |
|---|
| PARENTAL ID FIELD PTL_ID_FLD (UPPER BITS) |

| b7 – b0 |
|---|
| PARENTAL ID FIELD PTL_ID_FLD (LOWER BITS) |

FIG. 60

CONTENTS OF VIDEO TITLE SET TIME MAP TABLE INFO.
VTS_TMAPTI 945A

| SYMBOL | CONTENTS | NUMBER OF BYTES |
|---|---|---|
| VTS_TMAP_Ns | NUMBER OF VTS TIME MAPS | 2 |
| RESERVED | RESERVED | 2 |
| VTS_TMAPT_EA | END ADDRESS OF VTS_TMAPT | 4 |

FIG. 63

CONTENTS OF VIDEO TITLE SET TIME MAP SEARCH POINTER
VTS_TMAP_SRP 945B

| SYMBOL | CONTENTS | NUMBER OF BYTES |
|---|---|---|
| VTS_TMAP_SA | START ADDRESS OF VTS_TMAP | 4 |

FIG. 64

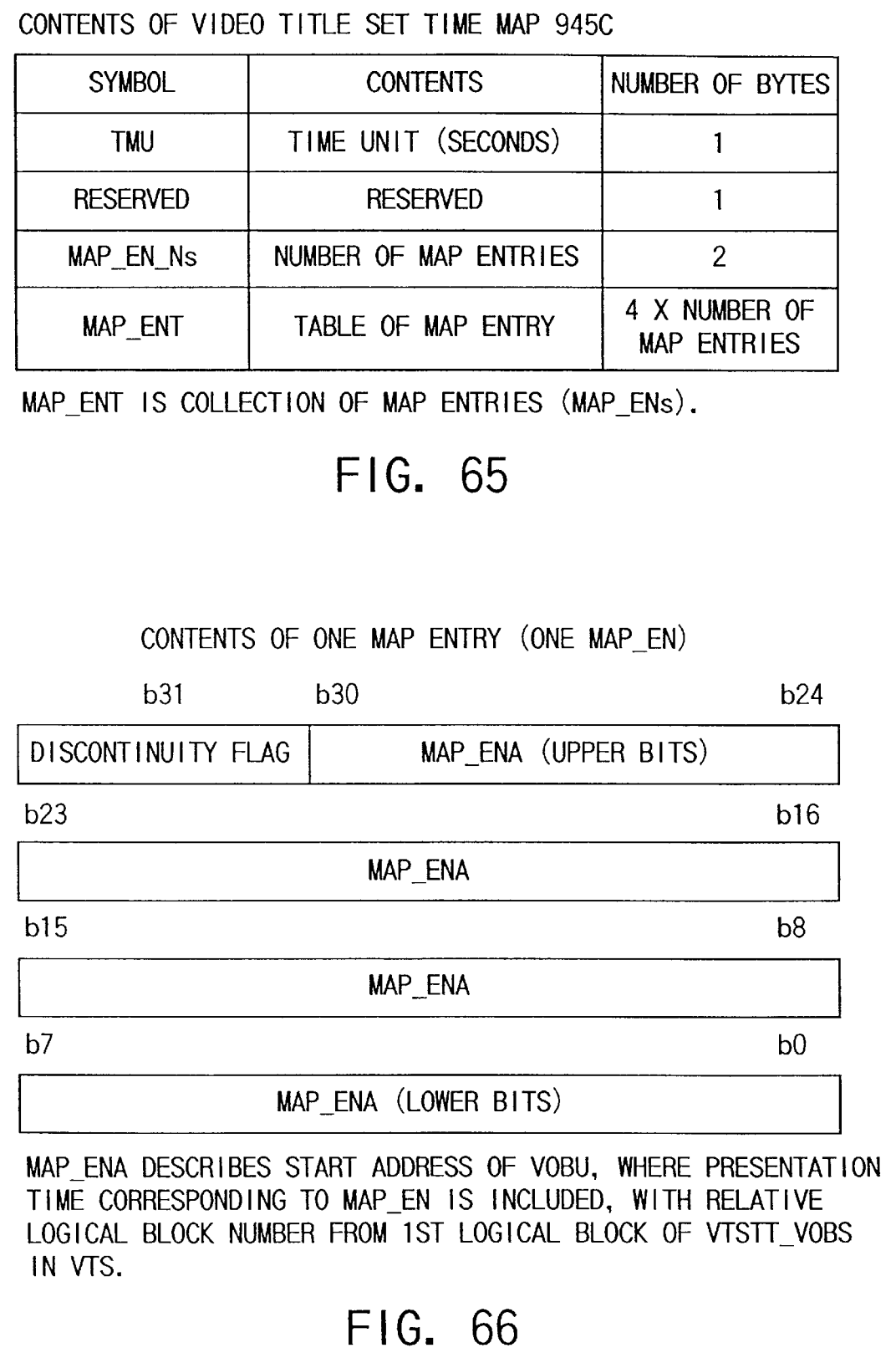

CONTENTS OF VIDEO TITLE SET TIME MAP 945C

| SYMBOL | CONTENTS | NUMBER OF BYTES |
|---|---|---|
| TMU | TIME UNIT (SECONDS) | 1 |
| RESERVED | RESERVED | 1 |
| MAP_EN_Ns | NUMBER OF MAP ENTRIES | 2 |
| MAP_ENT | TABLE OF MAP ENTRY | 4 X NUMBER OF MAP ENTRIES |

MAP_ENT IS COLLECTION OF MAP ENTRIES (MAP_ENs).

FIG. 65

CONTENTS OF ONE MAP ENTRY (ONE MAP_EN)

| b31 | b30 ... b24 |
|---|---|
| DISCONTINUITY FLAG | MAP_ENA (UPPER BITS) |

| b23 ... b16 |
|---|
| MAP_ENA |

| b15 ... b8 |
|---|
| MAP_ENA |

| b7 ... b0 |
|---|
| MAP_ENA (LOWER BITS) |

MAP_ENA DESCRIBES START ADDRESS OF VOBU, WHERE PRESENTATION TIME CORRESPONDING TO MAP_EN IS INCLUDED, WITH RELATIVE LOGICAL BLOCK NUMBER FROM 1ST LOGICAL BLOCK OF VTSTT_VOBS IN VTS.

FIG. 66

CONTENTS OF VIDEO TITLE SET MENU CELL ADDRESS TABLE INFORMATION VTSM_C_ADTI 946A

| SYMBOL | CONTENTS | NUMBER OF BYTES |
|---|---|---|
| VTSM_VOB_Ns | NUMBER OF VOBs IN VTSM_VOBS | 2 |
| RESERVED | RESERVED | 2 |
| VTSM_C_ADT_EA | END ADDRESS OF VTSM_C_ADT | 4 |

FIG. 68

CONTENTS OF VIDEO TITLE SET MENU CELL PIECE INFORMATION VTSM_CPI 946B

| SYMBOL | CONTENTS | NUMBER OF BYTES |
|---|---|---|
| VTSM_VOB_IDN | VOBU ID NUMBER FOR VTSM_CP | 2 |
| VTSM_C_IDN | CELL ID NUMBER FOR VTSM_CP | 1 |
| RESERVED | RESERVED | 1 |
| VTSM_CP_SA | START ADDRESS OF VTSM_CP | 4 |
| VTSM_CP_EA | END ADDRESS OF VTSM_CP | 4 |

FIG. 69

VIDEO TITLE SET INFO. VTSI 94

| VIDEO TITLE SET INFO. MANAGEMENT TABLE VTSI_MAT (MANDATORY) |
|---|
| VIDEO TITLE SET PART_ OF_TITLE SEARCH POINTER TABLE VTS_PTT_ SRPT (MANDATORY) |
| VIDEO TITLE SET PROGRAM CHAIN INFORMATION TABLE VTS_PGCIT (MANDATORY) |
| VIDEO TITLE SET MENU PGCI UNIT TABLE VTSM_PGCIT_UT (MANDATORY WHEN VTSM_VOBS EXISTS) |
| VIDEO TITLE SET TIME MAP TABLE VTS_TMAPT (OPTIONAL) |
| VIDEO TITLE SET MENU CELL ADDRESS TABLE VTSM_C_ADT (MANDATORY WHEN VTSM_VOBS EXISTS) |
| VIDEO TITLE SET MENU VIDEO OBJECT UNIT ADDRESS MAP VTSM_ VOBU_ADMAP (MANDATORY WHEN VTSM_VOBS EXISTS) |
| VIDEO TITLE SET CELL ADDRESS TABLE VTS_C_ADT (MANDATORY) |
| VIDEO TITLE SET VIDEO OBJECT UNIT ADDRESS MAP VTS_VOBU_ADMAP (MANDATORY) |

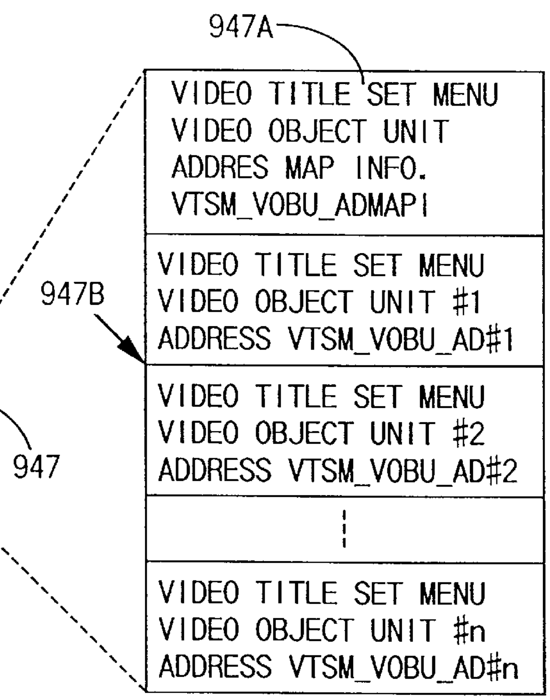

FIG. 70

CONTENTS OF VIDEO TITLE SET MENU VIDEO OBJECT UNIT ADDRESS MAP INFORMATION VTSM_VOBU_ADMAPI 947A

| SYMBOL | CONTENTS | NUMBER OF BYTES |
|---|---|---|
| VTSM_VOBU_ ADMAP_EA | END ADDRESS OF VTSM_VOBU_ADMAP | 4 |

FIG. 71

CONTENTS OF VIDEO TITLE SET MENU VIDEO OBJECT UNIT ADDRESS VTSM_VOBU_AD#n 947B

| SYMBOL | CONTENTS | NUMBER OF BYTES |
|---|---|---|
| VTSM_VOBU_SA#n | START ADDRESS OF VTSM_VOBU FOR VOBU#n | 4 |

FIG. 72

VIDEO TITLE SET INFO. VTSI 94

| VIDEO TITLE SET INFO. MANAGEMENT TABLE VTSI_MAT (MANDATORY) |
| --- |
| VIDEO TITLE SET PART_ OF_TITLE SEARCH POINTER TABLE VTS_PTT_ SRPT (MANDATORY) |
| VIDEO TITLE SET PROGRAM CHAIN INFORMATION TABLE VTS_PGCIT (MANDATORY) |
| VIDEO TITLE SET MENU PGCI UNIT TABLE VTSM_PGCIT_UT (MANDATORY WHEN VTSM_VOBS EXISTS) |
| VIDEO TITLE SET TIME MAP TABLE VTS_TMAPT (OPTIONAL) |
| VIDEO TITLE SET MENU CELL ADDRESS TABLE VTSM_C_ADT (MANDATORY WHEN VTSM_VOBS EXISTS) |
| VIDEO TITLE SET MENU VIDEO OBJECT UNIT ADDRESS MAP VTSM_ VOBU_ADMAP (MANDATORY WHEN VTSM_VOBS EXISTS) |
| VIDEO TITLE SET CELL ADDRESS TABLE VTS_C_ADT (MANDATORY) |
| VIDEO TITLE SET VIDEO OBJECT UNIT ADDRESS MAP VTS_VOBU_ADMAP (MANDATORY) |

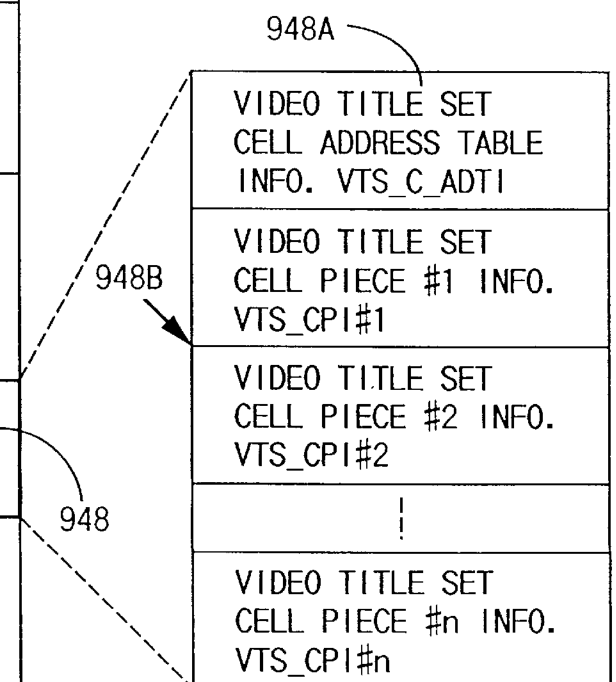

FIG. 73

CONTENTS OF VIDEO TITLE SET CELL ADDRESS TABLE INFORMATION VTS_C_ADTI 948A

| SYMBOL | CONTENTS | NUMBER OF BYTES |
|---|---|---|
| VTS_VOB_Ns | NUMBER OF VOBs IN VTSTT_VOBS | 2 |
| RESERVED | RESERVED | 2 |
| VTS_C_ADT_EA | END ADDRESS OF VTS_C_ADT | 4 |

FIG. 74

CONTENTS OF VIDEO TITLE SET CELL PIECE INFORMATION VTS_CPI 948B

| SYMBOL | CONTENTS | NUMBER OF BYTES |
|---|---|---|
| VTS_VOB_IDN | VOBU ID NUMBER FOR VTS_CP | 2 |
| VTS_C_IDN | CELL ID NUMBER FOR VTS_CP | 1 |
| RESERVED | RESERVED | 1 |
| VTS_CP_SA | START ADDRESS OF VTS_CP | 4 |
| VTS_CP_EA | END ADDRESS OF VTS_CP | 4 |

FIG. 75

VIDEO TITLE SET INFO. VTSI 94

| VIDEO TITLE SET INFO. MANAGEMENT TABLE VTSI_MAT (MANDATORY) |
| --- |
| VIDEO TITLE SET PART_ OF_TITLE SEARCH POINTER TABLE VTS_PTT_ SRPT (MANDATORY) |
| VIDEO TITLE SET PROGRAM CHAIN INFORMATION TABLE VTS_PGCIT (MANDATORY) |
| VIDEO TITLE SET MENU PGCI UNIT TABLE VTSM_PGCIT_UT (MANDATORY WHEN VTSM_VOBS EXISTS) |
| VIDEO TITLE SET TIME MAP TABLE VTS_TMAPT (OPTIONAL) |
| VIDEO TITLE SET MENU CELL ADDRESS TABLE VTSM_C_ADT (MANDATORY WHEN VTSM_VOBS EXISTS) |
| VIDEO TITLE SET MENU VIDEO OBJECT UNIT ADDRESS MAP VTSM_ VOBU_ADMAP (MANDATORY WHEN VTSM_VOBS EXISTS) |
| VIDEO TITLE SET CELL ADDRESS TABLE VTS_C_ADT (MANDATORY) |
| VIDEO TITLE SET VIDEO OBJECT UNIT ADDRESS MAP VTS_VOBU_ADMAP (MANDATORY) |

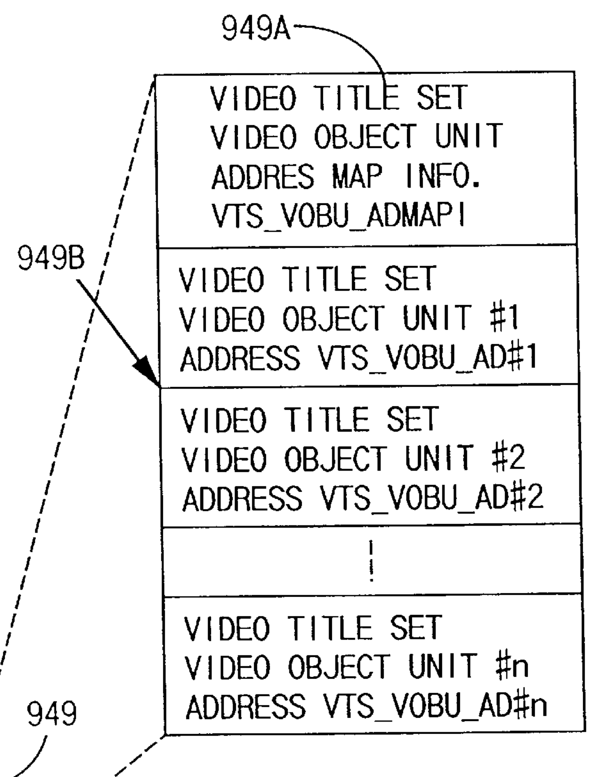

FIG. 76

CONTENTS OF VIDEO TITLE SET VIDEO OBJECT UNIT ADDRESS MAP INFORMATION VTS_VOBU_ADMAPI 949A

| SYMBOL | CONTENTS | NUMBER OF BYTES |
|---|---|---|
| VTS_VOBU_ADMAP_EA | END ADDRESS OF VTS_VOBU_ADMAP | 4 |

FIG. 77

CONTENTS OF VIDEO TITLE SET VIDEO OBJECT UNIT ADDRESS VTS_VOBU_AD#n 949B

| SYMBOL | CONTENTS | NUMBER OF BYTES |
|---|---|---|
| VTS_VOBU_SA#n | START ADDRESS OF VTS_VOBU FOR VOBU#n | 4 |

FIG. 78

EXAMPLE OF CONTENTS OF MENU TABLE 56A

| MENU TYPE | START ADDRESS OF FIRST VOBU |
|---|---|
| MAIN MENU (ROOT MENU) | C_FVOBU_SA OF VTSM_PGCI |
| TITLE MENU | |
| CHAPTER MENU OF TITLE "1" | C_FVOBU_SA OF VTS_PGCI |
| CHAPTER MENU OF TITLE "2" | |
| ⋮ | |
| AUDIO MENU OF TITLE "1" | |
| AUDIO MENU OF TITLE "2" | |
| ⋮ | |
| SUB-PICT MENU OF TITLE "1" | |
| SUB-PICT MENU OF TITLE "2" | |
| ⋮ | |
| ANGLE MENU OF TITLE "1" | |
| ANGLE MENU OF TITLE "2" | |
| ⋮ | |

FIG. 81

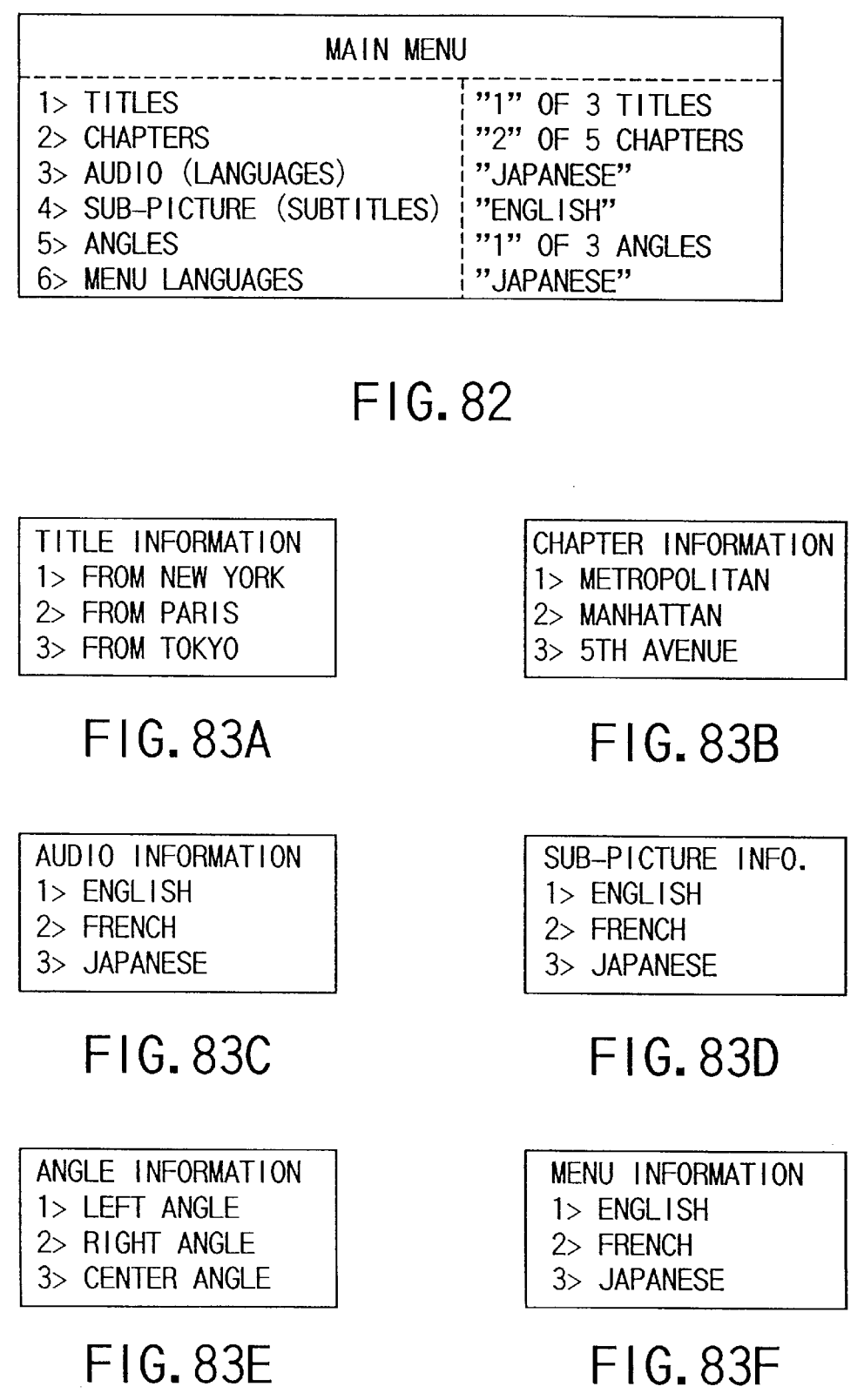

| MAIN MENU | |
|---|---|
| 1> TITLES | "1" OF 3 TITLES |
| 2> CHAPTERS | "2" OF 5 CHAPTERS |
| 3> AUDIO (LANGUAGES) | "JAPANESE" |
| 4> SUB-PICTURE (SUBTITLES) | "ENGLISH" |
| 5> ANGLES | "1" OF 3 ANGLES |
| 6> MENU LANGUAGES | "JAPANESE" |

FIG. 82

TITLE INFORMATION
1> FROM NEW YORK
2> FROM PARIS
3> FROM TOKYO

FIG. 83A

CHAPTER INFORMATION
1> METROPOLITAN
2> MANHATTAN
3> 5TH AVENUE

FIG. 83B

AUDIO INFORMATION
1> ENGLISH
2> FRENCH
3> JAPANESE

FIG. 83C

SUB-PICTURE INFO.
1> ENGLISH
2> FRENCH
3> JAPANESE

FIG. 83D

ANGLE INFORMATION
1> LEFT ANGLE
2> RIGHT ANGLE
3> CENTER ANGLE

FIG. 83E

MENU INFORMATION
1> ENGLISH
2> FRENCH
3> JAPANESE

FIG. 83F

| TITLE NUMBRE | NUMBER OF PART_OF_TITLEs (NUMBER OF CHAPTERS) | NUMBER OF ANGLES | OTHERS |
|---|---|---|---|
| 1 | 8 | 1 | ---- |
| 2 | 4 | 3 | ---- |
| 3 | 6 | 1 | ---- |

FIG. 96

| CELL NUMBER | CHAPTER NUMBER | CELL BLOCK MODE | CELL BLOCK TYPE | START ADD-RESS | END ADD-RESS |
|---|---|---|---|---|---|
| 1 | 1 | NOT | NOT* | ----- | ----- |
| 2 | 2 | NOT | NOT* | ----- | ----- |
| 3 | 3 | FIRST | ANGLE | ----- | ----- |
| 4 | 3 | MIDDLE | ANGLE | ----- | ----- |
| 5 | 3 | LAST | ANGLE | ----- | ----- |
| 6 | 4 | NOT | NOT* | ----- | ----- |

MEANING OF "NOT" (=00b); BLOCK NOT IN CELL
"FIRST" (=01b); FIRST BLOCK IN CELL
"MIDDLE" (=10b); MIDDLE BLOCK IN CELL
"LAST" (11b); LAST BLOCK IN CELL
"NOT*" (=00b); NOT PART OF BLOCK
"ANGLE" (=01b); ANGLE BLOCK

FIG. 97

MULTIANGLE BLOCK REPRODUCTION SYSTEM

BACKGROUND OF THE INVENTION

The present invention relates to an improvement in a digital video disk or digital versatile disk (DVD disk) capable of recording image and audio data on a signal recording medium and reproducing them in synchronism with each other, and a reproduction system therefor.

More particularly, the present invention relates to, in this system, an improved user interface in a DVD player capable of selectively and freely reproducing an image at an arbitrary angle desired by a user (viewer) in reproducing data from a DVD format disk capable of recording, in the form of a multiangle block, a set of images obtained by photographing or imaging a single scene (or a single event or a related event) at different angles.

Currently popular visual and audio recording media such as a compact disk (CD) and a laser disk (LD) have no idea of a multiangle block of "recording a set of images obtained by photographing or imaging a single scene at different angles". A title producer (provider) cannot produce or distribute such multiangle software (optical disk), even if wanted.

Even though an optical disk recorded with multiangle software were made, no user has a player having a multiangle reproduction function (such a player is not commercially available). Even if the provider wants to provide software using the multiangle function, there is no environment (infrastructure) for reproducing multiangle software.

Under these circumstances, a large-capacity DVD disk have been introduced initially called as a super density (SD) disk. The DVD has a special format which can realize the recording/reproducing function of the multiangle block. By this format, any provider can produce software using the multiangle function, can record such multiangle software on DVD disks, and distribute these DVD disks.

Further, in a video-on-demand system wherein contents of a DVD software including the multiangle block can be received by subscribers with certain charge (or with no-charge but with a commercial program), the provider can produce software using the multiangle function. Such software can be distributed to any subscriber of the video-on-demand system via digital lines, at the time when the subscriber demands such software.

In a player for reproducing a multiangle software (DVD disk) based on the above format, it is indispensable to reproduce the multiangle block. For this reason, any DVD player shall reproduce a disk on which the multiangle block is recorded, and has to allow an end user to freely select and reproduce an image with an angle desired by him or her.

Before the present invention has been made, there is no means for clearly notifying the user (viewer) whether or not he or she can voluntarily select a desired angle, or no means for clearly notifying the viewer whether or not the current scene allows an angle selection by the user (or whether or not the multiangle block is currently played back).

Further, (especially in a video-on-demand system,) no means is available to a user to easily instruct an angle change during the reproduction of the multiangle block.

BRIEF SUMMARY OF THE INVENTION

It is accordingly the first object of the present invention to provide a user interface in a system capable of freely and selectively reproducing an image at an arbitrary angle desired by a viewer in a disk reproduction mode, wherein a DVD disk capable of recording, in the form of a multiangle block, a set of images obtained by photographing or imaging a single scene (or a single event or a related event) at different angles is used, and a reproduction system for such a DVD disk is used.

It is the second object of the present invention to provide a remote controller provided with an angle change instruction key (simply called angle key) applied to the reproduction system of the present invention.

It is the third object of the present invention to provide a disk reproduction apparatus having the above-mentioned user interface.

It is the fourth object of the present invention to provide a multiangle block reproduction method having the above-mentioned user interface.

It is the fifth object of the present invention to provide a medium for recording information containing the multiangle block.

It is the sixth object of the present invention to provide a computer-readable program by which a personal computer provided with a DVD disk drive can be changed to a virtual DVD player having the above-mentioned user interface.

It is the seventh object of the present invention to provide a video-on-demand system utilizing the reproduction system of the present invention.

A multiangle block reproduction system according to the first invention is a system capable of selectively reproducing a plurality of images recorded on an angle block (AGL_C#i in FIG. 32 or 38) of a recording medium (10) having a format with which a set of a plurality of images obtained by photographing or imaging a photographic target at a variety of camera angles can be recorded in the form of the angle block (AGL_C#i), wherein when the recording medium (10) on which a program source (title) containing the angle block (AGL_C#i) is recorded is set, an angle mark (407) notifying a "program source with an angle block" is turned on (ST34 in FIG. 98), and when a portion of the angle block (AGL_C#i) of the program source is set in a reproduction mode, the angle mark (407) notifying that a "change in angle is possible" is flickered, modified, or changed in color (ST52 in FIG. 99).

A remote controller used in the multiangle block reproduction system according to the second invention comprises an angle key (5 ang in FIG. 5 or 8) to send an angle change instruction (YES at ST40 in FIG. 99) to the reproduction system when the angle mark (407) is flickered, modified, or changed in color (ST52 in FIG. 99).

A remote controller used for the multiangle block reproduction system according to the third invention comprises an angle mark ON/OFF key (5 am in FIG. 5) to selectively set the ON state of the angle mark (407) to an ON/OFF state (ST34 and ST36 in FIG. 98) when the angle mark (407) is set in an ON state.

A remote controller used for the multiangle block reproduction system according to the fourth invention comprises a display (5*z* in FIG. 5) for displaying the angle mark (407).

In a remote controller used for the multiangle block reproduction system according to the fifth invention, the angle mark (407) includes a shape (FIG. 9) for illustrating a camera angle direction.

A multiangle block reproduction system according to the sixth invention comprises a display window (4*w* in FIGS. 6 and 7) having the angle mark (407), and the angle mark (407) displayed in the display window (4*w* in FIG. 7) includes a shape (FIG. 9) for illustrating a camera angle direction.

A remote controller used for the multiangle block reproduction system according to the seventh invention includes a key (5*q* and 5 ang in FIG. 5 or 8) for changing an angle number contained in the angle block (AGL_C#i).

A multiangle block reproduction system according to the eighth invention comprises means (6 in FIG. 6; ST48 in FIG. 82 or 99) for displaying an angle number contained in the angle block (AGL_C#i).

A multiangle block reproduction system according to the ninth invention comprises means (6 in FIG. 1; ST66 in FIG. 100) for displaying an angle number of the angle block (AGL_C#i) under reproduction.

A reproduction apparatus according to the 10th invention is a reproduction apparatus (FIG. 1) for selectively reproducing video data (corresponding to VOBU 85 in FIG. 11) in an angle cell (AGL_C#i) from a disk-like recording medium (10 in FIG. 3) having a lead-in area (27) on a central side, an area (71 in FIG. 10) for recording a video manager (VMG) outside the lead-in area (27), and at least one area (72 in FIG. 10) for recording a video title set (VTS#n) outside the video manager recording area (71), the at least one video title set recording area (72) having an angle block constituted by a plurality of angle cells (AGL_C#i in FIG. 32 or 38), and the angle cells (AGL_C#i) containing different video data (AGL_C#i; corresponding to cells 84 in FIG. 11) obtained by photographing or imaging a photographic target at a variety of camera angles, wherein the video manager (VMG 71) of the disk-like recording medium (10) has video manager information (VMG 175 in FIG. 12), the video manager information (VMG 175) contains a title search pointer table (TT_SRPT 752 in FIG. 16), the title search pointer table (TT_SRPT 752) contains a title search pointer (TT_SRP 752B in FIG. 18), and the title search pointer (TT_SRP 752B) contains an angle count or number of angles (AGL_Ns), and the reproduction apparatus (FIG. 1) comprises an angle mark (407 in FIG. 7) for notifying the presence of the angle cell (AGL_C#i), and means (CPU 50 in FIG. 1) for checking the angle count (AGL_Ns) (ST16C in FIG. 89), and when the angle count represents a plurality of angles (YES at ST30 in FIG. 98), turning on the angle mark (407).

A reproduction apparatus according to the 11th invention is a reproduction apparatus (FIG. 1) for selectively reproducing video data (corresponding to VOBU 85 in FIG. 11) in an angle cell (AGL_C#i) from a disk-like recording medium (10 in FIG. 3) having a lead-in area (27) on a central side, an area (71 in FIG. 10) for recording a video manager (VMG) outside the lead-in area (27), and at least one area (72 in FIG. 10) for recording a video title set (VTS#n) outside the video manager recording area (71), the at least one video title set recording area (72) having an angle block constituted by a plurality of angle cells (AGL_C#i in FIG. 32 or 38), and the angle cells (AGL_C#i) containing different video data (AGL_C#i; corresponding to cell 84 in FIG. 11) obtained by photographing or imaging a photographic target at a variety of camera angles, wherein the video manager (VMG 71) of the disk-like recording medium (10) has video manager information (VMGI 75 in FIG. 12), the video manager information (VMGI 75) contains a title search pointer table (TT_SRPT 752 in FIG. 16), the title search pointer table (TT_SRPT 752) contains a title search pointer (TT_SRP 752B in FIG. 18), and the title search pointer (TT_SRP 752B) contains an angle count or number of angles (AGL_Ns), and the reproduction apparatus (FIG. 1) comprises an angle mark (407 in FIG. 7) for notifying the presence of the angle cell (AGL_C#i), first means (CPU 50 in FIG. 1) for checking (ST16C in FIG. 89) the angle count (AGL_Ns), and when the angle count represents a plurality of angles (YES at ST30 in FIG. 98), turning on (ST34) the angle mark (407), and second means (CPU 50) for, when the angle count represents only one angle (AGL_Ns), turning off (ST36) the angle mark (407).

A reproduction apparatus according to the 12th invention is a reproduction apparatus (FIG. 1) for selectively reproducing video data (corresponding to VOBU 85 in FIG. 11) in an angle cell (AGL_C#i) from a disk-like recording medium (10 in FIG. 3) having a lead-in area (27) on a central side, an area (71 in FIG. 10) for recording a video manager (VMG) outside the lead-in area (27), and at least one area (72) for recording a video title set (VTS#n) outside the video manager recording area (71), the at least one video title set recording area (72) having an angle block constituted by a plurality of angle cells (AGL_C#i in FIG. 32 or 38), and the angle cells (AGL_C#i) containing different video data (AGL_C#i; corresponding to cell 84 in FIG. 11) obtained by photographing or imaging a photographic target at a variety of camera angles, wherein the video manager (VMG 71) of the disk-like recording medium (10) has video manager information (VMGI 75 in FIG. 12), the video manager information (VMGI 75) contains a title search pointer table (TT_SRPT 752 in FIG. 16), the title search pointer table (TT_SRPT 752) contains a title search pointer (TT_SRP 752B in FIG. 18), and the title search pointer (TT_SRP 752B) contains an angle count or number of angles (AGL_Ns), and the reproduction apparatus (FIG. 1) comprises an angle mark (407 in FIG. 7) for notifying the presence of the angle cell (AGL_C#i), first means (CPU 50 in FIG. 1) for checking (ST16C in FIG. 89) the angle count (AGL_Ns), and when the angle count represents a plurality of angles (YES at ST30 in FIG. 98), turning on (ST34) the angle mark (407), second means (CPU 50) for, when the angle count represents only one angle (NO at ST30 in FIG. 98), turning off (ST36) the angle mark (407), and third means (CPU 50+5 am in FIG. 5) for, even when the angle count (AGL_Ns) represents the plurality of angles (YES at ST30), forcibly turning off (NO at ST32; ST36) the angle mark (407).

A reproduction apparatus according to the 13th invention is a reproduction apparatus (FIG. 1) for selectively reproducing video data (VOBU 85 in FIG. 11) in an angle cell (AGL_C#i) from a disk-like recording medium (10 in FIG. 3) having a lead-in area (27) on a central side, an area (71 in FIG. 10) for recording a video manager (VMG) outside the lead-in area (27), and at least one area (72 in FIG. 10) for recording a video title set (VTS#n) outside the video manager recording area (71), the at least one video title set recording area (72) having an angle block constituted by a plurality of angle cells (AGL_C#i in FIG. 32 or 38), and the angle cells (AGL_C#i) containing different video data (AGL_C#i; corresponding to cell 84 in FIG. 11) obtained by photographing or imaging a photographic target at a variety of camera angles, wherein the video manager (VMG 71) of the disk-like recording medium (10) has video manager information (VMGI 75 in FIG. 12), the video manager information (VMGI 75) contains a title search pointer table (TT_SRPT 752 in FIG. 16), the title search pointer table (TT_SRPT 752) contains a title search pointer (TT_SRP 752B in FIG. 18), and the title search pointer (TT_SRP 752B) contains an angle count or number of angles (AGL_Ns), and the reproduction apparatus (FIG. 1) comprises an angle mark (407 in FIG. 7) for notifying the presence of the angle cell (AGL_C#i), first means (CPU 50 in FIG. 1) for checking (ST16C in FIG. 89) the angle count (AGL_Ns), and when the angle count represents a plurality of angles (YES at ST30 in FIG. 98), turning on (ST34) the angle mark (407), second means (CPU 50) for, when the angle count represents only one angle (NO at ST30 in FIG. 98), turning off (ST36) the angle mark (407), third means (CPU 50) for, even when the angle count represents the plurality of angles (YES at ST30), turning on (ST34) or off (ST36) the angle mark (407), and a remote controller (5 in FIG. 5) having an angle mark ON/OFF key (5 am) for instructing (ST36) an ON (ST34)/OFF (ST36) operation of the angle mark (407) to the third means (CPU 50).

A reproduction apparatus according to 14th invention is a reproduction apparatus (FIG. 1) for selectively reproducing video data (corresponding to VOBU 85 in FIG. 11) in an angle cell (AGL_C#i) from a disk-like recording medium (10 in FIG. 3) having a lead-in area (27) on a central side, an area (71 in FIG. 10) for recording a video manager (VMG) outside the lead-in area (27), and at least one area (72) for recording a video title set (VTS#n) outside the video manager recording area (71), the at least one video title set recording area (72) having an angle block constituted by a plurality of angle cells (AGL_C#i in FIG. 32 or 38) and the angle cells (AGL_C#i) containing different video data (AGL_C#i; corresponding to cell 84 in FIG. 11) obtained by photographing or imaging a photographic target at a variety of camera angles, wherein the video title set (VTS 72) of the disk-like recording medium (10) contains at least one video object set (VOBS 82 in FIG. 11), the video object set (VOBS) contains at least one video object (VOB 83), the video object (VOB 83) contains at least one cell (84) including the angle cell (AGL_C#i), the cell (84) contains at least one video object unit (VOBU 85), each of the at least one video object unit (VOBU 85) contains a navigation pack (86) at a head thereof, the navigation pack (86) contains presentation control information (PCI data 113 in FIG. 26), and the presentation control information (PCI in FIG. 28) contains nonseamless angle information (NSML_AGLI) having address data (NSML_AGL_Cn_DSTA in FIG. 30) of each angle cell (AGL_C#i), and the reproduction apparatus (FIG. 1) comprises an angle mark (407 in FIG. 7) notifying the presence of the angle block (AGL_C#i), first means (CPU 50 in FIG. 1) for checking (ST16C in FIG. 89) the angle count (AGL_Ns), and when the angle count represents a plurality of angles (YES at ST30 in FIG. 98), turning on (ST34) the angle mark (407), and second means (CPU 50) for, when the angle count represents the plurality of angles (YES at ST30 in FIG. 98), referring to the address data (NSML_AGL_Cn_DSTA in FIG. 30) of each angle cell (AGL_C#i), returning to another angle cell different from the angle cell under reproduction along a reproduction time axis, and nonseamlessly switching (FIG. 32; ST44 in FIG. 99; ST68 in FIG. 100; 76 in FIG. 101) the reproduction target.

A reproduction apparatus according to the 15th invention is a reproduction apparatus (FIG. 1) for selectively reproducing video data (VOBU 85 in FIG. 11) in an angle cell (AGL_C#i) from a disk-like recording medium (10 in FIG. 3) having a lead-in area (27) on a central side, an area (71 in FIG. 10) for recording a video manager (VMG) outside the lead-in area (71), and at least one area (72) for recording a video title set (VTS#n) outside the video manager recording area (71), the at least one video title set recording area (72) having an angle block constituted by a. plurality of angle cells (AGL_C#i in FIG. 32 or 38), and the angle cells (AGL_C#i) containing different video data (AGL_C#i; corresponding to cell 84 in FIG. 11) obtained by photographing or imaging a photographic target at a variety of camera angles, wherein the video title set (VTS 72) of the disk-like recording medium (10) contains at least one video object set (VOBS 82 in FIG. 11), the video object set (VOBS) contains at least one video object (VOB 83), the video object (VOB 83) contains at least one cell (84) including the angle cell (AGL_C#i), the cell (84) contains at least one video object unit (VOBU 85), each of the at least one video object unit (VOBU 85) contains a navigation pack (86) at a head thereof, the navigation pack (86) contains data search information (DSI data 115 in FIG. 26), and the data search information (DSI in FIG. 34) contains nonseamless angle information (SML_AGLI) having address data (SML_AGL_Cn_DSTA in FIG. 36) of each angle cell (AGL_C#i), the video title set (VTS 72) of the disk-like recording medium (10) contains a program chain (PGC in FIG. 13) constituted by at least one cell (84) including the angle cell (AGL_C#i), the program chain (PGC) contains program chain information (PGCI), the program chain information (PGCI) contains a cell playback information table (C_PBIT in FIG. 39), the cell playback information table (C_PBIT) contains at least one cell playback information (C_PBIn in FIG. 40), each of at least one cell playback information (C_PBI) contains a cell category (C_CAT in FIG. 41), and the cell category (C_CAT) contains a cell block type (FIG. 42) representing the angle block or not and a seamless angle change flag (FIG. 42) representing a seamless angle change or not, and the reproduction apparatus (FIG. 1) comprises an angle mark (407 in FIG. 7) notifying the presence of the angle block (AGL_C#i), first means (CPU 50 in FIG. 1) for checking (ST16C in FIG. 89) the angle count (AGL_Ns), and when the angle count represents a plurality of angles (YES at ST30 in FIG. 98), turning on (ST34) the angle mark (407), second means (CPU 50) for, when the cell block type (FIG. 42) of the cell category (C_CAT) represents (binary 01) a current angle block (YES at ST50 in FIG. 99), flickering or modifying the angle mark or displaying (ST52) the angle mark (407) in another color, and second means (CPU 50) for, when the cell block type (FIG. 42) of the cell category (C_CAT) represents the current angle block (YES at ST30 in FIG. 98; YES at ST46 in FIG. 99) and the seamless angle change flag (FIG. 42) of the category (C_CAT) represents (binary 1) a seamless angle change (YES at ST50 in FIG. 99), referring to the address data (SML_AGL_Cn_DSTA in FIG. 36) of each angle cell (AGL_C#i) and seamlessly switching (FIG. 38; ST44 in FIG. 99; ST68 in FIG. 100; 76 in FIG. 101) the reproduction target to another angle cell different from the angle cell under reproduction without returning along a reproduction time axis.

An angle mark turn-on method according to the 16th invention is an angle mark turn-on method in a reproduction apparatus for selectively reproducing video data (corresponding to VOBU 85 in FIG. 11) in an angle cell (AGL_C#i) from a disk-like recording medium (10 in FIG. 3) having a lead-in area (27) on a central side, an area (71 in FIG. 10 for recording a video manager (VMG) outside the lead-in area (27), and at least one area (72 in FIG. 10) for recording a video title set (VTS#n) outside the video manager recording area (71), the at least one video title set recording area (72) having an angle block constituted by a plurality of angle cells (AGL_C#i in FIG. 32 or 38), and the angle cells (AGL_C#i) containing different video data (AGL_C#i; corresponding to cell 84 in FIG. 11) obtained by photographing or imaging a photographic target at a variety of camera angles, comprising recording video manager information (VMGI 75 in FIG. 12) on the video manager (VMG 71) of the disk-like recording medium (10), recording a title search pointer table (TT_SRPT 752 in FIG. 16) on the video manager information (VMGI 75), recording a title search pointer (TT_SRP 752B in FIG. 18) on the title search pointer table (TT_SRPT 752), recording an angle count or number of angles (AGL_Ns) on the title search pointer (TT_SRP 752B), and checking (ST16C in FIG. 89) the angle count (AGL_Ns), and when the angle count represents a plurality of angles (YES at ST30 in FIG. 98), turning on (ST34) the angle mark (407) notifying the presence of the angle cell (AGL_C#i).

An angle mark turn-on/off method according to the 17th invention is an angle mark turn-on/off method in a reproduction apparatus for selectively reproducing video data (corresponding to VOBU 85 in FIG. 11) in an angle cell (AGL_C#i) from a disk-like recording medium (10 in FIG. 3) having a lead-in area (27) on a central side, an area (71 in FIG. 10) for recording a video manager (VMG) outside the lead-in area (27), and at least one area (72 in FIG. 10) for recording a video title set (VTS#n) outside the video manager recording area (71), the at least one video title set recording area (72) having an angle block constituted by a plurality of angle cells (AGL_C#i in FIG. 32 or 38), and the angle cells (AGL_C#i) containing different video data (AGL_C#i; corresponding to cell 84 in FIG. 11) obtained by photographing or imaging a photographic target at a variety of camera angles, comprising recording video manager information (VMGI 75 in FIG. 12) on the video manager (VMG 71) of the disk-like recording medium (10), recording a title search pointer table (TT_SRPT 752 in FIG. 16) on the video manager information (VMGI 75), recording a title search pointer (TT_SRP 752B in FIG. 18) on the title search pointer table (TT_SRPT 752), recording an angle count or number of angles (AGL_Ns) on the title search pointer (TT_SRP 752B), checking (ST16C in FIG. 89) the angle count (AGL_Ns), and when the angle count represents a plurality of angles (YES at ST30 in FIG. 98), turning on (ST34) the angle mark (407) notifying the presence of the angle cell (AGL_C#i), and when the angle count represents only one angle (NO at ST30 in FIG. 98), turning off (ST36) the angle mark (407).

An angle mark turn-on/off method according to the 18th invention is an angle mark turn-on/off method in a reduction apparatus for selectively reproducing video data (corresponding to VOBU 85 in FIG. 11) in an angle cell (AGL_C#i) from a disk-like recording medium (10 in FIG. 3) having a lead-in area (27) on a central side, an area (71 in FIG. 10) for recording a video manager (VMG) outside the lead-in area (27), and at least one area (72 in FIG. 10) for recording a video title set (VTS#n) outside the video manager recording area (71), the at least one video title set recording area (72) having an angle block constituted by a plurality of angle cells (AGL_C#i in FIG. 32 or 38), and the angle cells (AGL_C#i) containing different video data (AGL_C#i; corresponding to cell 84 in FIG. 11) obtained by photographing or imaging a photographic target at a variety of camera angles, comprising recording video manager information (VMGI 75 in FIG. 12) on the video manager (VMG 71) of the disk-like recording medium (10), recording a title search pointer table (TT_SRPT 752 in FIG. 16) on the video manager information (VMGI 75), recording a title search pointer (TT_SRP 752B in FIG. 18) on the title search pointer table (TT_SRPT 752), recording an angle count or number of angles (AGL_Ns) on the title search pointer (TT_SRP 752B), checking (ST16C in FIG. 89) the angle count (AGL_Ns), and when the angle count represents a plurality of angles (YES at ST30 in FIG. 98), turning on (ST34) the angle mark (407) notifying the presence of the angle cell (AGL_C#i), when the angle count represents only one angle (NO at ST30 in FIG. 98), turning off (ST36) the angle mark (407), and even when the angle count represents the plurality of angles (YES at ST30), arbitrarily turning off (NO at ST32; ST36) the angle mark (407).

A nonseamless angle change method according to the 19th invention is a nonseamless angle change method in a reproduction apparatus for selectively reproducing video data (corresponding to VOBU 85 in FIG. 11) in an angle cell (AGL_C#i) from a disk-like recording medium (10 in FIG. 3) having a lead-in area (27) on a central side, an area (71 in FIG. 10) for recording a video manager (VMG) outside the lead-in area (27), and at least one area (72 in FIG. 10) for recording a video title set (VTS#n) outside the video manager recording area (71), the at least one video title set recording area (72) having an angle block constituted by a plurality of angle cells (AGL_C#i in FIG. 32 or 38), and the angle cells (AGL_C#i) containing different video data (AGL_C#i; corresponding to cell 84 in FIG. 11) obtained by photographing or imaging a photographic target at a variety of camera angles, comprising recording at least one video object set (VOBS 82 in FIG. 11) on the video title set (VTS 72) of the disk-like recording medium (10), recording at least one video object (VOB 83) on the video object set (VOBS), recording at least one cell (84) including the angle cell (AGL_C#i) on the video object (VOB 83), recording at least one video object unit (VOBU 85) on the cell (84), recording a navigation pack (86) at a head of each of the at lest one object unit (VOBU 85), recording presentation control information (PCI data in FIG. 26) on the navigation pack (86), recording nonseamless angle information (NSML_AGLI) including address data (NSML_AGL_Cn_

DSTA in FIG. 30) of each angle cell (AGL_C#i) on the presentation control information (PCI in FIG. 28), checking (ST16C in FIG. 89) the angle count (AGL_Ns), and when the angle count represents a plurality of angles (YES at ST30 in FIG. 98), turning on (ST34) an angle mark (407) notifying the presence of the angle block (AGL_C#i), and when the angle count (AGL_Ns) represents the plurality of angles (YES at ST30 in FIG. 98), referring to the address data (NSML_AGL_Cn_DSTA in FIG. 30) of each angle cell (AGL_C#i), returning to another angle cell different from the angle cell under reproduction along a reproduction time axis, and nonseamlessly switching (FIG. 32; ST44 in FIG. 99; ST68 in FIG. 100; ST76 in FIG. 101) the reproduction target.

A seamless angle change method according to the 20th invention is a seamless angle change method in a reproduction apparatus for selectively reproducing video data (corresponding to VOBU 85 in FIG. 11) in an angle cell (AGL_C#i) from a disk-like recording medium (10 in FIG. 3) having a lead-in area (27) on a central side, an area (71 in FIG. 10) for recording a video manager (VMG) outside the lead-in area (27), and at least one area (72 in FIG. 10) for recording a video title set (VTS#n) outside the video manager recording area (71), the at least one video title set recording area (72) having an angle block constituted by a plurality of angle cells (AGL_C#i in FIG. 32 or 38), and the angle cells (AGL_C#i) containing different video data (AGL_C#i; corresponding to cell 84 in FIG. 11) obtained by photographing or imaging a photographic target at a variety of camera angles, comprising recording at least one video object set (VOBS 82 in FIG. 11) on the video title set (VTS 72) of the disk-like recording medium (10), recording at least one video object (VOB 83) on the video object set (VOBS), recording at least one cell (84) including the angle cell (AGL_C#i) on the video object (VOB 83), recording at least one video object unit (VOBU 85) on the cell (84), recording a navigation pack (86) at a head of each of the at lest one object unit (VOBU 85), recording data search information (DSI data 115 in FIG. 26) on the navigation pack (86), recording seamless angle information (SML_AGLI) including the address data (SML_AGL_Cn_DSTA in FIG. 36) of each angle cell (AGL_C#i) on the data search information (DSI in FIG. 34), recording, on the video title set (VTS 72), a program chain (PGC in FIG. 13) constituted by at least one cell (84) including the angle cell (AGL_C#i), recording program chain information (PGCI) on the program chain (PGC), recording a cell playback information table (C_PBIT in FIG. 39) on the program chain information (PGCI), recording at least one cell playback information (C_PBIn in FIG. 40) on the cell playback information table (C_PBIT), recording a cell category (C_CAT in FIG. 41) on each of the at least one cell playback information (C_PBI), recording, on the cell category (C_CAT), a cell block type (FIG. 42) representing the angle block or not and a seamless angle change flag (FIG. 42) representing a seamless angle change or not, checking (ST16C in FIG. 89) the angle count (AGL_Ns), and when the angle count represents a plurality of angles (YES at ST30 in FIG. 98), turning on (ST34) the angle mark (407) notifying the presence of the angle block (AGL_C#i), when the cell block type (FIG. 42) of the cell category (C_CAT) represents (binary 01) a current angle block (YES at ST50 in FIG. 99), flickering or modifying the angle mark or displaying (ST52) the angle mark (407) in another color, and when the cell block type (FIG. 42) of the cell category (C_CAT) represents the current angle block (YES at ST30 in FIG. 98; YES at ST46 in FIG. 99) and the seamless angle change flag (FIG. 42) of the category (C_CAT) represents (binary 1) a seamless angle change (YES at ST50 in FIG. 99), referring to the address data (SML_AGL_Cn_DSTA in FIG. 36) of each angle cell (AGL_C#i) and seamlessly switching the reproduction target to another angle cell different from the angle cell under reproduction without returning along a reproduction time axis.

A disk-like recording medium (10 in FIG. 3) according to the 21st invention has a lead-in area (27) on a central side, an area (71 in FIG. 10) for recording a video manager (VMG) outside the lead-in area (27), and at least one area (72 in FIG. 10) for recording a video title set (VTS#n) outside the video manager recording area (71), the at least one video title set recording area (72) having an angle block constituted by a plurality of angle cells (AGL_C#i in FIG. 32 or 38), and the angle cells (AGL_C#i) containing different video data (AGL_C#i; corresponding to cell 84 in FIG. 11) obtained by photographing or imaging a photographic target at a variety of camera angles.

The video manager (VMG) of the disk-like recording medium (10) includes video manager information (VMGI in FIG. 12), the video manager information (VMGI) includes a title search pointer table (TT_SRPT in FIG. 16), the title search pointer table (TT_SRPT) includes a title search pointer (TT_SRP in FIG. 18), the title search pointer (TT_SRP) includes an angle count or number of angles (AGL_Ns).

When the angle count (AGL_Ns) represents a plurality of angles (YES at ST30 in FIG. 98), the medium is so constructed to indicate an existence of the angle cells (AGL_C#i).

In a recording medium according to the 22nd invention, when the angle count(AGL_Ns) is one (NO at ST30 in FIG. 98), the medium is so constructed to indicate a non-existence of the angle cells (AGL_C#i).

A disk-like recording medium (10 in FIG. 3) according to the 23rd invention has a lead-in area (27) on a central side, an area (71 in FIG. 10) for recording a video manager (VMG) outside the lead-in area (27), and at least one area (72 in FIG. 10) for recording a video title set (VTS#n) outside the video manager recording area (71), the at least one video title set recording area (72) having an angle block constituted by a plurality of angle cells (AGL_C#i in FIG. 32 or 38), and the angle cells (AGL_C#i) containing different video data (AGL_C#i; corresponding to cell 84 in FIG. 11) obtained by photographing or imaging a photographic target at a variety of camera angles.

The video title set (VTS) of the disk-like recording medium (10) includes one or more video object sets (VOBS in FIG. 11), the video object set (VOBS) includes one or more video object sets (VOB), the video object set (VOB) contains one or more cells (84) including the angle cells (AGL_C#i), and the cell (84) includes one or more video object units (VOBU).

Each of the video object units (VOBU) is provided with a navigation pack (86) at the head portion thereof, the navigation pack (86) includes presentation control information (PCI data in FIG. 26), the presentation control information (PCI in FIG. 28) contains nonseamless angle information (NSML_AGLI) including respective address data (NSML_AGL_Cn_DSTA in FIG. 30) of the angle cells (AGL_C#i).

The video manager (VMG) of the disk-like recording medium (10) includes video manager information (VMGI in FIG. 12), the video manager information (VMGI) includes a title search pointer table (TT_SRPT in FIG. 16), the title search pointer table (TT_SRPT) includes a title search pointer (TT_SRP in FIG. 18), the title search pointer (TT_SRP) includes an angle count or number of angles (AGL_Ns).

When the angle count (AGL_Ns) represents a plurality of angles (YES at ST30 in FIG. 98), the medium is so constructed to nonseamlessly change the target of presentation from the currently presented angle cell to another angle cell with reference to the respective address data (NSML_AGL_Cn_DSTA in FIG. 30) of the angle cells (AGL_C#i).

A disk-like recording medium (10 in FIG. 3) according to the 24th invention has a lead-in area (27) on a central side, an area (71 in FIG. 10) for recording a video manager (VMG) outside the lead-in area (27), and at least one area (72 in FIG. 10) for recording a video title set (VTS#n) outside the video manager recording area (71), the at least one video title set recording area (72) having an angle block constituted by a plurality of angle cells (AGL_C#i in FIG. 32 or 38), and the angle cells (AGL_C#i) containing different video data (AGL_C#i; corresponding to cell 84 in FIG. 11) obtained by photographing or imaging a photographic target at a variety of camera angles.

The video title set (VTS) of the disk-like recording medium (10) includes one or more video object sets (VOBS in FIG. 11), the video object set (VOBS) includes one or more video object sets (VOB), the video object set (VOB) contains one or more cells (84) including the angle cells (AGL_C#i), and the cell (84) includes one or more video object units (VOBU).

Each of the video object units (VOBU) is provided with a navigation pack (86) at the head portion thereof, the navigation pack (86) includes data search information (DSI data in FIG. 26), the data search information (DSI in FIG. 34) contains seamless angle information (SML_AGLI) including respective address data (SML_AGL_Cn_DSTA in FIG. 36) of the angle cells (AGL_C#i).

The video title set (VTS) of the disk-like recording medium (10) contains a program chain (PGC in FIG. 13) constituted by one or more cells (84) including the angle cells (AGL_C#i), the program chain (PGC) contains program chain information (PGCI), the program chain information (PGCI) contains a cell playback information table (C_PBIT in FIG. 39), the cell playback information table (C_PBIT) contains one or more cell playback information (C_PBIn in FIG. 40), each of the cell playback information (C_PBI) contains a cell category (C_CAT in FIG. 41), and the cell category (C_CAT) contains a cell block type (FIG. 42) representing the angle block or not and a seamless angle change flag (FIG. 42) representing a seamless angle change or not.

When the cell block type (FIG. 42) of the cell category (C_CAT) represents the current angle block (YES at ST30 in FIG. 98; YES at ST46 in FIG. 99) and the seamless angle change flag (FIG. 42) of the category (C_CAT) represents (binary 1) a seamless angle change (YES at ST50 in FIG. 99), the medium is so constructed to seamlessly change the target of presentation from the currently presented angle cell to another angle cell with reference to the respective address data (SML_AGL_Cn_DSTA in FIG. 36) of the angle cells (AGL_C#i).

A computer-readable program according to the 25th invention is adapted to a disk-like recording medium (10 in FIG. 3) comprising a lead-in area (27) on a central side, an area (71 in FIG. 10) for recording a video manager (VMG) outside the lead-in area (27), and at least one area (72 in FIG. 10) for recording a video title set (VTS#n) outside the video manager recording area (71), the at least one video title set recording area (72) having an angle block constituted by a plurality of angle cells (AGL_C#i in FIG. 32 or 38), and the angle cells (AGL_C#i) containing different video data (AGL_C#i; corresponding to cell 84 in FIG. 11) obtained by photographing or imaging a photographic target at a variety of camera angles.

When the video manager (VMG) of the disk-like recording medium (10) includes video manager information (VMGI in FIG. 12), the video manager information (VMGI) includes a title search pointer table (TT_SRPT in FIG. 16), the title search pointer table (TT_SRPT) includes a title search pointer (TT_SRP in FIG. 18), the title search pointer (TT_SRP) includes an angle count or number of angles (AGL_Ns), the computer-readable program for selectively reproducing video data (corresponding to VOBU 85 in FIG. 11) in the angle cells (AGL_C#i) from the disk-like recording medium (10) comprises the steps of:

- checking (ST16C in FIG. 89) the number of the angles (AGL_Ns); and
- when the checked number is two or more (YES at ST30 in FIG. 98), turning-on (ST34) an angle mark (407) so as to indicate the existence of the angle cells (AGL_C#i).

A computer-readable program according to the 26th invention is adapted to a disk-like recording medium (10 in FIG. 3) comprising a lead-in area (27) on a central side, an area (71 in FIG. 10) for recording a video manager (VMG) outside the lead-in area (27), and at least one area (72 in FIG. 10) for recording a video title set (VTS#n) outside the video manager recording area (71), the at least one video title set recording area (72) having an angle block constituted by a plurality of angle cells (AGL_C#i in FIG. 32 or 38), and the angle cells (AGL_C#i) containing different video data (AGL_C#i; corresponding to cell 84 in FIG. 11) obtained by photographing or imaging a photographic target at a variety of camera angles.

When the video manager (VMG) of the disk-like recording medium (10) includes video manager information (VMGI in FIG. 12), the video manager information (VMGI) includes a title search pointer table (TT_SRPT in FIG. 16), the title search pointer table (TT_SRPT) includes a title search pointer (TT_SRP in FIG. 18), the title search pointer (TT_SRP) includes an angle count or number of angles (AGL_Ns), the computer-readable program for selectively reproducing video data (corresponding to VOBU 85 in FIG. 11) in the angle cells (AGL_C#i) from the disk-like recording medium (10) comprises the steps of:

- checking (ST16C in FIG. 89) the number of the angles (AGL_Ns);
- when the checked number is two or more (YES at ST30 in FIG. 98), turning-on (ST34) an angle mark (407) so as to indicate the existence of the angle cells (AGL_C#i); and
- when the checked number is one (NO at ST30 in FIG. 98), turning-off (ST36) the angle mark (407).

A computer-readable program according to the 27th invention is adapted to a disk-like recording medium (10 in FIG. 3) comprising a lead-in area (27) on a central side, an area (71 in FIG. 10) for recording a video manager (VMG) outside the lead-in area (27), and at least one area (72 in FIG. 10) for recording a video title set (VTS#n) outside the video manager recording area (71), the at least one video title set recording area (72) having an angle block constituted by a plurality of angle cells (AGL_C#i in FIG. 32 or 38), and the angle cells (AGL_C#i) containing different video data (AGL_C#i; corresponding to cell 84 in FIG. 11) obtained by photographing or imaging a photographic target at a variety of camera angles.

When the video manager (VMG) of the disk-like recording medium (10) includes video manager information (VMGI in FIG. 12), the video manager information (VMGI) includes a title search pointer table (TT_SRPT in FIG. 16), the title search pointer table (TT_SRPT) includes a title search pointer (TT_SRP in FIG. 18), the title search pointer (TT_SRP) includes an angle count or number of angles (AGL_Ns), the computer-readable program for selectively reproducing video data (corresponding to VOBU 85 in FIG. 11) in the angle cells (AGL_C#i) from the disk-like recording medium (10) comprises the steps of:

checking (ST16C in FIG. 89) the number of the angles (AGL_Ns);

when the checked number is two or more (YES at ST30 in FIG. 98), turning-on (ST34) an angle mark (407) so as to indicate the existence of the angle cells (AGL_C#i);

when the checked number is one (NO at ST30 in FIG. 98), turning-off (ST36) the angle mark (407); and even if the checked number is two or more (YES at ST30), arbitrary turning-off (NO at ST32, ST36) the angle mark (407).

A computer-readable program according to the 28th invention is adapted to a disk-like recording medium (10 in FIG. 3) comprising a lead-in area (27) on a central side, an area (71 in FIG. 10) for recording a video manager (VMG) outside the lead-in area (27), and at least one area (72 in FIG. 10) for recording a video title set (VTS#n) outside the video manager recording area (71), the at least one video title set recording area (72) having an angle block constituted by a plurality of angle cells (AGL_C#i in FIG. 32 or 38), and the angle cells (AGL_C#i) containing different video data (AGL_C#i; corresponding to cell 84 in FIG. 11) obtained by photographing or imaging a photographic target at a variety of camera angles.

When the video title set (VTS) of the disk-like recording medium (10) includes one or more video object sets (VOBS in FIG. 11), the video object set (VOBS) includes one or more video object sets (VOB), the video object set (VOB) contains one or more cells (84) including the angle cells (AGL_C#i), and the cell (84) includes one or more video object units (VOBU); when each of the video object units (VOBU) is provided with a navigation pack (86) at the head portion thereof, the navigation pack (86) includes presentation control information (PCI data in FIG. 26), the presentation control information (PCI in FIG. 28) contains nonseamless angle information (NSML_AGLI) including respective address data (NSML_AGL_Cn_DSTA in FIG. 30) of the angle cells (AGL_C#i); and when the video manager (VMG) of the disk-like recording medium (10) includes video manager information (VMGI in FIG. 12), the video manager information (VMGI) includes a title search pointer table (TT_SRPT in FIG. 16), the title search pointer table (TT_SRPT) includes a title search pointer (TT_SRP in FIG. 18), the title search pointer (TT_SRP) includes an angle count or number of angles (AGL_Ns); then the computer-readable program for selectively reproducing video data (corresponding to VOBU 85 in FIG. 11) in the angle cells (AGL_C#i) from the disk-like recording medium (10) comprises the steps of:

checking (ST16C in FIG. 89) the number of the angles (AGL_Ns);

when the checked number is two or more (YES at ST30 in FIG. 98), turning-on (ST34) an angle mark (407) so as to indicate the existence of the angle cells (AGL_C#i);

when the checked number is two or more (YES at ST30 in FIG. 98), nonseamlessly changing (ST68 in FIG. 100) the target of presentation from the currently presented angle cell to another angle cell with reference to the respective address data (NSML_AGL_Cn_DSTA in FIG. 30) of the angle cells (AGL_C#i).

A computer-readable program according to the 29th invention is adapted to a disk-like recording medium (10 in FIG. 3) comprising a lead-in area (27) on a central side, an area (71 in FIG. 10) for recording a video manager (VMG) outside the lead-in area (27), and at least one area (72 in FIG. 10) for recording a video title set (VTS#n) outside the video manager recording area (71), the at least one video title set recording area (72) having an angle block constituted by a plurality of angle cells (AGL_C#i in FIG. 32 or 38), and the angle cells (AGL_C#i) containing different video data (AGL_C#i; corresponding to cell 84 in FIG. 11) obtained by photographing or imaging a photographic target at a variety of camera angles.

When the video title set (VTS) of the disk-like recording medium (10) includes one or more video object sets (VOBS in FIG. 11), the video object set (VOBS) includes one or more video object sets (VOB), the video object set (VOB) contains one or more cells (84) including the angle cells (AGL_C#i), and the cell (84) includes one or more video object units (VOBU); when each of the video object units (VOBU) is provided with a navigation pack (86) at the head portion thereof, the navigation pack (86) includes data search information (DSI data in FIG. 26), the data search information (DSI in FIG. 34) contains seamless angle information (SML_AGLI) including respective address data (SML_AGL_Cn_DSTA in FIG. 36) of the angle cells (AGL_C#i); and when the video title set (VTS) contains a program chain (PGC in FIG. 13) constituted by one or more cells (84) including the angle cells (AGL_C#i), the program chain (PGC) contains program chain information (PGCI), the program chain information (PGCI) contains a cell playback information table (C_PBIT in FIG. 39), the cell playback information table (C_PBIT) contains one or more cell playback information (C_PBIn in FIG. 40), each of the cell playback information (C_PBI) contains a cell category (C_CAT in FIG. 41), and the cell category (C_CAT) contains a cell block type (FIG. 42) representing the angle block or not and a seamless angle change flag (FIG. 42) representing a seamless angle change or not; then the computer-readable program for selectively reproducing video data (corresponding to VOBU 85 in FIG. 11) in the angle cells (AGL_C#i) from the disk-like recording medium (10) comprises the steps of:

checking (ST16C in FIG. 89) the number of the angles (AGL_Ns);

when the checked number is two or more (YES at ST30 in FIG. 98), turning-on (ST34) an angle mark (407) so as to indicate the existence of the angle cells (AGL_C#i);

when the cell block type (FIG. 42) of the cell category (C_CAT) represents the current angle block (YES at ST50 in FIG. 99), flashing (ST52) the angle mark (407) or modifying (ST52) the shape of the angle mark (407) or changing (ST52) the color of the angle mark (407); and when the cell block type (FIG. 42) of the cell category (C_CAT) represents the current angle block (YES at ST30 in FIG. 98; YES at ST46 in FIG. 99) and the seamless angle change flag (FIG. 42) of the category (C_CAT) represents (binary 1) a seamless angle change (YES at ST50 in FIG. 99), seamlessly changing (ST68 in FIG. 100) the target of presentation from the currently presented angle cell to another angle cell with reference to the respective address data (SML_AGL_Cn_DSTA in FIG. 36) of the angle cells (AGL_C#i).

A remote controller used for a multiangle block reproduction system according to the 30th invention, there is provided an angle key (5 ang in FIG. 5 or 8) used for instructing an angle change when a recording medium (10) in which a program source (or title) containing the multiangle block is recorded is set in the reproduction system (FIG. 1) and when the multiangle block of the program source is to be played back or being played back.

In a video-on-demand system according to the 31st invention wherein reproduction of a multiangle program is allowed, a receiver system (1000) of respective subscribers of the video-on-demand system is provided with angle-change instructing means (remote controller 5 having an angle key or keyboard 1024A having a key assigned with a function of the angle key) for generating an instruction to change respective images of the angle block.

In a video-on-demand system according to the 32nd invention, the receiver system (1000) comprises a monitor (6) for displaying a window, an operation icon serving as the angle-change instructing means, and a mouse pointer serving as a mark for transmitting a user operation to the operation icon, and a mouse (1026A) for moving the mouse pointer displayed on the monitor (6) and for generating a command corresponding to the position of the operation icon which is pointed by the mouse pointer, wherein the window serves to display contents of an image of a given program.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 15 is a view for explaining the contents of video manager information management table (VMGI_MAT) 751 in FIG. 12.

FIG. 17 is a view for explaining the contents of title search pointer table information (TT_SRPTI) 752A in FIG. 16.

FIG. 18 is a view for explaining the contents of title search pointer (TT_SRP) 752B for each title #n in FIG. 16.

FIG. 20 is a view for explaining the contents of video manager menu program chain information unit table information (VMGM_PGCI_UTI) 753A in FIG. 19.

FIG. 21 is a view for explaining the contents of video manager menu language unit search pointer (VMGM_LU_SRP) 753B in FIG. 19.

FIG. 22 is a view for explaining the contents of video manager menu program chain information unit (VMGM_LU) 753C in FIG. 19.

FIG. 23 is a view for explaining the contents of video manager menu language unit information (VMGM_LUI) 753CA in FIG. 22.

FIG. 24 is a view for explaining the contents of video manager program chain information search pointer (VMGM_PGCI_SRP) 753CB in FIG. 22.

FIG. 25 is a view for explaining the contents of a video manager menu program chain category (VMGM_PGC_CAT) contained in video manager menu program chain information search pointer 753CB in FIG. 24.

FIG. 29 is a view for explaining the contents of PCI general information contained in the presentation control information (PCI) data in FIG. 28.

FIG. 30 is a view for explaining the contents of nonseamless angle information (NSML_AGLI) contained in the presentation control information (PCI) data in FIG. 28.

FIG. 35 is a view for explaining the contents of DSI general information contained in the data search information (DSI) data in FIG. 34.

FIG. 36 is a view for explaining the contents of seamless angle information (SML_AGLI) contained in the data search information (DSI) data in FIG. 34.

FIG. 37 is a view for explaining the contents of the destination address (SML_AGL_C#n_DSTA) of a new angle cell upon an angle change, which is contained in seamless angle information (SML_AGLI) in FIG. 36.

FIG. 39 is a view for explaining the structure of program chain information (PGCI) in program chain 87 in FIG. 13.

FIG. 40 is a view for explaining the contents of a cell playback information table (C_PBIT) contained in the program chain information (PGCI) in FIG. 39.

FIG. 41 is a view for explaining the contents of each cell playback information (C_PBI) contained in the cell playback information table (C_PBIT) in FIG. 40.

FIG. 42 is a view for explaining the contents of a cell category (C_CAT) contained in the cell playback information (C_PBI) in FIG. 41.

FIG. 43 is a view for explaining the correspondence between the preceding and succeeding cells, a seamless playback flag, and a system time clock (STC) flag in a seamless angle change in an angle block.

FIG. 45 is a view for explaining the contents of video title set information management table (VTSI_MAT) 941 in FIG. 44.

FIG. 47 is a view for explaining the contents of part-of-title search pointer table information (PTT_SRPTI) 942A in FIG. 46.

FIG. 48 is a view for explaining the contents of part-of-title search pointer (TTU_SRP) 942B in FIG. 46.

FIG. 49 is a view for explaining the contents of part-of-title search pointer (PTT_SRP) 942C in FIG. 46.

FIG. 51 is a view for explaining the contents of video title set program chain information (VTS_PGCI) 943A in FIG. 50.

FIG. 52 is a view for explaining the contents of video title set program chain information search pointer (VTS_PGCI_SRP) 943B in FIG. 50.

FIG. 55 is a view for explaining the contents of video title set menu program chain information unit table information (VTSM_PGCI_UTI) 944A in FIG. 54.

FIG. 56 is a view for explaining the contents of video title set menu language unit search pointer 944B in FIG. 54.

FIG. 58 is a view for explaining the contents of video title set menu language unit information (VTSM_LUI) 944CA in FIG. 57.

FIG. 59 is a view for explaining the contents of video title set menu program chain information search pointer (VTSM_PGCI_SRP) 944CB in FIG. 57.

FIG. 60 is a view for explaining the contents of the video title set menu program chain category (VTSM_PGC_CAT) contained in program chain information search pointer (VTSM_PGCI_SRP) 944CB in FIG. 59.

FIG. 63 is a view for explaining the contents of video title set time map table information (VTS_TMAPTI) 945A in FIG. 62.

FIG. 64 is a view for explaining the contents of video title set time map search pointer (VTS_TMAP_SRP) 945B in FIG. 62.

FIG. 65 is a view for explaining the contents of video title set time map (VTS_TMAP) 945C in FIG. 62.

FIG. 66 is a view for explaining the contents of the map entry address (MAP_ENA) contained in video title set time map (VTS_TMAP) 945C in FIG. 65.

FIG. 68 is a view for explaining the contents of video title set menu cell address table information (VTSM_C_ADTI) 946A in FIG. 67.

FIG. 69 is a view for explaining the contents of video title set menu cell piece information (VTSM_CPI) 946B in FIG. 67.

FIG. 70 is a view for explaining the contents of video title set menu video object unit address map (VTSM_VOBU_ADMAP) 947 in FIG. 44.

FIG. 71 is a view for explaining the contents of video title set menu video object unit address map information (VTSM_VOBU_ADMAPI) 947A in FIG. 70.

FIG. 72 is a view for explaining the contents of each video title set menu video object unit address (VTSM_VOBU_AD#n) 947B in FIG. 70.

FIG. 73 is a view for explaining the contents of video title set cell address table (VTS_C_ADT) 948 in FIG. 44.

FIG. 74 is a view for explaining the contents of video title set cell address table information (VTS_C_ADTI) 948A in FIG. 73.

FIG. 75 is a view for explaining the contents of video title set cell piece information (VTS_CPI) 948B in FIG. 73.

FIG. 76 is a view for explaining the contents of address map (VTS_VOBU_ADMAP) 949 of the video title set video object unit in FIG. 44.

FIG. 77 is a view for explaining the contents of address map information (VTS_VOBU_ADMAPI) 949A of the video title set video object unit in FIG. 76.

FIG. 78 is a view for explaining the contents of address (VTS_VOBU_AD#n) 949B of each video title set video object unit in FIG. 76.

FIG. 81 is a view for explaining the contents of menu information stored in menu table 56A in FIG. 1 after menu processing in FIGS. 79 and 80 is complete.

FIG. 82 is a view for explaining the display example of the main menu (root menu) output to monitor 6 of the reproduction apparatus in FIG. 1 by looking up the menu table in FIG. 81.

FIGS. 83A to 83F are views for explaining the display examples of various menus output to monitor 6 of the reproduction apparatus in FIG. 1 by looking up the menu table in FIG. 81.

FIG. 96 is a view for explaining an example of the recording contents (e.g., a chapter count and an angle count or number of angles for each title number) of optical disk (DVD) 10 in FIG. 3.

FIG. 97 is a view for explaining another example of the recording contents (e.g., a cell block mode and a cell block type for each cell number/chapter number) of optical disk (DVD) 10 in FIG. 3.

DETAILED DESCRIPTION OF THE INVENTION

Figure 1:
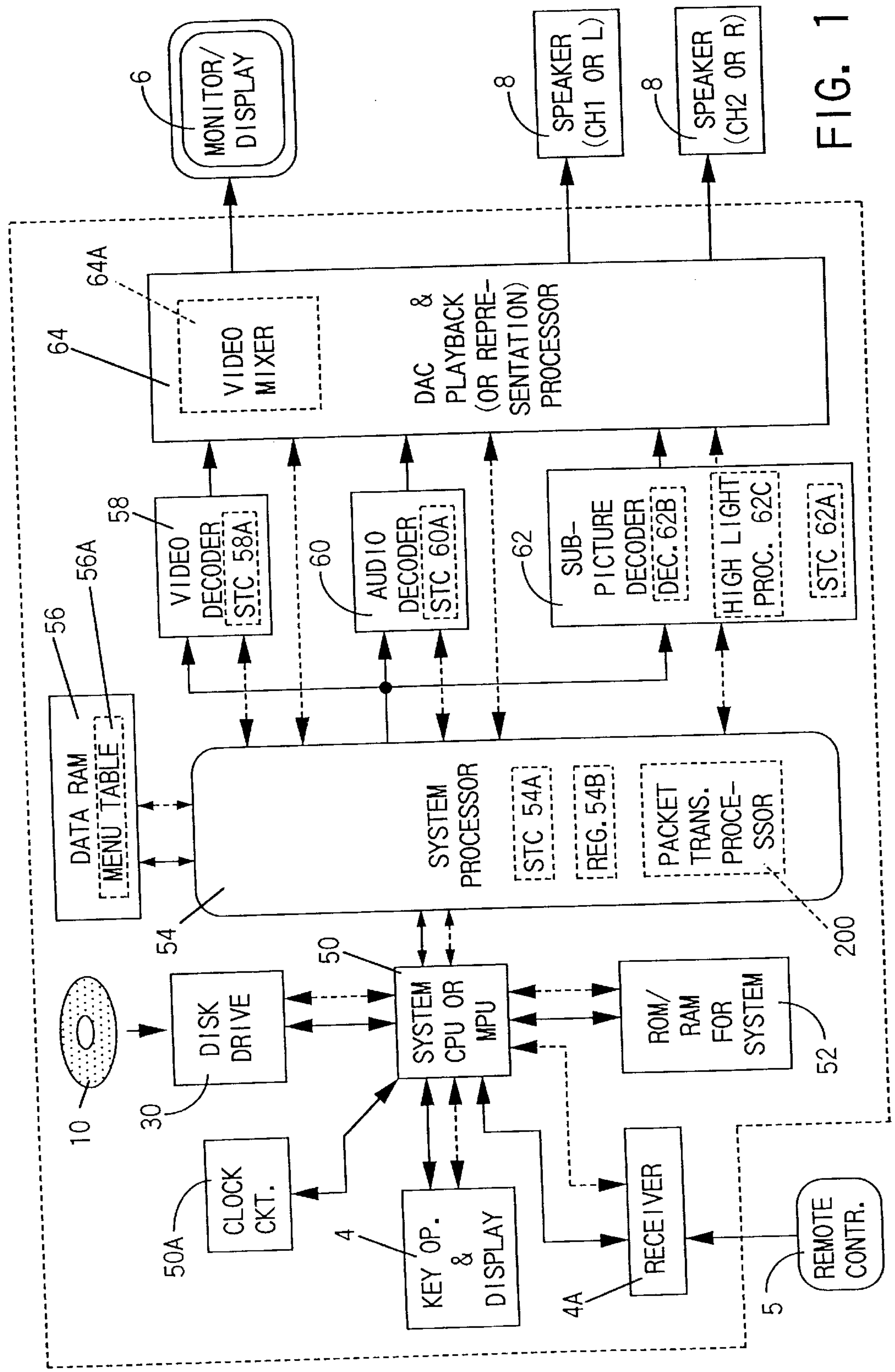
FIG. 1 is a block diagram for explaining the arrangement of an optical disk reproduction apparatus according to one embodiment of the present invention.

A multiangle block reproduction system (including a reproduction apparatus or method) according to an embodiment of the present invention will be described below. In order to avoid a repetitive description, the same reference numerals denote the same parts throughout the plurality of views of the drawing.

FIG. 1 is a block diagram showing. the arrangement of an optical disk reproduction apparatus according to an embodiment of the present invention. This optical disk apparatus comprises, as a visual user interface arrangement, key operation/display unit 4, remote controller 5, and monitor 6, and, as an auditory user interface arrangement, speaker unit 8 (a two-channel stereo pair are exemplified).

The optical disk apparatus further comprises remote controller receiver 4A for receiving user operation information from remote controller 5 and notifying system CPU 50 of the user operation information, disk drive unit 30 for rotating and driving optical disk 10, system CPU 50, system ROM/RAM unit 52, system processor 54, data RAM 56, video decoder 58, audio decoder 60, sub-picture decoder 62, and D/A and data reproduction processor 64.

System CPU 50 is formed of a microcomputer (so-called CPU or MPU). The reference clock (or date/time data) for operation time of the apparatus in FIG. 1 can be derived from clock circuit 50A.

System processor 54 includes system clock (STC) 54A and register 54B. Similarly, video decoder 58, audio decoder 60, sub-picture decoder 62 include system clocks (STCs) 58A, 60A, and 62A, respectively. System processor 54 further includes packet transfer processor 200 for determining the types of packets contained in data reproduced from optical disk 10 and transferring the data in the packets to the corresponding decoders (58 to 62).

Sub-picture decoder 62 further includes decoder 62B for decoding sub-picture data supplied from system processor 54 and highlight processor 62C for highlighting the sub-picture data decoded by decoder 62B.

Based on an emphasized pixel, a pattern pixel, a background pixel, or the like, decoder 62B expands 2-bit pixel data (sub-picture data) runlength-compressed in accordance with a predetermined rule.

Highlight processor 62C performs highlight processing in accordance a color code, a highlight color/contrast value, and X- and Y-coordinate values representing a rectangular area in which highlight information (e.g., menu selection items) supplied from system CPU 50. This highlight processing can be used as a means for allowing the user to easily recognize specific display items at the visual user interface using monitor 6.

Data RAM 56 contains menu table 56A which stores addresses of a sub-picture menu, an audio menu, an angle menu, a chapter (program) menu, and the like. The highlight processing is used to emphasize the specific portion of these menus.

When the color of contrast of each pixel of the decoded sub-picture data has been changed in accordance with the highlight information, the changed sub-picture data is supplied to image synthesizer 64A in D/A and data reproduction processor 64. Decoded main picture data (video data) is synthesized with highlighted sub-picture data (e.g., a caption and a menu) in image synthesizer 64A, and the synthesized image is displayed on monitor 6.

When the user operates key operation/display unit 4 (or remote controller 5) in FIG. 1, reproduction of data recorded on optical disk 10 is started.

The data recorded on optical disk 10 includes video data (MPEG-compressed data) containing multiangle blocks (interleave-recorded), sub-picture data (runlength-compressed bitmap data) used for caption display, audio data (data compressed by MPEG or any other scheme) of a plurality of languages, and/or multichannel stereo audio data (linear PCM.data having a quantization width of 16 to 26 bits and a sampling frequency of 48 to 96 kHz). These video/audio data are converted into analog video and audio signals until they are output from the reproduction apparatus. Monitor 6 displays full-motion video corresponding to the output video signal, and speaker unit 8 generates sounds corresponding to the output audio signal.

Solid arrows between the block elements in FIG. 1 represent a data bus, and broken arrows indicate a control bus.

Figure 2:
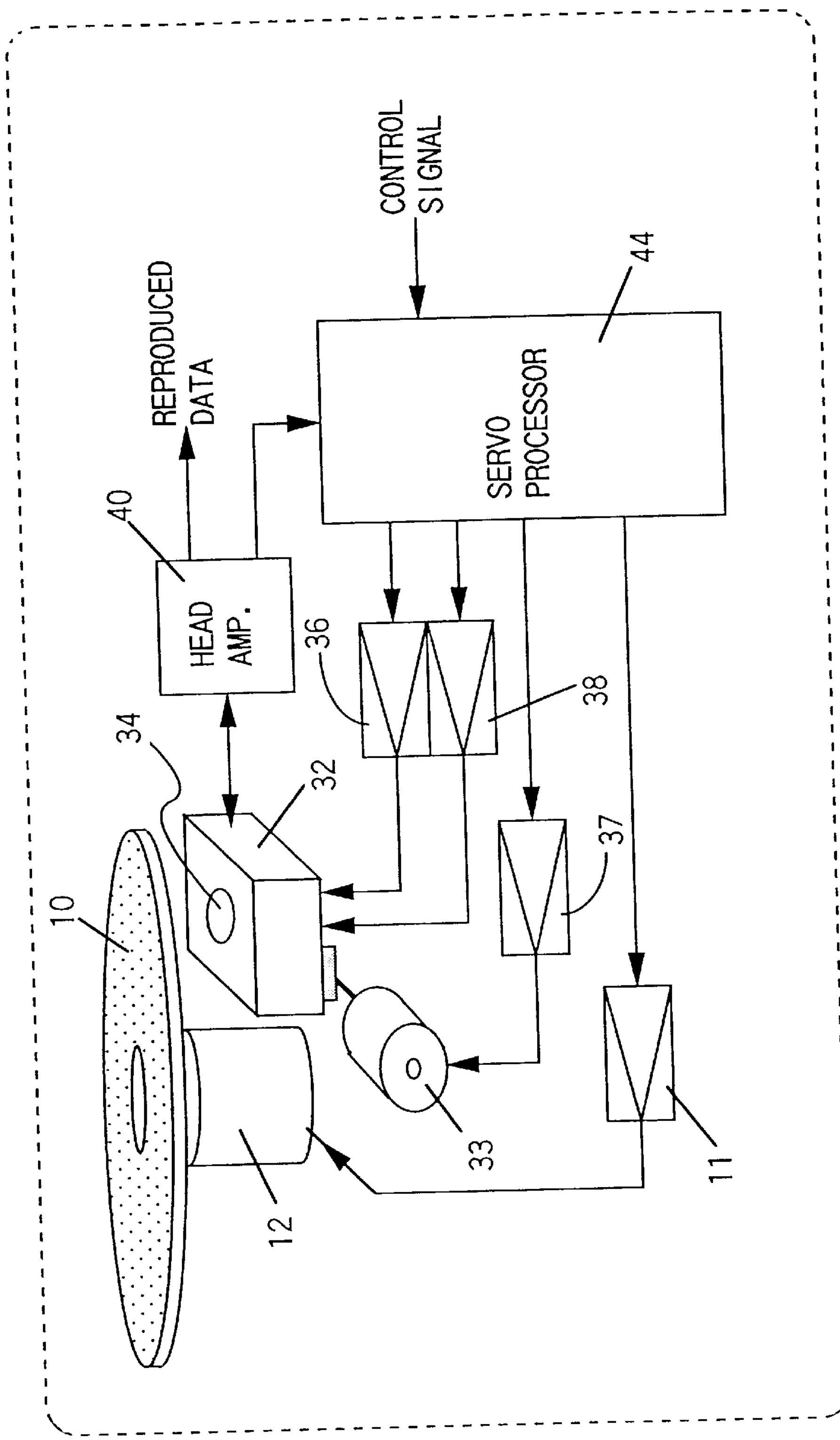
FIG. 2 is a view for explaining the internal arrangement of disk drive unit 30.

As shown in FIG. 2, disk drive unit 30 in FIG. 1 comprises motor driver 11, spindle motor 12, optical head 32 (optical pickup), feed motor 33, focus circuit 36, feed motor driver 37, tracking circuit 38, head amplifier 40, and servo processing circuit 44.

Optical disk 10 is placed on spindle motor 12 driven by motor driver 11 and rotated by this spindle motor 12 at a predetermined linear velocity. Optical head 32 for irradiating a laser beam onto the data recording surface of optical disk 10 is located immediately below optical disk 10. Optical head 32 is placed on a guide mechanism (not shown).

When a control signal (access signal) from system CPU 50 is supplied to servo processing circuit 44, a head movement signal is supplied from the servo processing circuit 44 to feed motor driver 37 in response to this control signal. Feed motor driver 37 supplies a drive signal corresponding to the head movement signal to feed motor 33. Feed motor 33 pivots in accordance with the drive signal from feed motor driver 37 and radially moves optical head 32 above optical disk 10 along a guide mechanism (not shown).

Optical head 32 has objective lens 34 opposing optical disk 10. To reproduce recorded data from optical disk 10, a laser beam is irradiated from optical head 32 onto the data recording surface of optical disk 10 through objective lens 34. In this case, objective lens 34 finely moves along the optical axis (focusing direction) in accordance with the drive signal from focus circuit 36, so that optical head 32 is automatically focused with respect to the data recording surface (pits) of optical disk 10. Objective lens 34 also finely moves in the radial direction (tracking direction) of optical disk 10 in accordance with a drive signal supplied from tracking circuit 38.

This fine movement (focusing and tracking directions) of objective lens 34 makes it possible to focus the laser beam from optical head 32 into a minimum beam spot on a spiral track (pit train) on the data recording surface of optical disk 10. In this manner, the tracks on the data recorded surface of optical disk 10 can be automatically (e.g., at a constant linear velocity) traced with the light beam spot from optical head 32.

Feed motor 38 is driven to radially move optical head 32 above optical disk 10, and a predetermined sector formed on the data recording layer of optical disk 10 is accessed by optical head 32. As a result of this access, data read from optical disk 10 is supplied from optical head 32 to head amplifier 40. The data is amplified by head amplifier, and the amplified data is output from disk drive unit 30.

The output reproduced data is stored in data RAM 56 by system processor 54 under the control of system CPU 50 controlled by programs stored in system ROM and RAM 52. The stored reproduced data is processed by system processor 54 and classified into video data, audio data, and sub-picture data. The video data, the audio data, and the sub-picture data are output to and decoded by video decoder 58, the audio decoder 60, and sub-picture decoder 62, respectively.

The decoded video, audio, and sub-picture data are converted into an analog video signal and an analog audio signal by D/A and reproduction processor 64. At the same time, the video signal and the sub-picture signal are mixed, and the mixed data is supplied to monitor 6. The audio signal is supplied to speaker unit 8. As a result, the full-motion video corresponding to the video signal and the sub-picture signal is displayed on monitor 6, and at the same time sounds corresponding to the audio signal are reproduced from speaker unit 8.

The optical disk reproduction operation of the apparatus shown in FIG. 1 is summarized as follows.

When a reproduction command is input from key operation/display unit 4, system CPU 50 sends a target address and a read instruction to optical disk drive unit 30.

Optical disk drive unit 30 rotates and drives optical disk 10 in accordance with the sent read instruction, loads the recorded data from the target address of optical disk 10, and sends the loaded data to system processor 50.

System processor 50 temporarily stores the sent data in data RAM 56. System processor 50 determines the type (video, audio, sub-picture) of data on the basis of the header information added to the stored data. Subprocessor 50 transfers the corresponding data to video decoder 58, audio decoder 60, and sub-picture decoder 62 in accordance with the determined types.

Decoders 58, 60, and 62 decode the transferred data in accordance with the corresponding data formats. The decoded result signals are supplied to D/A and data reproduction processor 64. A reproduced video signal on which sub-picture information (e.g., a caption) is properly superposed is supplied from D/A and data reproduction processor 64 to monitor 6. The audio signal (containing, e.g., proper sound effects and surrounding sounds) synchronized with the reproduced video signal is supplied to 2-CH (or 8-CH) stereo speaker unit 8.

The video signal decoded by video decoder 58 is supplied to a pan scan signal converter (not shown) and a letter box signal converter (not shown). One of the converted video signals output from these two signal converters and a direct signal directly output from video decoder 58 is selected by a video signal selector (not shown), and the selected signal is transferred to D/A and data reproduction processor 64.

The pan scan signal converter, the letter box signal converter, and the video signal selector may be arranged in video decoder 58 in FIG. 1.

Optical disk 10 reproduced by the reproduction apparatus shown in FIG. 1 may have a variety of structures. For example, a high-density, large-capacity read-only disk having an adhesion structure shown in FIG. 3 can be used in the reproduction apparatus shown in FIG. 1.

Figure 3:
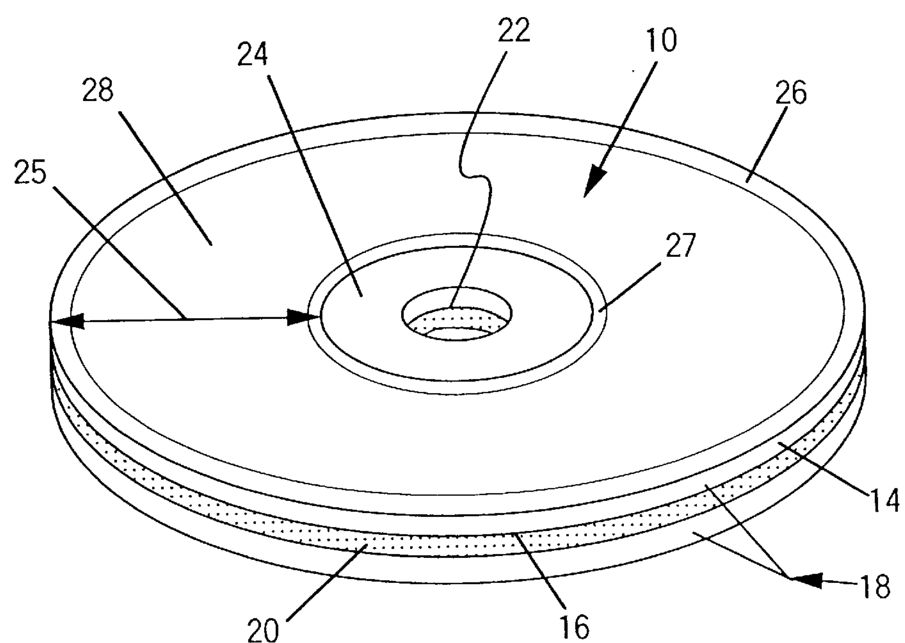
FIG. 3 is a perspective view for explaining the structure of an optical disk (digital video disk or digital versatile disk DVD) to be reproduced in the reproduction apparatus in FIG. 1.

Optical disk 10 shown in FIG. 3 is constituted by a pair of composite disk layers (a single layer or two layers) 18 and very thin adhesion layer 20 (e.g., 40-(m thick ultraviolet curing resin) interposed between these composite disk layers 18. Each composite disk 18 comprises transparent substrate (e.g., 0.6-mm thick polycarbonate) 14 and a recording layer, i.e., light-reflecting layer 16 (this layer is formed by depositing or sputtering aluminum, an aluminum alloy, or gold). The pair of disk layers 18 are adhered to each other so as to contact the surfaces of adhesion layer 20, thereby obtaining a 1.2-mm thick high-density optical disk.

Central hole 22 is formed in optical disk 10. Clamping regions 24 are formed around central hole 22 on the upper and lower surfaces of the disk to press optical disk 10 during rotation. The spindle of spindle motor 12 shown in FIG. 2 is fitted in central hole 22 when disk 10 is loaded in the optical disk apparatus. During rotation of the disk, optical disk 10 is clamped with clamping regions 24 by a disk clamper (not shown).

Optical disk 10 has information regions 25 around clamping regions 24, and information regions 25 can record video data, audio data, and any-other information.

Of each information region 25, lead-out region 26 is formed in the outer peripheral region of information region 25, and lead-in region 27 is formed in the inner peripheral region contacting clamping region 24. A region between lead-out region 26 and lead-in region 27 is defined as data recording region 28.

Recording tracks serving as the data recording region are, e.g., spirally or continuously formed on recording layer (light-reflecting layer) 16 of each information region 26. The continuous tracks are divided into a plurality of physical sectors. Serial numbers are assigned to these sectors. A variety of data are recorded on optical disk 10 using the sector as a recording unit.

Data recording region 28 of each information recording region 25 serves as an actual data recording region. As reproduction information, video data (main picture data), sub-picture data, and audio data are recorded in identical pit trains (i.e., a physical shape which causes an optical change in state).

A pit train is formed in advance on read-only optical disk 10 with a stamper. A light-reflecting layer is deposited or sputtered on the surface of transparent substrate 14 on which this pit train is formed. This light-reflecting layer is used as recording layer 16.

In read-only optical disk (DVD-ROM) 10, no groove serving as a track is normally formed, and a pit train formed on the surface of transparent substrate 14 functions as a track (note that the above groove is formed in a read/write DVD-RAM).

In an optical disk reproduction apparatus (DVD player) shown in FIG. 1, when the user (viewer) operates key operation/display unit 4 arranged on the front panel of the apparatus main body or remote controller 5 (i.e., a remote control unit connected to remote controller receiver 4A in the main body through infrared communication) to reproduce recorded data, i.e., main picture data, sub-picture data, and audio data from optical disk 10. The reproduced recorded data are converted into an audio signal and a video signal in the apparatus. The converted data are supplied to monitor 6 and speaker unit 8 arranged outside the apparatus and are reproduced as full-motion video and sounds.

The DVD reproduction apparatus according to the embodiment shown in FIG. 1 appropriately comprises all operation keys (operation buttons) having the following functions or operations keys required in each apparatus for the DVD reproduction operation.

[Power Key (POWER) Functions]

<1>The power key turns on/off the secondary side of an AC power supply circuit of the apparatus main body.

<2>When the power key is depressed in a state wherein a disk is set in the apparatus, the type (DVD or CD) of disk is determined and displayed. If the loaded disk cannot be reproduced, a message representing this is displayed.

<3>When the power key is depressed while a disk set in the apparatus contains a first play program chain (autostart code), reproduction of this program chain is automatically started.

<4>When the power key is depressed in the power-ON state or the tray open state, the tray is closed and then the power is turned off.

[Open/Close Key (OPEN/CLOSE) Functions]

<5>The disk tray is opened or closed. When the open/close key is depressed during reproduction of the disk, the current operation of the apparatus is terminated, and the disk tray is opened.

<6>When the open/close key is depressed in the power-OFF state or a tray closed state, the power is turned on and the disk tray is opened.

<7>When the open/close key is depressed in the disk tray open state, the disk tray is-retracted into the apparatus main body. At this time, when a disk is set on the tray, its management information is read to display the type (DVD or CD) of the set disk. If this disk cannot be reproduced, a message representing this is displayed.

<8>When the open/close key is depressed in the disk tray open state, the disk tray is retracted into the apparatus main body. At this time, when no disk is set on the tray, a message "NO DISK" is generated from a character generator and displayed.

<9>When a disk loaded into the apparatus main body upon turning on the open/close key contains a first play program chain (auto-start code), reproduction of this program chain is automatically started.

[Stop Key (STOP) Function]

<10>When the stop key is depressed during disk reproduction, reproduction is stopped. When the stop key is depressed during the stop, the previously reproduced title number (or the default title number) is generated by the character generator and displayed.

[Reproduction Key (PLAY) Functions]

<11>When the reproduction key is depressed while a disk is set on the disk tray, disk reproduction is started under the current set conditions (default settings; or the screen aspect ratio, audio language, caption language, and the like set by the viewer).

<12>When the reproduction key is depressed after a disk is set on the track in the disk tray open state, the tray is retracted into the apparatus main body, and reproduction of a default title (or a title designated by a title producer) recorded on the disk (DVD) is started. Note that if the disk contains a first play program chain (auto-start code), reproduction of this program chain is automatically started.

<13>When reproduction continues at the end of the title, unless otherwise specified with the recorded information of the disk, the reproduction operation is ended.

<14>When the reproduction key is depressed while the chapter or title number is set on the setup window during the memory setup window display, memory reproduction is started from the set chapter or title number.

<15>When the reproduction key is depressed in the random mode, the contents of the disk set on the tray are reproduced at random.

<16>When the reproduction mode of a disk during reproduction is changed to a still mode, the current reproduction operation is canceled, and a still image reproduction state is set. When the still image is reproduced in the cell playback mode, the reproduction key can be invalidated until the still cell reaches the final cell.

[Pause Key (PAUSE) Functions]

<17>When the pause key is depressed during reproduction of the program chain in a given title, the currently reproduced video frame of the program chain is set as a still image. When the pause key is depressed again in this state, the still image is changed to that of the next frame. Similarly, every time the pause key is depressed, the frame is changed in the time lapse direction, and the frame is changed a number of times corresponding to the number of times of depression of the pause key.

<18>During still image or frame feed reproduction, a sub-picture is reproduced, but audio data can be made not to be reproduced.

<19>This still image/frame feeding can be performed within the currently reproduced program chain. The pause key is invalidated after the frame is fed to the final frame in the title.

<20>When the cell playback mode reproduces a still image, the pause key is invalidated at the final cell of the still cell.

<21>When the reproduction key is depressed in the still image state set with the pause key, the state restores the normal reproduction mode.

[Skip Key (SKIP/Right-Headed Double Triangle Mark with Vertical Rod) Functions No. 1; for one sequential program chain title]

<22>When the skip key is depressed during reproduction, the next chapter (or program) in the currently reproduced title is searched and reproduced. If no next chapter is available, this key operation is invalidated. During the chapter search, the search destination chapter number on display unit 4 is flickered to notify the viewer of "searching".

<23>When the skip key is depressed during the stop, a chapter next to the current chapter is selected. When the reproduction key is depressed at this time, the selected chapter is searched and reproduced.

During the stop, a chapter (or program) crossing two titles can be skipped. For example, when the skip key is depressed while the final chapter number of title 1 is displayed, the first chapter number of title 2 is selected. When the reproduction key is depressed at this time, the selected chapter (chapter 1 of title 2) is searched and reproduced.

<24>When the skip key is kept depressed in the stop state for a predetermined period of time or longer, the chapter number is incremented by one at a predetermined speed (if the next title is available, the chapter number across the current title and the next title can be continuously changed). When the reproduction key is depressed after the skip key kept depressed is released, the chapter of the corresponding title is searched and reproduced.

[Skip Key (SKIP/Right-Headed Double Triangle Mark with Vertical Rod) Functions No. 2; for random program chain title]

<25>When the skip key is depressed during reproduction, a chapter (or program) selected at random next to the chapter of the currently reproduced title is searched and reproduced. Note that this key operation is invalidated when the random reproduction loop represents the final cycle and the next program chain is absent in the title.

<26>When the skip key is depressed during still image reproduction, the selected chapter (or program) is searched, and a still image is reproduced at the start of the searched chapter (or program). Note that when the still mode is set in the cell playback mode, the selected chapter is searched, and the first still image is reproduced.

<27>The skip key can be used to select a chapter number (program number) and title number set on the memory setup window (the number can be incremented, or the cursor is moved forward).

<28>The skip key is used to feed a menu page.

Skip Key (SKIP/Left-Headed Double Triangle Mark with Vertical Rod) Functions No. 1; for one sequential program chain title <29>When the skip key is depressed during reproduction, the start of the currently reproduced chapter (or program) is searched, and this chapter (or program) is reproduced from the beginning. When the skip key is kept depressed, the chapter number is decremented one by one until chamber number 1.

<30>When the skip key is depressed during the stop, a chapter immediately preceding the current chapter is selected. When the reproduction key is depressed at this time, the selected chapter is searched and reproduced.

During the stop, a chapter (or program) across two titles can be skipped. For example, when this skip key is depressed while chamber number 1 of title 3 is displayed, the last chapter number X of title 2 is selected. When the reproduction key is depressed at this time, the selected chapter (chapter X of title 2) is searched and reproduced.

This chapter decrement skip can be executed up to chapter 1 of title 1.

<31>When this skip key is kept depressed in the stop state for a predetermined period of time or longer, the chapter number is decremented one by one at a predetermined speed (until chapter 1 of title 1). When the reproduction key is depressed after the skip key kept depressed is released, the chapter of the corresponding title is searched and reproduced.

Skip Key (SKP/Left-Headed Double Triangle Mark with Vertical Rod) Functions No. 2; for random program chain title <32>When the skip key is depressed during reproduction, the start of the chapter (or program) of the currently reproduced title is searched, and the searched chapter (or program) is reproduced from the beginning. Note that even if the skip key is kept depressed, the search destination can be the start of the currently reproduced chapter (program).

<33>When the skip key is depressed during still image reproduction, the start of the currently reproduced chapter (or program) is searched, and the first still image is reproduced. When a still image is reproduced in the cell playback mode, the currently reproduced chapter is searched, and the first image is reproduced as a still image.

<34>The skip key can be used to select a chapter number (program number) and title number set on the memory setup window (the number can be decremented, or the cursor is moved backward).

<35>The skip key can be used to return a menu page.

[Menu Key (MENU) Functions]

<36>When a disk is set on the tray, the menu key reproduces and displays the root menu in the currently selected video title set recorded on the disk. If no disk is set, an error (alarm) is displayed.

<37>When no root menu is present in the currently selected video title set, the menu key performs an error (or alarm) display.

<38>When the menu key is depressed in normal reproduction to reproduce the menu, and a menu operation is performed to cancel the menu, reproduction is started from the portion reproduced before menu reproduction or a portion designated by the menu.

<39>When the menu key is depressed during root menu display, the state before the root menu is displayed is restored.

[Title Key (TITLE) Functions]

<40>When a disk is set on the tray and a title menu is recorded on the disk, the title key allows to display the title menu. When no disk is set on the tray, the title key performs error (or alarm) display.

<41>When no title menu is recorded on the disk set on the tray, the following operations can be performed during disk reproduction (or stop).

More specifically, when the title key is depressed, title and chapter numbers are displayed on part (e.g., upper left corner) of the screen. When a clear key is depressed, the title key is depressed again, or no key operation is performed for a predetermined period of time (e.g., 3 seconds), the title and chapter numbers are erased from the screen.

When a desired title number(e.g., "2") is entered with a ten-key pad while a title number (e.g., "1") and a chapter number (e.g., "1") are displayed, the screen display represents "title number: 2" and "chapter number: 1". When the reproduction key is depressed in this state, or no operation is performed for a predetermined period of time (e.g., 2 seconds), reproduction is started from chapter 1 of title 2.

In this case, during the title and chapter search operation, the search destination title number and chapter number on display unit 4 are kept flickered to notify the viewer of "searching".

<42>When title menu reproduction is performed upon depressing the title key in normal reproduction, and the title key is depressed again before title selection is not confirmed yet, reproduction is started from the portion reproduced before the menu reproduction.

[Select Keys/Cursor Keys (Pair of Upward and Downward Triangle Marks) Functions]

<43>The select/cursor keys are used to select an item in a disk menu (i.e., a menu called with the title key or menu key) or an item in a setup menu.

<44>In depressing a select key during set value display of an audio stream, a sub-picture stream, or an angle, when the upward triangle mark as the select key is depressed, the display is switched to the next stream or angle. When the downward triangle mark as the select key is depressed, the immediately preceding stream or angle appears.

<45>In depressing a select key during the display of a title number generated by the character generator, when the upward triangle mark as the select key is depressed, the next title appears. When the downward triangle mark as the select is depressed, the immediately preceding title appears.

[Select Keys/Cursor Keys (Pair of Left- and Right-Headed Triangle Marks) Functions]

<46>These select/cursor keys are used to select an item in a disk menu (i.e., a menu called with the title key or the menu key) and an item in the setup menu. For example, when the upward or downward triangle mark as the select/cursor key is depressed to select a given time, and the given item has several choices, the left- or right-headed triangle mark as the select/cursor key can be used to select one of the choices.

[Enter Key (ENTER) Functions]

<47>The enter key is used to confirm an item selected in the disk menu or the setup menu.

<48>The enter key is also used to confirm the title or chapter number on the memory window.

[Return Key (RETURN) Functions]

<49>The return key is used to allow the title producer (software provider) to search for a preset address on the disk. More specifically, the return key is used to designate an escape from the menu or a return operation to the reproduction start (restart) point.

[(Audio Key (AUDIO) Functions No. 1; for reproduction]

<50>When the audio key is depressed during reproduction, the name of language (when the type of audio stream is not music or the like but a language) of the currently reproduced audio stream is displayed on the reproduction screen for a predetermined period of time (e.g., 3 seconds) using a character generator (by checking the audio stream information recorded on the disk). When the audio key is depressed during this display, the voices of the next audio stream number are reproduced. When this audio key operation is repeated, the voices (various languages) recorded on this title are sequentially and cyclically reproduced.

<51>When the select/cursor keys (pair of upward and downward triangle marks) described above are selectively depressed during the display of the audio stream set values, an audio stream immediately preceding or succeeding the currently set audio stream can be selected. The contents of the selected audio stream are reproduced.

<52>When a number of the ten-key pad is entered du ring t he display of the audio stream set value, the audio stream can be switched to that of the entered number. The contents of the switched audio stream are reproduced.

<53>When the clear key is depressed during the display of the audio stream set value, the audio stream set value can be erased from the screen.

[(Audio Key (AUDIO) Functions No. 2; during stop (during blue back screen display))]

<54>When the audio key is depressed during the stop, the name of language (if the type of audio stream is a language) of the audio stream set in the currently selected title is displayed on the blue back screen for a predetermined period of time (e.g., 3 seconds) using the character generator (by checking the audio stream information recorded on the disk). When the audio key is depressed during this display again, the next audio stream number is set. When this audio key operation is repeated, the audio stream voices recorded on this title are sequentially and cyclically set and displayed.

<55>When the select/cursor keys (pair of upward and downward triangle marks) are selectively depressed during the display of the audio stream set value on the blue back screen, an audio stream immediately preceding or succeeding the currently set audio stream is selected.

<56>When a number of the ten-key pad is entered during the display of the audio stream set value on the blue back screen, the display is switched to an audio stream of the entered number.

<57>When the clear key is depressed during the display of the audio stream set value on the blue back screen, the audio stream set value is erased from the screen.

[Subtitle Key (SUBTITLE) Functions No. 1; during reproduction]

<58>When the subtitle key is depressed during reproduction, the name of language (if the type of sub-picture stream is a language) of a currently reproduced sub-picture stream is displayed on the reproduction screen for a predetermined period of time (e.g., 3 seconds) using the character generator (by checking the sub-picture stream information recorded on the disk). When the subtitle key is depressed during this display again, the sub-picture of the next stream number is reproduced. When this subtitle key operation is repeated, the sub-picture streams recorded on this title are sequentially and cyclically reproduced.

<59>When the select/cursor keys (pair of upward and downward triangle marks) are selectively depressed during the display of the sub-picture stream set value, the currently set sub-picture stream can be switched to a sub-picture stream immediately preceding or succeeding the currently set sub-picture stream. The contents of the switched sub-picture stream are reproduced.

<60>When a number of the ten-key pad is depressed during the display of the sub-picture stream set value, the stream is switched to the sub-picture stream of the entered number. The contents of the switched sub-picture stream are reproduced.

<61>When the clear key is depressed during the display of the sub-picture stream set value, the sub-picture stream set value is erased from the screen.

[Subtitle Key (SUBTITLE) Functions No. 2; during stop (during display on blue back screen)]

<62>When the subtitle key is depressed during the stop, the name of language (if the type of sub-picture stream is a language) of the sub-picture stream set in the currently selected title is displayed on the blue back screen for a predetermined period of time (e.g., 3 seconds) using the character generator (by checking the sub-picture stream information recorded on the disk). When the sub-picture key is depressed during this display again, the next sub-picture stream number is set. When this sub-picture key operation is repeated, the sub-picture stream voices recorded on this title are sequentially and cyclically set and displayed.

<63>When the select/cursor keys (pair of upward and downward triangle marks) are selectively depressed during the display of the sub-picture stream set values on the blue back screen, a sub-picture stream immediately preceding or succeeding the currently set sub-picture stream is selected.

<64>When a number of the ten-key pad is entered during the display of the sub-picture stream set value on the blue back screen, the display is switched to an sub-picture stream of the entered number.

<65>When the clear key is depressed during the display of the sub-picture stream set value on the blue back screen, the sub-picture stream set value is erased from the screen.

[Subtitle ON/OFF key (SUBTITLE ON/OFF) Functions]

<66>A sub-picture (subtitle) is displayed on/off.

<67>When the subtitle ON/OFF key is depressed during video reproduction or during the display of a sub-picture (sub-picture display ON set state), the sub-picture stream number set value is disabled, and this set value is displayed by the character generator for a predetermined period of time (e.g., 3 seconds), thereby erasing the sub-picture from the screen.

<68>When the subtitle ON/OFF key is depressed during video reproduction but not during the display of a sub-picture (sub-picture display OFF state), the sub-picture stream number set value is enabled, this set value is displayed by the character generator for a predetermined period of time (e.g., 3 seconds), and the sub-picture of the language of the ON set stream number is reproduced (if the sub-picture is recorded on the currently reproduced disk).

<69>When the subtitle ON/OFF key is depressed during video reproduction stop state, only the ON/OFF setting of the sub-picture display can be executed.

<70>In the sub-picture display OFF set state, when a forcible image output command is contained in the sub-picture stream having the same language code as that of the currently reproduced audio stream, the sub-picture corresponding to this command is forcibly output on the screen.

[Angle Key (ANGLE) Functions]

<71>When the angle key is depressed while a title having an angle block constituted by multiangle information and this angle block (angle interval) is reproduced, the angle number of the currently reproduced angle block is displayed by the character generator for a predetermined period of time (e.g., 5 seconds). When the angle key is depressed again during the angle number display interval, the identical time point of a cell having the next angle number is searched, and its reproduction is started.

Assume that a home run scene of a given batter is reproduced with angle number 1 (i.e., a camera angle when viewed from the center field to the back of a pitcher) of the multiangle block, that a bat hits a ball 5 seconds after the reproduction start time (t=0) of this angle block cell, and that the ball flies over the right field fence 3 seconds (t=8) after the batter hits the ball. In this case, when the viewer wants to watch this home run scene at another camera angle and depresses the angle key (t=5) and then angle number 2, the reproduction start time point (t=5) of this angle block cell is searched, and the home run scene can be restarted from t=5 at angle 2 (i.e., a camera angle at which the field is observed from, e.g., the first-base side infield stand).

When the angle key is further depressed during the angle number display interval, the recorded angle numbers are sequentially and cyclically switched, and reproduction (from time point t=5 in the above example) is stated at the selected angle.

<72>When the angle number is displayed on the screen by the character generator, a desired angle number may be directly selected with the ten-key pad (when an angle number absent from the currently reproduced angle block is entered with the ten-key pad, this key input is invalid). Alternatively, the angle number may be incremented or decremented with the select/cursor keys (pair of upward and downward triangle marks).

<73>When the angle is switched during still image reproduction of a cell in the multiangle block, reproduction time search is performed in the same manner as described above, and the still image at the searched angle is reproduced.

Assume that the still image of an automobile is reproduced with angle number 1 (i.e., camera angle at which the automobile is observed from the front). When the viewer wants to watch this automobile at another camera angle and depresses the angle key and then angle number 2, the reproduction start time point (t=0) of the angle block cell having angle number 2 is searched, and a still image is reproduced from t=0 at angle 2 (i.e., camera angle at which the automobile is observed from the right side surface).

When the angle key is depressed during the angle number display interval, the recorded angle numbers are sequentially and cyclically switched, and a still image is reproduced at the selected angle.

<74>Even if an angle key operation is performed during cell playback except for the multiangle block, angle setting (angle number switching) cannot be accepted. The angle setting (angle number switching) is accepted only when a multiangle block is present in the currently reproduced title.

<75>When the multiangle block cell is present in the selected title, angle setting (angle number switching) is accepted even in the stop state.

[Fast Forward (FWD) Key/Fast Rewind (REV) Key (Left- and Right-Headed Double Triangle Marks) Functions]

<76>When the fast forward key or the fast rewind key is depressed during motion picture reproduction or still image reproduction, fast forwarding or rewinding is performed at a speed (about twice the speed in normal reproduction) higher than that of normal reproduction (the motion of the motion picture is doubled, and the frame feed switching period of the still image is halved). When the fast forward key or fast rewind key is kept depressed, fast forward or rewind reproduction is performed at a speed (about eight times the speed of normal reproduction) much higher than that in normal reproduction (the motion of the motion picture becomes eight times, and the frame feed switching period of the still image is shorted to ⅛).

<77>When the reproduction key is depressed, fast forward or rewind reproduction is canceled, and reproduction at the normal speed is restored.

<78>Fast forward or rewind reproduction using the fast forward key or fast rewind key is performed only within the currently reproduced program chain when this key is operated. Fast forwarding is performed up to the end of this program chain, or fast rewinding is performed up to the start of this program chain. The pause state is then set at the end or start of the program chain.

<79>During fast forwarding or rewinding using the fast forward key or fast rewind key, reproduction of sounds (audio stream) and a subtitle (sub-picture stream) can be automatically inhibited.

The audio signal may be reproduced while changing the reproduction pitch in correspondence with the fast forward speed. For example, when a motion picture is the documentary movie of a marathon, and the subtitle is used as the time lapse from the start of the race, the subtitle may be reproduced during fast forward or rewind reproduction.

<80>When the reproduction mode becomes a still mode during fast forward or rewind reproduction using the fast forward key or the fast rewind key, the fast forward or rewind operation is canceled, and still image reproduction is started. When the fast forward key (fast rewind key) is depressed in the still cell playback mode, continuous frame forwarding (continuous frame rewinding) for, e.g., about one frame per second may be performed. At this time, when the fast forward key (or the fast rewind key) is kept depressed, continuous frame forwarding (or continuous frame rewinding) can be started at a rate of, e.g., about 4 frames per second. When the key is depressed again, the continuous frame forwarding (or continuous frame rewinding) at a rate of about one frame per second can be restored. When the cell playback mode is canceled during this continuous frame forwarding (or continuous frame rewinding), 2× fast forward (or fast rewind) reproduction can be performed.

[Display Key (DISPLAY) Functions]

<81>When this key is depressed during the stop or reproduction, the various key operation contents (on key operation/display unit 4 and/or on the screen of monitor 6 of the apparatus main body) are displayed.

[Ten-Key Pad ("0" to "9" and "+10") Functions]

<82>During normal reproduction, the ten-key pad is used to designate a chapter number in the currently reproduced title. When the key-key input is confirmed (the operation of the enter key), a chapter having the designated number is searched (this search operation can be performed with title number key T to be described later). An absent chapter number is not accepted.

<83>During the stop, the ten-key pad can be used to designate a chapter number in the selected title. When a ten-key input is confirmed, a chapter having the designated number is searched (this search operation can be performed with title number key T). An absent chapter number cannot be accepted.

<84>When a title containing a multiangle block is being reproduced (during angle cell playback) and an angle number is being displayed, the ten-key input angle number is directly selected. Note that an absent angle number is not accepted.

<85>In the disk menu display, when numbers are assigned to items on each disk menu window, an item corresponding to the ten-key input number is selected and executed. Note that an absent item number input is not accepted.

<86>In setting a parental lock from the setup menu, the ten-key pad can be used to enter a password.

[Clear Key (CLEAR) Functions]

<87>The clear key is used to cancel a key input for a title number or chapter number.

<88>The clear key is used to cancel a password input for changing a parental level.

<89>The clear key is used to cancel a repeat mode (to be described later).

<90>The clear key is used to cancel an input number for a memory setting window operation (to be described later.

<91>The clear key is used to cancel a memory reproduction mode (to be described later).

<92>The clear key is used to cancel a random reproduction mode (to be described later).

<93>The clear key is used to cancel to display the numbers of a title, a sound (audio stream), a subtitle (sub-picture stream), and an angle.

[Repeat Key (REPEAT) Functions]

<94>The repeat key is used to perform repeat setting of a chapter or title (only for a title having one sequential program chain).

<95>Every time the repeat key is depressed, the mode is sequentially and cyclically switched in the order of "chapter repeat", "title repeat", "repeat OFF", and "chapter repeat".

<96>When the repeat key is depressed during the A-B repeat operation (to be described later), the A-B repeat operation is canceled, and the mode changes to the chapter repeat mode.

<97>When a repeat operation range falls outside the repeat interval upon operation of the fast forward key, the fast rewind key, or the skip key, the repeat operation is canceled.

<98>When a multiangle block is present within the repeat interval, an angle change is enabled (i.e., the angle key properly functions even in the repeat mode).

[A-B Repeat Key (A-B REPEAT) Functions]

<99>The A-B repeat key is used to set the start and end points of a repeat operation between the two points (only for a title having one sequential program chain).

<100>When the repeat key is depressed for the first time, a start point (A) is set. When the repeat key is depressed for the second time, an end point (B) is set. At the end of setting of the end point, the start point is searched. A portion between the start point A and the end point B is repeatedly reproduced.

<101>The A-B repeat operation can be canceled with the clear key operation.

<102>When the mode is changed to title or chapter reproduction except for the A-B interval during the A-B repeat operation, or the repeat key is depressed, the A-B repeat operation can be canceled.

<103>When a repeat operation range falls outside the repeat interval upon operation of the fast forward key, the fast rewind key, or the skip key, the repeat operation is canceled.

<104>When the clear key, the fast forward key, the fast rewind key, or the skip key is depressed before the repeat end point (B) is set, the A-B repeat operation can be canceled.

<105>When a title is ended before the repeat operation reaches the end point (B) during the A-B repeat reproduction, the A-B repeat operation can be canceled.

<106>The start point (A) in the A-B repeat interval can be invalidated in the multiangle block interval (the head of the multiangle block interval can be defined as the A-B repeat start point. For example, the camera angle scene having angle number 1 of a given multiangle block can be repeated between A and B within this angle block).

<107>When a multiangle block appears during A-B repeat reproduction, the A-B repeat operation can be canceled.

<108>The start point (A) and the end point (B) which are set using the A-B repeat key designate the head (start address) of corresponding image data (group of pictures) immediately after setting of the start and end points.

[Memory Key (MEMORY) Functions]

<109>When a disk is set while the tray is kept closed, and the memory key is depressed, the memory setting window is displayed. When the memory key is depressed during the display of the memory setting window, the state immediately before the display of the memory setting window is restored.

<110>According to a memory setting method, title numbers and chapter numbers to be memory-reproduced during the display of the memory setting window are sequentially input with the ten-key pad and a title number (T) key (to be described later).

<111>When the cursor on the display window is moved with the select/cursor keys to perform memory setting inputs with the memory numbers of the cursor positions, the title and chapter numbers set with the subsequent memory numbers are incremented one by one.

Assume that "title 1, chapter 3" and "title 2, chapter 1" are already set with memory numbers 1 and 2, and no setting is performed from memory number 3. In this case, the cursor is positioned at "title 2, chapter 5" to set it. The contents set for memory numbers 1 and 2 are shifted to memory numbers 2 and 3. As a result, the set contents of memory numbers 1, 2, and 3, are "title 2, chapter 5", "title 1, chapter 3", and "title 2, chapter 1", respectively.

<112>When the cursor on the display screen is moved with the select/cursor keys, and the memory number at the cursor position is cleared, the contents set for this memory number are cleared, and the contents set for the subsequent memory numbers are decremented one by one.

Assume that "title 2, chapter 5", "title 1, chapter 3", and "title 2, chapter 1" are set for memory numbers 1, 2, and 3, respectively, and that no setting is performed from memory number 4. When the cursor is positioned at memory number 2, and a clear operation is performed, the contents "title 1, chapter 3" having been set for memory 2 are cleared, and the contents having been set for memory number 3 are shifted to those for memory number 2. The contents (no setting) having been set for memory number 4 are shifted to those for memory number 3. As a result, the set contents for memory numbers 1, 2, and 3 are "title 2, chapter 5", "title 2, chapter 1", and "no setting", respectively.

A memory setting count (the upper limit of the memory number) need not be necessarily limited. From the viewpoint of necessity in actual software and the physical memory capacity on the reproduction apparatus side, the maximum memory setting count is, e.g., about 30 (even if 99 titles are recorded on one disk, the maximum memory setting count is not necessarily 99 from the viewpoint of a general viewer. On the other hand, in a business reproduction apparatus, demand may be arisen for performing memory settings for a plurality of chapters in each of the 99 titles. In this case, the maximum memory setting count may be 999 or more).

<113>When the reproduction key is depressed during the display of the memory setting window, memory reproduction is started in the order of memory setting registration.

Assume that "title 2, chapter 5", "title 1, chapter 3", and "title 2, chapter 1" are set for memory numbers 1, 2, and 3, respectively, and that no setting is performed from memory number 4. When the reproduction key is depressed during the display of the memory setting window in this state, memory reproduction is performed as follows. "Title 2, chapter 5" is reproduced first, "title 1, chapter 3" is then reproduced, and "title 2, chapter 1" is finally reproduced. When reproduction of "title 2, chapter 1" is complete, reproduction is stopped.

<114>When the clear key is depressed during memory reproduction, the memory reproduction mode is canceled, and the mode directly changes to normal reproduction.

<115>The contents set on the memory setting window can be cleared by the following method.

<a>All the title and chapter numbers set during the display of the memory setting window are erased with the clear key.

<b>The tray is opened to eject the disk outside the apparatus (note that in the business reproduction apparatus, a nonvolatile internal memory can be arranged in the apparatus, and the memory settings may be stored with a code for specifying the disk even if the disk is ejected).

[Random Key (RANDOM) Functions]

<116>When the selected title has one sequential program chain, random reproduction is performed for chapters in this title.

<117>When the random key is depressed during reproduction, random reproduction is started from a chapter next to the currently reproduced chapter (for example, when the random key is depressed during reproduction of chapter 2 of a title having chapters 1 to 9, random reproduction is started in reproduction of chapter 3, so that, e.g., chapters 5, 3, 7, 1, and 9 are reproduced at random).

<118>When the random key is depressed during the stop, random reproduction is started after the reproduction key is depressed to start disk reproduction.

<119>When random reproduction of all the chapters in the selected tile is complete, reproduction is stopped. During this random reproduction, the chapter number is not repeatedly reproduced, and the chapters are simply reproduced at random. However, random reproduction may be performed such that a given chapter may be repeatedly reproduced. Alternatively, random reproduction may be endlessly repeated unless the power switch is turned off or the stop key is depressed.

<120>The clear key can be depressed during random reproduction to cancel the memory reproduction mode, and the mode can be changed to normal reproduction.

<121>When the random key is depressed during random reproduction, the random reproduction mode can be canceled.

[Slow Key (SLOW) Functions]

<122>When the slow key is depressed during reproduction, slow reproduction is performed at a ½ speed in the forward direction. At the same time, "½" or a number or symbol corresponding to "½", is displayed on the currently reproduced video image by using the character generator.

<123>When the slow key is then depressed, slow reproduction can be performed at a ⅛ speed in the forward direction. When the slow key is further depressed, the slow reproduction speed is periodically switched in the order of 1/16, ⅛, ½, ⅛, 1/16, . . . , so that the slow display on the currently reproduced video image is changed accordingly.

<124>When the slow key is depressed while the reproduction operation is paused (using the pause key), 1/16 slow speed reproduction is performed. The effect of the slow key is the same as described above.

<125>When the reproduction key is depressed during slow reproduction, the mode is changed to normal reproduction.

<126>When the title is changed during slow reproduction, the slow reproduction mode is canceled, and the mode is changed to normal reproduction.

<127>A slow key operation is invalid during still image reproduction in the cell playback mode.

<128>Sounds are not normally reproduced during slow reproduction, but the pitch of audio data may be changed in accordance with a reproduction speed, and the audio data may be reproduced.

[Last Play Key (LAST PLAY) Functions]

<129>When the last play key is depressed upon interrupting reproduction by depressing the stop key during disk reproduction or by turning.off the power key (including power failure), reproduction is started at the interruption position or a position slightly before the interruption position.

<130>When the disk tray is opened after the stop, the reproduction interruption position can be cleared from the memory so that the last play key can be invalidated. When the reproduction interruption position is not cleared from the memory but is kept stored in the memory in the reproduction apparatus, reproduction can be restarted from the interruption position or a position slightly before the interruption position by depressing the last play key, even after the disk is unloaded and then loaded into the tray.

<131>When reproduction is interrupted by the power-OFF operation while the disk has a first play program chain (auto-start), this operation with the last key is invalidated (i.e., reproduction is stated from the first play program chain).

<132>When the random program chain is interrupted during reproduction, reproduction can be restarted from the interruption position or a position slightly before the interruption position by depressing the last play key, provided that a random reproduction loop count is stored in the reproduction apparatus.

[Setup Key (SETUP) Functions]

<133>The setup key is a key for calling a setup menu for performing various settings (e.g., setting of a screen size/aspect ratio, setting of an angle mark, setting of a parental lock, setting of a desired type of audio language, setting of a desired type of caption language, and setting of a desired type of menu language) for the reproduction apparatus. This key input is valid only during the reproduction stop.

<134>When the setup key is depressed during the display of the setup menu, the display of the setup menu is turned off, and a reproduction stop state (blue back screen) is set.

[Title Number Key (T) Functions]

<135>In designating a title number and a chapter number so as to perform a search operation or memory reproduction operation, a number input from the ten-key pad before depressing the title number key is set as a title number. A number input from the ten-key pad after depressing the title number key is set as a chapter number.

<136>When the title number key is depressed before depressing the random key, random title reproduction is performed in place of random chapter reproduction. For example, when titles 1, 2, 3, 4, and 5 are recorded on a disk set on the tray, and the random key is depressed after depressing the title number key (the reproduction key is additionally depressed in the stop state), random title reproduction is started in the order of titles 2, 5, 1, 4, and 3.

The minimum necessary number of various keys described above are arranged on the front panel of the reproduction apparatus on which key operation/display unit 4 is arranged.

Figure 4:
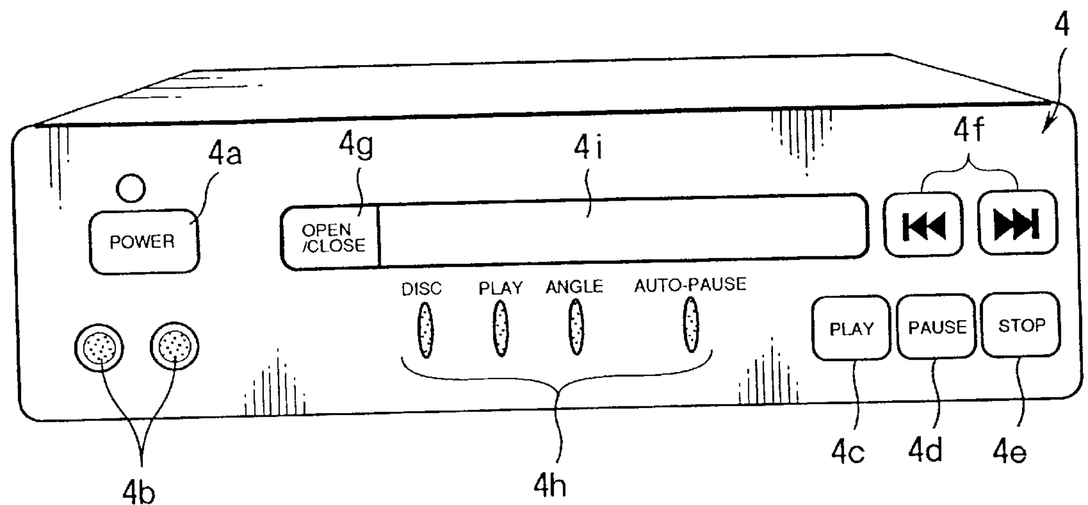
FIG. 4 is a view showing the outer appearance of the reproduction apparatus in FIG. 1.

For example, as shown in FIG. 4, power key 4*a*, 2-channel microphone input terminal 4*b*, reproduction (play) key 4*c*, pause key 4*d*, stop key 4*e*, chapter/program stop key 4*f*, open/close key 4*g* for instructing loading/unloading of disk 10, display 4*h*, insertion/removal port (disk tray) 4*i* for optical disk 10, and the like are arranged on the front panel of the reproduction apparatus.

Figure 5:
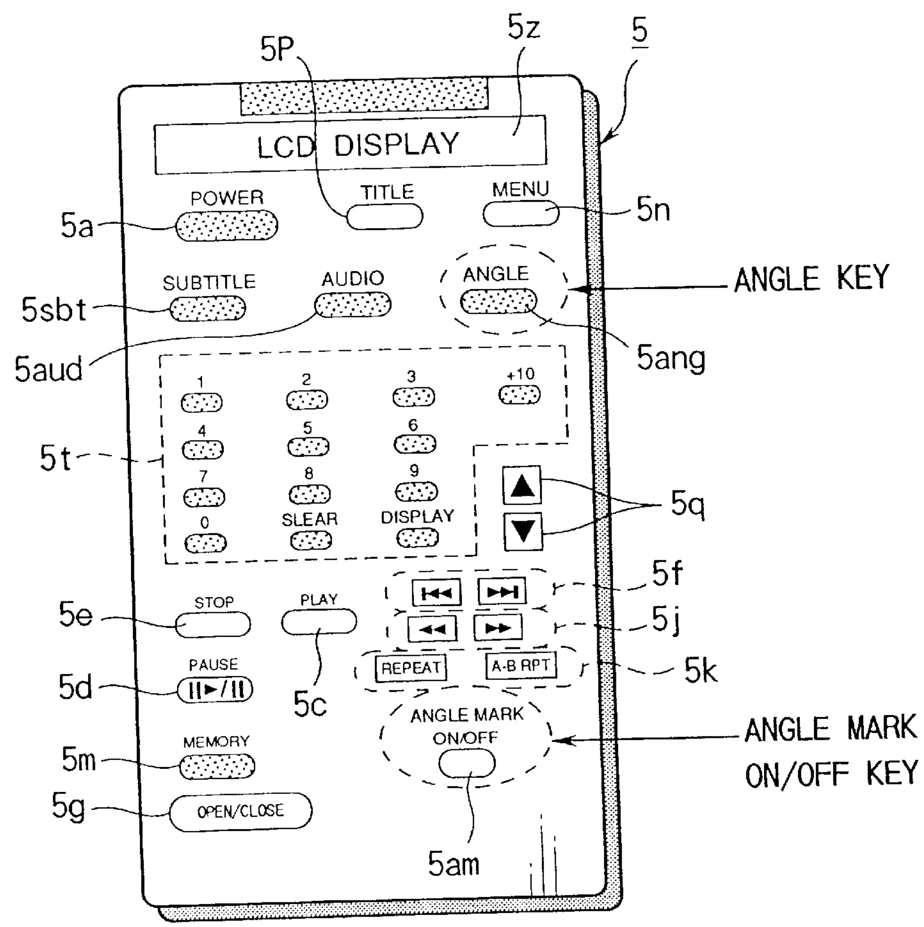
FIG. 5 is a view showing an arrangement of remote controller 5 used in the reproduction apparatus in FIG. 1

The main ones of the various keys described above are arranged on remote controller 5. For example, as shown in FIG. 5, remote controller 5 has power key 5*a*, numerical keys (ten-key pad) 5*t*, reproduction key 5*c*, pause key 5*d*, stop key 5*e*, skip key 5*f* for skipping a reproduction portion in units of chapters/tracks (or in units of programs), open/close key 5*g*, fast forward/rewind (FWD/REV) key 5*j*, repeat key 5*k* for setting a desired repeat range and instructing reproduction within the set repeat range, memory key 5*m* for storing various states set by the viewer in the memory (RAM portion in system ROM/RAM 52) in FIG. 1, menu key 5*n* for instructing to display the menu window, title key 5*p* for instructing to display the title menu window, subtitle key 5 sbt for instructing to display the subtitle menu window (this menu is to select, e.g., the type of caption language of a sub-picture stream), audio key 5 aud for selecting the type of sounds in reproduction, select keys (cursor keys) 5*q* for moving the cursor vertically (or in the upper, lower, right, and left directions) in selecting an item from the menu window, and the like.

Remote controller 5 further includes angle key 5 ang and angle mark ON/OFF key 5 am. Although a detailed arrangement will be described later, a plurality of video data (multiangle block) obtained by photographing a single home run scene (or an orchestra performing a given piece of music) can be stored in optical disk 10. When this angle block is reproduced while angle mark ON/OFF key 5 am is kept on, an angle mark (e.g., a camera shape and/or a three-dimensional arrow corresponding to the direction of the camera angle) is displayed on part of the screen of display unit 4 or monitor 6.

The display of the angle mark (camera indicator) is effective in that the viewer is notified of "angle block reproducing". However, when some viewer repeatedly reproduces the same software (disk 10) and already knows a multiangle block portion, the angle block display state by means of angle mark flickering may bother this viewer. In this case, the angle mark is turned off with angle mark ON/OFF key 5 am.

When angle key 5 ang is depressed during angle block reproduction, the camera angles of the same home run scene can be sequentially switched, and the home run scene can be reproduced at different angles. In this case, the audio contents may be switched in correspondence with the changes in camera angles. For example, in the home run scene observed from the first-base side infield stand, the audio channels from a stereo microphone set on the first-base side are selected, and a ball hit sound is reproduced from left speaker 8. In the home run scene observed from the center field stand, the audio channels from a stereo microphone set on the center field side are selected, and the ball hit sound is reproduced from the center between right and left speakers 8.

This audio channel switching can be manually performed with audio key 5 aud. However, audio channels may be automatically selected in correspondence with angle selection. For example, when the ith angle is selected with angle key 5 ang, ith audio channels corresponding to the ith angle may be automatically selected. The relationship between the angles and the audio channels can be stored in advance table data in the internal memory of the reproduction apparatus or remote controller 5.

Liquid crystal panel 5*z* for displaying visual information corresponding to the operation results of various keys arranged on remote controller 5 of FIG. 5 may be arranged on remote controller 5. When this panel 5*z* is constituted by a two-dimensional display panel having a given display resolution and a given display area, a title number, a chapter number, a subtitle (sub-picture stream) number, an audio stream number, menu types, menu selection item contents (e.g., the type of default language, and parental setting), a multiangle block number (or various camera angle icons= angle marks), and the like, all of which are selected in correspondence with the various key operations of remote controller 5 can be displayed on the two-dimensional display panel.

Figure 6:
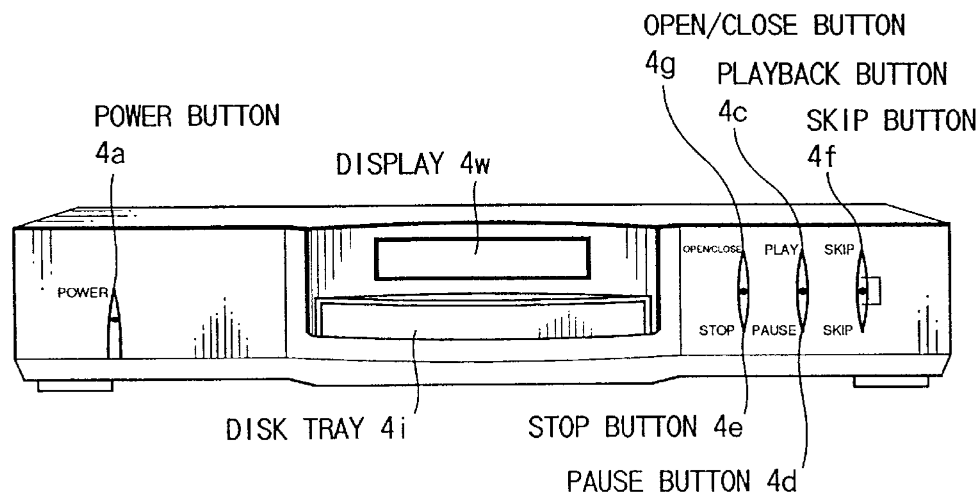
FIG. 6 is a view showing another outer appearance of remote controller 5 used in the reproduction apparatus in FIG. 1.

FIG. 6 shows another arrangement of the front panel of the reproduction apparatus (DVD player) in FIG. 1. This front panel has power button 4*a*, reproduction button 4*c*, pause button 4*d*, stop button 4*e*, open/close button 4*g*, disk tray 4*i*, skip button 4*j*, and display window 4*w*, all of which correspond to various operation keys in FIG. 4.

Figure 7:
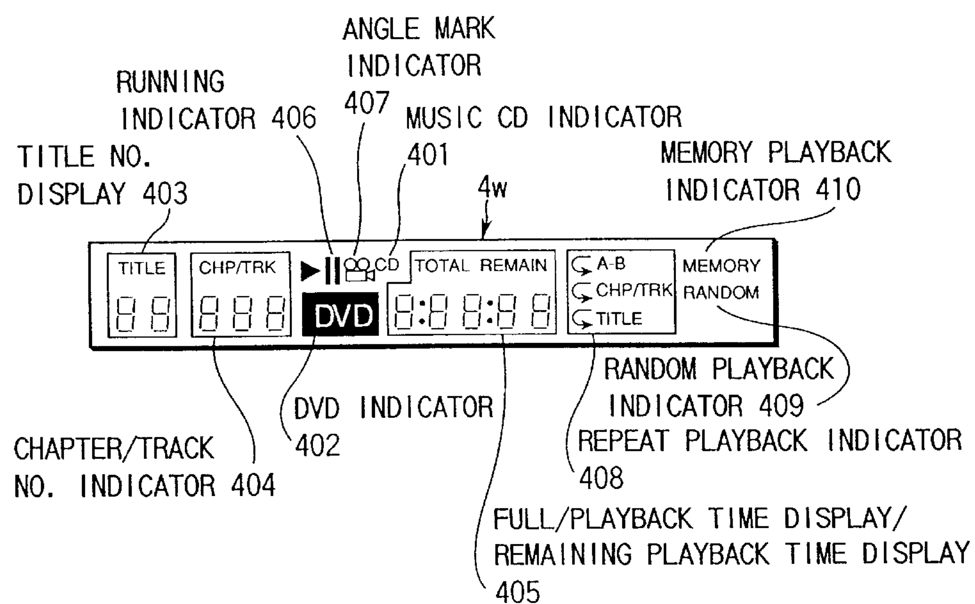
FIG. 7 is a view for explaining how angle mark (camera mark) 407 is displayed on display window 4*w* formed in the reproduction apparatus in FIG. 6.

FIG. 7 shows the display contents on display window 4*w* in FIG. 6. More specifically, when optical disk 10 set on disk tray 4*i* is a CD, the table of contents (TOC) recorded in its lead-in region is read to turn on CD display portion 401 representing that set disk 10 is a music CD. On the other hand, when optical disk 10 set on disk tray 4*i* is a DVD, management information recorded in its lead-in region is read to turn on DVD display portion 402 representing that set disk 10 is a DVD.

When DVD disk 10 is set on disk tray 4*i*, the title number of a program to be reproduced is displayed on title number display portion 403, and chapter/track numbers of the title having the displayed title number to be reproduced are displayed on chapter/track number display portion 404. At the same time, a total reproduction time or remaining reproduction time is displayed on total reproduction time/remaining reproduction time display portion 405.

When reproduction button 4*c* is depressed, travel display mark 406 is turned on to start reproduction from the chapter on display portion 404 in the title on display portion 403.

When a reproduction portion reaches a multiangle block, angle mark display portion 407 is turned on or flickered or changed in color. More specifically, when a title having an angle block is selected, and a portion except for the angle block is currently reproduced, mark 407 is simply turned on. When reproducing within the angle block recording interval is started, mark 407 is flickered to visually notify the viewer of a state wherein various angle reproduction operations can be performed. Alternatively, during reproduction for a portion except for the angle block, mark 407 may be simply turned on with a green backlight. During angle block reproduction, mark 406 may be flickered with a red backlight.

At this time, when angle mark ON/OFF key 5 am of remote controller 5 in FIG. 5 is kept on, a mark or sign (icon) representing "multiangle block reproducing" is also displayed at the predetermined portion of monitor 6. When angle mark ON/OFF key 5 am is kept off, angle mark display portion 407 is turned on or flickered, changed in color, or deforms, and the angle mark is erased from the display screen of monitor 6.

Angle mark 407 on the monitor screen may be displayed as a camera icon. When a reproduction portion reaches an angle block, the icon may deform or may be animated. This angle mark icon can be output to the screen using the bit mark display region. More specifically, the angle mark icon can be output to the caption character head portion in the caption display region for a sub-picture. During angle block reproduction, this icon can be rotated.

When angle mark display portion 407 is turned on or flickered, changed in color, or deforms, the viewer knows that multiangle reproduction is possible. At this time, when angle key 5 ang of remote controller 5 is depressed, the angle number is cyclically changed in the order of #1, #2, #3, . . . , #1 to change the camera angle for a reproduction scene (data at a maximum of nine angles can be recorded).

When the viewer depresses angle key 5 ang once under an assumption that a home run scene is reproduced at a camera angle on the backstop side, the reproduction scene is switched to the one at the camera angle on the first-base infield side. When angle key 5 ang is further depressed once, the reproduction scene is switched to the one at the camera angle on the right field stand side.

The viewer uses repeat key 5*k* of remote controller 5 in FIG. 5 to mark time A at which a pitcher pitches for a batter and time B at which the home run ball flies over the right field fence, and instructs repeat reproduction, the home run scene from the pitch to the time when the ball flies over the right field fence can be repeatedly reproduced at any desired camera angle. This repeat reproduction can be performed in units of chapters/tracks or titles (when one title in music software corresponds to one piece of music, repeat reproduction in units of titles is also preferable).

When repeat reproduction is instructed with repeat key 5*k* of remote controller 5 in units of reproduction times (A-B repeat), chapters/tracks, or titles, a corresponding portion (e.g., A-B) of the repeat reproduction display portion in FIG. 7 is turned on or flickered. This notifies the viewer of a repeat reproduction state.

Figure 8:
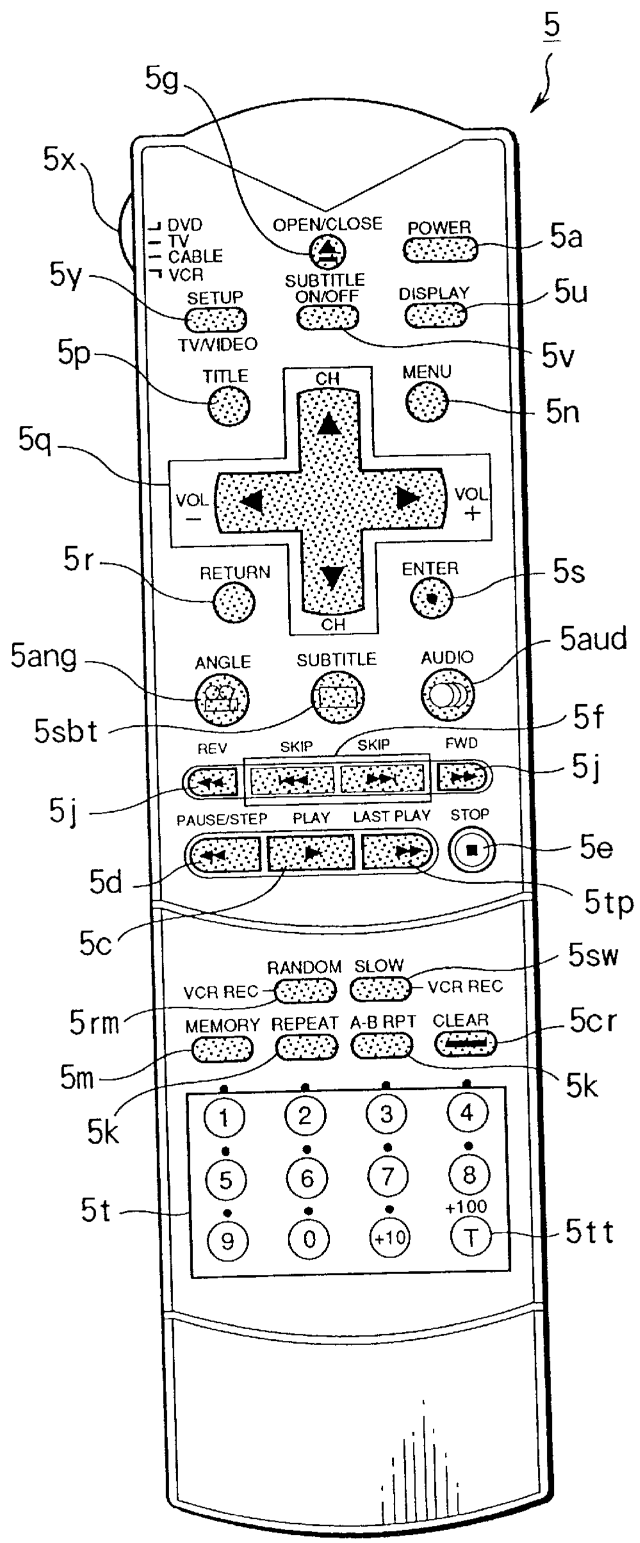
FIG. 8 is a view for explaining another arrangement of remote controller 5 used in the reproduction apparatus in FIG. 1.

On the other hand, when optical disk 10 contains 10 pieces of music with video data, and random reproduction is instructed by the viewer, random reproduction display portion 409 in FIG. 7 is turned on or flickered, and the 10 pieces of music are reproduced at random (random reproduction can be instructed using button 5 rm of the remote controller in FIG. 8).

In reproducing the DVD containing the above pieces of music, the viewer designates a desired reproduction order with ten-key pad 5*t* and stores the order in the memory (52) of the apparatus. Thereafter, when reproduction button 5*c* is turned on to turn on or flicker memory reproduction display portion 410 in FIG. 7, the plurality of pieces of music designated by the viewer can be reproduced in the order stored in the memory.

FIG. 8 shows another arrangement of remote controller 5. Remote controller 5 in FIG. 8 has the following operation keys/buttons in addition to the various keys/buttons of remote controller 5 in FIG. 5.

More specifically, for common use of remote controller 5 in FIG. 8 in a DVD player, a television, a cable television, and a video cassette deck, remote control switch 5*x* for selecting one of the remote controller operation targets is arranged. In addition, remote controller 5 also includes setup button 5*y* turned on to cause remote controller 5 to set up various DVD player selection items (e.g., an aspect ratio, a parental lock level, an audio language, a caption language, a disk menu language, and an on-screen language) in the DVD mode selected by switch 5*x*, and display button 5*u* for displaying various pieces of operation information (e.g., a title number, a chapter number, a total reproduction time, and various reproduction modes) on monitor 6.

Remote controller 5 in FIG. 8 also includes subtitle ON/OFF button 5*v* depressed when the viewer wants to select a subtitle (e.g., the caption of a specific language) in each title. During reproduction of disk 10 on which subtitles are recorded, button 5*v* and then subtitle button 5 sbt are depressed to allow the viewer to select a desired subtitle.

Figure 9:
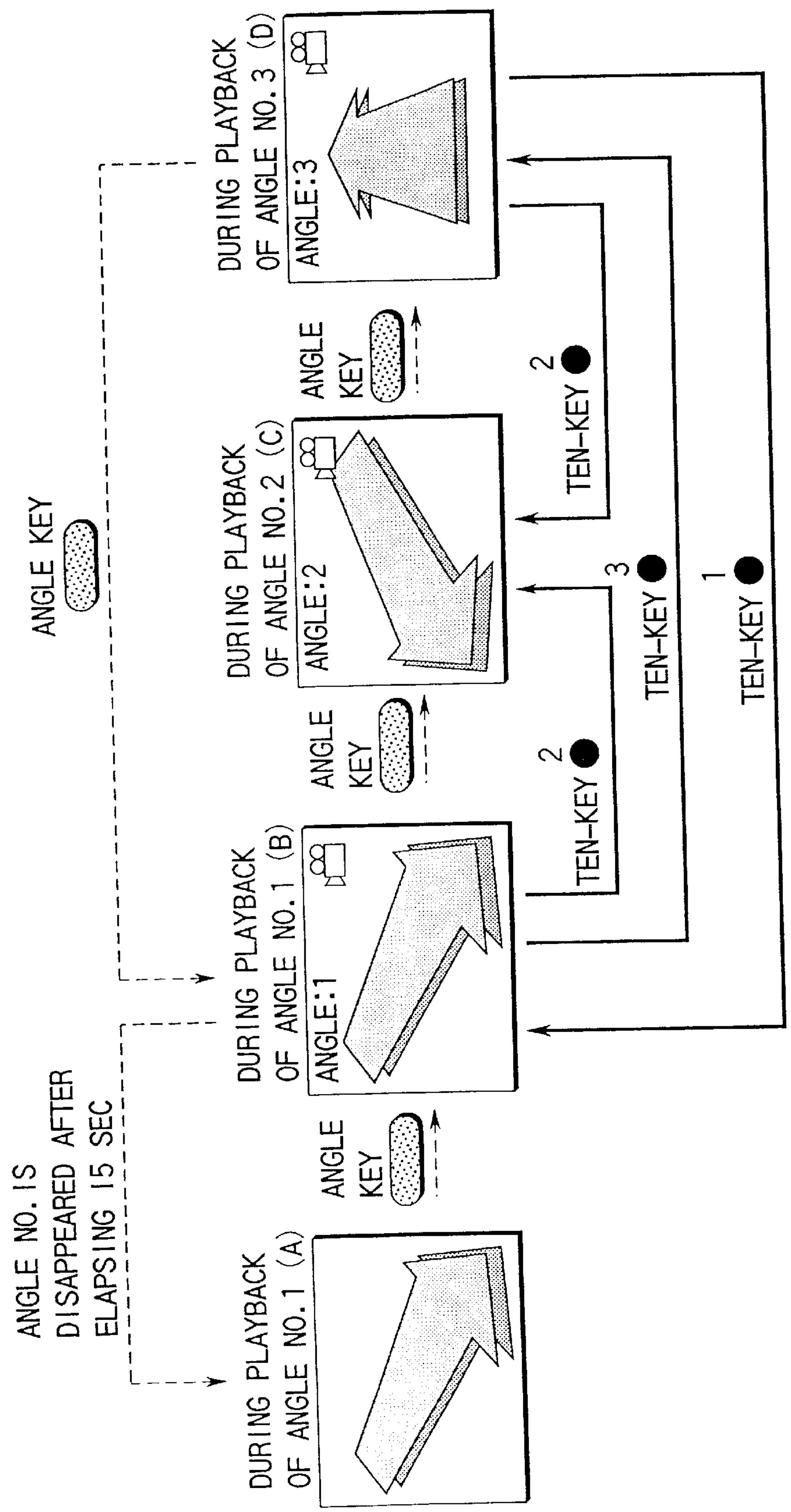
FIG. 9 is a view for explaining angle switching during reproduction of a title having an angle block capable of multiangle reproduction in the reproduction apparatus in FIG. 1.

FIG. 9 is a view for explaining how the corresponding display screen on monitor 6 changes when angle button 5 ang of remote controller 5 in FIG. 5 or 8 is depressed during reproduction of a multiangle block containing three kinds of camera-angle information.

As shown on the screen (A) of FIG. 9, first of all, the scene is reproduced at the default angle (e.g., angle 1) (the thick arrow indicates the camera angle). Judging from flickering of angle mark 407 on display window 4*w* in FIG. 7, the viewer knows that the default angle can be changed.

When the viewer who knows that the angle can be changed depresses angle button 5 ang once, the monitor display changes to the screen (B) in FIG. 9. Since the camera angle is set to angle 1, the camera angle of the displayed video image does not change. However, an angle switching instruction output with angle button 5 ang is notified by a camera mark located at the upper right corner of the screen (B). The current angle number is notified by characters "ANGLE: 1" at the upper left corner of the screen (B).

When a predetermined period of time has elapsed (e.g., 15 sec) in this state, the camera mark and the characters "ANGLE: 1" on the screen (B) disappear, and the state of the screen (A) is restored.

When angle button 5 ang is further depressed in the state of the screen (B), the camera angle is changed to angle 2. The display of monitor 6 is switched to the screen (C) in FIG. 9. At this time, the camera mark at the upper right corner of the screen (C) is kept unchanged, but the current angle number is notified by the characters "ANGLE: 2" at the upper left corner of the screen (C).

When angle button 5 ang is further depressed in the state of the screen (C), the camera angle is changed to angle 3. The display of monitor 6 is switched to the screen (D) in FIG. 9. The camera mark on the upper right corner of the screen (D) is kept unchanged, but the current angle number is notified by the characters "ANGLE: 3" at the upper left corner of the screen (D).

The angle switching operations with angle button 5 ang have been described above. During the angle number display, a desired angle may be directly selected with the ten-key pad.

For example, during reproduction on the screen (B) of FIG. 9 at angle 1, selection of "2" with the ten-key pad allows a direct change in angle to angle 2 on the screen (C). During reproduction on the screen (B) at angle 1, selection of "3" with the ten-key pad allows a direct change in angle to angle 3 on the screen (D).

In addition, during reproduction on the screen (C) of FIG. 9 at angle 1, selection of "1" with the ten-key pad allows a direct change in angle to angle 1 on the screen (B). During reproduction on the screen (C) at angle 2, selection of "3" with the ten-key pad allows a direct change in angle to angle 3 on the screen (D).

Similarly, during reproduction on the screen (D) of FIG. 9 at angle 3, selection of "1" with the ten-key pad allows a direct change in angle to angle 1 on the screen (B). During reproduction on the screen (D) at angle 3, selection of "2" with the ten-key pad allows a direct change in angle to angle 2 on the screen (C).

Although the icon of the camera mark at the upper right corner of the screen in FIG. 9 is not changed, the lens direction of the camera mark icon may be changed in correspondence with each camera angle represented by the thick line.

Figure 10:
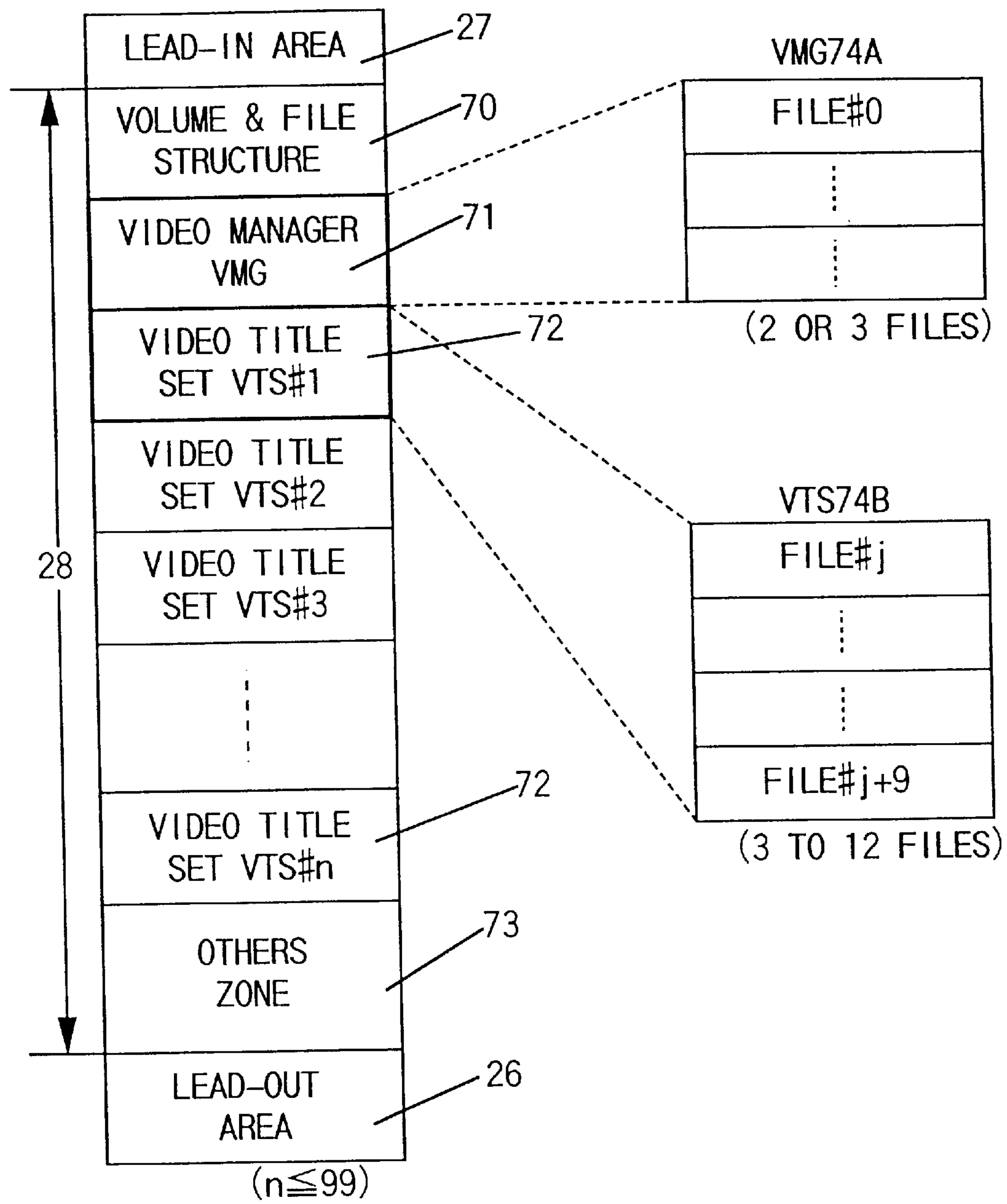
FIG. 10 is a view for explaining the logical structure of information recorded on the optical disk (DVD) in FIG. 3.

Data recording region 28 formed on optical disk 10 in FIG. 3 has a volume and a file structure, as shown in FIG. 10. The logical format of this structure is determined so as to comply with, e.g., ISO9660 as one of the reference standards, and a universal disk format (UDF) bridge.

Data recording region 28 from lead-in region 27 to lead-out region 26 is assigned as a volume space. This volume space can include a space for applications of specific standard (digital video disk or digital versatile disk; abbreviated as the DVD standard) and a space except for the applications of specific standard.

The volume space of data recording region 28 is physically divided into a large number of sectors. Serial numbers are assigned to the physical sectors. The logical addresses of data recorded in this volume space (data recording region 28) represent logical sector numbers (LSNs) determined by ISO9660 and the UDF bridge. The logical sector size is 2,048 bytes (or 2 kbytes) as in a physical sector size. Serial numbers are assigned to the logical sector numbers (LSNs) in the ascending order of the physical sector numbers.

As shown in FIG. 10, the volume space of data recording region 28 has a hierarchical structure. The volume space has volume and file structure region 70, video manager 71, at least one video title set 72, and another recording region 73. These regions are segmented by the boundaries of the logical sectors. One logical sector is defined as 2,048 bytes, and one logical block is defined as 2,048 bytes. Therefore, one logical sector can be defined in a one-to-one correspondence with one logical block.

File structure region 70 corresponds to the management region defined by IS09660 and the UDF bridge. On the basis of the description in this region 70, the contents of video manage (VMG) 71 are stored in system ROM/RAM 52 in FIG. 1.

Information (video manager information VMGI, video manager menu video object set VMGM_VOBS, and video manager information backup file VMGI_BUP, all of which will be described later) for managing video title sets (VTS#1 to VTS#n) is described in video manager (VMG) 71.

Each video title set (VTS) 72 stores video data (a V pack to be described later) compressed by a predetermined standard such as MPEG, audio data (an A pack to be described later) compressed or uncompressed by a predetermined standard, runlength-compressed sub-picture data (an SP pack to be described later; this pack contains bit map data in which one pixel is defined by a plurality of bits), and information (a navigation pack to be described later; this pack contains playback control information/presentation control information PCI, and data search information DSI) for reproducing the V, A, and SP packs.

Video title set 72 is constituted by a plurality of files 74B as in video manager 71. Each file 74B contains, as control data, video title set information (VTSI), video title set menu object set (VTSM_VOBS), video title set title video object set (VTSTT_VOBS; a maximum of nine files), and video title set information backup (VTSI_BUP).

The maximum number of video title sets (VTS#1 to VTS#n) is limited to 99. The number of files 74B (File#j to File#j+9) constituting each video title set 72 is selected from 3 to 12. These files 74A and 74B are segmented by the boundaries of the logical sectors.

Information available for video title set 72 or other information not associated with the video title sets can be stored in another recording region 73. This another recording region 73 is not essential and may be deleted if it is not used.

Each video title set 72 in FIG. 10 contains a plurality of video object sets (VOBSs). As will be described later, the video object sets (VOBSs) in video title set (VTS) 72 are a video title set menu video object set (VTSM_VOBS), and a video object set (VTSTT_VOBS) for the title of at least one video title set. Both the video object sets have different application purposes, but have the same structure.

The structure of each video object set (VOBS) will be described below.

Figure 11:
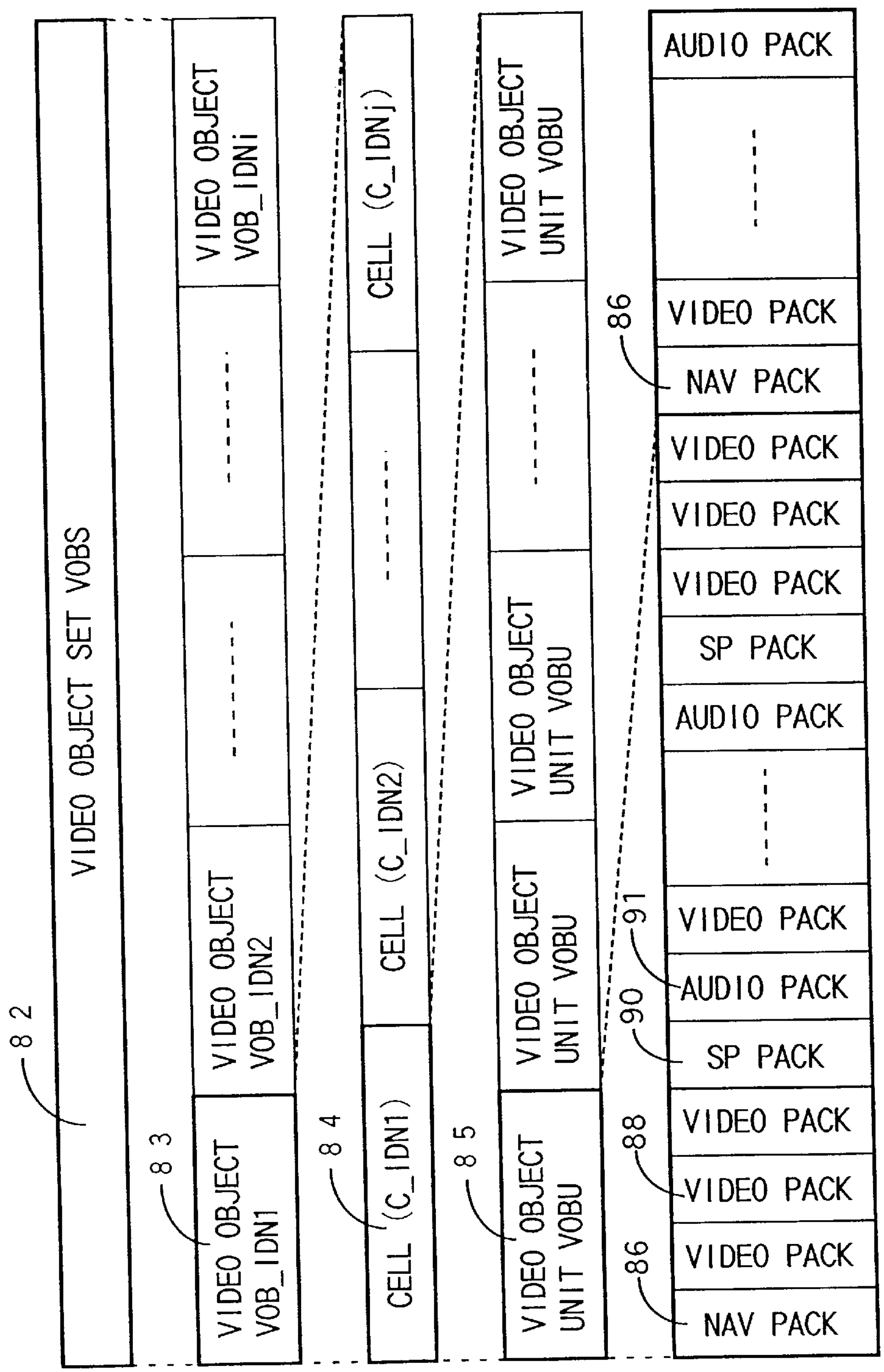
FIG. 11 is a view for explaining the hierarchical structure of data recorded on each video title set (VTS) 72 in FIG. 10.

As shown in FIG. 11, video object set (VOBS) 82 is defined as a set of at least one video object (VOB) 83. Video objects (VOBSs) 83 in video object set (VOBS) 82 are used for the same application purpose.

Menu video object set (VOBS) 82 is normally constituted by one video object (VOB) 83 in which a plurality of menu window display data are stored. To the contrary, title set video object set (VTSTT_VOBS) 82 is normally constituted by a plurality of video objects (VOBs) 83.

When boxing fight video is taken as an example, video objects (VOBs) 83 constituting title set video object set (VTSTT_VOBS) 82 correspond to video data of the respective fights of boxer X. In this case, by designating specific video object (VOB) 83, the third fight of boxer X with the world champion can be reproduced.

Video object (VOB) 83 constituting the menu video object set (VTSM_VOBS) stores menu data of the fights of boxer X. A specific fight, e.g., the 11th fight of boxer X with the world champion can be designated in accordance with the menu display.

In a normal story movie, one video object (VOB) 83 can constitute one video object set (VOBS) 82. In this case, one video stream is completed by one video object (VOB) 83.

In a collection of animation constituted by a plurality of stories, or a movie in the omnibus form, a plurality of video streams can be arranged in correspondence with the respective stories in one video object set (VOBS) 82. In this case, each video stream is stored in corresponding video object (VOB) 83. In this case, the audio stream and sub-picture stream associated with each video stream are completed in corresponding video object (VOB) 83.

Identification numbers (IDN#i; i=0 to i) are assigned to corresponding video objects (VOB) 83. Each identification number can specify corresponding video object (VOB) 83. Video object (VOB) 83 is constituted by one or a plurality of cells 84. A normal video stream is constituted by a plurality of cells, but a menu video stream may be constituted by one cell 84.

Each identification number (C_IDN#j) are assigned to the respective cells as in video objects (VOBs) 83. Each cell identification number (C_IDN#j; j=0 to j) can specify the corresponding cell.

The angle change described above is to change an angle (camera angle) at which an object is observed. In boxing, the angle change indicates that a knock-out scene (a single or related event) can be observed from different angles, e.g., the champion side, the challenger side, and the judge side.

The angle is changed in the following two cases: a case in which an angle is selected in accordance with the favor of the viewer (e.g., the angle mark in FIG. 7 is flickered); and a case in which a single scene is automatically repeated at different angles in accordance with the stream of a story (a software producer/provider composes the story to repeat the single scene at different angles).

The angle is selected in the following cases: time-discontinuous nonseamless playback in which the angle is changed after returning to the same scene (e.g., the camera angle is changed to another angle in a scene in which a boxer hits a counterpunch, and a scene in which the boxer starts to hit the same counterpunch is reproduced); and time-continuous seamless playback in which the angle is changed in a scene succeeding the current scene (e.g., the camera angle is changed to another camera angle in a scene in which one boxer hits a counterpunch, and a scene in which the other boxer bends backward is reproduced continuously in the time axis).

As shown in FIG. 11, each cell 84 is constituted by at least one video object unit (VOBU) 85. Each video object unit 85 is constituted as a set (pack string) of navigation pack (NV pack) 86 as the first pack, video pack (V pack) 88, sub-picture pack (SP pack) 90, and audio pack (A pack) 91. That is, video object unit (VOBU) 85 is defined as a set of all packs recorded from given navigation pack 86 to next navigation pack 86.

This navigation pack 86 is installed in video object unit (VOBU) 85 so as to realize any angle change (nonseamless playback and seamless playback).

The reproduction time of video object unit (VOBU) 85 corresponds to the reproduction time of video data constituted by at least one video group (a group of pictures abbreviated as a GOP) contained in video object unit (VOBU) 85. More specifically, the reproduction time falls within the range of 0.4 to 1.0 sec. One GOP normally has a duration of 0.5 sec in the MPEG standards and is screen data so compressed as to reproduce about 15 frames for this duration.

When video object unit (VOBU) 85 contains video data, GOPs (complying with MPEG) each constituted by video pack (V pack) 88, sub-picture pack (SP pack) 90, and audio pack (A pack) 91 are arrayed to constitute a video data stream. Video object (VOB) 83 is determined with reference to the GOP reproduction time regardless of the number of GOPs. Navigation pack (NV pack) 86 is arranged at the head of the video object, as shown in FIG. 11.

Even reproduction data constituted by only the audio and/or sub-picture data has video object unit (VOBU) 85 as one unit. For example, when video object unit (VOBU) 85 is constituted by audio pack (A pack) 91 having navigation pack (NV pack) 86 as. the head of this object unit, audio pack (A pack) 91 to be reproduced within the reproduction time of video object unit (VOBU) 85 to which this audio data belongs is stored in video object unit (VOBU) 85 as in video object (VOB) 83 for video data.

Video manager (VMG) 71 in FIG. 10 is constituted by a plurality of files 74A starting from file #0. Video manager 71 contains the following three items (FIG. 12) corresponding to each file.

Figure 12:
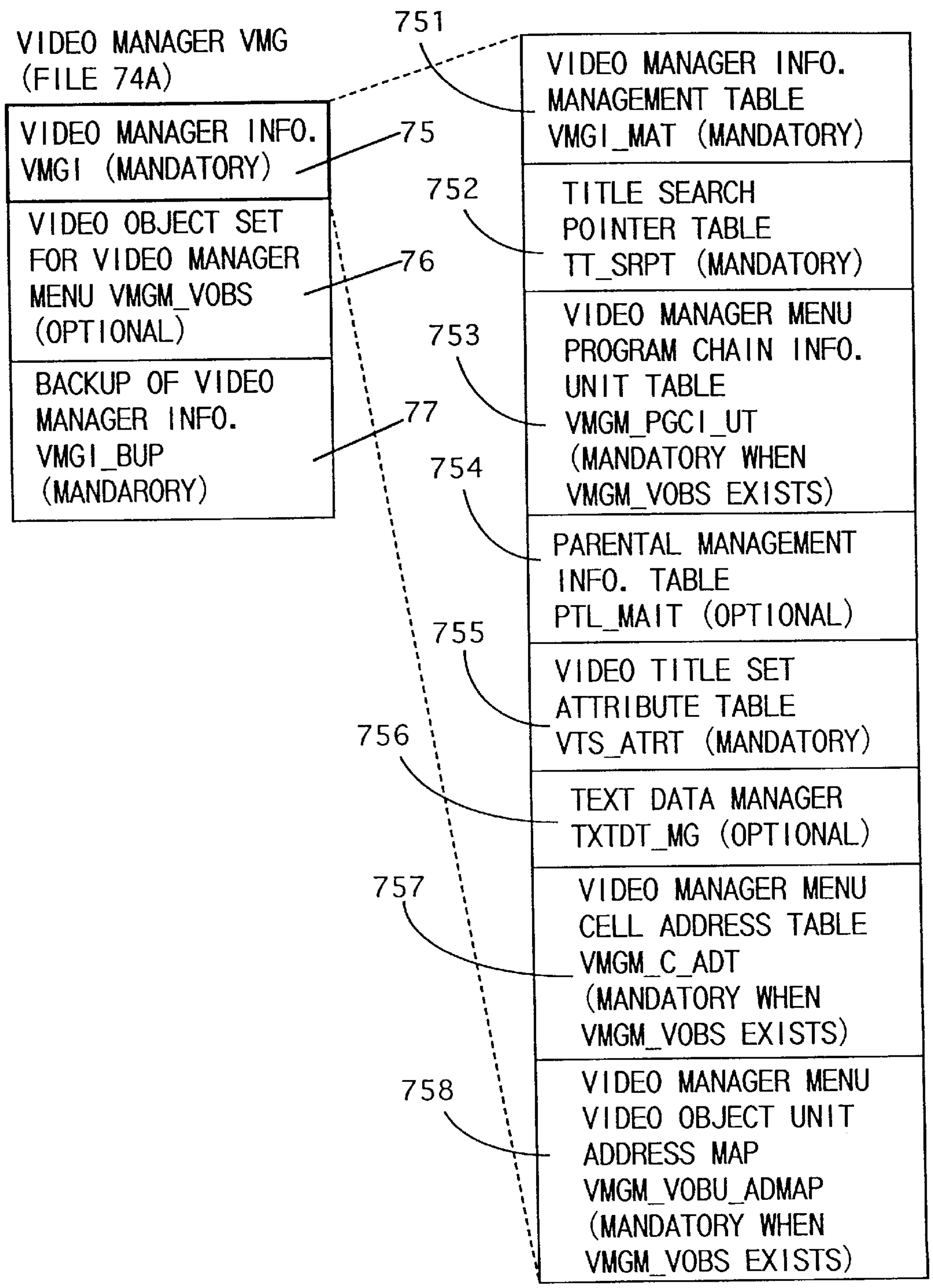
FIG. 12 is a view for explaining the logical structure of video manager (VMG) 71 in FIG. 10.

That is, as shown in FIG. 12, video manager (VMG) 71 contains video manager information (VMGI) 75, video manager menu object set (VMGM_VOBS) 76, and video manager information backup (VMGI_BUP) 77.

Video manager information (VMGI) 75 and video manager information backup (VMGI_BUP) 77 are indispensable items, and video object set (VMGM_VOBS) 76 for displaying the video manager information menu (VMGM) can be optional.

Video manager information menu video object set (VMGM_VOBS) 76 stores menu information (managed by video manager 71) associated with video data, audio data, and sub-picture data which are recorded on optical disk 10.

A description of the volume name, and the audio and sub-picture data in the display of the volume name of an optical disk to be reproduced can be displayed by video manager information menu video object set (VMGM_VOBS) 76. At the same time, selectable items can be displayed in a sub-picture by this object set 76.

For example, video manager information menu video object set (VMGM_VOBS) 76 allows to display a message that an optical disk to be reproduced contains video data storing fights of given boxer X up to his fight with the world champion. That is, the fighting pause of boxer X is reproduced as video data together with the volume name representing the successful history of boxer X, and his theme song (if any) is output. In addition, his personal and fighting histories in a chronological order are displayed in a sub-picture.

An inquiry for specifying the language (e.g., English, Japanese, French, or German) of the fight narration and an inquiry for selecting whether a caption in a predetermined language is displayed in a sub-picture or specifying one of a plurality of selectable language captions are output in the form of, e.g., a menu form, as selection item displayed by VMGM video object set (VMGM_VOBS) 76. From the display by VMGM video object set (VMGM_VOBS) 76, the viewer can select, e.g., English audio data and Japanese sub-picture caption. Settings for watching the flight of boxer X are thus prepared.

As shown in FIG. 12, video manager information management table (VMGI_MAT; indispensable) 751, title search pointer table (TT_SRPT; indispensable) 752, video manager menu program chain information unit table (VMGM_PGCI_UT; indispensable in the presence of VMGM_VOBS) 753, parental management information table (PTL_MAIT; optional) 754, video title set attribute table (VTS_ATRT; indispensable) 755, text data manager (TXTDT_MG; optional) 756, video manager menu cell address table (VMGM_C_ADT; indispensable in the present of VMGM_VOBS) 757, and video manager menu video object unit address map (VMGM_VOBU_ADMAP; indispensable in the presence of VMGM_VOBS) 758 are described, in this order, in video manager information (VMGI) 75 at the head of video manager (VMG) 71.

The table, map, and the like (751 to 758) of video manager information 75 include information used to reproduce each video title set 72 in FIG. 10 and are recorded on optical disk 10 so as to match the logical sector boundaries.

As shown in FIG. 12, the size of video manager 71, the start address of each information in video manager 71, attribute information associated with video manager menu video object set (VMGM_VOBS) 76, and the like are described in indispensable video manager information management table (VMGI_MAT) 751.

The title number input from key operation/display unit 4 in FIG. 1 or the entry program chain (EPGC) of a video title contained in the volume in optical disk 10 and selectable upon selection with remote controller 5 in FIG. 8 is described in indispensable title search pointer table (TT_SRPT) 752.

Figure 13:
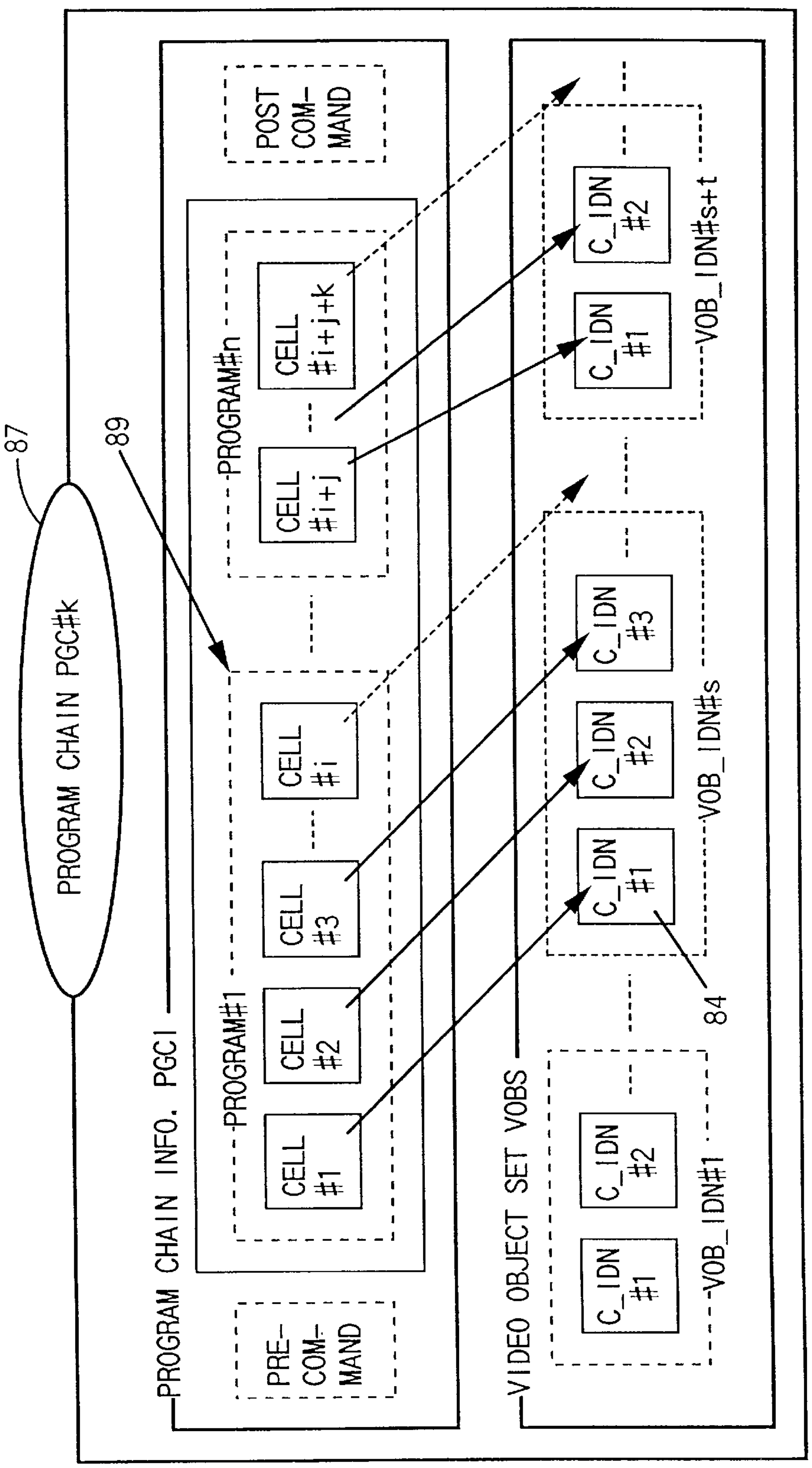
FIG. 13 is a view for explaining the structure of a program chain (PGC) formed by a set of a plurality of programs having a large number of cells 84 in FIG. 11.
Figure 14:
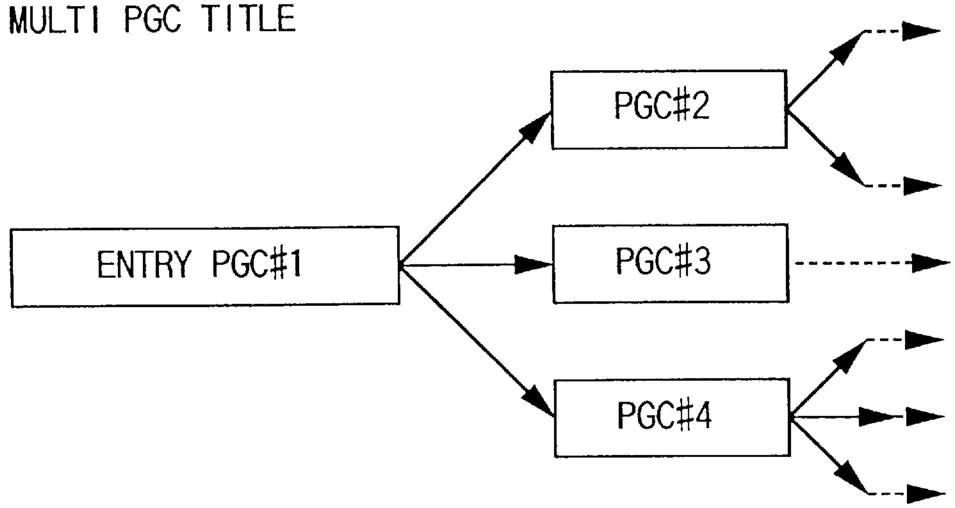
FIG. 14 is a view for explaining a case in which a one-sequential PGC title is formed by one program chain and a case in which a plurality of program chains constitute a multi-PGC title.

As shown in FIG. 13, the program chain (PGC) is a set of programs 89 for reproducing the story of a given title. As shown in FIG. 14, the program chain (PGC) contains an entry program chain (Entry PGC) and at least one program chain (PGC#2, PGC#3, PGC#4, . . . ) following an entry program chain (Entry PGC#1).

As shown in the upper portion of FIG. 14, a title having only one sequential program chain (or a tile having only one random program chain) is constituted by the entry program chain (Entry PGC). The entry program chain serves as a program chain to be reproduced first in reproducing a given title.

The title having one sequential program chain is constituted by a single program chain without loop reproduction, random reproduction, or shuffle reproduction. On the other hand, the title having one random program chain is constituted by a single program chain with loop reproduction, random reproduction, or shuffle reproduction.

As shown in the lower portion of FIG. 14, a multiprogram chain title having two or more sequential program chains is constituted at least one program chain (PGC#2, PGC#3, PGC#4, . . . ) following the entry program chain (Entry PGC#1). The multiprogram chain title uses a plurality of program chains to allow recording of a drama in multistory development.

Multiangle reproduction described with reference to FIG. 9 is possible in any program chain in FIG. 14 (whether an angle block capable of multiangle reproduction is inserted in each program chain is determined by the software provider).

In the title arrangement shown in FIG. 13, a set of cell IDs (#1, . . . ) constitute one program 89, a set of programs (#1, . . . ) constitute one program chain 87, and a set of program chains (#1, . . . ) constitute one title.

A plurality of program chains (#1 to #k) 87 (FIG. 13) containing the entry program chain are continuously reproduced to complete a one-title movie. The viewer can designate program 89 in program chain 87 to watch the specific scene (contents of program 89) of this movie.

When the arrangement (software arrangement produced by the provider) in FIG. 13 is made to correspond to the arrangement (the data arrangement recorded on the optical disk) in FIG. 11, the program chain (PGC) corresponds to the video object set (VOBS), and the program corresponds to the video object (VOB). However, the program chain (PGC) and the program are not equal to the video object set (VOBS) and the video object (VOB).

The program chain information (PGCI) will be described later in association with a seamless angle change flag.

As shown in FIG. 15, video manager information management table (VMGI_MAT) 751 in FIG. 12 is described with a video manager identifier (VMG_ID), a video 6W manager end address (VMG_EA), a video manager information end address (VMGI_EA), a version number (VERN) of a standard employed by optical disk (DVD) 10, a video manager category (VMG_CAT), a volume setting identifier (VLMS_ID), a video title set count (VTS_Ns), the identifier (PVR_ID) of a provider (the producer or distributor of software recorded on the disk), a video manager information management table end address (VMGI_MAT_EA), a first play program chain information start address (FP_PGCI_SA), the start address (VMGM_VOBS_SA) of the video object set of the video manager menu, the start address (TT_SRPT_SA) of the title search pointer table, the unit table start address (VMGM_PGCI_UT_SA) of the program chain information of the video manager menu, a parental management information table start address (PTL_MAIT_SA), a video title set attribute table start address (VTS_ATRT_SA), a text data manager start address (TXTDT_MG_SA), a video manager menu cell address table start address (VMGM_C_ADT_SA), a video manager menu video object unit address map start address (VMGM_VOBU_ADMAP_SA), a video attribute (VMGM_V_ART) displayed in the video manager menu, an audio stream count (VMGM_AST_Ns) displayed in the video manager menu, an audio stream attribute (VMGM_AST_ATR) displayed in the video manager menu, a sub-picture stream count (VMGM_SPST_Ns) displayed in the video manager menu, a sub-picture stream attribute (VMGM_SPST_ATR) displayed in the video manager menu, and first play program chain information (FP_PGCI).

The video copy flag for the video manager and video title set and an audio copy flag are described in the category (VMG_CAT) of the video manager of video manager information management table (VMGI_MAT) 751.

The addresses such as the end address (VMGI_MAT_EA) of video manager information management table (VMGI_MAT) 751 and the start address (TT_SRPT_SA) of title search pointer (TT_SRPT) 752 are described as relative logical clock counts from the start logic block in which table (VMGI_MAT) 751 is stored.

Referring back to FIG. 12, the video title set attribute information table (VTS_ATRTI), the video title set attribute search pointer (VTS_ATR_SRP) for each video title set, and the video title set attribute (VTS_ATR) for each video title set are contained in video title set attribute table (VTS_ATRT) 755 in video manager (VMG) 71.

The number (a maximum of 99 titles) of video title sets (VTSs) 72, the end address of the video title set attribute table, and the like are described in the video title set attribute information table (VTS_ATRTI).

The start address of the video title set attribute (VTS_ATR), and the like are described in the video title set attribute search pointer (VTS_ATR_SRP).

The end address of the video title set attribute (VTS_ATR), the category of the video title set, the video title set attribute information, and the like are described in the video title set attribute (VTS_ATR).

A video data compression scheme, other video attributes, the presence/absence of audio data compression, an audio data compression scheme, the number of audio channels, other audio stream attributes, sub-picture attributes, e.g., a caption using a sub-picture or a menu display form, and the like are described as the video title set attribute information.

Figure 16:
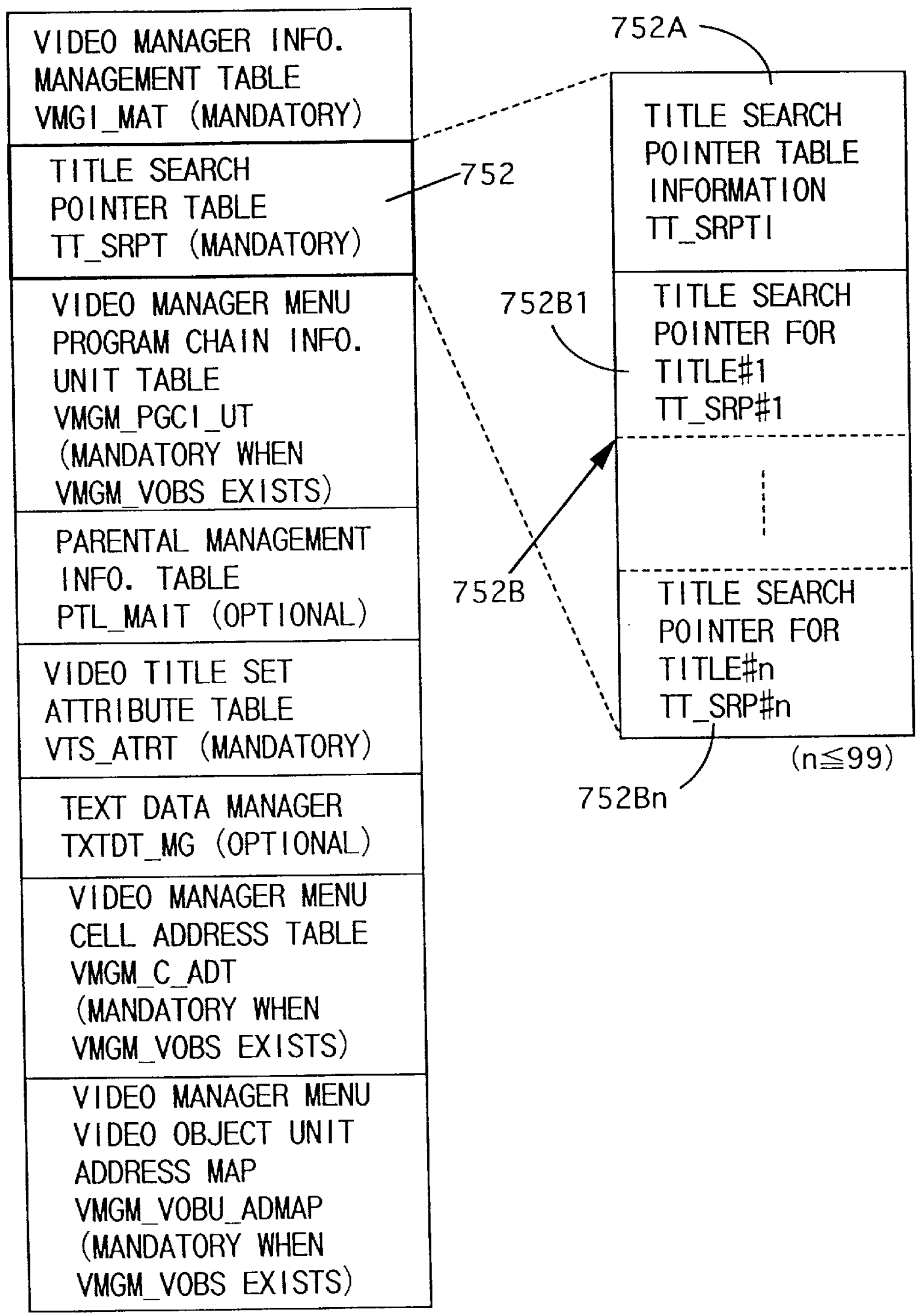
FIG. 16 is a view for explaining the contents of title search pointer table (TT_SRPT) 752 in FIG. 12.

As shown in FIG. 16, title search pointer table information (TT_SRPTI) 752A is described at the head of title search pointer table (TT_SRPT) 752. Title search pointers (TT_SRPs) 752B from #1 to #n (n (99) are continuously described in number corresponding to the number of titles in the volume. When only video title set 72 of one title is stored in this volume, only one title search pointer (TT_SRP#1) 752B1 is described in table (TT_SRPT) 752.

As shown in FIG. 17, the number (TT_Ns) of title search pointers 752B and the end address (TT_SRPT_EA) of title search pointer table (TT_SRPT) 752 are described in title search pointer table information (TT_SRPTI) 752A. This address (TT_SRPT_EA) is described in the number of bytes from the start byte of this title search pointer table (TT_SRPT) 752.

As shown in FIG. 18, a title playback type (TT_PB_TY), an angle count or number of angles (AGL_Ns), a part-of-title count (PTT_Ns), the parental identifier field (TT_PTL_ID_FLD) of the corresponding title, a video title set number (VTSN), a title count (VTS_TTN) of the video title set, and the start address (VTS_SA) of the video title set are described in each title search pointer (TT_SRP) 752*b*.

A one-bit title type flag (TT_TY), and a playback type (TT_PB_TY#1, #2, . . . ) having a plurality of bits representing the presence/absence of a command such as a link/jump/call command are described in the title playback type (TT_PB_TY).

When the title type flag (TT_TY) is 0b (binary 0), this flag represents that the corresponding title has one sequential program chain. If, however, the flag (TT_TY) is 1b, the flag represents that the corresponding title is a title having one random program chain or a title having a multiprogram chain. Each playback type bit (TT_PB_TY#1, #2, . . . ) is 0b, the bit represents the absence of a command such as a link/jump/call command in a cell or button command. However, when the bit is 1b, the bit represents the presence of a command such as a link/jump/call command in the cell or button command.

The number of angles (#1 to #9) in an angle block of the corresponding title is described in the angle count (AGL_Ns).

A number (e.g., a chapter number) in a partial title (e.g., a title divided into a plurality of chapters) in a title is described in the part-of-title count (PTT_Ns).

The parental ID field of a given title is described in the parental identifier field (TT_PTL_ID_FLD) of the given title. Reproduction of a predetermined portion (one or a plurality of portions) of the given title can be limited at a predetermined inhibition level on the basis of the description contents of this parental ID field.

The title set number (#1 to #99) representing the video title set which contains the given title is described in the video title set number (VTSN).

The title number of a video title set is described in the video title set title count (VTS_TTN). This title count (VTS_TTN) is used to access a corresponding title unit (TTU) in the part-of-title search point table (VTS_PTT_SRPT) of the video title set represented by the video title set number (VTSN).

The start address of the video title set (VTS) represented by the video title set number (VTSN) is described in the video title set start address (VTS_SA).

Video title set (VTS) 72 to be reproduced is specified and at the same time the storage position of video title set 72 on optical disk 10 is specified in accordance with the contents of the above-described title search pointer (TT_SRP) 752B. In this case, the logic block count for the title set designated by the video title set number (VTSN) is described in the start address (VTS_SA) of video title set 72.

Information associated with video manager menu video object set (VMGM_VOBS) 76 is described in video manager menu PGCI unit table (VMGM_PGCI_UT) 753 arranged in video manager (VMG) 71 in FIG. 12. This table (VMGM_PGCI_UT) 753 is an indispensable table in the presence of the video manager menu (VMGM) in video manager menu video object set (VMGM_VOBS) 76.

Video manager menu PGCI unit table (VMGM_PGCI_UT) 753 is an indispensable item in the presence of video manager menu video object set (VMGM_VOBS) 76. Information associated with a program chain for reproducing the video manager menu (VMGM) arranged for each language is described in table 753.

By looking up this video manager menu PGCI unit table (VMGM_PGCI_UT) 753, the program chain of a designated language in video manager menu video object set (VMGM_VOBS) 76 is acquired to allow display and output of the menu in the designated language.

Figure 19:
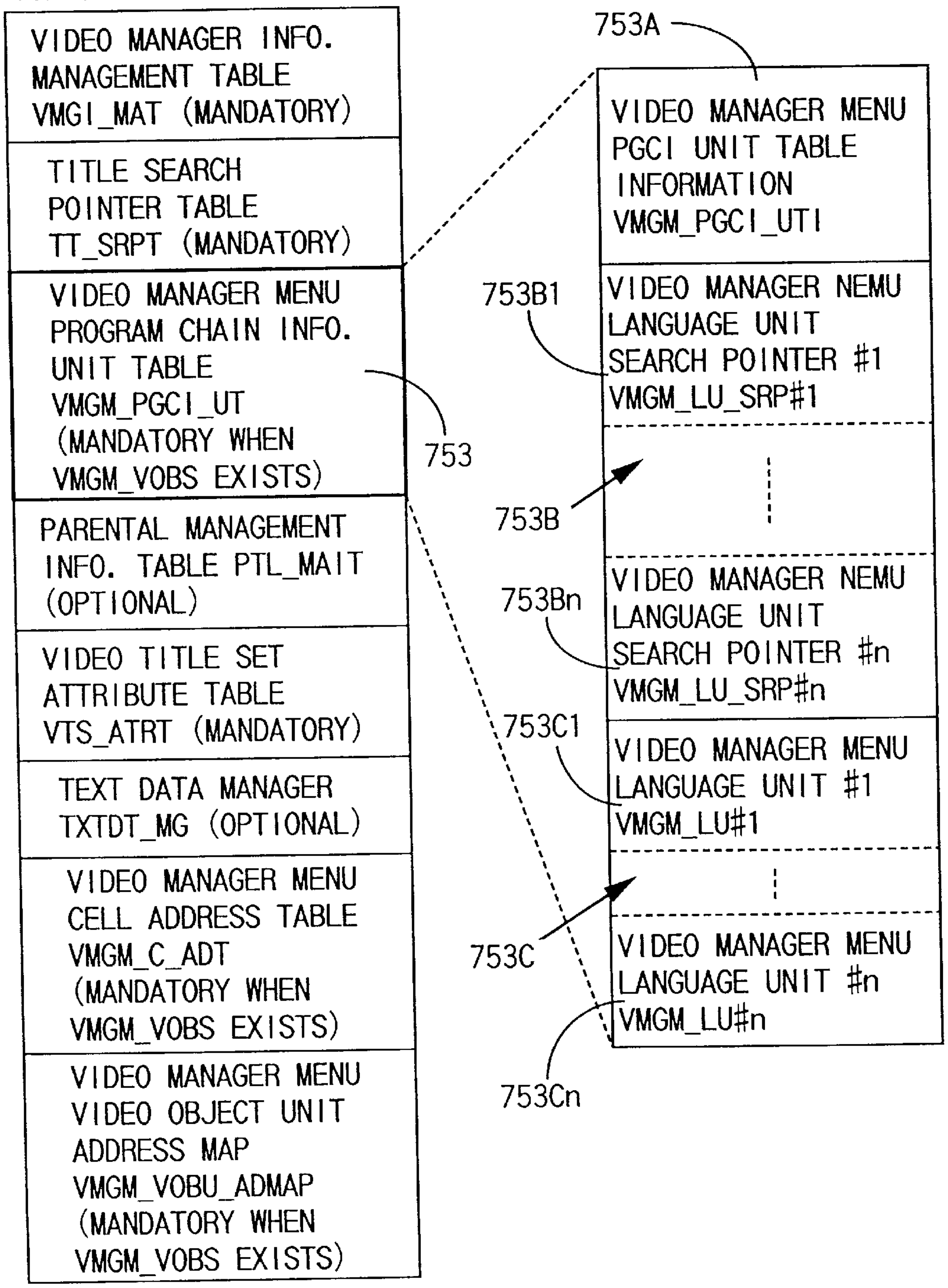
FIG. 19 is a view for explaining the contents of video manager program menu program information unit table (VMGM_PGCI_UT) 753 in FIG. 12.

As shown in FIG. 19, video manager menu PGCI unit table (VMGM_PGCI_UT) 753 is constituted by video manager menu PGCI unit table information (VMGM_PGCI_UTI) 753A, n video manager menu language unit search pointers (VMGM_LU_SRPs) 753B, and n video manager menu language units (VMGM_LUs) 753C.

As shown in FIG. 20, a video manager menu language unit number (VMGM_LU_Ns) and the end address (VMGM_PGCI_UT_EA) of video manager menu PGCI unit table (VMGM_PGCI_UT) 753 are described in video manager menu PGCI unit table information (VMGM_PGCI_UTI) 753A.

As shown in FIG. 21, a video manager menu language code (VMGM_LCD), information (VMGM_EXST) indicating existence of the video manager menu, and the start address (VMGM_LU_SA) of video manager menu language unit (VMGM_LU) 753C are described in video manager menu language unit search pointer (VMGM_LU_SRP) 753B. This description is performed in an order corresponding to video manager menus (VMGMS) #1 to #n.

As shown in FIG. 22, video manager menu language unit information (VMGI_LUI) 753CA, program chain search pointer (VMGM_PGCI_SRP#n) 753CB for video manager menus #1 to #n, and video manager menu program chain information (VMGM_PGCI) 753CC are described in video manager menu language unit (VGM_LU) 753C.

As shown in FIG. 23, a video manager menu program chain search pointer number (VMGM_PGCI_SRP_Ns)

and the end address (VMGM_LU_SA) of the video manager menu language unit are described in video manager menu language unit information (VMGM_LUI) 753CA.

As shown in FIG. 24, a video manager menu program chain category (VMGM_PGC_CAT) and the start address (VMGM_PGCI_SA) of the video manager menu program chain information are described in video manager menu program chain search pointer (VMGM_PGCI_SRP#n) 753CB.

As shown in FIG. 25, the video manager menu program chain category (VMGM_PGC_CAT) is constituted by 32-bit (four bytes) data. In this category (VMGM_PGC_CAT), the first eight bits are assigned to the lower bits of the parental ID field (PTL_ID_FLD), the next eight bits are assigned to the upper bits of the parental ID field (PTL_ID_FLD), the next four bits serve as a reservation area, the next two bits designate a block type, the next two bits designate a block mode, the next four bits designate a menu ID, the next three bits serve as a reservation area, and the final one bit (32th bit) designates an entry type.

The entry type bit is a flag representing whether a given program chain (PGC) is registered as an entry. If the entry type bit is 0b (binary 0), the bit represents that the given program chain is not an entry program chain. However, if the entry type bit is 1b, the bit represents that the given program chain is a entry program chain.

Information representing whether the given program chain is menu data, and information for designating a specific menu, if the given program chain is menu data, are described in the menu ID.

That is, if the entry type is 0b, 0000b is entered in the menu ID. If the entry type is 1b, 0010b representing a title menu is entered in the menu ID, or 4-bit data (data except 0000b or 0010b) used for another application purpose (e.g., menu designation except title menu designation) is entered in the menu ID.

If the contents in the block mode of a given block represent 00b, this represents that data is not a program chain (PGC) in the given block; if 01b, this represents that the data is the first program chain in the given block; if 10b, this represents that the data is a program chain in the given block; and if 11b, this represents that the data is the final program chain in the given block.

If the contents of the block type represent 00b, this represents that the data is not part of the given block; and if 01b, this represents that the data is a parental block (i.e., a block containing information whose reproduction is allowed under only a specific condition). Data 10b and 11b are reserved for other purposes.

The parental ID field is a portion for storing a flag string for determining whether reproduction of specific information in the program chain is allowed. For example, only when the upper bits of the parental ID field correspond to the contents of the corresponding lower bits, reproduction is allowed.

The start address (VMGM_PGCI_SA) of the video manager menu program chain information in FIG. 24 describes the start address of the video manager menu program chain information (VMGM_PGCI) using a relative block count from the first byte of the video manager menu language unit (VMGM_LU).

When the video manager menu PGCI unit table (VMGM_PGCI_UT) 753 is not present in the video manager information (VMGI) 75 in FIG. 12, "00000000h" is described at its start address.

As shown in FIG. 11, navigation pack (NV pack) 86 is arranged in the lower layer of the hierarchical structure of the recording data of optical disk 10 at the head for each video object unit (VOBU) 85. This navigation pack 86 is constituted as follows.

Figure 26:
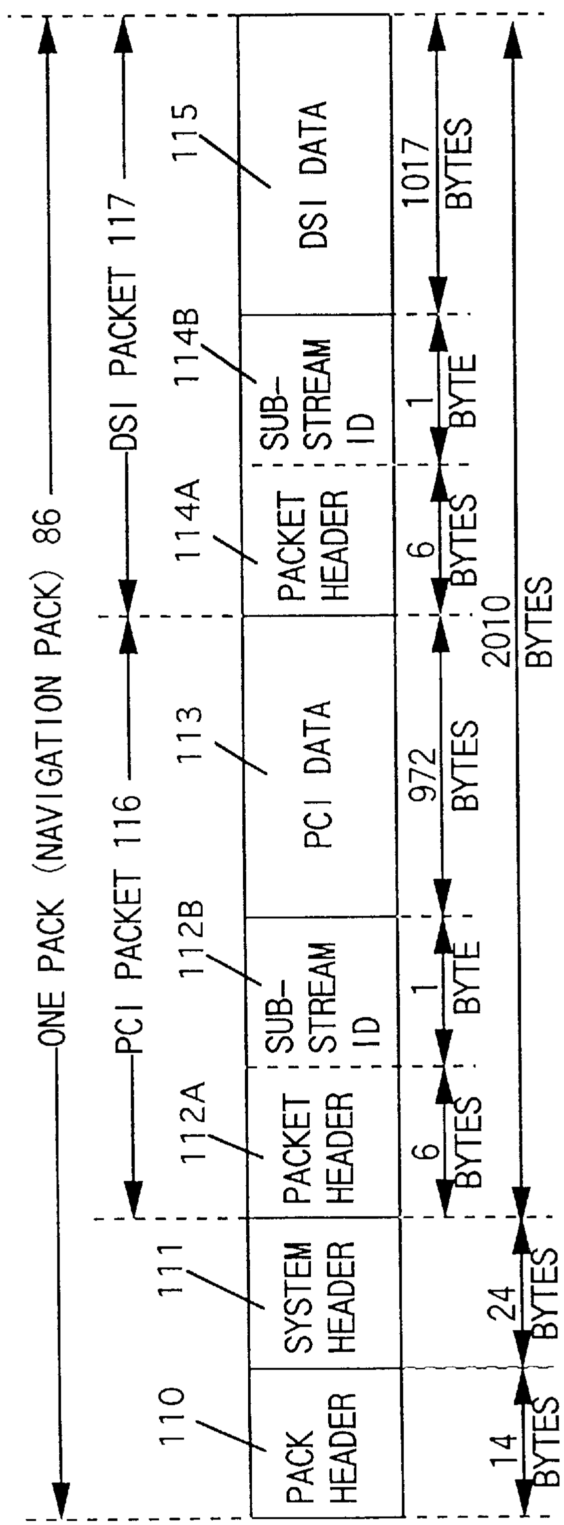
FIG. 26 is a view for explaining the contents of navigation pack 86 in FIG. 11.

As shown in FIG. 26, navigation pack 86 is constituted by 2,010-byte navigation data having 14-byte pack header 110, 24-byte system header 111, and two packets (116 and 117). The two packets constituting this navigation data are playback control information (presentation control information; PCI) packet (PCI_PKT) 116 and data search information (DSI) packet (DSI_PKT) 117.

PCI packet 116 is constituted by 6-byte packet header 112A, 1-byte substream identifier 112A, and 979-byte PCI data 113. The data stream of PCI data 113 is designated by an 8-bit code "00000000", of substream identifier 112B.

DSI packet 117 is constituted by 6-byte packet header 114A, 1-byte substream identifier 114B, and 1,017-byte DSI data 115. The data stream of DSI data 115 is designated by an 8-bit code "00000001" of substream identifier 114B.

The one-pack data length of navigation pack 86 having the above structure is 2,048 bytes (i.e., 2 kbytes) corresponding to one logical sector on optical disk 10.

Figures 27, 28:
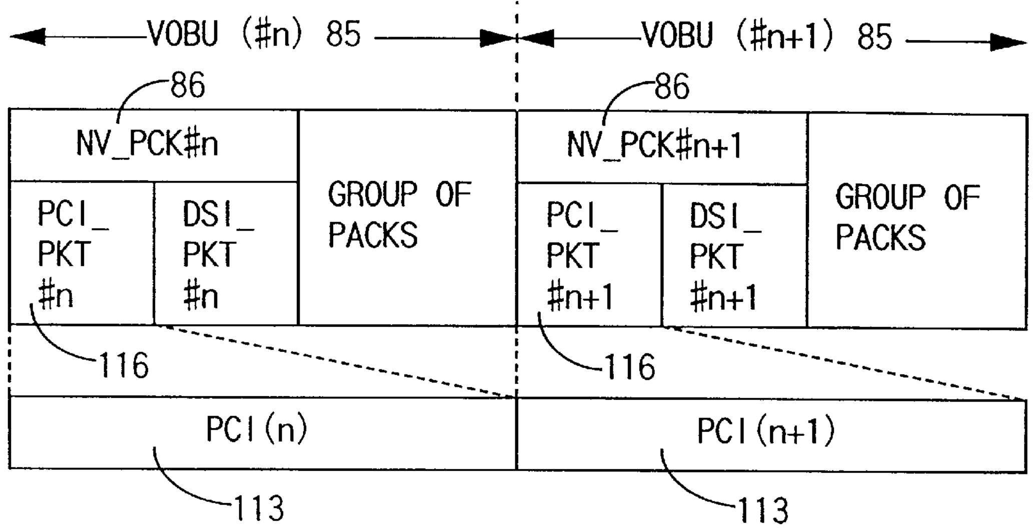
FIG. 27 is a view for explaining the correspondence between video object unit (VOBU) 85 and data 113 of presentation control information (PCI) contained in presentation control information packet (PCI_PKT) 116 in navigation pack 86 in FIG. 26.
FIG. 28 is a view for explaining the contents of presentation control information (PCI) data 113 in FIG. 27.

This navigation pack 86 is located in video object unit (VOBU#n) in FIG. 27 or immediately before a video pack (the second left V pack 88 in the lower portion in FIG. 11) containing the first data in the group of pictures (GOP). When the video object unit (VOBU 85) does not contain any video pack, navigation pack 86 is located at the head of the object unit containing the first object pack (A pack) or sub-picture pack (SP pack) of the corresponding GOP.

Even if the video object unit (VOBU 85) does not contain any video pack, the reproduction time of the video object unit is determined with reference to a video reproduction unit as in a case wherein the video object unit contains the video pack.

The group of pictures (GOP) is a data string representing a plurality of continuous frames compressed in accordance with the MPEG standards. When the compressed data is then expanded, image data representing a plurality of continuous frames is obtained, and a motion picture can be reproduced in accordance with the resultant image data.

Pack header 110 and system header 111 are defined by the MPEG2 system layer. More specifically, pack header 110 stores a pack start code, a system clock reference (SCR), and multiplex rate information. A bit rate and a stream ID are described in system header 111. Similarly, a packet start code, a packet length, and a stream ID are stored in each of packet header 112A of PCI packet 116 and packet header 114A of DSI packet 117 in accordance with the MPEG2 system layer.

The hierarchical structure of PCI packet 116 and DSI packet 117 which are stored in navigation pack 86 in FIG. 26 is applied to FIG. 11 as follows (the hierarchical levels are segmented by forward slashes.

VOBS/VOB/CELL/VOBU/NV-PACK/PCI&DSI

Angle information (NSML_AGLI in FIG. 30) for non-seamless playback (to be described later) is stored in PCI packet 116 in the lowest layer of the above hierarchical structure. Similarly, angle information (SML_AGLI in FIG. 36) for seamless playback (to be described later) is stored in DSI packet 117 in the lowest layer. In performing multiangle reproduction in this embodiment, necessary angle information is extracted from PCI packet 116 or DSI packet 117 in the above hierarchical structure.

As shown in FIG. 26, navigation pack (NV_PCK#n) 86 located at the head of each video object unit (VOBU#n) contains PCI packet (PCI_PKT#n) 116 and DSI packet (DSI_PKT#n) 117.

As shown in FIG. 27, PCI packet 116 contains PCI data (PCIn) 113 serving as navigation data for changing the display contents (presentation contents) in synchronism with the reproduction state of the video data in video object unit (VOBU#n) 85.

As shown in FIG. 28, this PCI data 113 contains 60-byte PCI general information (PCI_GI), 36-byte nonseamless playback angle information (NSML_AGLI), 694-byte highlight information (HLI), a 189-byte reservation area, and 189-byte recording information (RECI).

Recording information RECI corresponds to an international standard recording code (ISRC) and represents the video data, audio data, and sub-picture data recorded in video object unit VOBU. The ISRC depends on a system reference clock complying with the internal standard ISO3901.

As shown in FIG. 29, the PCI general information (PCI_GI) is described with the logical block number (NV_PCK_LBN) of a navigation pack, the category (VOBU_CAT) of a video object unit (VOBU), the user operation control (VOBU_UOP_CTL) of the video object unit (VOBU), the display start time (VOBU_S PTM) of the video object unit (VOBU), the display end time (VOBU_E_PTM) of the video object unit (VOBU), the display end time (VOBU_SE_PTM) at the end of a sequence in the video object unit (VOBU), a cell elapse time (C_ELTM), and a reservation area.

The above logical block number (NV_PCK_LBN) represents the address (recording position) of a navigation containing presentation control information (PCI) in accordance with a relative block count from the first logical block of the video object set (VOBU) containing this PCI.

The above category (VOBU_CAT) describes the copy protect contents of an analog signal corresponding to video and sub-picture data in the video object unit (VOBU) containing the presentation control information (PCI).

The above user operation control (VOBU_UOP_CTL) describes a user operation inhibited during the display (presentation) period of the video object unit (VOBU) containing the presentation control information (PCI).

The above display start time (VOBU_S_PTM) describes the display (presentation) start time of the video object unit (VOBU) containing the presentation control information (PCI). More specifically, this VOBU_S_PTM represents the display start time of the first video (first picture) in the display order of the first GOP in the video object unit (VOBU).

The above display end time (VOBU_E_PTM) describes the display (presentation) end time of the video object unit (VOBU) containing the presentation control information (PCI). More specifically, when the video data in the video object unit (VOBU) are continuous, this VOBU_E_PTM represents the display end time of the last video image (last picture) in the.display order of the last GOP in the video object unit (VOBU).

On the other hand, when no video data is present in the video object unit (VOBU) or reproduction of this video object unit (VOBU) is kept stopped, this VOBU_E_PTM represents the end time of virtual video data aligned on the time grid of a field interval (i.e., 1/60 sec in the NTSC video).

The above display end time (VOBU_SE_PTM) describes the display (presentation) end time represented by the sequence end code of the video data in the video object unit (VOBU) containing the presentation control information (PCI). More specifically, this VOBU_SE_PTM represents the display end time of the last video image (last picture) in the display order, which contains the sequence end code of the video object unit (VOBU). If no video image (picture) with a sequence end code is present in the video object unit (VOBU), 00000000h (h is the hexadecimal notation) is entered in VOBU_SE_PTM.

The above cell elapse time (C_ELTM) describes, in BCD hour, minute, and second, and frame, the relative display (presentation) time from the first video frame in the display order of cells containing the presentation control information (PCI) to the first video frame in the display order of the video object unit (VOBU) containing this PCI. When no video data is present in the video object unit (VOBU), first video frame of the virtual video data is used as the video frame.

FIG. 30 shows the contents of a table in which angle information (NSML_AGLI) in FIG. 28 is written. As shown in FIG. 30, the start address (NSML_AGL_C#n_DSTA) of a skip destination angle cell (cell constituting a switching destination angle; AGL_C#n) by multiangle count #n of the angle block is described in angle information (NSML_AGLI).

Figure 31:
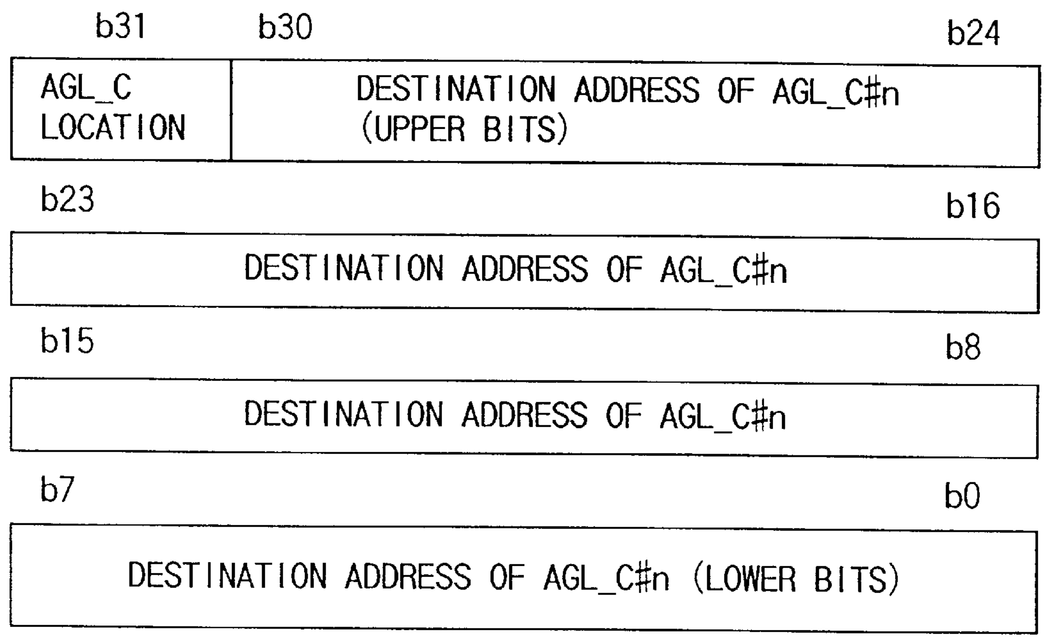
FIG. 31 is a view for explaining the contents of the destination address (NSML AGL_C#n DSTA) of a new angle cell upon an angle change, which is contained in nonseamless angle information (NSML_AGLI) in FIG. 30.

This start address (NSML_AGL_C#n_DSTA) describes the start address of the video object unit (VOBU) in the skip destination angle cell (AGL_C#n) in accordance with the relative logical block count from the logical block of the navigation pack containing the presentation control information (PCI). The start address (NSML_AGL_C#n_DSTA) has a 32-bit (4 bytes) structure, as shown in FIG. 31.

More specifically, the first byte constitutes lower eight bits of the angle cell (AGL_C#n), the following two bytes constitute intermediate 8+8 bits of the angle cell (AGL_C#n), the following seven bits constitute the upper seven bits of the angle cell (AGL_C#n), and the last one bit is used as the location flag (AGL_C location) of the angle cell.

The location flag (AGL_C location) of the angle cell describes whether the jump destination is located before the navigation pack (NV_PCK) containing the presentation control information (PCI). More specifically, when the flag (AGL_C location) is 0b (binary 0), the jump destination is located after the navigation pack. If the flag is 1b, the jump destination is located before the navigation pack or is the navigation pack itself.

The reproduction (presentation) start time of the video object unit (VOBU) of the jump destination cell is the same time (t20 in FIG. 32) as the reproduction time of the VOBU containing the presentation control information (PCI) or start time (t10 in FIG. 32) of the immediately preceding VOBU.

As will be described later, in angle change seamless playback using DSI data 115 in FIG. 26, the reproduction (presentation) start time of the video object unit (VOBU) of the jump destination cell is selected as the reproduction time (t80 in FIG. 38) of the start VOBU in the interleaved unit upon an angle change (t70).

Figure 32:
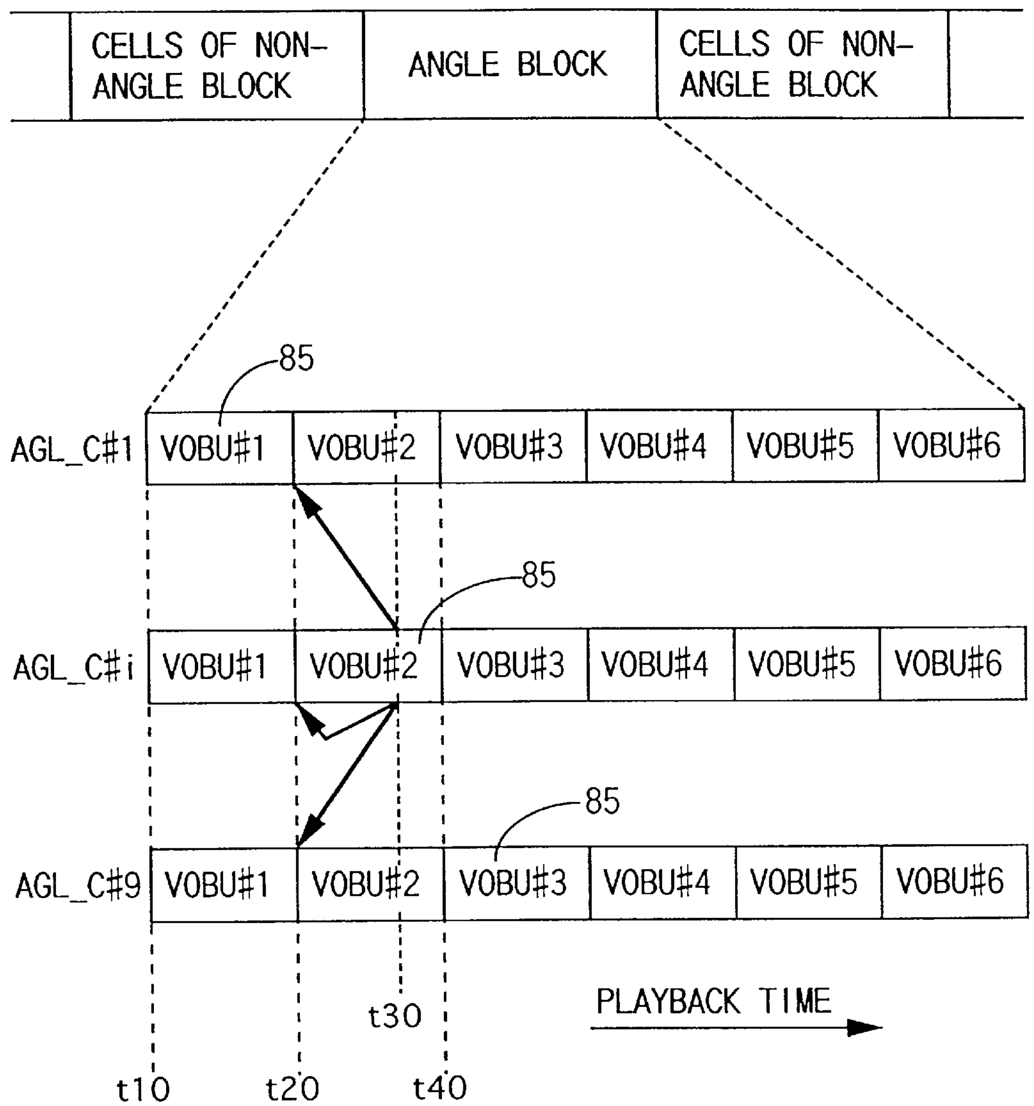
FIG. 32 is a view for explaining how a nonseamless angle change using nonseamless angle information (NSML_AGLI) in FIG. 30 is performed.

As shown in FIG. 32, the angle cell (AGL_C#i; i=1 to n) controlled by PCI data 113 can be changed in units (0.4 to 1 sec in reproduction time) of video object units (VOBU) 85. In FIG. 32, serial numbers #n are assigned to video object units (VOBUs) 85 in accordance with the reproduction order.

The angle cells (AGL_C#i; i=1 to n) in an angle block are arranged parallel in the reproduction time flow. In a relationship with cells except the angle block, the cells in an angle block are arranged series with the preceding and succeeding cells in the reproduction time flow.

In video object unit (VOBU#n; n=1 or 2) of another angle cell (AGL_C#1 or AGL_C#9) corresponding to reproduction number #n (e.g., N=2) of a given angle cell (AGL_

C#i), another angle data (VOBU#2) of the same time as that of video object unit (VOBU#2) having reproduction number #2, or another angle data (VOBU#1) (t10) immediately preceding video object unit (VOBU#2) having reproduction number #2 is stored.

Assume that video object units (VOBUs) 85 are continuously arrayed as video data for reproducing a series of actions of pitching/batting in a scene including a pitcher and a batter in given angle cell (AGL_C#i) 84. Also assume that video object units (VOBUs) 85 are continuously arrayed as video data for reproducing only the batter to check his batting form in another angle cell (AGL_C#1). Further assume that video object units (VOBUs) 85 are continuously arrayed as video data for reproducing only the facial expression of the pitcher in still another angle cell (AGL_C#9).

During viewing the video of angle cell #i (AGL_C#i), the viewer changes the reproduction angle to angle cell #1 when the batter hits the ball. More specifically, the camera angle is changed to a camera angle at which only the batter is reproduced when the batter hits the ball. The angle is changed to an angle not for a scene after the batter hits the ball, but for a scene immediately before the batter starts swinging the bat (i.e., the time returns 0.4 to 1 sec within one VOBU).

During viewing the video of angle cell #i (AGL_C#i), when the viewer changes the angle cell to angle #9 when the batter hits the ball, i.e., when the camera angle is changed to a camera angle at which only the pitcher is reproduced when the pitched ball is hit, the facial expression of the pitcher at this time is displayed on the screen, and the viewer can find the metal change of the pitcher.

By describing the start address (NSML_AGL_C#n_DSTA) of the angle cell in this manner, the following angle change (discontinuous nonseamless playback in which time returns in the development of a story) can be realized.

An angle change assuming a series of scenes in which pitcher A pitches, batter B hits the ball in a ball game, and the hit ball flies over a field fence, i.e., a home run will be described below.

Referring to FIG. 32, angle cells (AGL_C#i; i=1 to 9) contain video information obtained by photographing, at various camera angles, a single or related event of a home run hit by batter B upon pitching of pitcher A. For example, angle cell AGL_C#1 contains video information from a camera located in the first-base side infield stand, angle cell AGL_C#i (e.g., i=5) contains video information from a camera located at the back of the backstop, and angle cell AGL_C#9 contains video information from a camera located in the center field stand to pick up batter B through the back of pitcher A.

Assume that the viewer who is reproducing optical disk 10 containing the above angle cell (AGL_C#i; i=5) in the reproduction apparatus of FIG. 1 knows by flickering of angle mark 407 in FIG. 7 that the angle change is currently allowed, and that the reproduction angle is switched from #5 to #9 using angle button 5 ang and number button (ten-key pad) 5*t* of remote controller in FIG. 8 (the image under reproduction is frozen (time t30 (FIG. 32) ) at which angle button 5 ang is depressed, and reproduction is paused).

When the viewer depresses angle button 5 ang to start angle change reproduction, system CPU 50 in FIG. 1 looks up the angle information table (NSML_AGLI) in FIG. 30 to acquire a jump destination address having cell number #9 (the start address of VOBU#2 in this case). System CPU 50 reproduces video information (from VOBU#2) of angle number #9 recorded on optical disk 10 from time t20 (the frozen image of angle #5 is switched to an image of angle #9, and full-video reproduction is started).

When video data from VOBU#2 in FIG. 32 represents scenes from a scene in which batter B hits the ball, the image at the camera angle (#5) of the camera at the back of the backstop at a moment when batter B hits the ball is switched to the image at the camera angle (#9) of the camera at the center field stand at the moment when batter B hits the ball, and scenes in which the ball flies over the field fence are reproduced.

On the other hand, assume that the viewer switches the reproduction angle from #5 to #1 using angle button 5 ang and number button (ten-key pad) 5*t* of remote controller 5 in FIG. 8.

When the viewer depresses angle button 5ang to start angle change reproduction (time t30 in FIG. 32), system CPU 50 in FIG. 1 looks up the angle information table (NSML_AGLI) in FIG. 30 to acquire a jump destination address having cell number #1 (the start address of VOBU#2 in this case). Whether the jump destination address is #2 or another number is determined on the basis of a specific address which is written in the table in FIG. 30 by the provider (software producer) of optical disk 10. Video information (from VOBU#2) recorded on optical disk 10 is reproduced from time t20.

When video information from VOBU#1 in FIG. 32 represents an image immediately before pitcher A pitches for batter B, the image at a moment when the batter hits the ball at the camera angle (#5) from the camera located at the back of the backstop is switched to the image at the camera angle (#1) of the camera located in the first-base side infield stand at a moment when the pitcher throws the home-run ball. The viewer then watches the scenes in which pitcher A pitches from the right side of the screen, batter B on the left side of the screen hits the ball, and the hit ball flies over the right field stand on the right side of the screen.

When cell addresses before the angle AGL_C#1 are written in NSML_AGL_C1_DSTA in the table of FIG. 30, another angle reproduction starting from time before time t10 is also allowed upon switching the angle from angle #i to angle #1 (in this case, a nonseamless angle change to a scene one second or more before the current scene can be performed).

To greatly return the time upon an angle change, a search operation having a larger time unit may be combined with the angle change performed in units of VOBUS. For example, during reproduction of the angle cell (#5) in video object (VOB_IDN2) 83 in FIG. 11, an angle switching operation is performed to allow to start reproduction from the camera angle of another angle cell (#9) in the video object (VOB_IDN1).

In any case, in the example of FIG. 32, since the reproduction time (the time flow in the development of a story) upon an angle change returns to the past time, discontinuous time nonseamless playback is possible.

Figures 33, 34:
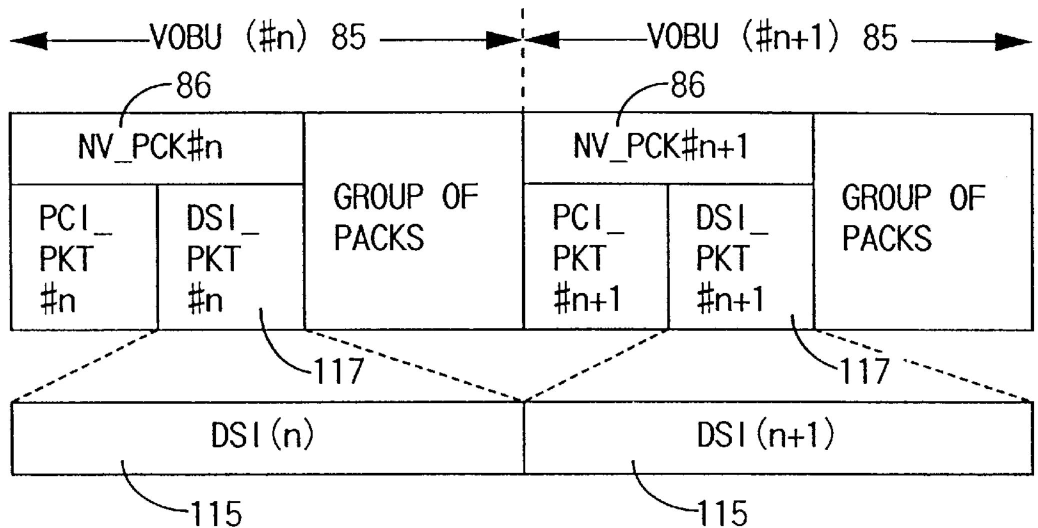
FIG. 33 is a view for explaining the correspondence between video object unit (VOBU) 85 and data 115 of data search information (DSI) contained in data search information packet (DSI_PKT) 117 in navigation pack 86 in FIG. 26.
FIG. 34 is a view for explaining the contents of data search information (DSI) data 115 in FIG. 33.

As shown in FIG. 33, DSI packet 117 shown in FIG. 26 contains DSI data (DSIn) 115 serving as the navigation data for search for video object unit (VOBU#n) 85.

As shown in FIG. 34, DSI data 115 contains 32-byte DSI general information (DSI_GI), 148-byte seamless playback information, 54-byte seamless playback angle information (SML_AGLI), 168-byte video object unit search information (VOBU_SRI), and 144-byte synchronous reproduction information (SYNCI).

As shown in FIG. 35, information related to entire DSI data 115 is described in the DSI general information (DSI_GI). More specifically, system time clock reference value (NV_PCK_SCR) of navigation pack 86 is described first in the DSI general information (DSI_GI).

This system time clock reference value (NV_PCK_SCR) is loaded in the system time clock (STC) incorporated in each section in FIG. 1. With reference to this STC, a video pack, an audio pack, and a sub-picture pack are decoded by video decoder 58, audio decoder 60, and sub-picture decoder 62, respectively, in the reproduction apparatus of FIG. 1. The decoded video and audio data are reproduced at monitor 6 and speaker unit 8.

A navigation pack logical block number (NV_PCK_LBN) in which the address (start address) of navigation pack 86 containing DSI packet 117 with the relative logical block number (RLBN) from the start of the logical blocks of video object set 82 containing this DSI packet 117 is described in the DSI general information (DSI_GI).

A video object unit end address (VOBU_EA) in which the address of the last pack in video object unit 85 with the relative logical block number (RLBN) from the start logical block of video object unit 85 containing DSI packet 117 is described in the DSI general information (DSI_GI).

A video object unit first reference picture end address (VOBU_1STREF_EA) in which the address of video packet 88 recorded with the last data of the first encoded reference picture (first I picture) following DSI packet 117 is described with the relative block number (RLBN) from the start logical block of video object unit 85 recorded with this DSI packet 117 is described in the DSI general information (DSI_GI). If this video object unit 85 does not contain an I picture (or does not contain video data), 00000000h is written in this VOBU_1STREF_EA.

In addition, a video object unit second reference picture end address (VOBU_2NDREF_EA) in which the address of video packet 88 recorded with the last data of the second encoded reference picture (I or P picture; normally the first P picture) following DSI packet 117 is described with the relative block number (RLBN) from the start logical block of video object unit 85 recorded with this DSI packet 117 is written in the DSI general information (DSI_GI). If this video object unit 85 does not contain the second reference picture, 00000000h is written in this VOBU_2NDREF_EA.

In addition, a video object unit third reference picture end address (VOBU_3RDREF_EA) in which the address of video packet 88 recorded with the last data of the third encoded reference picture (I or P picture; normally the first P picture) following DSI packet 117 is described with the relative block number (RLBN) from the start logical block of video object unit 85 recorded with this DSI packet 117 is written in the DSI general information (DSI_GI). If this video object unit 85 does not contain the third reference picture, 00000000h is written in this VOBU_3RDREF_EA.

The video object unit (VOBU) normally contains several groups of pictures (GOPs). In this case, the second and third reference pictures may belong to GOPs other than the group of pictures (GOP) to which the first reference picture belongs. In this case, the above end addresses (VOBU_2NDREF_EA and VOBU_3RDREF_EA) are calculated across the boundary of the groups of pictures (GOPs).

The identification number (VOBU_VOB_IDN) of video object 83 containing DSI packet 117 is written in the DSI general information (DSI_GI).

The identification number (VOBU_C_IDN) of cell 84 containing DSI packet 117 is written in the DSI general information (DSI_GI).

A cell elapse time (C_ELTM) having the same contents as those of the cell elapse time (C_ELTM) in the table of the presentation control information general information (PCI_GI) in FIG. 29 is described in the DSI general information (DSI_GI).

The address of a jump destination angle cell as in non-seamless playback angle information (NSML_AGLI) of PCI data 113 is described in the seamless playback angle information (SML_AGLI) in FIG. 36.

As shown in FIG. 36, a seamless angle cell jump destination (SML_AGL_Cn_DSTA) representing the start address and cell size of the jump destination angle cell (AGL_C#n) is described by the number of selectable angles is described in the angle information (SML_AGLI). This SML_AGL_Cn_DSTA is constituted by 48 bits (6 bytes), as shown in FIG. 37.

More specifically, the first two bytes (lower 16 bits) represent the size of the jump destination interleaved unit (ILVU) of the angle cell (AGL_C#n), the following 31 bits represent the jump destination address of the angle cell (AGL_C#n), and the last one bit (48th bit) represents the location flag (AGL_C location) of the angle cell.

This location flag (AGL_C location) describes whether the jump destination is located after the navigation pack (NV_PCK) containing the data search information (DSI). More specifically, if the flag (AGL_C location) is 0b (binary 0), the jump destination is located after the navigation pack. However, if the flag is 1b, no specific processing is determined.

This seamless playback angle information (SML_AGLI) becomes valid only when the angle is changed seamlessly (i.e., only when the seamless angle change flag is set) (when the seamless angle change flag is not set, the angle is changed nonseamlessly; in this case, nonseamless playback angle information (NSML_AGLI) becomes valid).

In the start address of the above jump destination angle cell (AGL_C#n), the start address of the interleaved unit (ILU#n) of the angle cell (AGL_C#n) to be reproduced upon completion of reproduction of the interleaved unit (ILU#n−1) of a given angle cell containing DSI data 115 is described with the relative logical block number (RLBN) from the logical block number of navigation pack 86 containing this DSI data 115.

The interleaved unit (ILU#n) is the recording unit when a plurality of angle cells (AGL_C#n) continuous from the viewpoint of the program contents are physically interleave-recorded alternately (striped) on optical disk 10.

When this interleaved unit (ILU#n) is made to correspond to video object unit (VOBU) 85 in FIG. 11, at least one VOBU (more specifically, a set of video packs constituting a VOBU) of each of a plurality of angle cells is interleave-recorded on the track of optical disk 10 (note that each interleaved unit is constituted by at least one VOBU).

Figure 38:
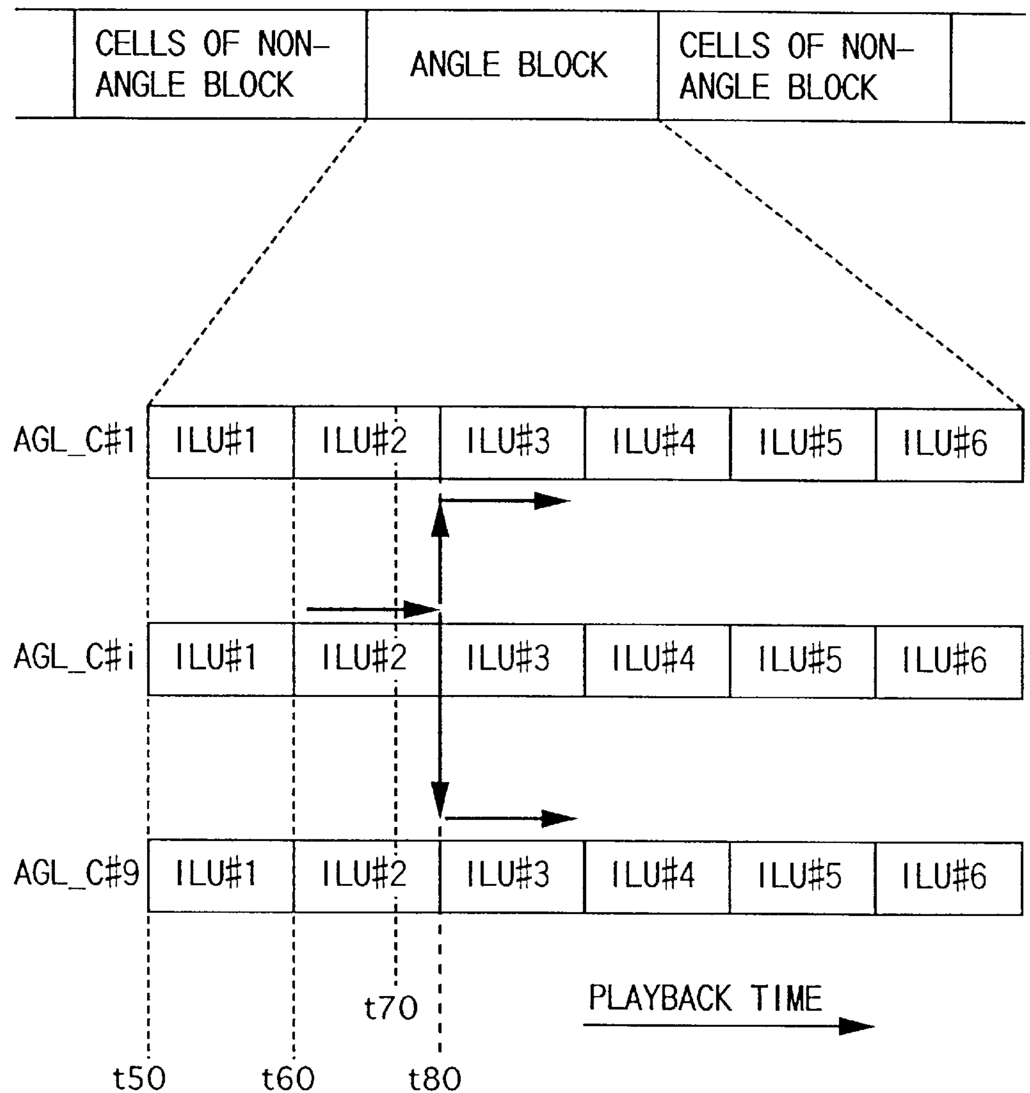
FIG. 38 is a view for explaining how a seamless angle change using the seamless angle information (SML_AGLI) in FIG. 36 is performed.

As illustrated in FIG. 38, the interleaved units (ILU#1) of the angle cell (AGL_C#1) to the angle cell (AGL_C#9) are physically arranged in order (on the recording tracks of optical disk 10), and the interleaved units (ILU#2) of the angle cell (AGL_C#1) to the angle cell (AGL_C#9) are then physically arranged in order. Similarly, the units (ILU#3) of AGL_C#1 to AGL_C#9 are arranged, and the units (ILU#4) of AGL_C#1 to AGL_C#9 are arranged (each ILU is constituted by at least one VOBU).

The angle cells (AGL_C#i; i=1 to n) in an angle block are arranged parallel to each other in the reproduction time flow. In a relationship with cells other than the angle block, the cells of the angle block are arranged in series with the preceding and succeeding cells in the reproduction time flow.

As described above, portions in which the pieces of information (a plurality of VOBUs) of the respective angle cells (#1 to #9) are interleave-recorded in the form of stripes are called interleaved blocks. For example, interleaved units ILU of angle cells AGL_C#1 to AGL_C#9 contain video information obtained by picking up a single or related event such as a home-run scene of the same butter, provided that the reproduction time has a 0.4- to 1-sec video object unit (VOBU) as a unit.

A change in angle based on the seamless playback angle information (SML_AGLI) shown in FIG. 36 is performed during reproduction of the above interleaved block, the following operation is performed.

That is, as shown in FIG. 38, the trace destination of optical head 32 in FIG. 22 is the interleaved unit (ILU#3) of the jump destination angle cell (AGL_C#1 or #9) following the reproduction time (t60 to t80) of the interleaved unit (ILU#2) of the currently reproduced angle cell (AGL_C#i) recorded with DSI data 115.

In the example of FIG. 38, angle switching causes the reproduction time to jump to time immediately upon cell switching, so that continuous seamless playback is performed along the time axis.

When the above angle change is not performed, optical head 32 intermittently traces interleaved units ILU#1, ILU#2, ILU#3, . . . (ILU#1, ILU#2, ILU#3, . . . , except AGL_C#i are skipped) during reproduction of the angle cell (AGL_C#i) in the interleaved block.

When the PCI angle information (NSML_AGLI) is used, the angle change is performed such that the time returns in units of video object units (VOBUs) (0.4 to 1 sec). However, when the DSI angle information (SML_AGLI) is used, the angle is changed in units of interleave-recorded cells (time interval equal to or longer than that of the VOBU). In this case, the scenes are continuous along the time axis (the time does not return to the past time), and the scene is changed to a scene at another angle.

That is, while the angle information (NSML_AGLI) of the presentation control information (PCI) describes a discontinuous (nonseamless) angle change along the time axis, the angle information (SML_AGLI) of the data search information (DSI) describes a continuous (seamless) angle change along the time axis.

The seamless angle change will be described in more detail by taking a ball game scene as an example. Assume that angle cell AGL_C#i is the stream of video data obtained by picking up continuous scenes, viewed from the infield stand, in which pitcher A pitches, batter B hits the ball, and the hit ball flies over the field fence, a home run. Also assume that angle cell AGL_C#1 is the stream of video data obtained by picking up the same scenes from the field stand. Further assumes that angle cell AGL_C#9 is the stream of video data obtained by picking up the scenes of teammates of batter B at times corresponding to the scenes related to this home-run scene.

When the viewer who watches the scene of angle cell AGL_C#i changes the angle cell to angle cell AGL_C#1 (scene from the field stand) when batter B hits the ball (time t70 in FIG. 38), the scene is switched to the scene in which the hit ball continuously flies to the field (toward the viewer) upon hitting the ball by batter B along the time axis (the frame is not frozen during switching).

When the viewer watches the scene of angle cell AGL_C#i and changes the angle cell to angle cell AGL_C#9 at the time of a home run, the angle is changed to an angle at which the teammates to which batter B belongs are reproduced. The expressions of the teammates and manager exited about the home run are displayed on the screen.

When the angle information (NSML_AGLI) of PC data 113 and the angle information (SML_AGLI) of DSI data 115 are selectively used, different multiangle scenes in terms of the impressions of the viewer can be reproduced.

The program chains (PGCs) include a first play PGC (FP_PGC), a video manager menu PGC (VMGM_PGC), a video title set menu PGC (VTSM_PGC), and a title PGC (TT_PGC).

Each of these program chains (PGCs) is normally constituted by program chain information (PGCI) and at least one video object (VOB; each object contains at least one cell). However, a program chain (PGC) may contain only program chain information (PGCI). The program chain (PGC) containing only the program chain information (PGCI) is used when a reproduction condition is determined and reproduction is shifted to another program chain.

The number (count) of program chain information (PGCI) is assigned from one in the description order of PGCI search pointers. The number of program chains (PGC) is equal to the program chain information (PGCI) count. Even if a program chain takes a block structure, the number of program chains (PGC) is equal to the number of continuous PGCI search pointers.

The program chain information (PGCI) has a structure shown in FIG. 39. More specifically, the program chain information (PGCI) is constituted by program chain general information (PGC_GI; indispensable), a program chain command table (PGC_CMDT; optional), a program chain program map (PGC_PGMAP; indispensable in the presence of the next C_PBIT), a cell playback information table (C_PBIT; optional), and a cell position information table (C_POSIT; indispensable in the presence of C_PBIT).

As shown in FIG. 40, the cell playback information table (C_PBIT) contains a maximum of 255 pieces of cell playback information (C PBIn; #n=#1 to #255).

As shown in FIG. 41, each cell playback information (C_PBI) contains a cell category (C_CAT; four bytes), cell playback time (C_PBTM: four bytes), the start address (C_FVOBU_SA; four bytes) of the first video object unit (VOBU) in a cell, the end address (C_FILVU_EA; four bytes) of the first interleaved unit (ILVU) in the cell, the start address (C_LVOBU_SA; four bytes) of the last video object unit (VOBU) in the cell, and the end address (C_LVOBU_EA; four bytes) of the last video object unit (VOBU) in the cell.

As shown in FIG. 42, in the cell category (C_CAT), the lower eight bits (b0 to b7) represent the number of cell commands, the next eight bits (b8 to b15) represent a cell still time, the next five bits (b16 to b20) represent a cell type (e.g., karaoke or the like), the next one bit (b21) represents an access limit flag, the next one bit (b22) represents the cell playback mode (e.g., a motion picture or still image), the next one bit (b23) is a reservation bit, the next one bit (b24) represents a seamless angle change flag, the next one bit (b25) represents the discontinuity flag (whether STC is reset) of system time clock STC, the next one bit (b26) represents an interleave arrangement flag (i.e., whether a cell designated by C_PBI is contained in a continuous block or an interleaved block), the next one bit (b27) represents a seamless playback flag (whether a cell designated by C_PBI is to be reproduced), the next two bits (b28 and b29) represent a cell block type (whether the block represents an angle block), the last two bits (b30 and b31) represent a cell block mode (e.g., whether a cell is the first cell in a block).

If the cell block mode is 00b (b represents binary notation), a cell is not the one in a block. If the cell block mode is 01b, the cell is the first cell in the block. If the cell block mode is 10b, the cell is a cell in the block. If the cell block mode is 11b, a cell is the last cell in the block.

If the cell block type is 00b, a cell is not part of the current block; if, 01b, the current block is an angle block (i.e., a block containing a multiangle cell).

When the cell block type is not 01b during reproduction of a tile (the count AGL_Ns in TT_SRP in FIG. 18 is two or more) containing a multiangle cell, angle mark 407 in FIG. 7 is kept on.

If cell block type=01b is detected during reproduction, the viewer is notified of "reproducing" of the angle block by flickering (or the ON state, a change in color, or deformation of the shape of the angle mark) of angle mark 407 in FIG. 7. The viewer knows that reproduction at another angle is possible for the currently reproduced video image.

If the interleave arrangement flag is 0b, the current cell is in a continuous block (i.e.,. a plurality of VOBUs are continuously recorded); and if, 1b, the current cell is in an interleaved block (i.e., ILVUs each containing at least one VOEU are interleave-recorded).

When the seamless angle change flag is set (=1b), the current cell is a seamless playback target; if this flag is not set (=0b), the current cell is a nonseamless playback target.

More specifically, when the interleave arrangement flag is 1b, and the seamless angle change flag is 0b, a nonseamless angle change enable state is set. However, when the interleave arrangement flag is 1b, and the seamless angle change flag is 1b, a seamless angle change enable state is set.

When a media drive system having a very short access time (i.e., a system capable of accessing the head of a desired angle block within the one-frame video period; this system is not necessarily limited to an optical disk drive system) is used, a smooth angle change can be achieved during the period of interleave arrangement flag=0b, i.e., during the period of a set (different angle cells) of non-interleave-recorded VOBUs.

When optical disk 10 having a relatively low access speed is used as a recording medium, one peripheral length of a recording track of this disk is preferably assigned to one interleaved block. In this case, the optical head can be finely moved to a trace destination by one track in the radial direction of the disk in a jump (angle change) between the adjacent interleaved blocks. Therefore, a track jump without any time lag (suitable for a seamless angle change in FIG. 38) can be made.

On the other hand, when a track jump by one video object unit (VOBU) is made, a time lag occurs at a maximum of one revolution of the disk. Therefore, an angle change together with a jump performed in units of VOBUs is suitable for the nonseamless angle change like the one shown in FIG. 32.

The contents of the seamless angle change flag are normally determined in advance by a provider (i.e., the software producer who produces the program contents of each title recorded on optical disk 10). That is, by determining the contents of the seamless angle change flag in advance, the provider can uniquely determine whether to perform the nonseamless angle change in FIG. 32 or the seamless angle change in FIG. 38. It is, however, possible to arrange hardware of the reproduction apparatus so as to allow the viewer (the user of the reproduction apparatus in FIG. 1) to arbitrarily change the contents of the seamless angle change flag in the reading data.

If the cell playback mode is 0b, this represents continuous reproduction in a cell; if, 1b, this represents still reproduction in each VOBU present in the cell.

If the access limit flag is 0b, reproduction is allowed; and if 1b, reproduction is inhibited (this flag is set to have the same contents for all the cells in one block).

For example, when a current cell is prepared for the karaoke, the cell type can represent the following in accordance with the 5-bit contents.

If the 5-bit data is 00000b, no cell type is designated; if 00001b, the title image of the karaoke is designated; if 00010b, the introduction of a karaoke song is designated; if 00011b, a song part except the climax (theme) is designated; if, 00100b, the song part of the first climax is designated; if 00101b, the song part of the second climax is designated; if 0010b, the male vocal part of the song is designated; if 00111b, the female vocal part of the song is designated; if 01000b, the male-female duet part is designated; if 01001b, the instrumental part (the performance with only musical instruments) is designated; if 01010b, the fade-in portion of the instrumental part is designated; if 01011b, the fade-out portion of the instrumental part is designated; if 01100b, the first ending part is designated; and if 01101b, the second ending part is designated. The contents of the remaining five bits are used for other application purposes.

The angle change can also be applied to the angle change of the background video of a karaoke song (e.g., the whole body, face, or mouth of a singer who sings the guide vocal part can be subjected to an angle change desired by the viewer seamlessly along the flow of the karaoke song, nonseamlessly upon returning to the previous song part, or during repeat reproduction of a part between desired measures).

When the 8-bit data of the cell still time in FIG. 42 is 00000000b, a non-still mode is designated; if 11111111b, a still image is endlessly designated; and if, 00000001b to 11111110b, the still image display operations for seconds represented by decimal numbers (1 to 254) are designated by these contents.

The number of cell commands represents the number of commands executed at the end of reproduction of the current cell.

The seamless playback flag and the system time clock STC discontinuity flag in FIG. 42 have the contents shown in FIG. 43 in accordance with cell playback states.

If the immediately preceding cell (foregoing cell) is a cell in an angle block, and the current cell is a single cell, the seamless playback flag and the STC discontinuity flag are "1" and "1", respectively. Even if the immediately preceding cell is a single cell, and the current cell is a cell in the angle block, the seamless playback flag and the STC discontinuity flag may be "1", and "1", respectively (i.e., the discontinuity flag is set at "1" because switching between the angle block and the normal block is performed).

When there is no immediately preceding cell while the current cell is a cell in the angle block, the seamless playback flag and the STC discontinuity flag may be "0", and "1", respectively.

On the other hand, if the immediately preceding cell and the current cell are cells in the angle block, the seamless playback flag and the STC discontinuity flag are set at "1" and "0", respectively (i.e., the discontinuity flag is not set because the angle block is not switched, and this discontinuity flag is set at "0") A description target is temporarily changed, and the arrangement of video title set VTS will be described below. Video title set (VTS) 72 in FIG. 10 is constituted by a maximum of 10 files (#j to #j+9) 74B. This video title set 72 contains four items (FIG. 44) in correspondence with the files.

Figure 44:
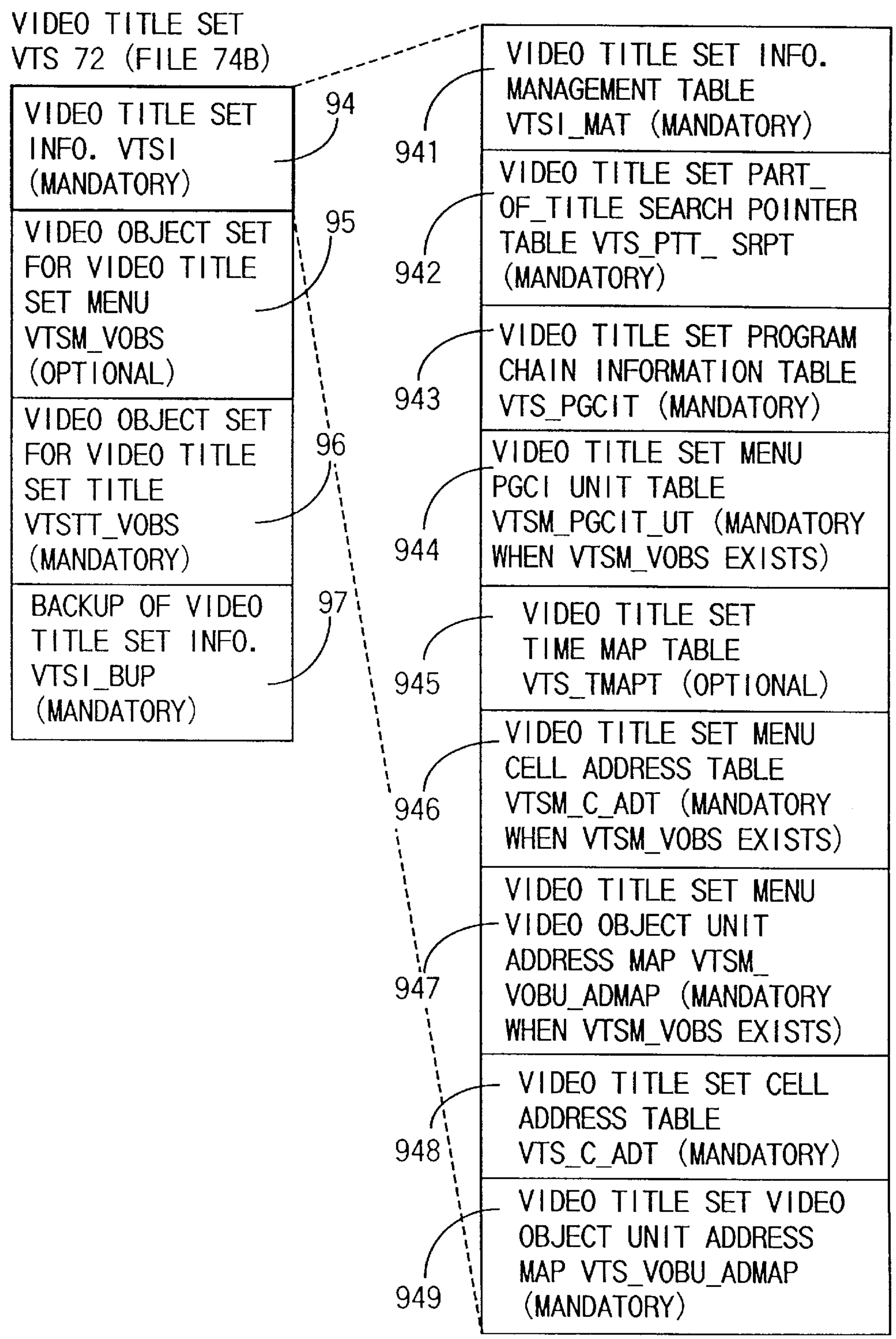
FIG. 44 is a view for explaining the logical structure of video title set (VTS) 72 in FIG. 10.

More specifically, in FIG. 44, video title set (VTS) 72 contains video title set information (VTSI) 94, video title set menu video object set (VTSM_VOBS) 95, video object set (VTSTT_VOBS) 96 for the title of a video title set, and video title set information backup (VTSI_BUP) 97.

Video title set information (VTSI) 94 can have, as indispensable items, video object set (VTSTT_VOBS) 96 for the title of a video title set, and video title set information backup (VTSI_BUP) 97, and, as an optional item, video title set menu video object set (VTSM_VOBS) 95.

As shown in FIG. 44, video tile set information (VTSI) 94 located at the head of video title set (VTS) 72 is described, in the following order, with video title set information management table (VTSI_MAT; indispensable) 941, title search pointer table (VTS_PTT_SRPT; indispensable) 942 for the part of title (e.g., a program chapter) of a video title set, program chain information table (VTS_PGCIT; indispensable) 943 for the video title set, program chain information unit table (VTSM_PGCI_UT; indispensable in the presence of VTSM_VOBS) 944 for the video title set menu, video title set time map table (VTS_TMAPT; optional) 945, cell address table (VTSM_C_ADT; indispensable in the presence of VTSM_VOBS) 946 for the video title set menu, video object unit address map (VTSM_VOBU_ADMAP; indispensable in the presence of VTSM_VOBS) 947 for the video title set menu, video title set address table (VTS_C_ADT; indispensable) 948, and video object unit address map (VTS_VOBU_ADMAP; indispensable) 949 for the video title set.

As shown in FIG. 45, video title set information management table (VTSI_MAT) 941 shown in FIG. 44 is described with a video title set identifier (VTS_ID), a video title set end address (VTS_EA), a video title set information end address (VTSI_EA), the version number (VERN) of the standard employed by optical disk (DVD) 10, a video title set category (VTS_CAT), a video title set information management table end address (VTSI_MAT_EA), the start address (VTSM_VOBS_SA) of the video object set of the video title set menu, the start address (VTSTT_VOBS_SA) of the video object set of the title of the video title set, the start address (VTS_PTT_SRPT_SA) of the part-of-title search pointer table of the video title set, the start address (VTS_PGCIT_SA) of the program chain information table of the video title set, the start address (VTSM_PGCI_UT_SA) of the unit table of the program chain information of the video title set menu, the start address (VTS_TMAPT_SA) of the time map table of the video title set, the start address (VTSM_C_ADT_SA) of the cell address table of the video title set menu, the start address (VTSM_VOBU_ADMAP_SA) of the address map of the video object unit of the video title set menu, the start address (VTS_C_ADT_SA) of the cell address table of the video title set, the start address (VTS_VOBU_ADMAP_SA) of the address map of the video object unit of the video title set, the video attribute (VTSM_V_ART) of the video title set menu, an audio stream count (VTSM_AST_Ns) of the video title set menu, the audio stream attribute (VTSM_AST_ATR) of the video title set menu, the sub-picture stream count (VTSM_SPST_Ns) of the video title set menu, the sub-picture stream attribute (VTSM_SPST_ATR) of the video title set menu, the video attribute (VTS_V_ART) of the video title set, the audio stream count (VTS_AST_Ns) of the video title set, the audio stream attribute table (VTS_AST_ATRT) of the video title set, the sub-picture stream count (VTS_SPST_Ns) of the video title set, the sub-picture stream attribute table (VTS_SPST_ATRT) of the video title set, and the multichannel audio stream attribute table (VTS_MU_AST_ATRT) of the video title set.

The above tables are aligned at the boundaries of the logical blocks of data recorded on optical disk 10.

Figure 46:
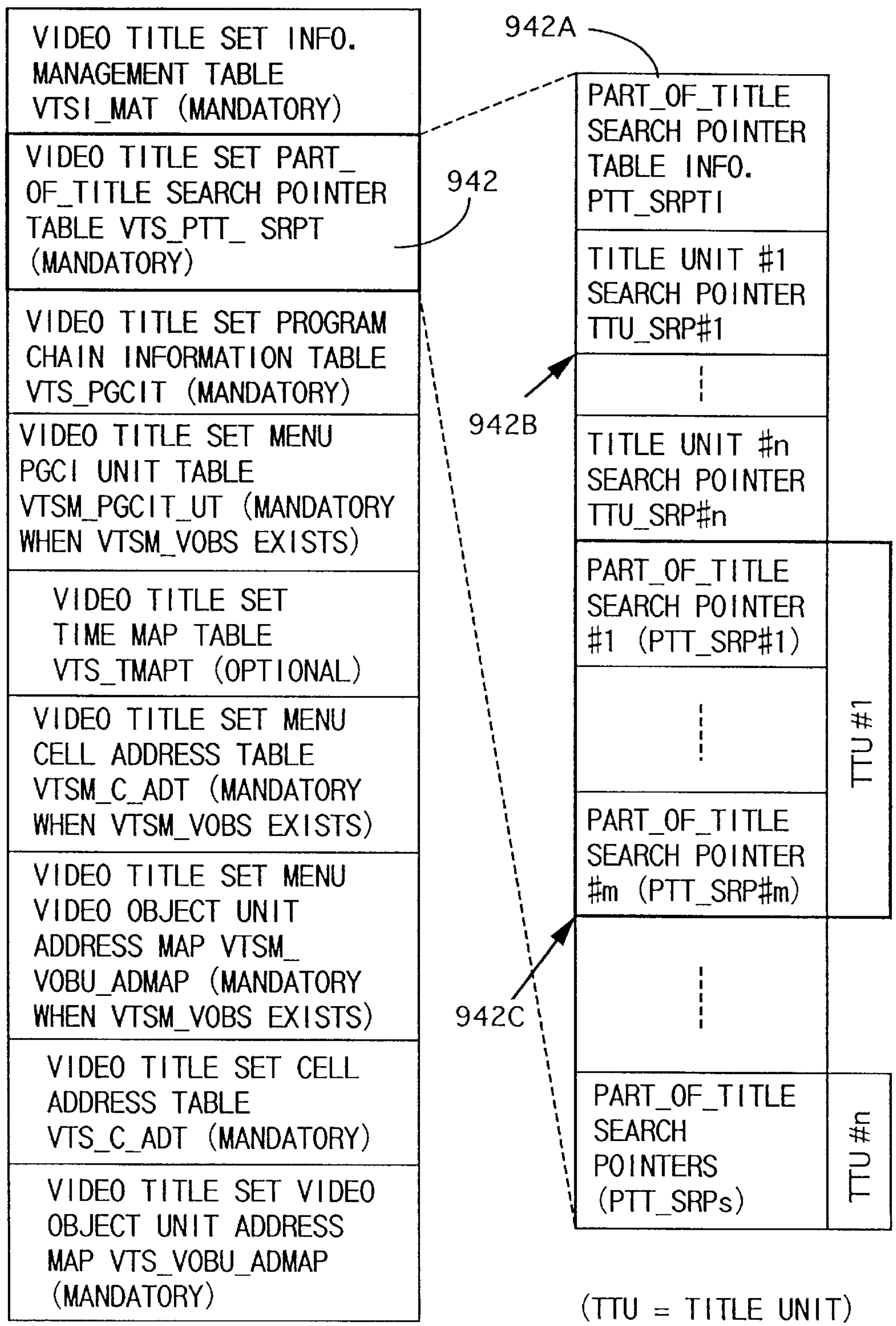
FIG. 46 is a view for explaining the contents of video title set part-of-title search pointer table (VTS_PTT_SRPT) 942 in FIG. 44.

As shown in FIG. 46, title search pointer table (VTS_PTT_SRPT) 942 for part of title of the video title set in FIG. 44 contains part-of-title search pointer table information (PTT_SRPTI) 942A, search pointers (TTU_SRP#1 to TTU_SRP#n) 942B from title unit #1 to title unit #n, and part-of-title search pointers (PTT_SRP#1 to PTT_SRP#m or PTT_SRPS; s represents a plurality of PTT_SRPs) 942C respectively corresponding to title unit #1 to title unit #n.

The part of title (PTT) represents an entry point in the corresponding title. This part of title (PTT) is assigned with a part-of-title search pointer (PTT_SRP) in which the number (PGCN) of program chains and the number (PGN) of programs are described. The part-of-title search pointer (PTT_SRP) is located at the head of the corresponding program.

The number (count) of part-of-title (PTTN) is assigned to each title. At least one part-of-title search pointer (PTT_SRP) is described from one to the number of PTTs in the ascending order in correspondence with the PTTN. A set of part-of-title search pointers (PTT_SRPs) arranged for the respective titles constitutes title units (TTUs; TTU#1 to TTU#n in FIG. 46). For example, the first part of the title (PTTN#1) of each title corresponds to program number PGN#1 of the entry program chain.

When a given title is constituted by one sequential program chain, the part-of-title count (PTTN) is assigned to all the programs of the given title in the reproduction order.

A plurality of PTTs defined for the program chin block is assigned to the first program chain of this block.

A plurality of PTTs corresponding to other program chains (PGCs) in this program chain block are defined by the same program number (PGN) used in defining the part of tile of the first program chain.

As shown in FIG. 47, part-of-title search pointer table information (PTT_SRPTI) 942A contains the count (VTS_TTU_Ns) of title units in the video title set, and the end address (VTS_PTT_SRPT_EA) of the part-of-title search pointer table of the video title set.

The number (VTS_TTU_Ns) of title units is equal to the number of titles in the video title set (VTS) and is a maximum of 99. The end address (VTS_PTT_SRPT_EA) is described by the relative block number from the first byte of the part-of-title search pointer table (VTS_PTT_SRPT).

As shown in FIG. 48, each search pointer (TTU_SRP#1 to TTU_SRP#n) 942B contains the start address (TTU SA) of the title unit (TTU). This TTU_SA is described by the relative block number from the first byte of the corresponding part-of-title search pointer table (VTS_PTT_SRPT).

As shown in FIG. 49, each part-of-title search pointer (PTT_SRP) 942C contains the program chains number (PGCN) and the programs number (PGN). This PGCN describes a serial number assigned to the selected program chains. As for a plurality of program chains (PGCs) in a given block, the program chain number (PGCN) is set as the number of first program chain (PGC) in this block.

The programs number (PGN) describes the program number in the selected program chain (PGC). When the selected program chain (PGC) does not contain any video object (VOB), "0" is described in the programs number (PGN).

Figure 50:
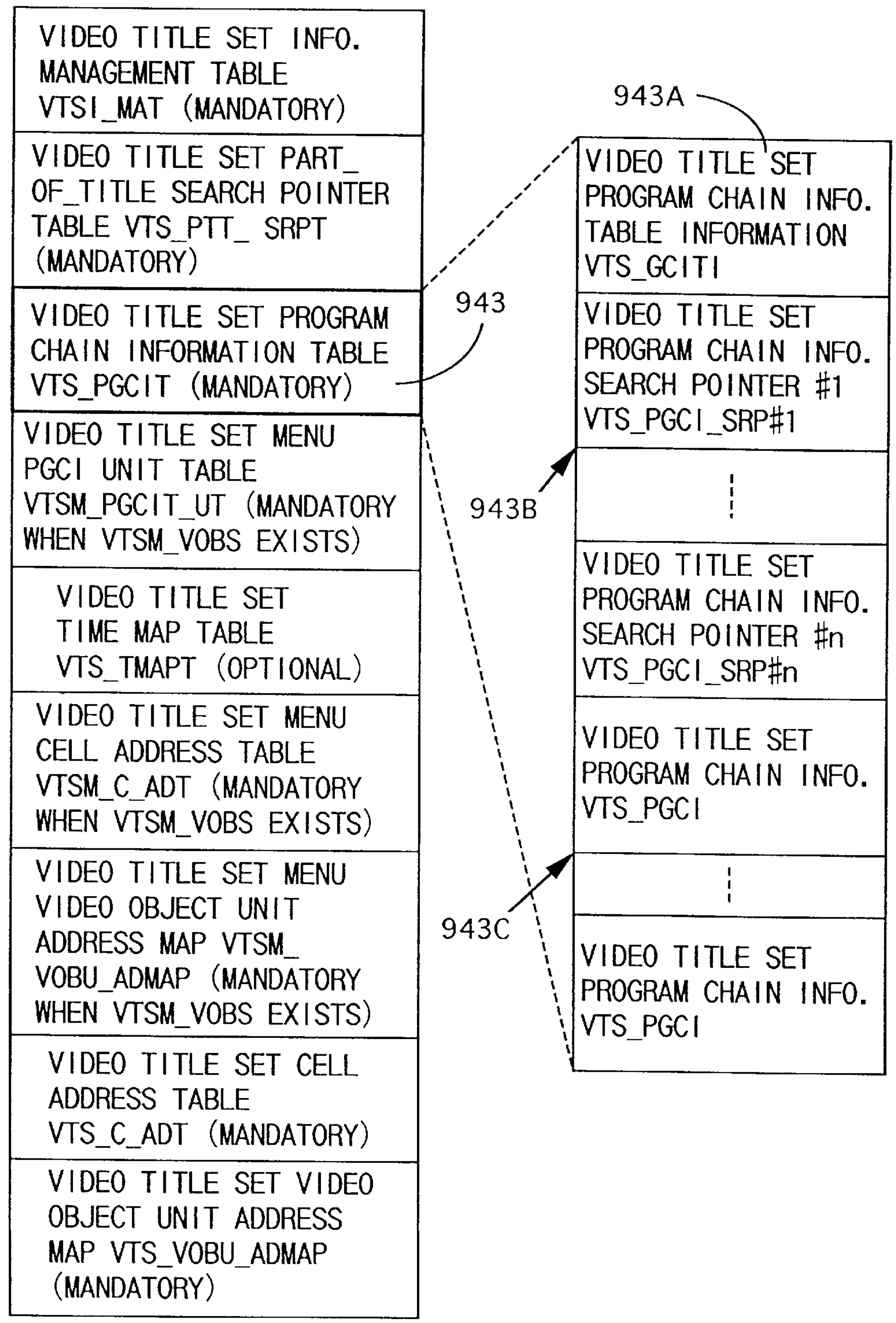
FIG. 50 is a view for explaining the contents of video title set program chain information table (VTS_PGCIT) 943 in FIG. 44.

As shown in FIG. 50, the program chain information table (VTS_PGCIT) 943 of the video title set in FIG. 44 contains video title set program chain information table information (VTS_PGCITI) 943A, video title set program chain information search pointer (VTS_PGCI_SRP#1 to VTS_PGCI_SRP#n) 943B, and video title set program chain information (VTS_PGCI) 943C (program chain information PGCI has been described with reference to FIG. 39).

Note that the order of a plurality of pieces of video title set program chain information (VTS_PGCIs) 943C is set regardless of the order of a plurality of video title set program chain information search pointers (VTS_PGCI_

SRP#1 to VTS_PGCI_SRP#n). Therefore, the same program chain information (VTS_PGCI) can be designated by using at least one program chain information search pointer (VTS_PGCI_SRP).

As shown in FIG. 51, video title set program chain information table information (VTS_PGCITI) 943A contains a video title set program chain information search pointer count (VTS_PGCI_SRP_Ns) and the end address (VTS_PGCIT_EA) of the video title set program chain information table. This end address (VTS_PGCIT_EA) is described by the relative block number from the first byte of the video title set program chain information table (VTS_PGCIT).

As shown in FIG. 52, each video title set program chain information search pointer (VTS_PGCI_SRP) 943B contains a video title set program chain category (VTS_PGC_CAT) and the start address (VTS_PGCI_SA) of video title set program chain information.

Figure 53:
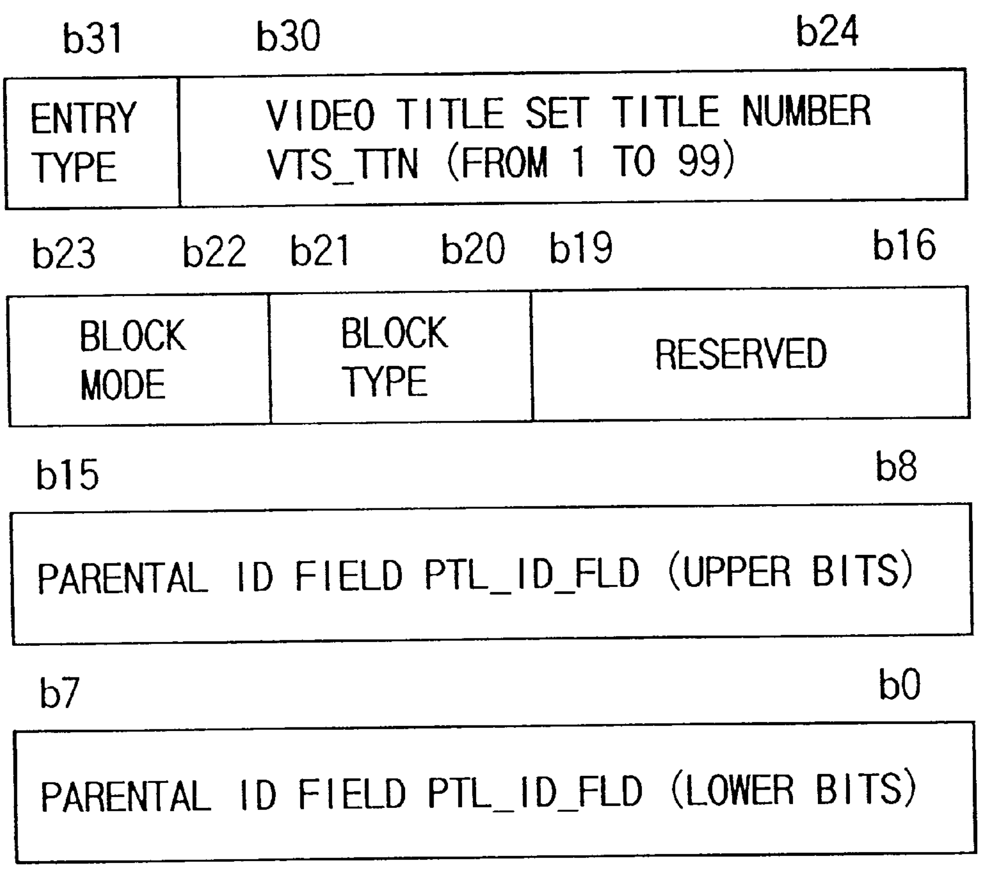
FIG. 53 is a view for explaining the contents of the video title set program chain category (VTS_PGC_CAT) contained in program chain information search pointer (VTS_PGCI_SRP) 943B in FIG. 52.

The video title set program chain category (VTS_PGC_CAT) is constituted by 32 bits (four bytes), as shown in FIG. 53.

Referring to FIG. 53, the lower eight bits of VTS_PGC_CAT are assigned to the lower bits of the parental identification field, the next eight bits are assigned to the upper bits of the parental identification field, the next four bits are reserved as a reservation field, the next two bits designate a block type, the next two bits designate a block mode, the next seven bits describe the title value (VTS_TTN) of the video title set, and the last one bit (32nd bit) designates an entry type.

More specifically, if the first entry type counted from the upper bit of the four bytes (32 bits) is 1b (binary 1), the current program chain (PGC) is represented as an entry PGC; and if 0b, the current program chain is represented as a program chain except the entry PGC. The following title value (VTS_TTN) represents the number (a maximum of 99) of titles of the current video title set. If the block mode of the following two bits represents 00b, the program chain is represented not as a program chain in the current block; if 01b, the chain is represented as the first program chain in the current block; if 10b, the chain is represented as a program chain in the current block; and if 11b, the chain is represented as the last program chain in the current block. If the block type of the following two bits is 00b, the block is not the current block; and if 01b, the block is represented as the parental block (reproduction is allowed for this block under a specific condition). The following 8+8 bits represent an area in which information (flag bit string) for determining the reproduction condition of the parental block is described.

The start address (VTS_PGCI_SA) of the video title set program chain information is described by the relative block number from the first byte of the video title set program chain information table.

Figure 54:
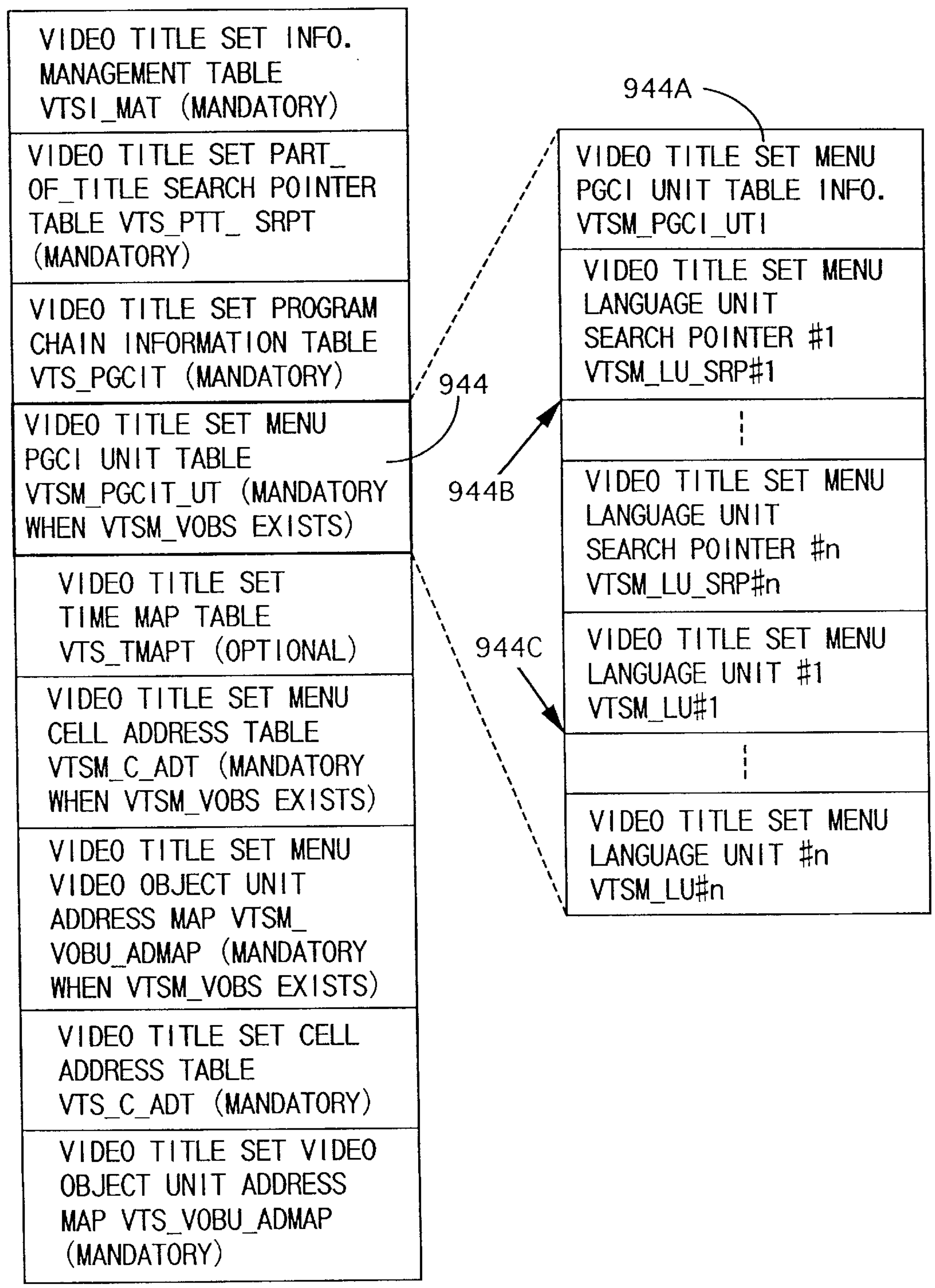
FIG. 54 is a view for explaining the contents of video title set menu program chain information unit table (VTSM_PGCI_UT) 944 in FIG. 44.

As shown in FIG. 54, video title set menu program chain information unit table information (VTSM_PGCI_UTI) 944A, video title set menu language unit search pointer (VTSM_LU_SRP#1 to VTSM_LU_SRP#n) 944B, and video title set menu language unit (VTSM_LU#1 to VTSM_LU#n) 944C are contained in video title set menu program chain information unit table (VTSM_PGCI_UT) 944 in FIG. 44.

As shown in FIG. 55, a video title set menu language unit count (VTSM_LU_Ns), and the end address (VTSM_PGCI_UT_EA) of the video title set menu program chain information unit table are contained in video title set menu program chain information unit table information (VTSM_PGCI_UTI) 944A. This end address (VTSM_PGCI_UT_EA) is described by the relative block number from the first byte of the video title set menu program chain information unit table (VTSM_PGCI_UT).

As shown in FIG. 56, a video title set menu language code (VTSM_LCD), information (VTSM_EXST) indicating existence of the video title set menu, and the start address (VTSM_LU_SA) of the video title set menu language unit are contained in video title set menu language unit search pointer (VTSM_LU_SRP) 944B.

The language code (VTSM_LCD) describes the language code of the video title set menu language unit. In this table, one language appears once. The start address (VTSM_LU_SA) describes the start address of the video title set menu language unit (VTSM_LU) by using the relative block number from the first byte of the video title set menu program chain information unit table (VTSM_PGCI_UT).

Figure 57:
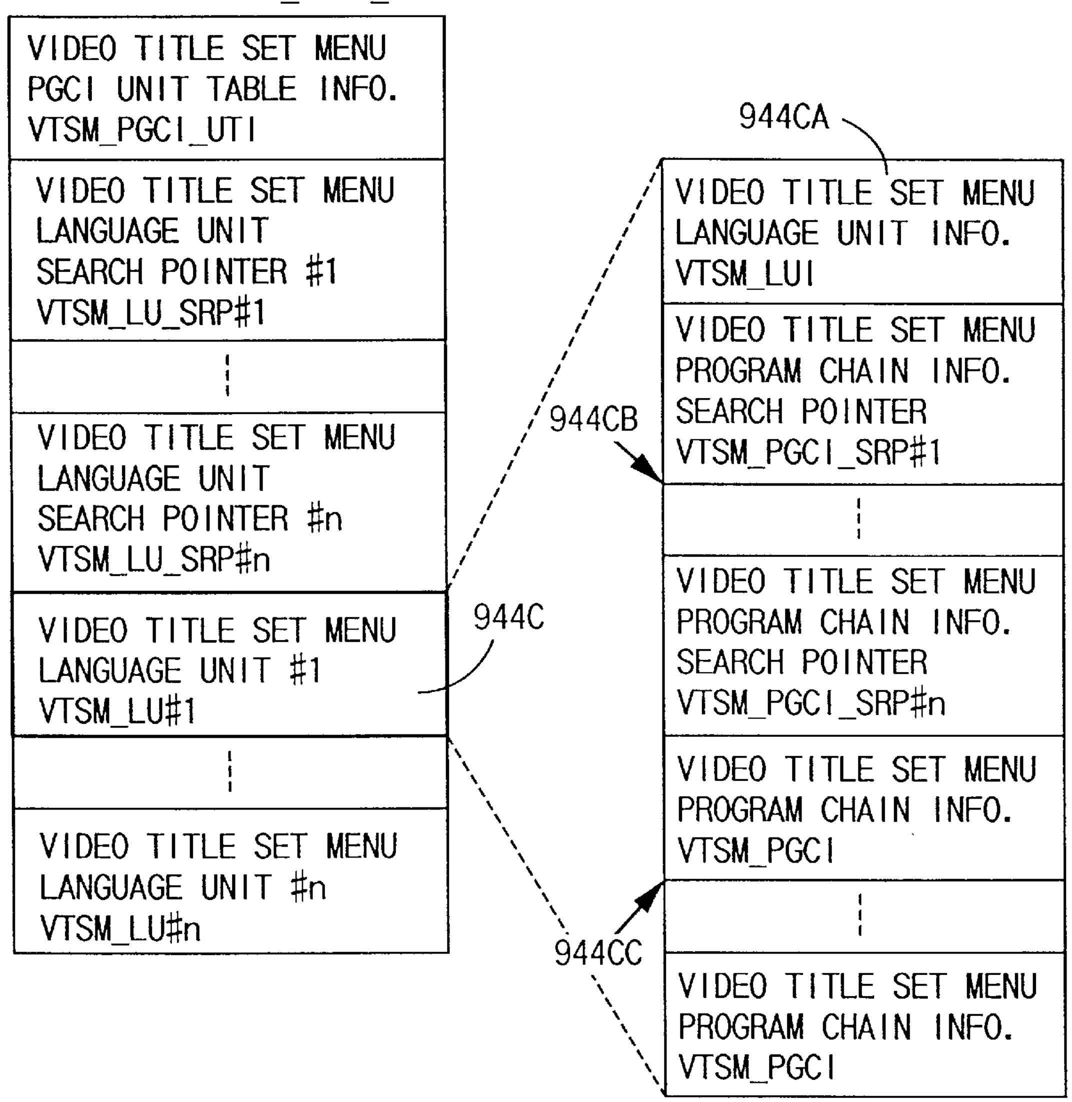
FIG. 57 is a view for explaining the contents of video title set menu language unit 944C in FIG. 54.

As shown in FIG. 57, video title set menu language unit information (VTSM_LUI) 944CA, video title set menu program chain information search pointer (VTSM_PGCI_SRP#1 to VTSM_PGCI_SRP#n) 944CB, and video title set menu program chain information (VTSM_PGCI) 944CC are contained in video title set menu language unit (VTSM_LU) 944C (the program chain information (PGCI) has been described with reference to FIG. 39).

Note that the order of the plurality of pieces of video title set menu program chain information (VTSM_PGCI) 944CC is set regardless of the order of the plurality of video title set menu program chain information search pointers (VTSM_PGCI_SRP#1 to VTSM_PGCI SRP#n) 944CB. Therefore, at least one video title set menu program chain information search pointer (VTSM_PGCI_SRP) can designate single video title set menu program chain information (VTSM_PGCI).

As shown in FIG. 58, a video title set menu program chain information search pointer count (VTSM_PGCI_SRP_Ns) and the end address (VTSM_LU_EA) of the video title set menu language unit are contained in video title set menu language unit information (VTSM_LUI) 944CA.

The search pointer count (VTSM_PGCI_SRP_Ns) describes the number of video title set menu program chains (VTSM_PGCs). The end address (VTSM_LU_EA) describes the end address of the language unit (VTSM_LU) by using the relative block number from the first byte of the video title set menu language unit (VTSM_LU).

As shown in FIG. 59, a video title set menu program chain category (VTSM_PGC_CAT) and the start address (VTSM_PGCI_SA) of the video title set menu program chain information are contained in video title set menu program chain information search pointer (VTSM_PGCI_SRP#1 to VTSM_PGCI_SRP#n).

The video title set menu program chain category (VTSM_PGC_CAT) is constituted by 32 bits (four bytes), as shown in FIG. 60.

Referring to FIG. 60, the lower eight bits of VTSM_PGC_CAT are assigned to the lower bits of the parental identification field, the next eight bits are assigned to the upper bits of the parental identification field, the next four bits serve as a reservation field, the next two bits designate a block type, the next two bits designate a block mode, the next four bits describe a menu identifier (menu ID), the next three bits serve as a reservation field, and the last one bit (32nd bit) designates an entry type.

If the first entry type counted from the upper bit of four bytes (32 bits) of a given program chain (PGC) is 1b (binary 1), this program chain is represented as an entry PGC. However, if the first entry type is 0b, the given program chain is represented as a program chain except the entry PGC.

The contents of the following 4-bit menu identifier (menu ID) are determined as follows. If the entry type is 0b, 0000b is entered in the menu ID. If the entry type is 1b, a binary code is entered in the menu ID.

More specifically, if a root menu is determined, 0011b is entered; if a sub-picture menu, 0100b is entered; if an audio menu, 0101b is entered; if an angle menu, 0110b is entered; and if a part-of-title (e.g., a chapter) menu, 0111b is entered. The 4-bit binary code of the menu identifier (menu ID) except these is reserved for another application purpose.

If the 2-bit block mode following the menu identifier (menu ID) in a given block is 00b, the corresponding program chain is represented not as a program chain in the given block; if 01b, the corresponding program chain is represented as the first program chain in the given block; and if 10b, the corresponding program chain is represented as the last program chain in the given block. If the following 2-bit block type is 00b, the corresponding block is not part of the given block; and if 01b, the corresponding block is a parental block (i.e., a block whose reproduction is allowed under only a specific condition). The following 8+8 bits correspond to an area in which information (flag bit string) for determining the reproduction condition for the parental block is described.

The start address (VTSM_PGCI_SA) describes the start address of the video title set menu program chain information (VTSM_PGCI) by using the relative block number of the first byte of the video title set menu language unit (VTSM_LU).

Figure 61:
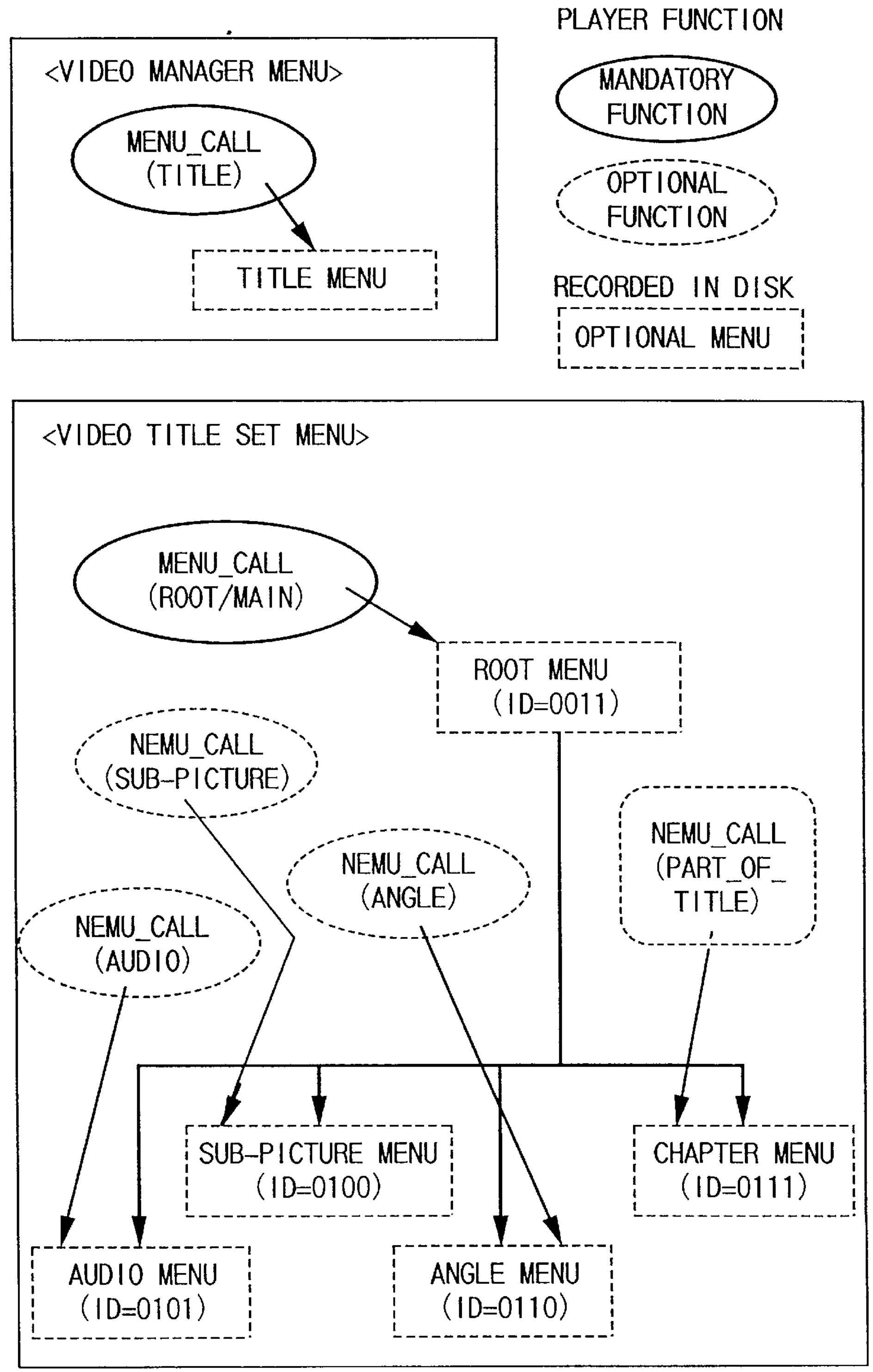
FIG. 61 is a view for explaining the hierarchical structure of menus used in the reproduction apparatus in FIG. 1.

FIG. 61 is a conceptual view for explaining the correspondence between the system menus and the user operation functions. The menus (pop-up menus appropriately appearing on the screen of monitor 6) are mainly classified into a title menu, a video title set menu, and an optional menu. Of these menus, each menu of the video title set menu is called on the basis of the contents of the menu ID in FIG. 60.

More specifically, when a menu call is made first, the root menu program chain of menu ID=0011b is called. Subsequently, to display the audio menu, the audio menu program chain of menu ID=0101b is called. To display a sub-picture menu, the sub-picture menu program chain of menu ID=0100b is called. To display the angle menu, the angle menu program chain of menu ID=0110b is called. To display the part-of-title (chapter) menu, the part-of-title menu program chain of menu ID=0111b is called.

As will be described later, when the user (viewer) of the reproduction apparatus in FIG. 1 is to change an angle, the angle menu program chain of menu ID=0110b is called, and the angle menu is displayed on monitor 6 (the angle may be changed without displaying the angle menu on monitor 6).

Video title set time map table (VTS_TMAPT) 945 in FIG. 44 contains information which describes the recording position of each program chain in a given video title set using a corresponding limited reproduction time.

Figure 62:
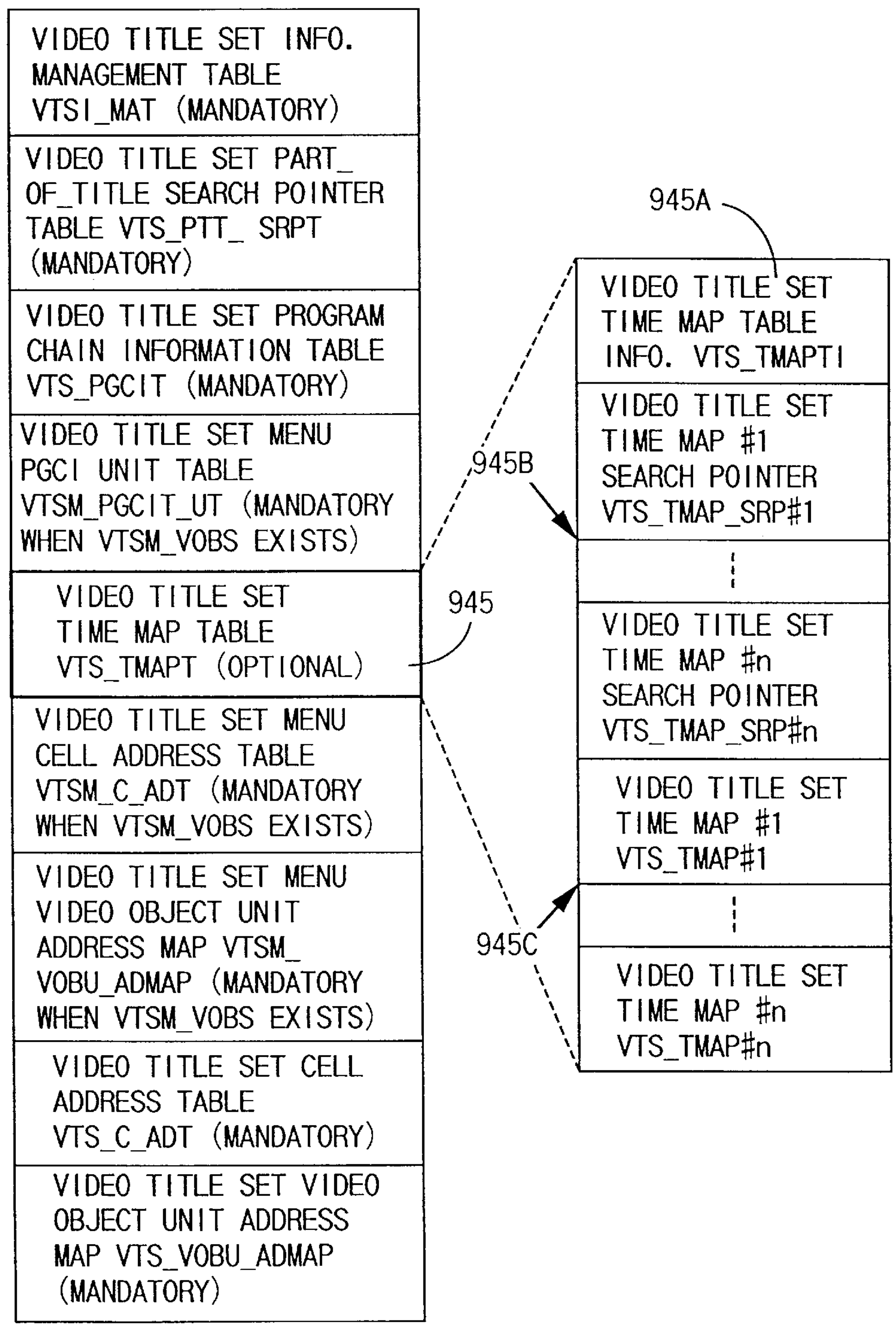
FIG. 62 is a view for explaining the contents of Ash video title set time map table (VTS_TMAPT) 945 in FIG. 44.

As shown in FIG. 62, video title set time map table information (VTS_TMAPTI) 945A, video title set time map search pointer (VTS_TMAP_SRT#1 to VTS_TMAP_SRT#n) 945B, and video title set time map (VTS_TAMP#1 to VTS_TMAP#n) 945C are contained in this time map table (VTS_TMAPT) 945.

When a video title set contains any one sequential program chain title, the video title set time map (VTS_TMAP) must always be described regardless of whether a time search or time play is allowed in this title.

At least one video title set time map (VTS_TMAP) is available. The number of video title set time maps is equal to the number of video title set program chain information search pointers (VTS_PGCI_SRPs). Therefore, when a given program chain block is constituted by a plurality of program chains, the video title set time maps (VTS_TMAPs) are described for all the program chains in the given block.

Each video title set time map (VTS_TMAP) is described in the same order as that of the plurality of video title set program chain information search pointers (VTS_PGCI_SRPs) in the corresponding video title set.

As shown in FIG. 63, a video title set time map count (VTS_TMAP_Ns) and the end address (VTS_TMAPT_EA) of the video title set time map table are contained in video title set time map table information (VTS_TMAPTI) 945A in FIG. 62.

The video title set time map count (VTS_TMAP_Ns) describes the number of video title set time maps (VTS_TMAPs) in the video title set time map table (VTS_TMAPT). This number of maps (VTS_TMAP_Ns) is set equal to the number of video title set program chain information search pointers (VTS_PGCI_SRPs) in the corresponding video title set. The end address (VTS_TMAPT_EA) of the video title set time map table describes the end address of this time map table (VTS_TMPT) by using the relative block number from the first byte of the video title set time map table (VTS_TMAPT).

As shown in FIG. 64, video title set time map search pointer (VTS_TMAP_SRT#1 to VTS_TMAP_SRT#n) 945B contains the start address (VTS_TMAP_SA) of the video title set time map. This start address (VTS_TMAP_SA) describes the start address of the corresponding video title set time map (VTS_TMAP) by using the relative block number of the first byte of the video title set time map table (VTS_TMAPT).

As shown in FIG. 65, a time unit (TMU) representing the time unit in seconds, a map entry count (MAP_EN_Ns), and a map entry table (MAP_ENT) are contained in video title set time map (VTS_TMAP#1 to VTS_TMAP#n) 945C.

The time unit (TMU) describes the time interval of each map entry (MAP_EN) in units of seconds. Each map entry (MAP_EN) describes the recording position of the corresponding time map using a time limited by the value of the time unit (TMU). The map entry (MAP_EN) is set from the start portion of a program chain continuous with respect to each time unit (TMU) on the program chain (PGC).

When an angle block is contained in this program chain (PGC), only the (at least one) map entry (MAP_EN) for angle number #1 is described. The map entry (MAP_EN) is set to sequentially reproduce the program chain (PGC) regardless of whether a cell command for the program chain command table (PGC_CMDT; FIG. 39), a cell playback mode in the cell category (C_CAT; FIG. 42) in the program chain information, or a cell still time in this cell category (C_CAT) is set.

When zero is described in the time unit (TMU), the map entry count (MAP_EN_Ns) is zero accordingly. In this case, the map entry table (MAP_ENT) has no contents.

When a title to which the above program chain (PGC) belongs is a title having one sequential program chain, and this program chain (PGC) is accessible by a user operation such as a time search or time play, a value except zero is set in the time unit (TMU).

The map entry count (MAP_EN_Ns) in FIG. 65 describes the number (0 to 2,048) of map entries (MAP_ENs) in the video title set time map (VTS_TMAP). If the time unit (TMU) is zero, the map entry count (MAP_EN_Ns) becomes zero accordingly.

The first map entry address (MAP_ENA) in the program chain (PGC) belongs to the first one time unit (TMU) of this program chain (PGC). The number of map entry addresses (MAP_ENAs) is equal to the number of map entries, and the total number of bytes of the map entry address is the map entry count ×4.

As shown in FIG. 66, each map entry (MAP_EN) is constituted by 4 bytes (32 bits). The first byte constitutes the lower eight bits of MAP_ENA, the following two bytes constitute the intermediate 8+8 bits of MAP_ENA, the following seven bits constitute the upper seven bits of MAP_ENA, and the last one bit (32nd bit) is used as a discontinuity flag.

If this discontinuity flag is 0b (binary 0), this represents that the current map entry address (MAP_ENA) and the next map entry address (MAP_ENA) belong to the same cell. If this discontinuity flag is 1b, this represents that the current map entry address (MAP_ENA) and the next map entry address (MAP_ENA) belong to different cells, or the current map entry address (MAP_ENA) is the last map entry address (MAP_ENA) of this program chain (PGC).

By using the relative block number from the first logical block of the video title set title video object set (VTSTT_VOBS) in the corresponding video title set (VTS), the map entry address (MAP_ENA) in FIG. 66 describes the start address of the video object unit (VOBU) in which this address (MAP_ENA) is located.

Figure 67:
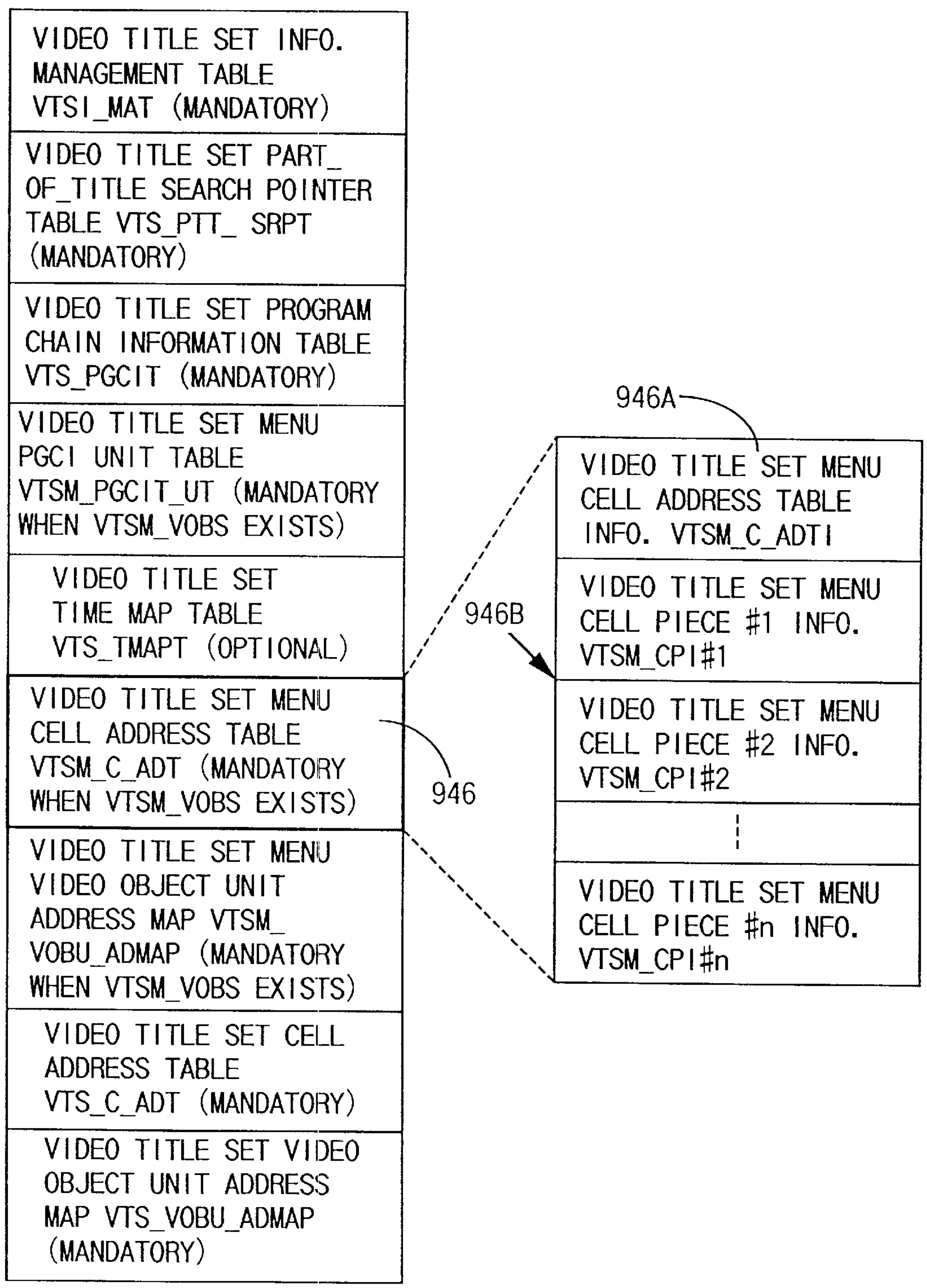
FIG. 67 is a view for explaining the contents of video title set menu cell address table (VTSM_C_ADT) 946 in FIG. 44.

As shown in FIG. 67, video title set menu cell address table information (VTSM_C_ADTI) 946A and video title set menu cell piece information (VTSM_CPI#1 to VTSM_CPI#n) 946B are contained in video title set menu cell address table (VTSM_C_ADT) 946 in FIG. 44.

As shown in FIG. 68, a video object (VOB) count (VTSM_VOB_Ns) in the video title set menu video object set (VTSM_VOBS) and the end address (VTSM_C_ADT_EA) of the video title set menu cell address table (VTSM_C_ADT) are contained in video title set menu cell address table information (VTSM_C_ADTI) 946A.

The video title set menu video object count (VTSM_VOB_Ns) describes the video object (VOB) count in the video title set menu video object set (VTSM_VOBS) in the corresponding video title set. The end address (VTSM_C_ADT_EA) of the video title set menu cell address table describes the end address of this cell address table (VTSM_C_ADT) by the relative block number from the first byte of the video title set menu cell address table (VTSM_C_ADT).

As shown in FIG. 69, video title set menu cell piece information (VTSM_CPI_#1 to VTSM_CPI#n) 946B contains the numerical value (VTSM_VOB_IDN) of the video object identifier (VOB_ID) for a cell piece, the numerical value (VTSM_C_IDN) of the cell identifier (Cell_ID) for the cell piece, the start address (VTSM_CP_SA) of the cell piece (VTSM_CP) of the video title set menu, and the end address (VTSM_CP_EA) of the cell piece (VTSM_CP) of the video title set menu.

The numerical value (VTSM_VOB_IDN) of the video object identifier describes the number of the video object identifier (VOB_ID) to which the cell piece (CP) belongs. The numerical value (VTSM_C_IDN) of the cell identifier describes the number of the cell identifier (Cell_ID) to which the cell piece (CP) belongs. The start address (VTSM_CP_SA) of the cell piece describes the start address of the first navigation pack (NV_PCK) of the cell piece by using the relative block number from the first logical block of the video title set menu video object set (VTSM_VOBS) in the corresponding video title set. The end address (VTSM_CP_EA) of the cell piece describes the end address of the last logical block of the cell piece by using the relative block number from the first logical block of the video title set menu video object set (VTSM_VOBS) in the corresponding video title set.

As shown in FIG. 70, video title set menu video object unit address map (VTSM_VOBU_ADMAP) 947 in FIG. 44 contains address map information (VTSM_VOBU_ADMAPI) 947A of the video title set menu video object unit and address (VTSM_VOBU_AD#1 to VTSM_VOBU_AD#n) 947B of the video title set menu video object unit.

The start addresses of all the video object units (VOBUs) in the video title set menu video object set (VTSM_VOBS) are described in the ascending order of the logical block numbers on address map (VTSM_VOBU_ADMAP) 947.

As shown in FIG. 71, address map information (VTSM_VOBU_ADMAPI) 947A of the video title set menu video object unit contains the end address (VTSM_VOBU_ADMAP_EA) of the address map (VTSM_VOBU_ADMAP) of the video title set menu video object unit.

This VTSM_VOBU_ADMAP_EA describes the end address of the address map (VTSM_VOBU_ADMAP) by using the relative block number from the first byte of the address map (VTSM_VOBU_ADMAP) of the video title set menu video object unit.

As shown in FIG. 72, address (VTSM_VOBU_AD#n) 947B of the video title set menu video object unit contains the start address (VTSM_VOBU_SA#n) of the video title set menu video object unit (VTSM_VOBU) for the video object unit (VOBU#n).

This VTSM_VOBU_SA#n describes the start address of the nth video object unit (VOBU#n) by using the relative logical block number from the first logical block of the video title set menu video object unit (VTSM_VOBS) in the corresponding video title set.

As shown in FIG. 73, video title set cell address table (VTS_C_ADT) in FIG. 44 contains video title set cell address table information (VTS_C_ADTI) 948A and video title set cell piece information (VTS_CPI#1 to VTS_CPI#n) 948B.

In this cell address table (VTS_C_ADT) 948, the start and end addresses of all the cells and all the interleaved units in the video object set (VTSTT_VOBS) of the video title set title are described.

If a cell belongs to a video object located in an interleaved block, a cell piece is defined as one interleaved unit (ILVU). If the boundary of the cell falls within one interleaved unit (ILVU), the cell piece is defined by each cell in the interleaved unit.

The video title set cell piece information (VTS_CPI) of each cell piece is described in the order of a video object identifier number (VOB_IDN), a cell identifier number (C_IDN), and a cell piece in the cell.

Note that the video object identifier number (VOB_IDN) and the cell identifier number (C_IDN) are assigned to a cell to which the corresponding cell piece belongs.

As shown in FIG. 74, video title set cell address table information (VTS_C_ADTI) 948A contains a video title set video object count (VTS_VOB_Ns) representing the number of video objects in the video object set of the video title set title, and a video title set cell address end address (VTS_C_ADT_EA) representing the end address of the video title set cell address table.

The video title set video object count (VTS_VOB_Ns) describes the number of video object sets (VTSTT_VOBSs) in the video title set title in the corresponding video title set.

The video title set cell address end address (VTS_C_ADT_EA) describes the end address of the video title set cell address (VTS_C_ADT) by using the relative logical block number from the first byte of this video title set cell address (VTS_C_ADT).

As shown in FIG. 75, video title set cell piece information (VTS_CPI) 948B contains the video object identifier number (VTS_VOB_IDN) of the video title set for the cell piece, the cell identifier number (VTS_C_IDN) of the video title set for the cell piece, and the end address (VTS_CP_EA) of the cell piece of the video title set.

The video object identifier number (VTS_VOB_IDN) describes the identification number of the video object of the video title set to which the cell piece belongs.

The cell identifier number (VTS_C_IDN) describes the cell identification number of the video title set to which the cell piece belongs.

The start address (VTS_CP_IDN) of the cell piece describes the start address of the first navigation pack of the cell piece by using the relative logical block number from the first logical block of the video object of the video title set title in the corresponding video title set.

The end address (VTS_CP_EA) of the cell piece describes the end address of the last logical block of the cell piece by using the relative logical block number from the first logical block of the video object of the video title set title in the corresponding video title set.

As shown in FIG. 76, the video title set video object unit address map (VTS_VOBU_ADMAP) 949 in FIG. 44 contains address map information (VTS_VOBU_ADMAPI) 949A of the video object unit of the video title set, and address (VTS_VOBU_AD#1 to VTS_VOBU_AD#n) 949B of the video object unit of the video title set.

In this address map (VTS_VOBU_ADMAP) 949, the start addresses of all the video object units in the video object set (VTSTT_VOBSs) in the video title set title are described in the ascending order of the logical block numbers.

As shown in FIG. 77, address map information (VTS_VOBU_ADMAPI) 949A of the video object unit of the video title set contains the end address (VTS_VOBU_ADMAP_EA) of the address map of the video object unit of the video title set.

This VTS_VOBU_ADMAP_EA describes the end address of the address map (VTS_VOBU_ADMAP) of the video object unit of the video title set by using the relative block number from the first byte of this VTS_VOBU_ADMAP.

As shown in FIG. 78, address (VTS_VOBU_AD#n) 949B of the video object unit of the video title set describes the start address (VTS_VOBU SA#n) of the video object unit of the video title set for the nth video object unit (VOBU#n).

This VTS_VOBU_AD#n describes the start address of the nth video object unit (VOBU#n) by using the relative logical block number from the first logical block of the video object set of the video title set title in the corresponding video title set.

Menu reproduction processing in the apparatus shown in FIG. 1 will be described below.

When optical disk 10 is set in the optical disk reproduction apparatus in FIG. 1 upon power-ON operation of the apparatus, system CPU 50 reads out the initial operation programs from system ROM and RAM 52 to operate disk drive unit 30. Disk drive unit 30 starts a read operation from lead-in region 27 of optical disk 10. By this read operation, information of the volume and file structure region 70 (FIG. 10) following lead-in region 27 is read out. The volume and file structure of this region 70 is defined complying with a predetermined standard (e.g., ISO-9660).

To read-access volume and file structure region 70 recorded at the predetermined position of optical disk 10 set in disk drive unit 30, system CPU 50 supplies a read instruction to disk drive unit 30 to read out the contents of volume and file structure region 70 and temporarily stores the readout contents in data RAM 56 through system processor 54.

Subsequently, system CPU 50 extracts information such as the recording position, capacity, and size of each file on disk 10 and information required for other management (management information) from the data stored in data RAM 56 using the path table and the directory record (these area read from optical disk 10) stored in data RAM 56, transfers the extracted information in a predetermined location in system ROM and RAM 52, and stores it therein.

System CPU 50 then refers to information of the recording position, capacity, and the like of each file from system ROM and RAM 52 to acquire video manager 71 (FIG. 12) constituted by a plurality of files starting from file No. 0.

More specifically, system CPU 50 refers to information of the recording position, capacity, and the like of each file which is acquired from system ROM and RAM 52 to supply a read instruction to disk drive unit 30. System CPU 50 acquires the positions and sizes of a plurality of files constituting video manager 71 present on the root directory and reads out this video manager 71. Readout video manager 71 is transferred to data RAM 56 through system processor 54 and stored at a predetermined location in data RAM 56.

Figure 79:
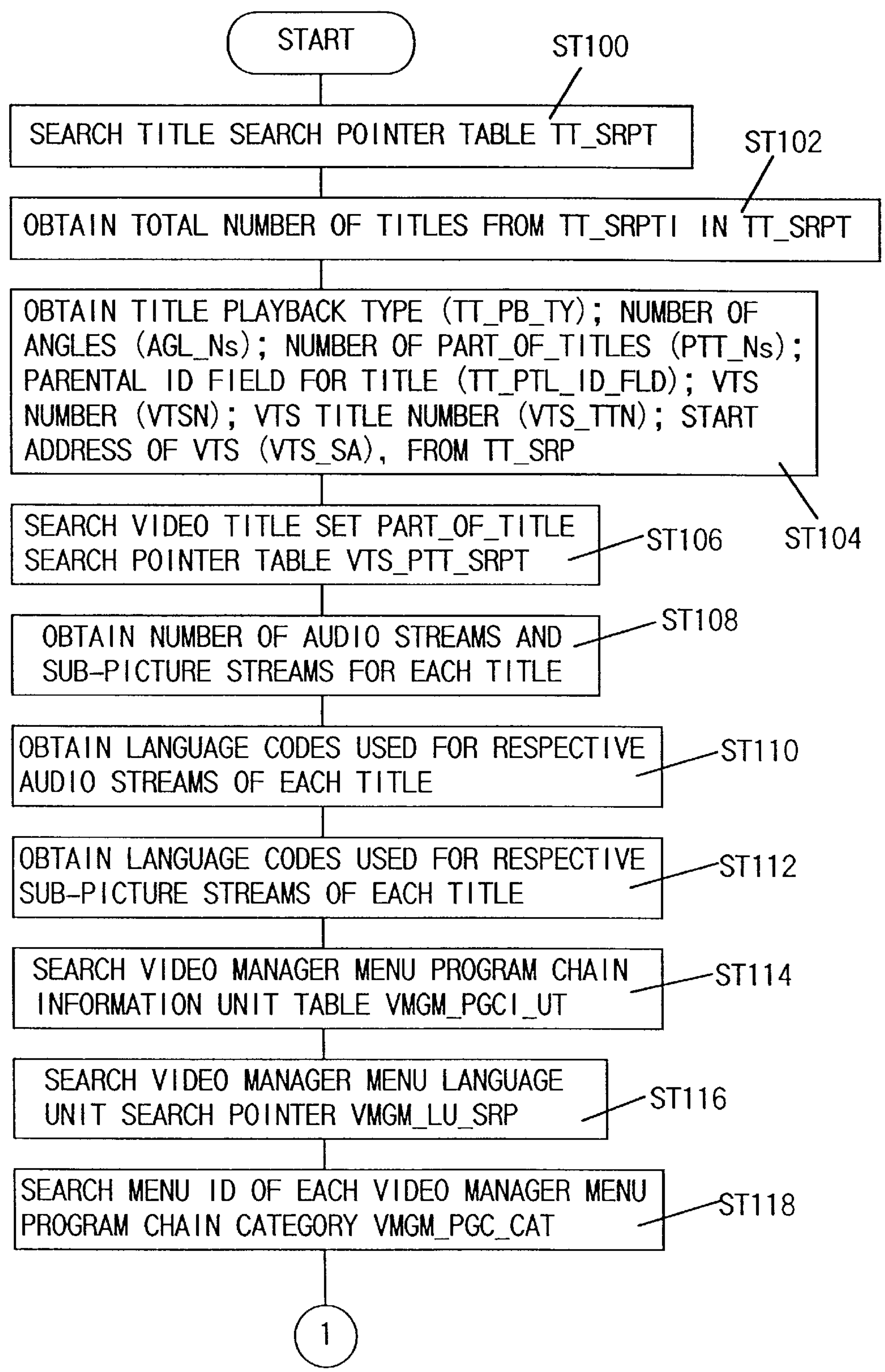
FIG. 79 is a flow chart for explaining the first half of menu processing in the reproduction apparatus in FIG. 1.
Figure 80:
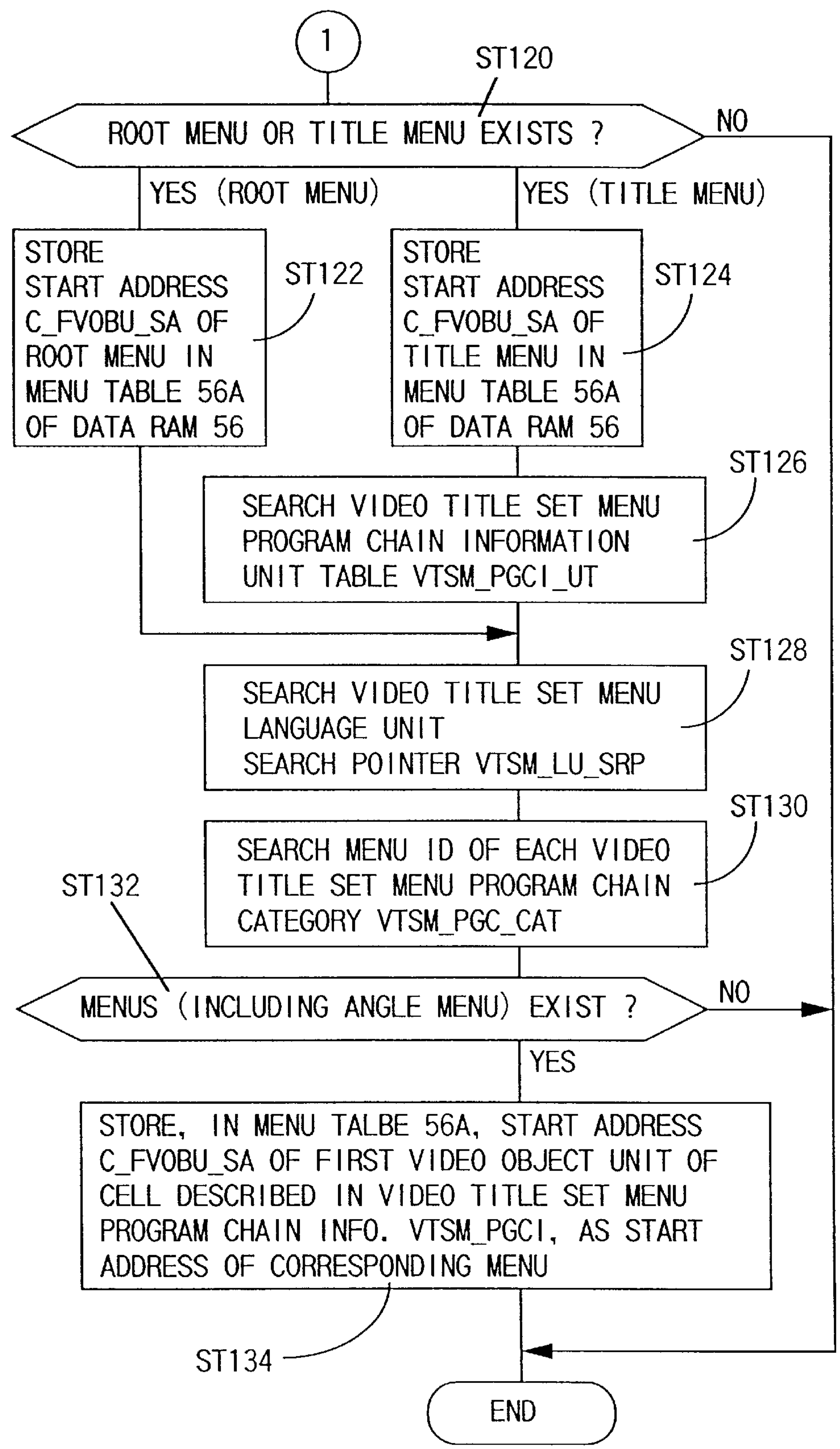
FIG. 80 is a flow chart for explaining the second half of menu processing in the reproduction apparatus in FIG. 1.

System CPU 50 then performs menu processing shown in the flow charts of FIGS. 79 and 80.

As shown in FIG. 79, system CPU 50 acquires video manager information (VMGI) 75 having the structure shown in FIG. 12 from video manager 71 stored in data RAM 56, and searches second title search pointer table (TT_SRPT) 752 in video manager information (VMGI) 75 (step ST100).

System CPU 50 acquires title search pointer table information (TT_SRPTI) 752A in title search pointer table (TT_SRPT) 752 having the structure shown in FIG. 16, and obtains the total number of titles in optical disk 10 in accordance with the number (TT_Ns; FIG. 17) of title search pointers described in the title search pointer table information (step ST102).

System CPU 50 extracts each title search pointer (TT_SRP#) 752B in title search pointer table (TT_SRPT) 752 and obtains, for each title, a title playback type (TT_PB_TY), an angle count or number of angles (AGL_Ns), a parental ID field (TT_PTL_ID_FDL), a video title set number (VTSN), a video title set title number (VTS_TTN), and the start address (VTS_SA) of the video title set (step ST104).

That is, at step ST104, system CPU 50 acquires information of an angle count or number of angles (AGL_Ns) of the lowest layer of the "VMG/VMGI/TT_SRPT/TT_SRP/AGL_Ns" layer.

System CPU 50 uses the start address (VTS_SA) 942 of video title set 72 described in each title search pointer (TT_SRP) 752*b* to search for video title set part-of-title pointer table (VTS_PTT_SRPT) 942 from video title set information (VTSI) 94 serving as the first table of each video title set 72 (step ST106).

System CPU 50 obtains an audio stream count of each title in accordance with an audio stream count (VTS_AST_Ns; FIG. 45) described in video title set information management table (VTSI_MAT) 941 of each video title set 72, and obtains a sub-picture stream count of each title (step ST108).

System CPU 50 obtains a use language for each audio stream of each title in accordance with the audio language code of each audio stream described in the audio stream attribute table (VTS_AST_ATRT; FIG. 45) of video title set information management table (VTSI_MAT) 941 of each video title set 72 (step ST110).

System CPU 50 obtains a use language for each sub-picture stream of each title in accordance with the sub-picture language code of each sub-picture stream described in the sub-picture stream attribute table (VTS_SPST_ATRT; FIG. 45) of video title set information management table (VTSI_MAT) 941 of each video title set 72 (step ST112).

System CPU 50 searches video manager menu program chain information unit table (VMGM_PGCI_UT; FIG. 12) serving as the third table in video manager information (VMGI) 75 of video manager 71 (step ST114).

By this search, video manager menu language unit search pointer (VMGM_LU_SRP; FIG. 19) 753B described with the same language code as that set in the reproduction apparatus is searched (step ST116).

When video manager menu program chain information unit search pointer (VMGM_LU_SRP) 753B described with the same language code is searched, system CPU 50 searches for the menu ID (FIG. 25) described for each category (VMGM_PGC_CAT; FIG. 24) of each video manager menu of video manager menu program chain information search pointer (VNGM_PGCI_SRP; FIG. 24) 753CB in video manager menu language unit (VMGM_LU) 753C corresponding to this pointer (VMGM_LU_SRP) 753B (step ST118).

Control shifts from node (1) in FIG. 79 to node (1) in FIG. 80. System CPU 50 determines in accordance with the search result at step ST118 of FIG. 79 whether the root menu (FIG. 61) as the main menu is present and whether the title menu (FIG. 61) is present (step ST120).

When the root menu is present, system CPU 50 extracts one of video manager menu program chain information search pointers (VMGM_PGCI_SRPs; FIG. 22) in which the menu ID (0011b in FIG. 61) of this root menu is described. System CPU 50 reads out the contents of corresponding video manager menu program chain information (VMGM_PGCI; FIG. 22) 753CC from the start address (VMGM_PGCI_SA; FIG. 24) described in the extracted search pointer. System CPU 50 stores, as the start address of the root menu, the start address (C_FVOBU_SA; FIG. 41) of start video object unit (VOBU; FIG. 11) 85 of the cell described in this video manager menu program chain information (VMGM_PGCI) 753CC in menu table 56A in data RAM 56 in FIG. 1 (step ST122).

On the other hand, when the title menu is present, system CPU 50 extracts one of video manager menu program chain information search pointers (VMGM_PGCI_SRPs; FIG. 22) in which the menu ID of the title menu is described. System CPU 50 reads out the contents of corresponding video manager menu program chain information (VMGM_PGCI; FIG. 22) 753CC from the video manager menu program chain information start address (VMGM_PGCI_SA; FIG. 24) described therein. System CPU 50 stores, as the start address of the title menu, the start address (C_FVOBU_SA; FIG. 41) of start video object unit (VOBU; FIG. 11) 85 of the program chain described in this video manager menu program chain information (VMGM_PGCI) 753CC in menu table 56A in data RAM 56 in FIG. 1 (step ST124).

Video title set menu program chain information unit table (VTSM_PGCI_UT; FIG. 44) 944 in video title set information (VTSI; FIG. 44) serving as the first table of each video title set 72 (VTS#1 to VTS#n in FIG. 10) (step ST126).

As a result, video title set menu language unit search pointer (VTSM_LU_SRP; FIG. 54) 944B described with the same language code as that set in the reproduction apparatus in FIG. 1 is searched (step ST128).

When video title set menu language unit search pointer (VTSM_LU_SRP) 944B described with the same language code is searched, system CPU 50 searches for the menu ID (FIG. 60) described for each category (VTSM_PGC_CAT) for each video title set menu from video title set menu program chain information search pointer (VTSM_PGCI_SRP; FIG. 59) 944CB in video title set menu language unit (VTSM_LU; FIG. 54) 944C corresponding to searched pointer (VTSM_LU_SRP; FIG. 54) 944B (step ST130).

By this search, it is determined whether a sub-picture menu, an audio menu, an angle menu, and a chapter (program) menu are present, and whether a title menu is present (step ST132).

When these menus are present (YES at step ST132), system CPU 50 extracts one of video title set menu program chain information search pointers (VTSM_PGCI_SRPs; FIG. 57) 944CB in which this menu ID (FIG. 60) is described. System CPU 50 stores, as the start address of the corresponding menu, the start address (C_FVOBU_SA; FIG. 41) of start video object unit (VOBU; FIG. 11) 85 of the cell described in this video title set menu program chain information (VTSM_PGCI) 944CC in menu table 56A in data RAM 56 in FIG. 1.

When it is determined at step ST132 that no menu is present (NO at step ST132), step ST134 is skipped.

As described above, the start addresses of the sub-picture menu, audio menu, angle menu, and part-of-title (chapter or program) menu for each video title set 72 are stored in menu table 56A formed in data RAM 56 in FIG. 1.

As a result, as shown in FIG. 81, menu table 56A stores the start addresses of the respective menus which correspond to the languages set in the reproduction apparatus in FIG. 1.

When the viewer (the user of the reproduction apparatus in FIG. 1) then turns on, e.g., menu key 5*n* of remote controller 5 in FIG. 8, system CPU 50 searches menu table 56A having the contents shown in FIG. 81 to determine whether the root menu is present.

As a result, when it is determined that the root menu is present, system CPU 50 reads out the start address (C_FVOBU_SA; FIG. 41) of start video object unit (VOBU) 85 stored in correspondence with the root menu from menu table 56A. System CPU 50 reads out the root menu data corresponding to the readout address from the recording region on disk 10 which corresponds to video manager menu video object set (VMGM_VOBS; FIG. 12) 76. The readout data is temporarily stored in data RAM 56 through system processor 54.

The data (cell 84 in FIG. 11) having the root menu stored in data RAM 56 is distributed to video decoder 58, audio decoder 60, and sub-picture decoder 62 and decoded on the basis of reproduction time information. The decoded data are then subjected to D/A conversion and predetermined signal processing in reproduction processor 64. The D/A-converted video data (main picture and sub-picture) is supplied to monitor 6, and a root menu (main menu) window shown in FIG. 82 is reproduced on monitor 6. At the same time, the D/A-converted audio data is supplied to speaker unit 8, and predetermined sounds (menu guidance or the like) are appropriately reproduced from speaker unit 8.

When the viewer depresses title key 5*p* (FIG. 8) of remote controller 5, a numerical key of ten-key pad 5*t* (FIG. 8) which corresponds to the title number in the root menu reproduction state, or reproduction key 5*c* (FIG. 8) to start normal reproduction, system CPU 50 determines title menu reproduction to determine whether a title menu is present.

When it is determined that the title menu is present, system CPU 50 reads out the start address (C_FVOBU_SA; FIG. 41) of start video object unit (VOBU) 85 stored in correspondence with the title menu in menu table 56A (FIG. 81). System CPU 50 reads out title menu data corresponding to this address from the recording region of disk 10 which corresponds to video manager menu video object set (VMGM_VOBS) 76. The readout data is temporarily stored in data RAM 56 through system processor 54.

The data (cell 84) having the root menu stored in data RAM 56 is distributed to video decoder 58, audio decoder 60, and sub-picture decoder 62 and decoded on the basis of reproduction time information. The decoded data are subjected to signal conversion in D/A and reproduction processor 64, and the resultant data are supplied to monitor 6. As a result, a title menu image as shown in FIG. 83A is reproduced on monitor 6, and at the same time, the corresponding sounds are appropriately reproduced from speaker unit 8.

When skip key 5*f* (FIG. 8) for chapter switching is turned on while the root menu (main menu) in FIG. 82 is kept reproduced, or after a title is selected in normal reproduction, system CPU 50 enters reproduction of a chapter menu (part-of-title menu) corresponding to the currently selected title and determines whether a chapter menu is present.

As a result, when it is determined that the chapter menu is present, the start address (C_FVOBU_SA; FIG. 41) of start video object unit (VOBU) 85 stored in correspondence with the chapter menu of menu table 56A (FIG. 81) is read out. Chapter menu data corresponding to this readout address is read out from the recording region of disk 10 which corresponds to video title set menu video object set (VTSM_VOBS) 95. The readout data is temporarily stored in data RAM 56 through system processor 54.

Data (cell 84) having the chapter menu stored in data RAM 56 is distributed to video decoder 58, audio decoder 60, and sub-picture decoder 62 and decoded on the basis of reproduction time information. The decoded data are subjected to signal conversion in D/A and reproduction processor 64, and the resultant data are supplied to monitor 6. As a result, a chapter menu (part-of-title menu) image as shown in FIG. 83B is reproduced on monitor 6, and at the same time, the corresponding sounds are appropriately reproduced from speaker unit 8.

When audio key 5 aud (FIG. 8) is turned on while the root menu is kept reproduced, or after a title is selected in normal reproduction, system CPU 50 enters reproduction processing of an audio menu corresponding to the currently selected title and determines whether the audio menu is present.

As a result, when it is determined that the audio menu is present, the start address (C_FVOBU_SA; FIG. 41) of start video object unit (VOBU) 85 stored in correspondence with the audio menu of menu table 56A (FIG. 81) is read out. Audio menu data corresponding to this readout address is read out from the recording region of disk 10 which corresponds to video title set menu video object set (VTSM_VOBS) 95. The readout data is temporarily stored in data RAM 56 through system processor 54.

Data (cell 84) having the audio menu stored in data RAM 56 is distributed to video decoder 58, audio decoder 60, and sub-picture decoder 62 and decoded on the basis of reproduction time information. The decoded data are subjected to signal conversion in D/A and reproduction processor 64, and the resultant data are supplied to monitor 6. As a result, an audio menu image as shown in FIG. 83C is reproduced on monitor 6, and at the same time, the corresponding sounds are appropriately reproduced from speaker unit 8.

When subtitle key 5 sbt (FIG. 8) corresponding to a sub-picture is turned on while the root menu is kept reproduced, or after a title is selected in normal reproduction, system CPU 50 enters reproduction processing of a sub-picture menu (subtitle menu) corresponding to the currently selected title and determines whether the sub-picture menu is present.

As a result, when it is determined that the sub-picture menu is present, the start address (C_FVOBU_SA; FIG. 41) of start video object unit (VOBU) 85 stored in correspondence with the sub-picture menu of menu table 56A (FIG. 81) is read out. Sub-picture menu data corresponding to this readout address is read out from the recording region of disk 10 which corresponds to video title set menu video object set (VTSM_VOBS) 95. The readout data is temporarily stored in data RAM 56 through system processor 54.

Data (cell 84) having the sub-picture menu (subtitle menu) stored in data RAM 56 is distributed to video decoder 58, audio decoder 60, and sub-picture decoder 62 and decoded on the basis of reproduction time information. The decoded data are subjected to signal conversion in D/A and reproduction processor 64, and the resultant data are supplied to monitor 6. As a result, a sub-picture menu (subtitle menu) image as shown in FIG. 83D is reproduced on monitor 6, and at the same time, the corresponding sounds are appropriately reproduced from speaker unit 8.

When angle key 5 ang (FIG. 5 or 8) is turned on while the root menu is kept reproduced, or after a title is selected in normal reproduction, system CPU 50 enters reproduction processing of an angle menu corresponding to the currently selected title and determines whether the angle menu is present.

As a result, when it is determined that the angle menu is present, the start address (C_FVOBU_SA; FIG. 41) of start video object unit (VOBU) 85 stored in correspondence with the angle menu of menu table 56A (FIG. 81) is read out. Angle menu data corresponding to this readout address is read out from the recording region of disk 10 which corresponds to video title set menu video object set (VTSM_VOBS) 95. The readout data is temporarily stored in data RAM 56 through system processor 54.

Data (cell 84) having the angle menu stored in data RAM 56 is distributed to video decoder 58, audio decoder 60, and sub-picture decoder 62 and decoded on the basis of reproduction time information. The decoded data are subjected to signal conversion in D/A and reproduction processor 64, and the resultant data are supplied to monitor 6. As a result, an angle menu image as shown in FIG. 83E is reproduced on monitor 6 (an angle mark (FIG. 9) illustrating a camera angle may be displayed on monitor 6 together with this angle menu).

Although the right, left, and central angles are exemplified in FIG. 83E for illustrative convenience, other camera angles are available. For example, in a boxing fight between boxers A and B, the first camera angle can be set at the position of a hook-up announcer outside the ring, the second camera angle can be set at the viewpoint of a referee, the third camera angle can be set at the viewpoint of boxer A, and the fourth camera angle can be set at the viewpoint of boxer B. According to the present invention, the “camera angle” is not limited to any physical “photographing direction”, but can be grasped as a concept including various “viewpoints” corresponding to the program contents (how the video image is viewed from the different viewpoints of the actors and actresses of a drama).

The menu languages exemplified in FIGS. 82, 83C, 83D, and 83F can be changed by the viewer (the user of the reproduction apparatus in FIG. 1) (Japanese is used as the menu language in FIGS. 82 and 83A to 83F). Assume that Japanese is designated as the default menu language. In this case, if the viewer does not change any setting, the Japanese menu is displayed. When the viewer selects "English" in the menu language window shown in FIG. 83F, the menus shown in FIGS. 82 and 83A to 83F are displayed in English upon closing the currently displayed menu.

Together with reproduction of the above angle menu, the corresponding sounds are appropriately reproduced from speaker unit 8 (e.g., audio guidance data for menu-selectable contents are stored in ROM 52 and appropriately read out from ROM 52, and system CPU 50 can create the guidance sounds for the menu-selectable contents in accordance with speech synthesis software; such speech synthesis can be realized by a known technique, and a detailed description thereof will be omitted).

System CPU 50 stores the acquired menu data in menu table 56A in data RAM 56. When this table is appropriately looked up, a necessary menu can be quickly displayed.

System CPU 50 acquires the stream counts and attribute information of video manager menu video, audio, and sub-picture data which are described in video manager information management table (VMGI_MAT; FIG. 15) 751. System CPU 50 then sets parameters necessary for reproducing video manager menus in video decoder 58, audio decoder 60, and sub-picture decoder 62 on the basis of the acquired attribute information.

Video data reproduction (including a nonseamless angle change in FIG. 32 and a seamless angle change in FIG. 38) using navigation pack 86 (FIG. 26) containing the presentation control information (PCI) and the data search information (DSI) will be described below.

Figure 84:
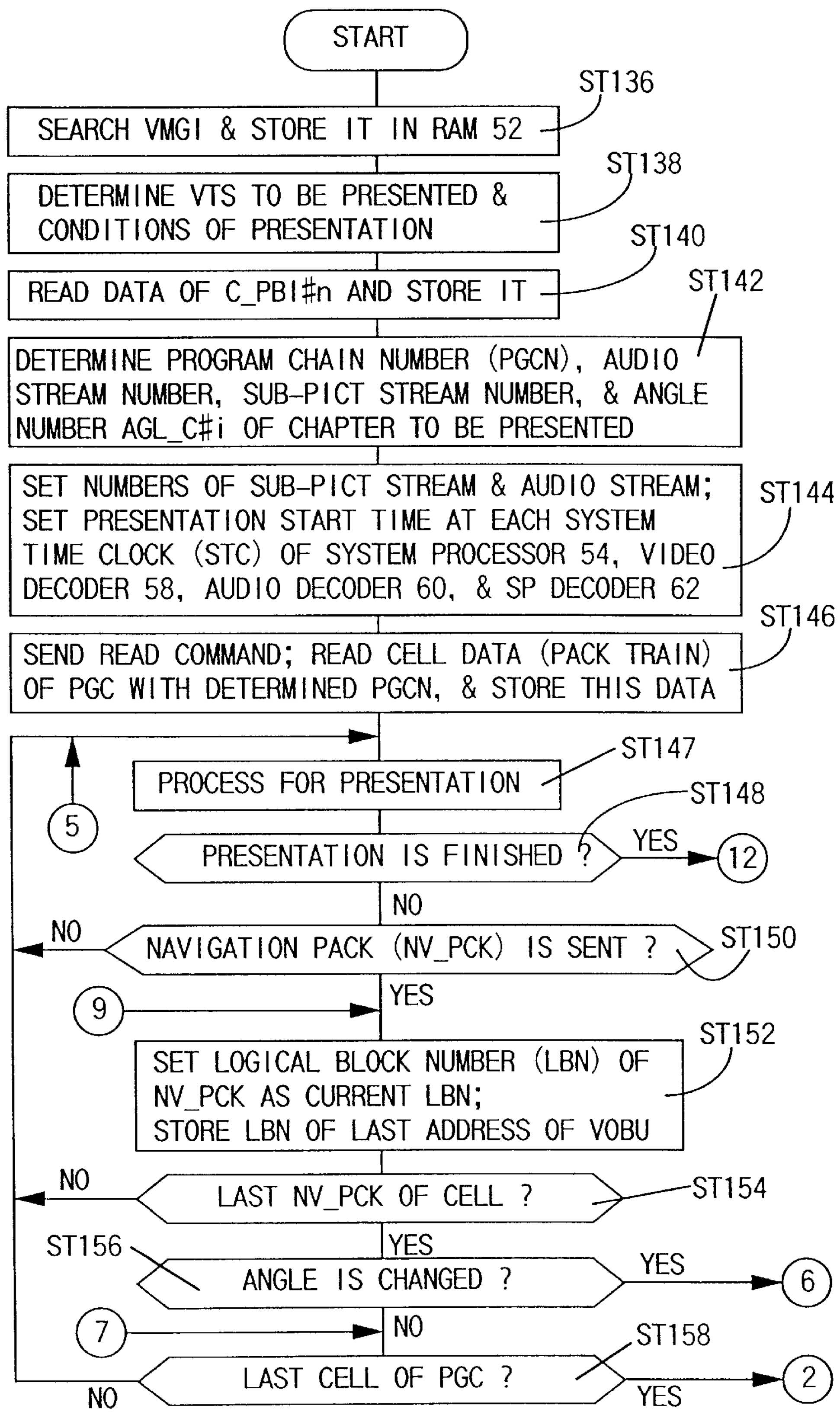
FIG. 84 is a flow chart for explaining the first one-third of angle change processing in the reproduction apparatus in FIG. 1.

When video data is normally reproduced in the flow chart of FIG. 84, video manager information (VMGI) 75 is searched by system CPU 50 in FIG. 1 upon the start of reproduction and stored in system ROM/RAM 52 (step ST136).

Video title set information (VTSI) 94 of video title set (VTS) 72 is loaded in RAM 52 on the basis of this video manager information (VMGI) 75, and the video title set menu is displayed on monitor 6 using video object set (VTSM_VOBS) 95.

On the basis of the menu display contents, the viewer (the user of the reproduction apparatus in FIG. 1) decides title set 72 to be reproduced and reproduction conditions (e.g., an audio language, a caption language, and the aspect ratio of a reproduction screen) (step ST138).

When title set 72 thus decided is selected upon operation of key operation/display unit 4 or remote controller 5, data (C_PBI#1 to C_PBI#n; FIG. 40) of the cell playback information table (C_PBIT; FIG. 39) is loaded by system CPU 50 from program chain information table (VTS_PGCIT; FIG. 44) 943 of title set 72 thus selected. The loaded data is stored in system ROM/RAM 52 (step ST140).

The viewer then inputs various reproduction conditions (e.g., a desired chapter, a desired audio language, a desired caption language, and a desired camera angle) through key operation/display unit 4 or remote controller 5 while observing the menus in FIGS. 83A to 83E. On the basis of the input reproduction conditions, system CPU 50 determines the program chain number (PGC#k; PGC#1, PGC#2, PGC#3, . . . in FIG. 14) corresponding to the chapter to be reproduced, an audio stream number, a sub-picture (caption/subtitle) stream number, and an angle number (AGL_C#i in FIG. 32 or 38) (step ST142).

For example, the skyscrapers in Manhattan, N.Y. are selected as the title to be reproduced, and the display of an English sub-picture caption with a French narration about the skyscrapers is determined. The camera angle is determined as a direction to capture a reporter, i.e., a narrator from the right in the walking direction.

When the viewer skips the decision operation at step ST138, the reproduction apparatus in FIG. 1 employs the default settings determined by the apparatus maker or the provider who created the program recorded on disk 10. When the default settings are employed, video reproduction starts from the first chapter of the first title set recorded on optical disk 10 in English voices (audio stream #1) and a Japanese caption (sub-picture stream #1) at a screen aspect ratio of 9:16 (the default value of the reproduction apparatus) and a camera angle (angle number #1) from the viewpoint of the reporter.

The sub-picture and audio stream numbers thus determined are set in register 54B in system processor 54. At the same time, reproduction start time is set in system time clocks (STCs) 54A, 58A, 60A, and 62A of system processor 54, video decoder 58, audio decoder 60, and sub-picture decoder 62. The start address and program chain number (cell number) of first VOBU 85 in cell 84 (FIG. 11) containing target reproduction video image are stored in system ROM/RAM 52 (step ST144).

As described above, when video title set loading is prepared, system CPU 50 supplies a read command to disk drive unit 30. Disk drive unit 30 seeks the corresponding recording area on optical disk 10 on the basis of the above start address. Cell data (more specifically, the lowermost pack train in FIG. 11) of the designated program chain are sequentially read out by this read command and supplied to data RAM 56 through system CPU 50 and system processor 54 (step ST146).

The sent cell data, i.e., at least one video object unit 85 (a plurality of packs having navigation pack 86 in FIG. 11 as the head) is sequentially stored from head navigation pack 86 in order in data RAM 56.

Various kinds of pack data (video pack 88, sub-picture pack 90, and audio pack 91) stored in data RAM 56 are distributed to video decoder 58, audio decoder 60, and sub-picture decoder 62 in FIG. 1 and decoded therein. The decoded data are supplied to D/A and data reproduction processor 64. As a result, a video signal containing information of video pack 88 and sub-picture pack 90 extracted from optical disk 10 is supplied to monitor 6. At the same time, an audio signal containing information of audio pack 91 extracted from optical disk 10 is supplied to speaker unit 8. Full-motion video with a caption (sub-picture) in a predetermined language and sounds in a predetermined language is displayed (step ST147).

During video and audio reproduction, it is determined whether an interrupt for terminating reproduction is input from disk drive unit 30 (step ST148).

If the reproduction termination interrupt is input from disk drive unit 30 (YES at step ST148), the flow jumps to reproduction end processing (node 12) to be described later.

If no reproduction termination interrupt is not input from disk drive unit 30 (NO at step ST148), control waits until next navigation pack 86 is transferred (step ST150).

During which navigation pack 86 is not transferred, the video and audio reproduction continues (step ST147, NO at step ST148, and NO at step ST150).

When next navigation pack 86 is transferred (YES at step ST150), the logical block number (NV_PCK_LBN; FIG. 29 or 35) of transferred navigation pack 86 is stored in system ROM/RAM 52 as the current logical block number (NOWLBN). At the same time, the logical block number (ENDLBN) of the end address of video object unit 85 (part of cell 84 constituting the program chain during reproduction) containing transferred navigation pack 86 is stored in system ROM/RAM 52 (step ST152).

At the end of transfer of the above navigation pack 86, it is determined whether a pack is last navigation pack 86 of currently reproduced cell 84 (step ST154).

This determination is performed by comparing the start address (C_LVOBU_SA; FIG. 41) of the last video object unit in the cell playback information table (C_PBIn; FIG. 40) with the address (NV_PCK_LBN serving as NOWLBN; FIG. 29 or 35) of current navigation pack 86 (more specifically, NOWLBN is compared with ENDLBN). If this navigation pack 86 is not the last navigation pack in currently reproduced cell 84 (NO at step ST154), the flow returns to reproduction processing at step ST147.

If navigation pack 86 is the last navigation pack in currently reproduced cell 84 (YES at step ST154), the flow advances to next processing.

More specifically, during video and audio reproduction from optical disk 10, it is determined if a user interrupt (e.g., an angle change request) is input from key operation/display unit 4 or remote controller 5 (step ST156).

When this user interrupt (angle change request) is detected (YES at step ST156), data (e.g., an angle number) corresponding to this interrupt operation is stored in system ROM/RAM 52, and the flow jumps to angle change processing (node 6) to be described later.

If no angle change is detected (NO at step ST156), it is determined whether currently reproduced cell 84 is the last cell of the program chain (PGC) to which this cell belongs (step ST158).

This determination is performed by determining whether currently reproduced cell 84 is the last cell (#n) of the cell playback information table (C_PBIT; FIG. 40). More specifically, this determination is performed on the basis of the elapsed time (C_ELTM; FIG. 29) of the cell constituting the currently reproduced program chain (PGC) or the identification number (VOBU_C_IDN; FIG. 35) of the reproduced cell.

When currently reproduced cell 84 is determined not to be the last cell of the program chain (PGC) (NO at step ST158), the flow returns to reproduction processing at step ST147.

Figure 85:
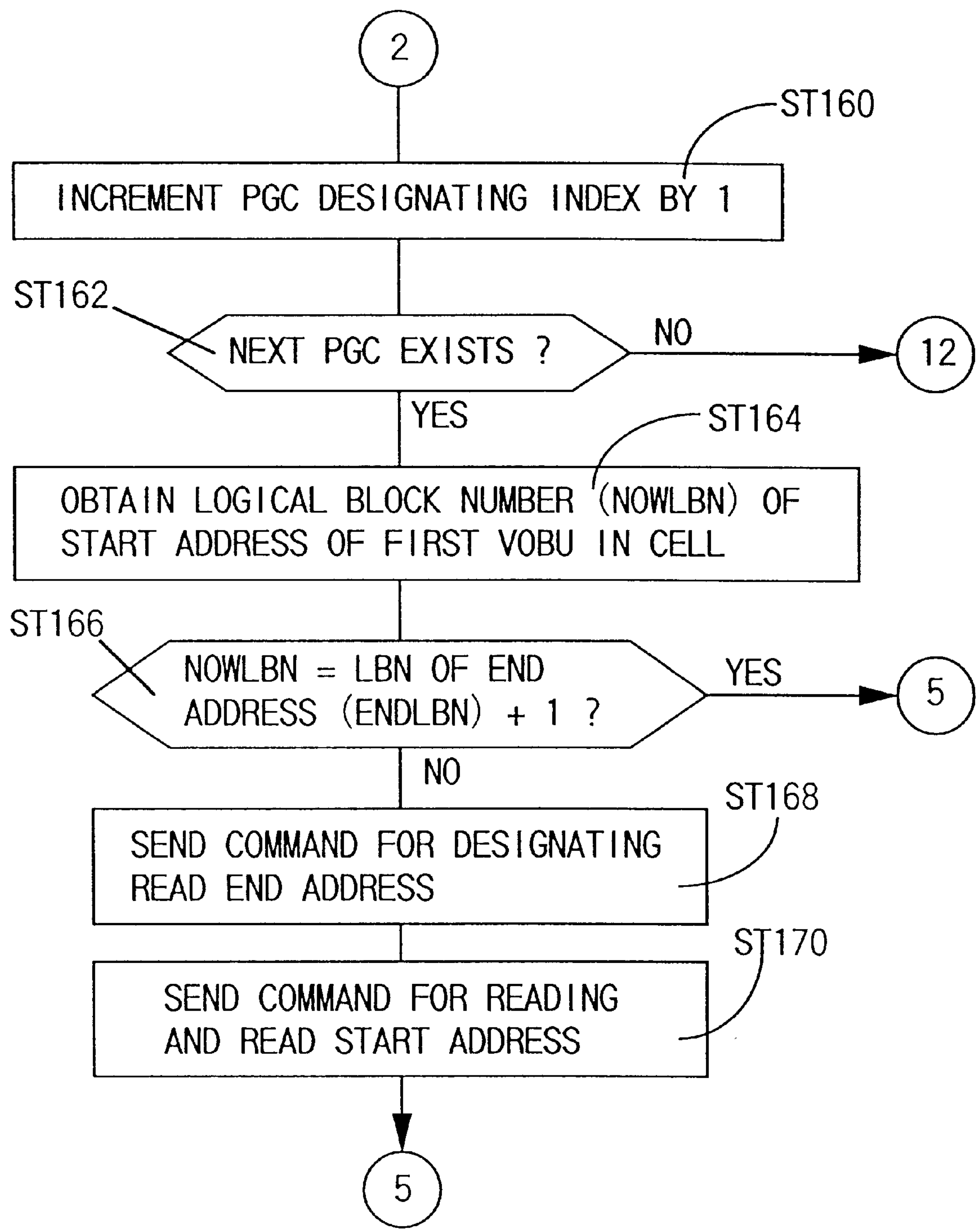
FIG. 85 is a flow chart for explaining the second one-third of angle change processing in the reproduction apparatus in FIG. 1.

The description of the operation of the reproduction apparatus in FIG. 1 returns from node (2) in FIG. 84 to node (2) in FIG. 85.

Except for a special case (e.g., an interactive drama whose story variously changes), the program chains are normally reproduced in the ordinal numbers (in the ascending order). Judging from this, a program chain number to be reproduced next can be automatically set by adding one to the program chain number whose reproduction is just complete (step ST160).

More specifically, when cell 84 is the last cell of the program chain (PGC) (YES at step ST158), this program chain is complete, so that an index (NOWPGC) Iffor designating the target reproduction program chain is incremented by one to designate the next program chain (PGC) (step ST160). When a multi-PGC title in FIG. 14 is taken as an example, the next reproduction target changes to PGC#2 upon completion of reproduction of, e.g., entry PGC#1.

It is then determined whether the program chain having a new incremented program chain number is recorded on optical disk 10 under reproduction (step ST162).

If no program chain to be reproduced next is present (NO at step ST162), the flow jumps to reproduction end processing (node 12) to be described later.

If a program chain to be reproduced next is present (YES at step ST162), the cell playback information table (C_PBIT; FIG. 39) of the incremented program chain is searched, and the start address (C_FVOBU_SA; FIG. 41) of the first video object unit in the currently reproduced cell is acquired from the contents (e.g., C_PBI#2; FIG. 40) of the cell playback information table as the current logical block number (NOWLBN) (step ST164).

It is determined whether the resultant logical block number (NOWLBN) is the number (ENDLBN+1) next to the logical block number (ENDLBN) of the last address of video object unit 85 (part of cell 84 constituting the currently reproduced program chain) stored in system ROM/RAM 52 at step ST152 (step ST166).

If the resultant logical block number (NOWLBN) is the number (ENDLBN+1) next to the logical block number of the last address (YES at step ST166), the flow returns to reproduction processing (step ST147) in FIG. 84 through node (5).

If the resultant logical block number (NOWLBN) is not the number (ENDLBN+1) next to the logical block number of the last address (NO at step ST166), the cell addresses are discontinuous.

In this case, system CPU 50 outputs a read end address command for designating the end address of currently reproduced video object unit 85 and temporarily stops a read operation of disk drive unit 30 at the designated address (step ST168).

When a read command and a start address are supplied again from system CPU 50 to disk drive unit 30 (step ST170), the flow returns to reproduction processing (node 5) at step ST147 of FIG. 84, and a seek operation for new navigation pack 86 is started.

Figure 86:
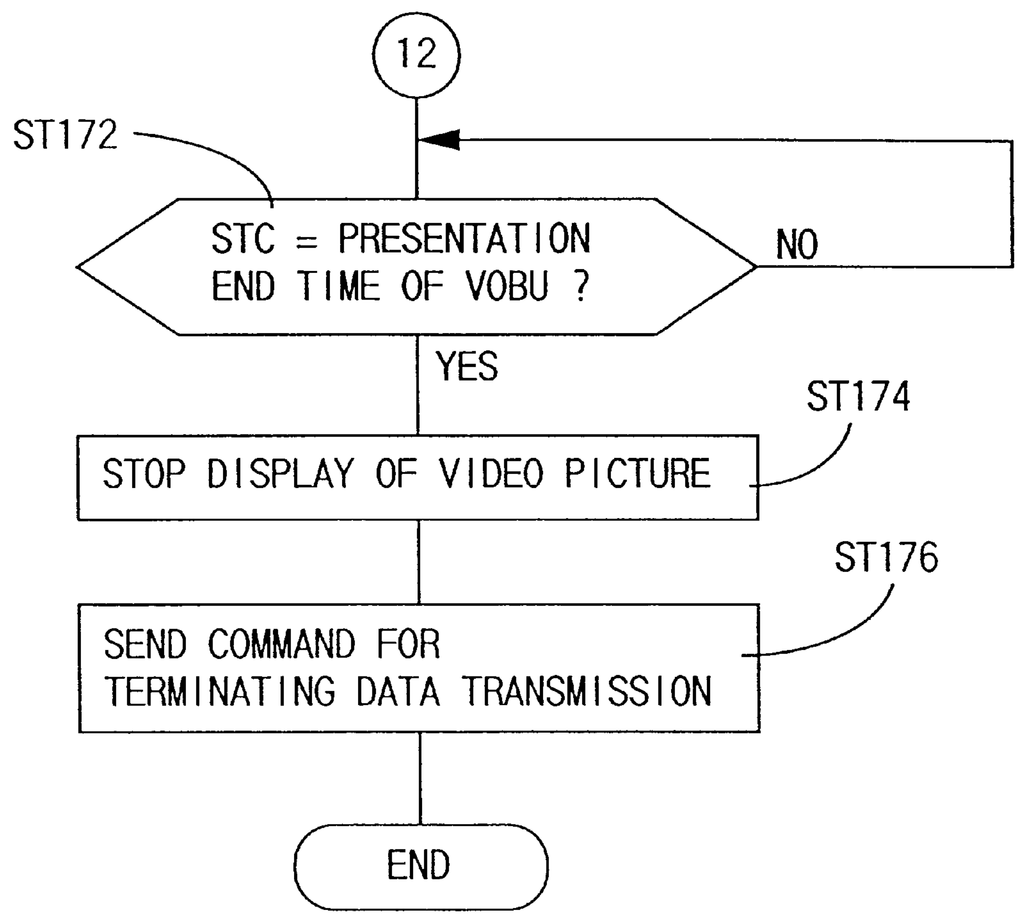
FIG. 86 is a flow chart for explaining the third one-third of angle change processing in the reproduction apparatus in FIG. 1.

When reproduction is complete in FIG. 84 (YES at step ST148), or when no program chain to be reproduced next is present in FIG. 85 (NO at step ST162), the flow advances to processing in node 12 of FIG. 86.

First, the PCI general information (PCI_GI) contained in PCI data 113 (FIG. 28) of navigation pack 86 is referred to, and the display end time (VOBU_E_PTM; FIG. 29) of the video object unit described therein is referred to (step ST172).

When this display end time (VOBU_E_PTM) coincides with the contents (system time clock reference value NV_PCK_SCR; FIG. 35) of the system time clock (STC) in FIG. 1 (YES at step ST172), the screen display on monitor 6 is stopped (e.g., the video image under reproduction disappears, and the screen is changed to the blue back screen appropriately having necessary character information) (step ST174).

A data transfer stop command is then transmitted from system CPU 50 to disk drive unit 30 (step ST176). Data transfer from disk drive unit 30 is stopped, and the reproduction operation is ended.

Figure 87:
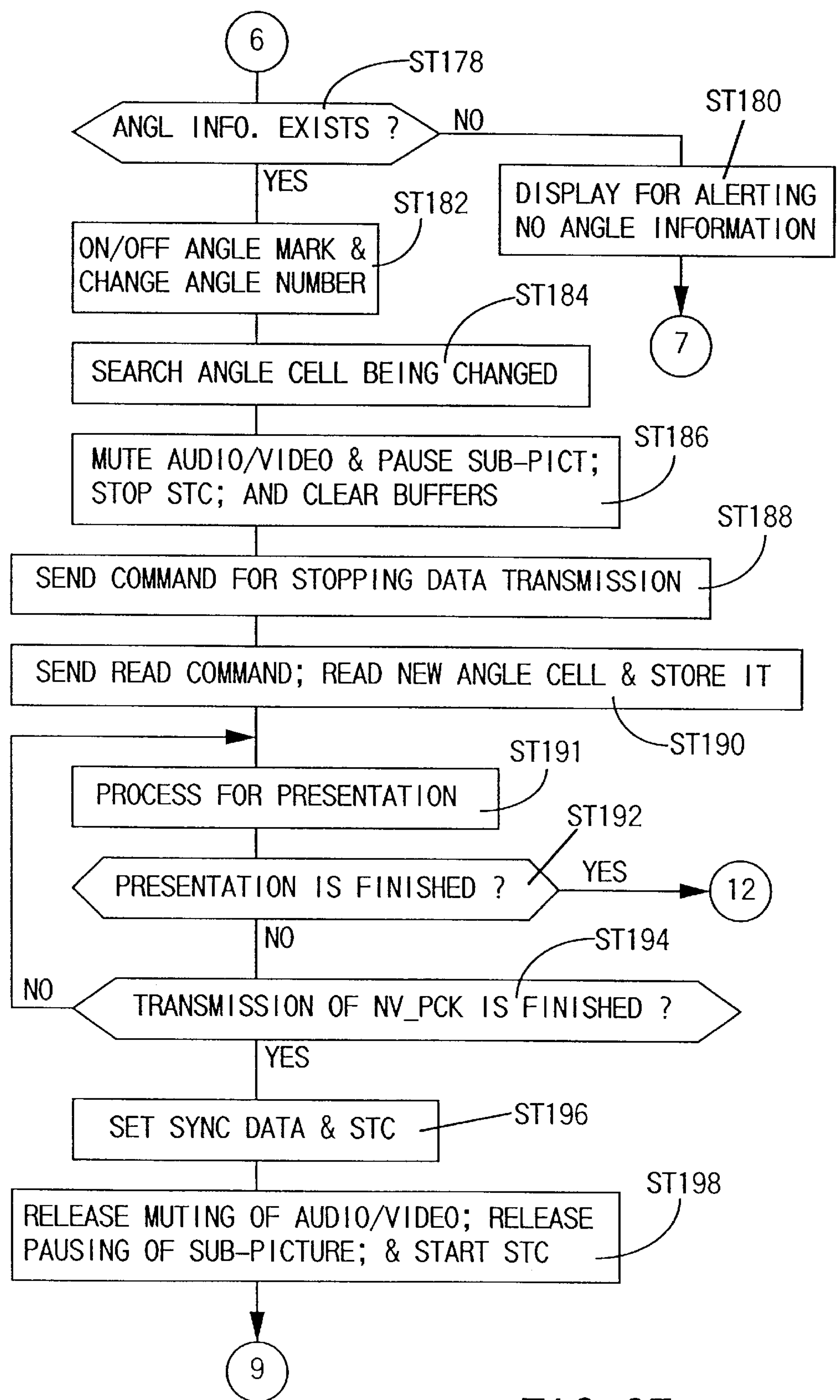
FIG. 87 is a flow chart for explaining various processing operations (e.g., angle mark flickering and a change in angle number) associated with the angle change in angle change processing of FIG. 84.

The description of the operation of the reproduction apparatus in FIG. 1 changes from node (6) in FIG. 84 to node (6) in FIG. 87.

When an angle change is input from key operation/display unit 4 or remote controller 5 during reproduction processing (YES at step ST156), it is determined whether angle information (nonseamless angle information NSML_AGLI in FIG. 30 or seamless angle information SML_AGLI in FIG. 36) is present (step ST178).

That is, at step ST178, system CPU 50 determines whether nonseamless angle information NSML_AGLI (FIG. 30) or seamless angle information SML_AGLI (FIG. 36) is present, or these pieces of angle information are not present.

Nonseamless angle information NSML_AGLI (FIG. 30) is stored in PCI packet 116 (FIG. 27) in the lowermost layer of the VOBS/VOB/CELL/VOBU/NV-PACK/PCI layer, and seamless angle information SML_AGLI (FIG. 36) is stored in DSI packet 117 (FIG. 33) in the lowermost layer of the VOBS/VOB/CELL/VOBU/NV-PACK/DSI layer.

If no angle is available as an angle change target (i.e., destination address NSML_AGL_Cn_DSTA after the angle change is not described in NSML_AGLI in FIG. 30, or destination address SML_AGL_Cn_DSTA after the angle change is not described in SML_AGLI in FIG. 36) (NO at step ST178), a message representing that no angle data is available is displayed on key operation/display unit 4 (FIG. 1), liquid crystal display unit 5*z* (FIG. 5) of the remote controller, and/or monitor 6 (FIG. 1) (step ST180).

If "no angle data is available", angle mark 407 in FIG. 7 is neither turned on nor flickered.

When the display of "no angle data is available" is complete, the flow jumps to final cell check step ST158 in FIG. 84 through node (7).

If an angle is available as an angle change target (i.e., destination address NSML_AGL_Cn_DSTA after the angle change is described in NSML_AGLI in FIG. 30, or destination address SML_AGL_Cn_DSTA after the angle change is described in SML_AGLI in FIG. 36) (YES at step ST178), angle mark 407 in FIG. 7 is flickered (or angle mark 407 is turned on in a color representing that an angle change is possible).

The viewer (the user of the reproduction apparatus in FIG. 1) who knows by flickering of the angle mark (turn-on in a specific color) that the angle change is possible can designate a desired angle number through key operation/display unit 4 or remote controller 5 (step ST182).

An angle change using either angle information (NSML_AGLI) of PCI data 113 or angle information (SML_AGLI) of DSI data 115 is designated. Note that if only one of the above pieces of information is present, the present information (NSML_AGLI or SML_AGLI) is selected.

Whether angle information NSML_AGLI or SML_AGLI is selected is determined in accordance with specific contents of a seamless angle change flag in FIG. 42.

Assume that another angle number #Y is designated from currently reproduced angle number #X. In this case, when the program reproduction time for the designation angle cell number of angle number #Y returns from the current program reproduction time (FIG. as32), the seamless angle change flag is 0b to indicate a nonseamless angle change, thereby selecting the angle information (NSML_AGLI) in FIG. 30.

On the other hand, when the program reproduction time of the destination angle cell number of angle number #Y advances from the current program reproduction time (FIG. 38), the seamless angle change flag is 1b to indicate a seamless angle change, thereby selecting the angle information (SML_AGLI) in FIG. 36.

When the changed angle number is designated (by the viewer), the designation address (NSML_AGL_Cn_DSTA in FIG. 30; or SML_AGL_Cn_DSTA in FIG. 36) of the angle cell corresponding to the designated angle number is acquired from the nonseamless angle information (NSML_AGLI) in FIG. 30 or the seamless angle information (SML_AGLI) in FIG. 36.

To seek the acquired cell address, the logical block number (NOWLBN) is set on the basis of the acquired cell address, and the destination angle cell is searched on the basis of this logical block number (step ST184).

In a change in nonseamless angle using PCI, the reproduction sounds and images discontinuously and abruptly change along with a change in angle. For this reason, system CPU 50 performs muting processing in reproduction of video and audio data and pause processing in sub-picture reproduction.

Along with these processing operations, the system clocks (STCs) of the respective components of the reproduction apparatus in FIG. 1 are stopped, and the buffers in video decoder 58, audio decoder 60, and sub-picture decoder 62 are cleared to allow reception of changed angle data (step ST186).

System CPU 50 then sends a data transfer stop command to disk drive unit 30 to temporarily stop the read operation of disk drive unit 30 (step ST188).

When system CPU 50 then supplies a read command to disk drive unit 30, the logical block number to be sought, i.e., the start address of the destination angle cell is searched to start data transfer of the changed angle cell. New angle cell data thus read out is sent to data RAM 56 through system CPU 50 and system processor 54 (step ST190).

During video and audio reproduction of the changed angle cell (step ST191), it is determined whether a reproduction end interrupt is output from drive unit 30 (step ST192).

When the reproduction end interrupt is output from drive unit 30 (YES at step ST192), the flow jumps to reproduction end processing (node 12) in FIG. 86.

On the other hand, when no reproduction end interrupt is output from drive unit 30.(NO at step ST192), control waits until next navigation pack 86 is transferred (step ST194). During which next navigation pack 86 is transferred (NO at step ST194), video and audio reproduction of the changed angle cell continues (step ST191, NO at step ST192, and NO at step ST194).

When next navigation pack 86 is transferred (YES at step ST194), predetermined sync data are respectively set in video decoder 58, audio decoder 60, and sub-picture decoder 62. The system clock reference (NV_PCK_SCR) of the navigation pack described in the DSI general information (DSI_GI; FIG. 35) of navigation pack 86 is referred to, thereby setting the system time clocks (STCs) in FIG. 1 (step ST196).

The video/audio mute state and the sub-picture pause state which are set at step ST186 are canceled, and the operation of the system time clock (STC) is started (step ST198).

The flow then jumps to node (9) in FIG. 84, and processing at steps ST147 to ST158 are executed as in normal reproduction.

Figure 88:
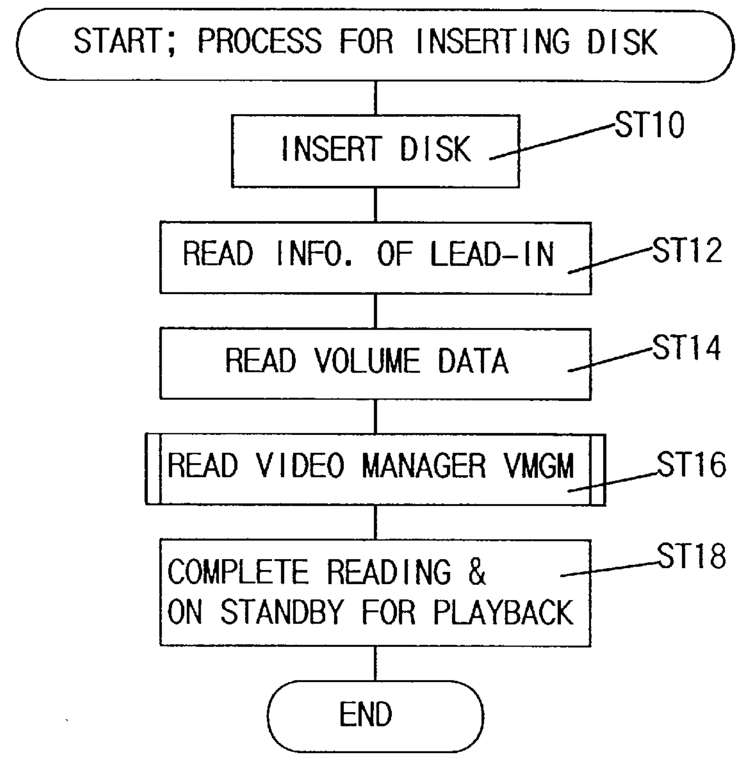
FIG. 88 is a flow chart for explaining an apparatus operation (disk insertion processing) after optical disk (DVD) 10 in FIG. 3 is set in the reproduction apparatus of FIG. 1.

FIG. 88 is a flow chart for explaining processing until the reproduction apparatus in FIG. 1 is set in the reproduction standby state after optical disk 10 is set in this apparatus.

When the viewer depresses, e.g., open/close button 4*g* in FIG. 6, disk tray 4*i* is opened. Optical disk 10 to be reproduced by the viewer is placed in the predetermined portion of tray 4*i*. When the viewer depresses open/close button 4*g* again, tray 4*i* is retracted into the apparatus main body (step ST10).

When optical disk 10 having the structure shown in FIG. 3 is retracted into the reproduction apparatus main body in FIG. 1 (the outer appearance is shown in FIG. 6), and reproduction is started (by an auto-start operation or reproduction button operation), information is read from lead-in region 27 (step ST12).

When optical disk set on disk tray 4*i* is a compact disk (CD), the table of contents (TOC) recorded in its lead-in region is read to turn on CD display unit 401 (FIG. 7) which indicates that set disk 10 is a music CD.

On the other hand, when optical disk 10 set on disk tray 4*i* is a digital video disk/digital versatile disk (DVD), volume and file structure region 70 (FIG. 10) following lead-in region 27 is read-accessed to turn on DVD display unit 402 (FIG. 7) representing that set disk 10 is a DVD.

When optical disk 10 set on disk tray 4*i* is a DVD, volume data is loaded from volume and file structure region 70 (corresponding to a management region defined in ISO9660 and the UDF bridge) (step ST14).

The contents of video manager (VMG) 71 (FIG. 10) are stored in system ROM/RAM 52 (FIG. 1) on the basis of the description of the loaded volume data. Information (e.g., video manager information (VMGI)) for managing video title sets (VTS#1 to VTS#n) 72 is described in this video manager 71. This video manager information (VMGI) is loaded (step ST16).

Upon completion of loading of this video manager information (VMGI), the reproduction apparatus in FIG. 1 is set in the reproduction standby state for set optical disk (DVD) 10 (step ST18).

Figure 89:
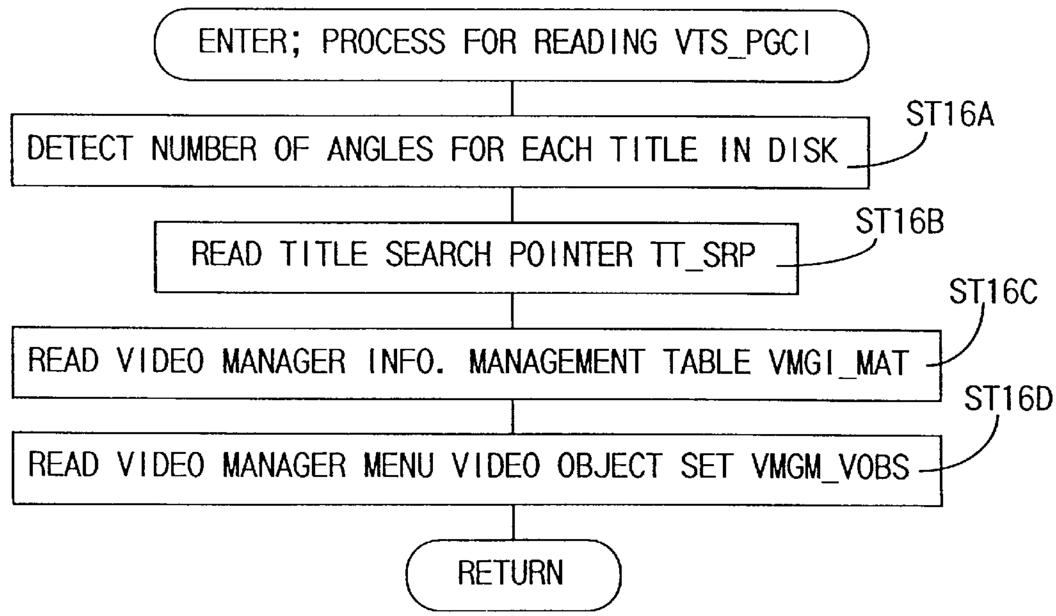
FIG. 89 is a flow chart for explaining the contents of video manager information (VMGI) loading processing ST16 in the processing flow of FIG. 88.

FIG. 89 shows the processing contents in video manager information loading step ST16 in FIG. 88.

More specifically, the video manager information management table (VMGI_MAT; FIG. 12) 751 is loaded in system RAM 52 in FIG. 1 (step ST16A).

Similarly, the title search pointer table (TT_SRPT; FIG. 16) 752 is loaded in system RAM 52 (step ST16B).

The angle count (AGL_Ns; FIGS. 18 and 96) of each title in set DVD disk 10 is checked from loaded title search pointer table (TT_SRPT) 752 (step ST16C).

Whether each title contains a multiangle reproducible angle block is determined by determining whether the angle count (AGL_Ns) for each title represents two or more angles (if AGL_Ns is "1", the title does not contain any angle block).

After the angle count (AGL_Ns) for each title is determined, video manager menu video object set (VMGM_VOBS; FIG. 12) 76 is loaded in system RAM 52 in FIG. 1 (step ST16D).

As a result, a menu (FIG. 82) having selectable title numbers and selectable angle counts (or selectable number of angles) is output to monitor 6 in FIG. 1, and the flow returns to reproduction standby step ST18.

Figure 90:
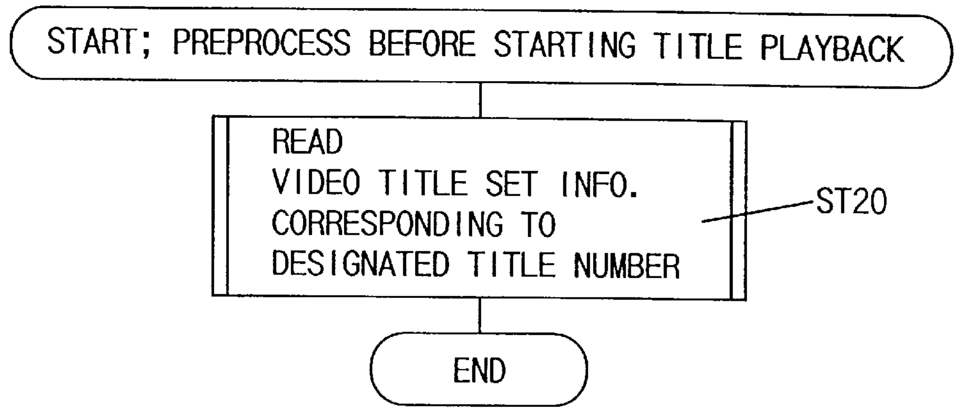
FIG. 90 is a flow chart for explaining an apparatus operation (title reproduction start preprocessing) after optical disk (DVD) 10 in FIG. 3 is set in the reproduction apparatus in FIG. 1.

Preprocessing in FIG. 90 is executed prior to the start of title reproduction. More specifically, when the viewer selects a desired title number (e.g., #1) and depresses, e.g., reproduction button 5*c* in FIG. 8, the video title set information (VTSI; FIG. 44) corresponding to the designated title number (#1) is loaded in system RAM 52 in FIG. 1 (step ST20).

Figure 91:
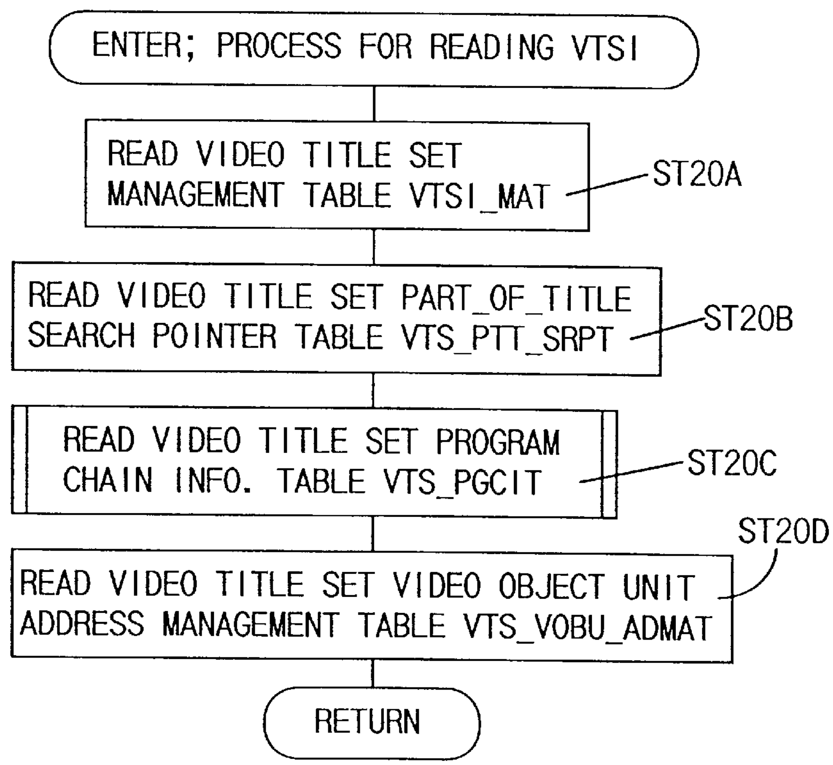
FIG. 91 is a flow chart for explaining the contents of video title set information (VTSI) loading processing ST20 in the processing flow of FIG. 90.

FIG. 91 shows the processing contents in video title set information loading step ST20 in FIG. 90.

More specifically, video title set information management table (VTSI_MAT; FIG. 44) 941 is loaded in system RAM 52 (step ST20A).

Subsequently, search pointer table (VTS_PTT_SRPT; FIG. 44) 942 of the part of title of the video title set is loaded in system RAM 52 (step ST20B).

Program chain information table (VTS_PGCIT; FIG. 44) 943 of each video title set is then loaded in system RAM 52 (step ST20C). This loading is performed for all the video title sets (a maximum of 99 video title sets) recorded on set disk 10.

When loading of program chain information table (VTS_PGCIT) 943 for all the video title sets is complete, address management table (VTS_VOBU_ADMAT; FIG. 44) 949 of the video object unit of each video title set is loaded in system RAM 52 (step ST20D). The flow then returns to the end state of step ST20 for loading the video title set information (VTSI).

Figure 92:
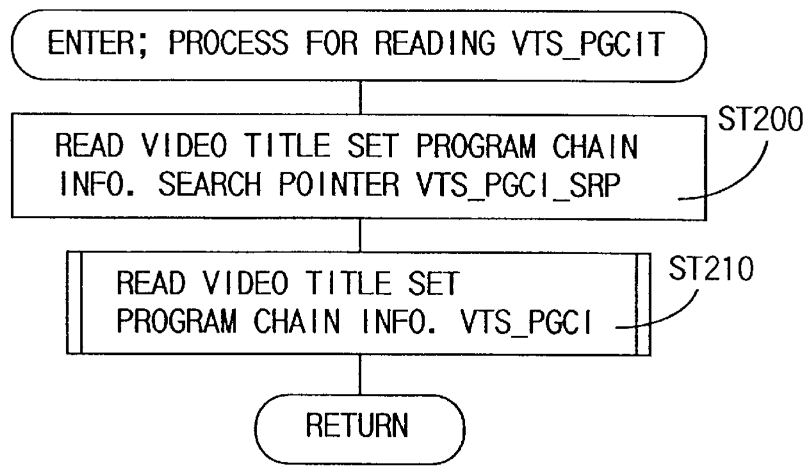
FIG. 92 is a flow chart for explaining the contents of program chain information table (VTS_PGCIT) loading processing ST20C in the processing flow of FIG. 91.

FIG. 92 shows the processing contents in program chain information table loading step ST20C in FIG. 91.

More specifically, program chain information search pointer (VTS_PGCI_SRP; FIG. 50) 943B of a given video title set is loaded in system RAM 52 (step ST200).

The start address (VTS_PGCI_SA; FIG. 52) of the corresponding video title set program chain information is described in loaded search pointer (VTS_PGCI_SRP) 943B. Program chain information (VTS_PGCI) 943B of the given video title set is loaded in system RAM 52 on the basis of this start address (VTS_PGCI_SA) (step ST210). The flow then returns to address management table loading step ST20D in FIG. 91.

Figure 93:
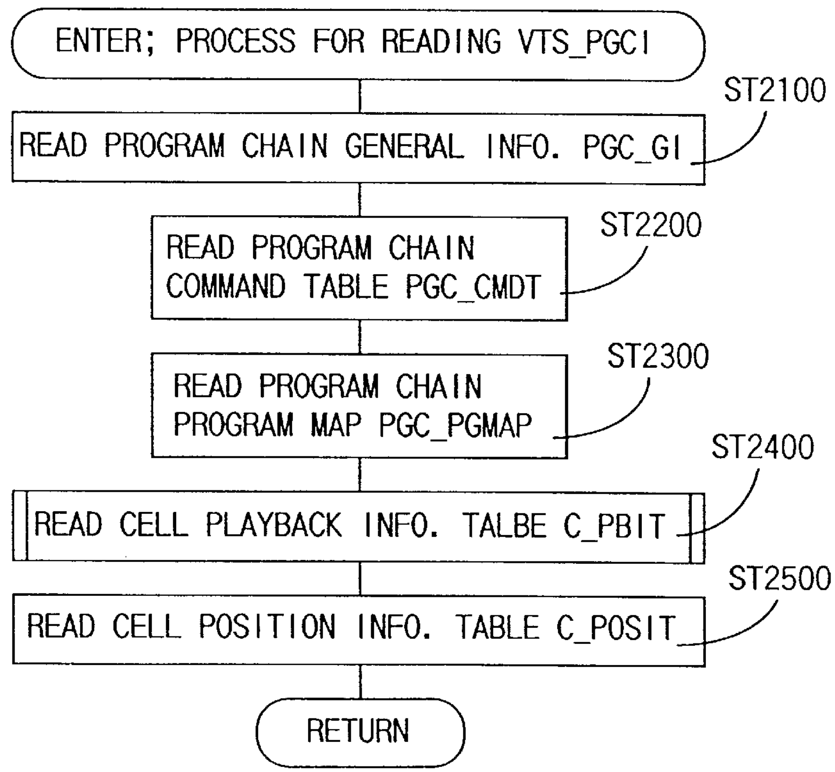
FIG. 93 is a flow chart for explaining the contents of program chain information (VTS_PGCI) loading processing ST210 in the processing flow of FIG. 92.

FIG. 93 shows the processing contents in program chain information loading step ST210 in FIG. 92.

More specifically, the program chain general information (PGC_GI; FIG. 39) is loaded in system RAM 52 (step ST2100), the command table (PGC_CMDT; FIG. 39) of the program chain is loaded in system RAM 52 (step ST2200), and the program map (PGC_PGMAP; FIG. 39) of the program chain is then loaded in system RAM 52 (step ST2300). Subsequently, the cell playback information table (C_PBIT; FIG. 39) is loaded in system RAM 52 (step ST2400), and finally the cell position information table (C_POSIT; FIG. 39) is loaded in system RAM 52 (step ST2500). Processing in program chain information loading step ST210 in FIG. 92 is complete.

Figure 94:
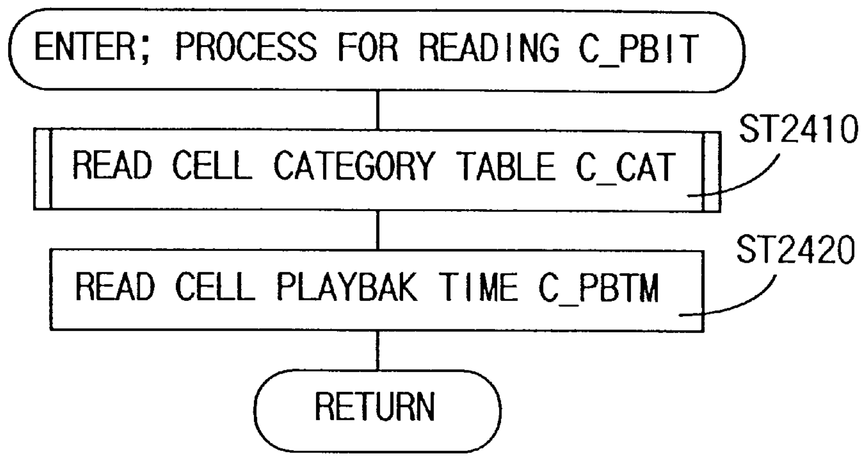
FIG. 94 is a flow chart for explaining the contents of cell playback information table (C_PBIT) loading processing ST2400 in the processing flow of FIG. 93.

FIG. 94 shows the processing contents in cell playback information table loading step ST2400 in FIG. 93.

More specifically, the category (C_CAT; FIG. 41) is loaded from the cell playback information (C_PBI) in system RAM 52 (step ST2410), and the cell playback time (C_PBTM; FIG. 41) is then loaded in system RAM 52. The flow returns to cell position information table loading step ST2500 in FIG. 93.

Figure 95:
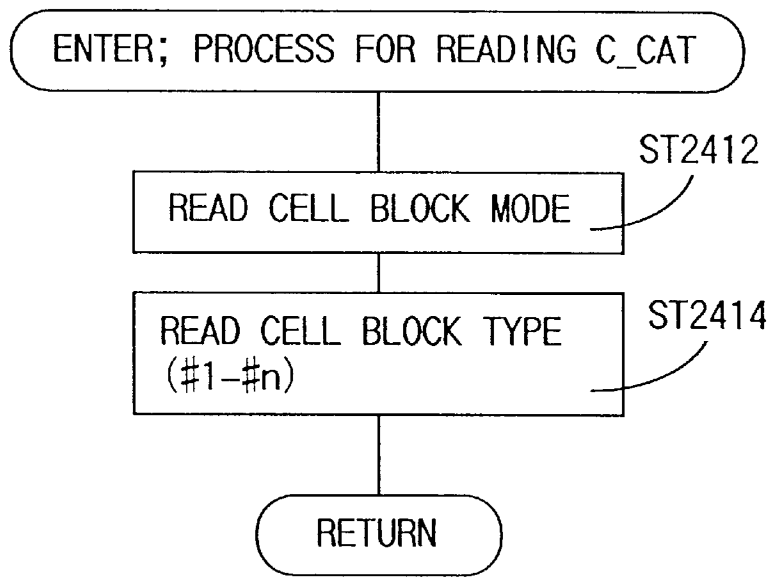
FIG. 95 is a flow chart for explaining the contents of cell category table (C_CAT) loading processing ST2410 in the processing flow of FIG. 94.

FIG. 95 shows the processing contents in cell category table loading step ST2410 in FIG. 94.

More specifically, the cell block mode (FIG. 42) in the cell category (C_CAT; FIG. 41) is loaded in system RAM 52 (step ST2412). Subsequently, the cell block type (FIG. 42) described in the corresponding cell category (C_CAT) for each video title set is loaded in system RAM 52 (step ST2414). The loaded cell block type (FIG. 42) is 01b (b is binary notation), the corresponding cell is represented as an angle block cell.

When cell block type=01b is detected by system CPU 50 during reproduction of each video title set, for example, angle mark 407 in FIG. 7 is flickered to notify the viewer of the state in which an "angle change is possible".

A list (FIG. 96) of a part-of-title count (chapter count) and an angle count or number of angles is stored in system RAM 52 (FIG. 1) in processing of FIGS. 88 and 89. This storage state is maintained until optical disk 10 set in the reproduction apparatus is replaced with another disk.

In processing of FIGS. 90 to 95, a list (FIG. 97) of the cell block mode (e.g., to designate the position of a cell in a block), cell block type (to designate whether a block is an angle block), and start and end addresses of a given cell is stored in system RAM 52 (FIG. 1) for the given cell of each chapter of each title. This storage state is maintained until optical disk 10 set in the reproduction apparatus is replaced with another disk.

When the contents (2-bit binary code) of the cell block mode described with reference to FIG. 42 are applied to the contents in FIG. 97, NOT in the cell block mode corresponds to 00b; FIRST, 01b; MIDDLE, 10b; and LAST, 11b.

When the contents (2-bit binary code) of the cell block type described with reference to FIG. 42 are applied to the contents in FIG. 97, NOT of the cell block type corresponds to 00b; and ANGLE, 01b.

Figure 98:
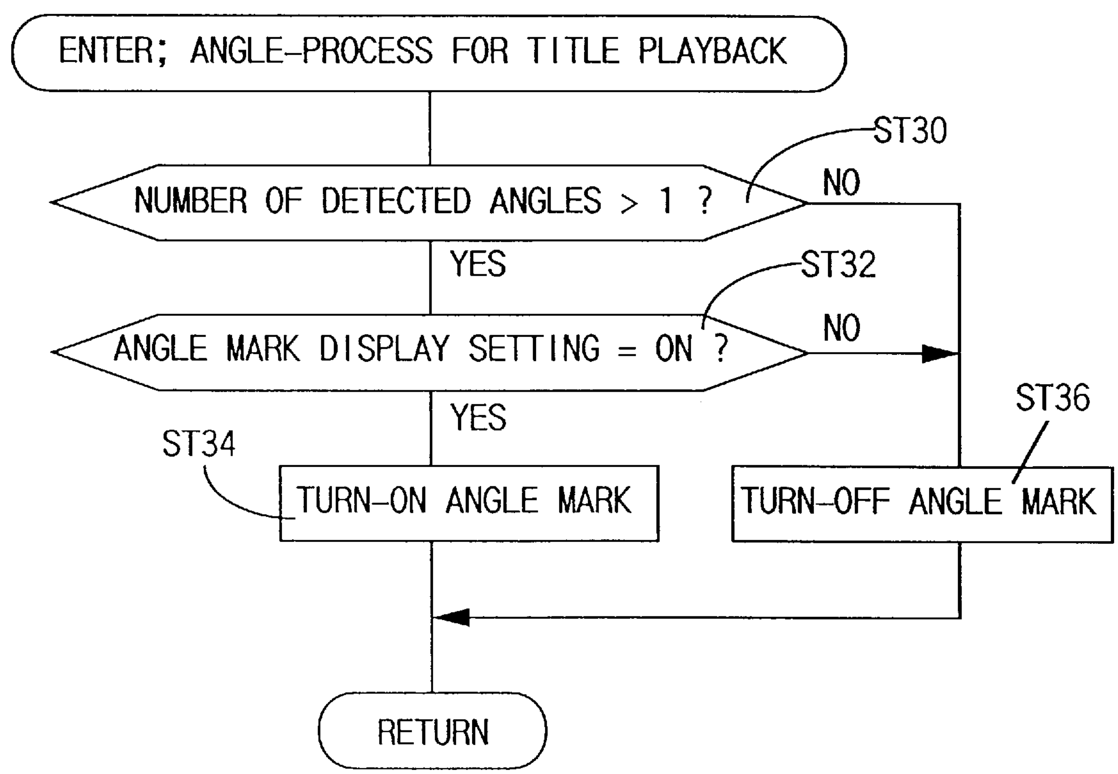
FIG. 98 is a flow chart for explaining an apparatus operation (angle mark display processing) when a title in optical disk 10 set in the reproduction apparatus in FIG. 1 is reproduced.

FIG. 98 is a flow chart for explaining angle change processing in reproduction of a given title recorded on optical disk 10.

When DVD disk 10 is set in the reproduction apparatus in FIG. 1, an angle count or number of angles for each title recorded on disk 10 is determined from FIG. 96 (the storage contents of RAM 52) (see step ST16C in FIG. 89). When the viewer selects title #2 as the reproduction target, its title is detected to have four chapters and an angle block (three angles in this case) capable of multiangle reproduction. When title #2 is selected, system CPU 50 in FIG. 1 detects that the title having the angle block is to be reproduced.

When title #2 having a multiangle block having a plurality of angles is selected (YES at step ST30 in FIG. 98), and angle mark ON/OFF key 5 am is turned on (YES at step ST32), the camera type angle mark shown in (B) to (D) of FIG. 9 is turned on and displayed on, e.g., corners of liquid crystal display unit 5*z* of remote controller 5 and monitor 6 together with an arrow indicating the angle direction (step ST34).

The arrow indicating the angle direction in FIG. 9 need not be displayed (the viewer can recognize that a title is a title capable of multiangle reproduction in accordance with only the presence/absence of the camera mark). Note that the camera mark and the angle direction arrow can be displayed using a sub-picture bitmap area.

When title #1 having no multiangle block (i.e., the number of angles is one) is selected (NO at step ST30) or angle mark ON/OFF key 5 am is kept off (NO at step ST32) even during reproduction of title #2 having a multiangle block, the angle mark is turned off (step ST36). Subsequent processing is the same as processing from step ST147 in FIG. 84.

The angle mark (camera mark) display on monitor 6 can be set ON/OFF by the operation of angle mark ON/OFF key 5 am. When a title having a multiangle block is selected as a reproduction target, the angle mark (camera mark) is kept displayed on the reproduction apparatus main body or display unit 5*z* of the remote controller.

Figure 99:
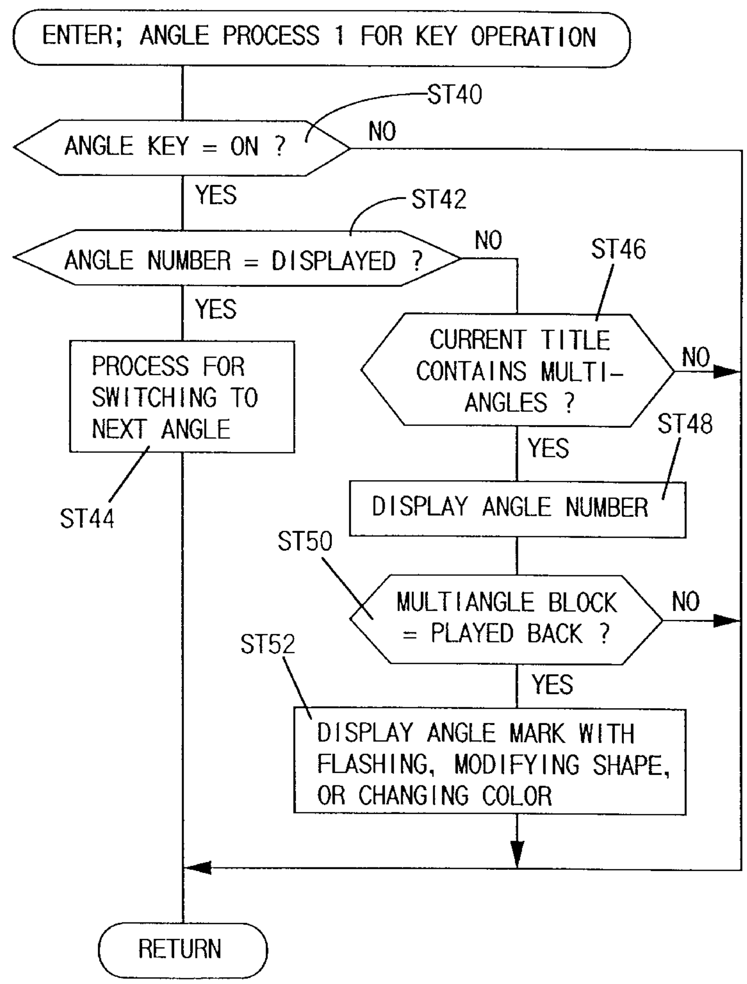
FIG. 99 is a flow chart for explaining an example (angle processing 1) of an apparatus operation responding to a key operation (a key operation on the apparatus main body or the remote controller) after optical disk (DVD) 10 is set in the reproduction apparatus in FIG. 1.

When DVD disk 10 is set in the reproduction apparatus in FIG. 1, and, for example, angle key 5 ang of remote controller 5 in FIG. 5 is turned on (YES at step ST40 in FIG. 99), an angle number display state is checked (step ST42).

For example, during the display of the angle number (ANGLE: 1) as illustrated at the upper right corner of (B) in FIG. 9 (YES at step ST42), processing for switching to the next angle (ANGLE: 2 in (C) of FIG. 9) is performed in response to the ON operation of angle key 5 ang (step ST44).

When the angle number is not being displayed as illustrated in (A) of FIG. 9 (NO at step ST42), it is determined with reference to the list in FIG. 96 whether the currently reproduced title (e.g., #2) is a title having a multiangle block (step ST46).

When the currently reproduced title is a title (#2) having a multiangle block (YES at step ST46), and angle key 5ang of remote controller 5 is turned on at step ST40 (YES at step ST40), the angle number is displayed (step ST48).

During reproduction of the title (#2) having the multiangle block, when reproduction reaches a cell (cells #3 to #5 in chapter #3 in FIG. 97) having an angle block (YES at step ST50), angle mark (camera mark) 407 is flickered, deformed, or changed in another color (e.g., a green camera mark is changed to a red or orange camera mark) (step ST52). By this noticeable change of angle mark 407, the viewer can know that the angle change is currently possible. The subsequent processing may be the same as processing from step ST147 in FIG. 84.

The alarm sound or speech synthesis guidance to notify the viewer of the state in which the "angle change is currently possible" may be output from speaker unit 8 in FIG. 1 in addition to a visual change in angle mark 407 at step ST52.

Figure 100:
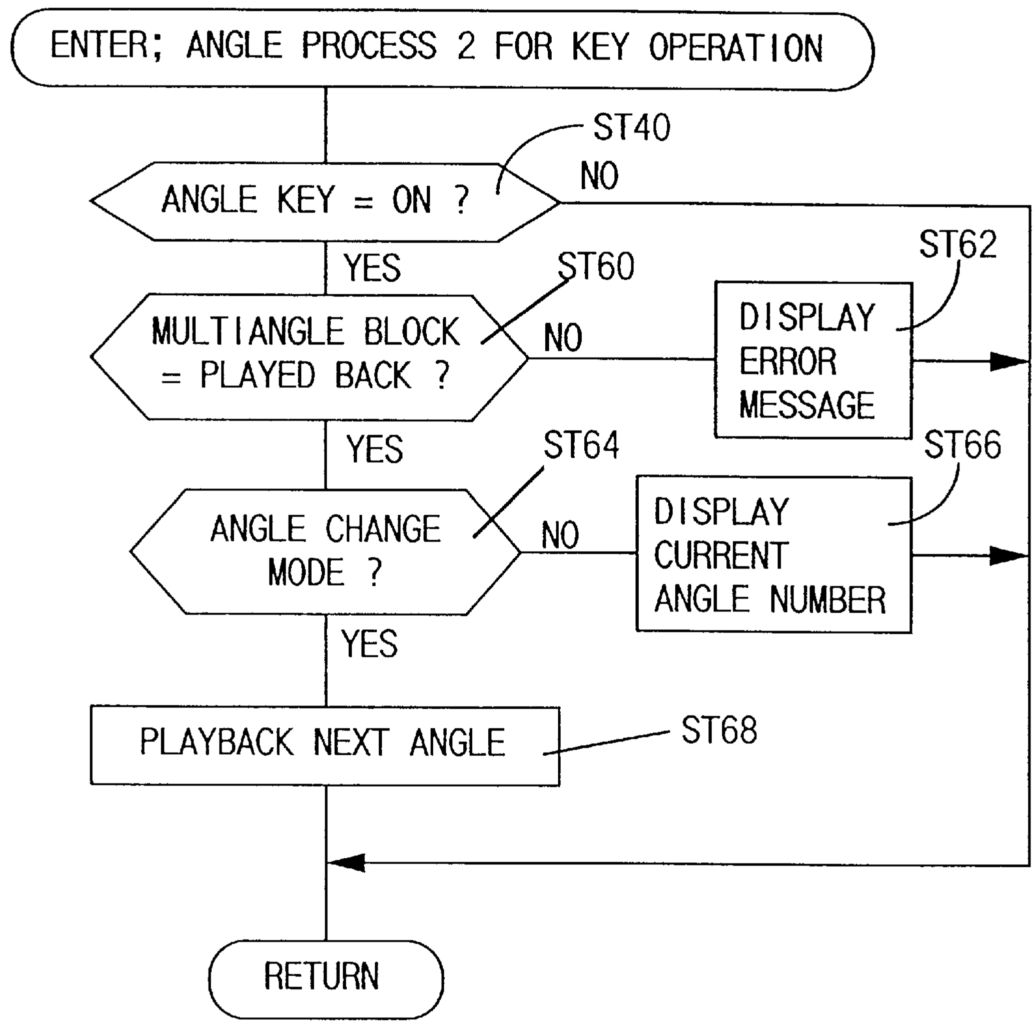
FIG. 100 is a flow chart for explaining another example (angle processing 2) responding to a key operation after optical disk (DVD) 10 is set in the reproduction apparatus in FIG. 1.

For example, when angle key 5 ang of remote controller 5 in FIG. 5 is turned on after DVD disk 10 is set in the reproduction apparatus in FIG. 1 (YES at step ST40 in FIG. 100), it is determined whether the angle block is being reproduced (step ST60).

When the angle block is being reproduced (YES at step ST60), it is determined whether the angle change mode is currently set (step ST64). More specifically, a predetermined state to be exemplified below is checked after depression of angle key 5 ang.

When a title having an angle block constituted by multiangle information is selected, and this angle block (angle interval) is being reproduced (YES at step ST60), the currently reproduced angle number is generated by a character generator (not shown) for a predetermined period of time (e.g., 5 sec; the predetermined state of the angle change mode is set during this period) and displayed at a corner (the upper left corner in FIG. 9) of monitor 6.

When the angle key is depressed gain during the angle number display period, the corresponding time (t20 in FIG. 32 or t80 in FIG. 36) of a cell having the next angle number is searched, and reproduction is started from this time (step ST68).

When angle block reproduction is not performed (NO at step ST60) upon depression of angle key 5 ang (YES at step ST40), an error message having alarm contents representing that an angle change is impossible is output to monitor 6 (step ST62).

Even while the angle block is being reproduced (YES at step ST60), when no user operation is performed five or more seconds after depression of angle key 5 ang (YES at step ST40), so that the angle change mode is canceled (NO at step ST64), the currently reproduced angle number (e.g., angle number #1 in (B) of FIG. 9) is displayed on monitor 6 (FIG. 1), liquid crystal display unit 5*z* (FIG. 5) of remote controller 5, and/or display window 4*w* (FIG. 7) of the apparatus main body (step ST66).

Figure 101:
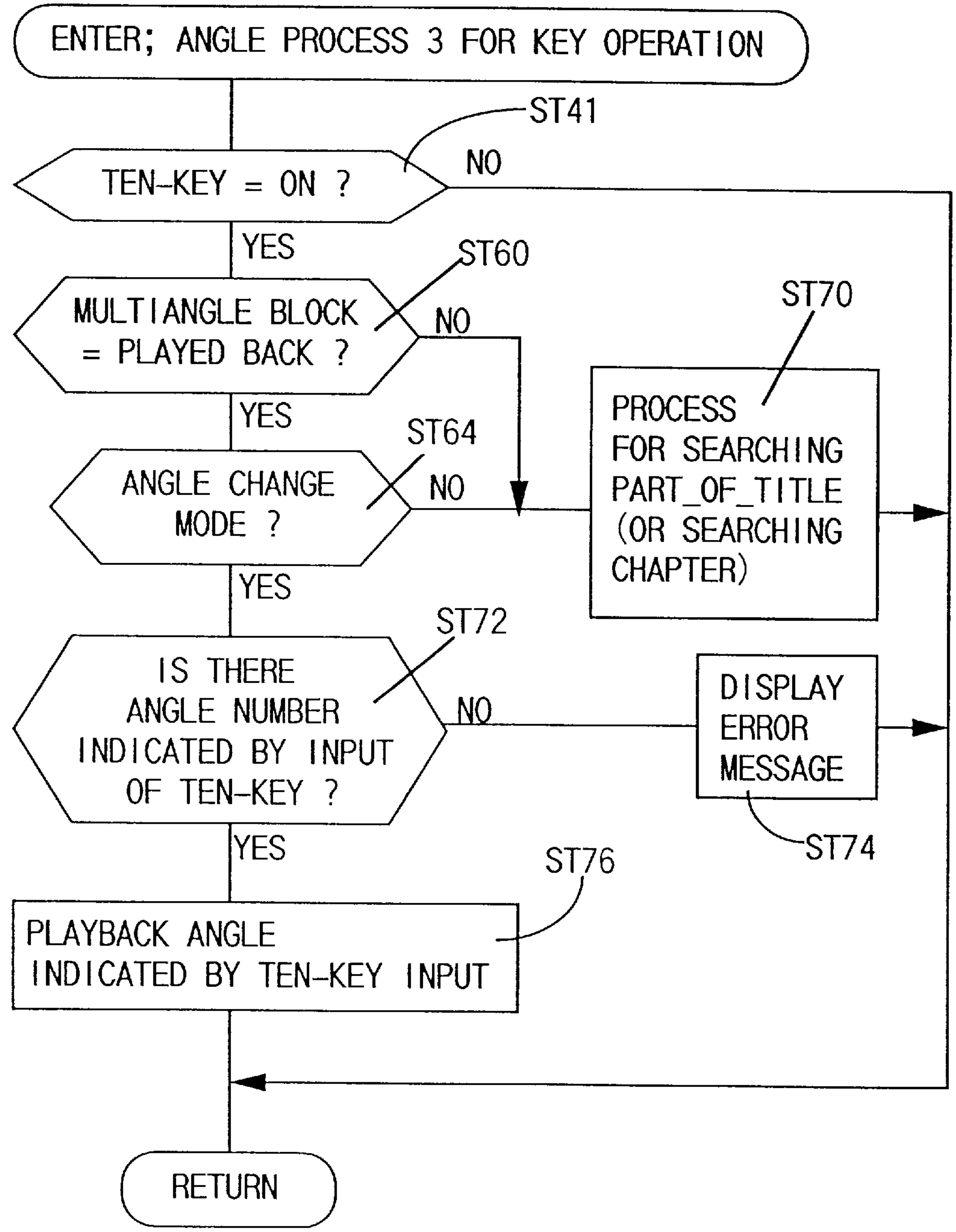
FIG. 101 is a flow chart for explaining still another example (angle processing 3) of an apparatus operation responding to a key operation after optical disk (DVD) 10 is set in the reproduction apparatus in FIG. 1.

When one of the keys in ten-key pad 5*t* of remote controller 5 is depressed (YES at step ST41 in FIG. 101) after DVD disk 10 is set in the reproduction apparatus in FIG. 1, it is determined whether the angle block is being reproduced (step ST60).

When the angle block is being reproduced (YES at step ST60), it is determined whether the angle change mode is currently set (step ST64). More specifically, the predetermined state (i.e., the 5-sec user operation wait state upon depression of angle key 5 ang) after depression of angle key 5 ang is checked.

When one (e.g., 2) of the keys of ten-key pad 5*t* in FIG. 5 is turned on (YES at step ST64) in this predetermined state (the angle change mode is active), it is determined whether the angle number (#2) input from ten-key pad 5*t* is present in the currently reproduced title (step ST72). This determination is performed by looking up the list having the contents shown in FIG. 96.

When angle #1 of chapter #4 of title #2 is being reproduced, angle number #2 newly input from ten-key pad 5*t* is present (YES at step ST72) because the number of angles in FIG. 96 is three.

In this case, the corresponding time (t20 in FIG. 32 or t80 in FIG. 36) of the cell having input angle number #2 is searched, and reproduction is started from this time (step ST76).

When the angle block is not being reproduced (NO at step ST60) upon depression (YES at step ST40) of one of the keys of ten-key pad 5*t* in the predetermined state (the angle change mode is active), the chapter (part of title) of the number input from ten-key pad 5*t* is searched (step ST70).

Even while the angle block is being reproduced (YES at step ST60), when no user operation is performed five or more seconds after depression of angle key 5 ang (YES at step ST40), so that the angle change mode is canceled (NO at step ST64), the chapter (part of tile) of the number input from ten-key pad 5*t* is searched (step ST70).

When the angle number input from ten-key pad 5*t* is not present in currently reproduced disk 10 (this angle number is not present in the list in FIG. 96) (NO at step ST72) in the predetermined state (the angle change mode is active), an error message having the alarm contents representing that the angle change is impossible is output to monitor 6 (step ST74).

A method of notifying the viewer of the title number, chapter number, angle number, and the like selected by angle switching operations is not limited to a visual display. For example, by using a speech synthesis technique, the voice of the selected corresponding number may be output from speaker unit 8.

Figure 102:
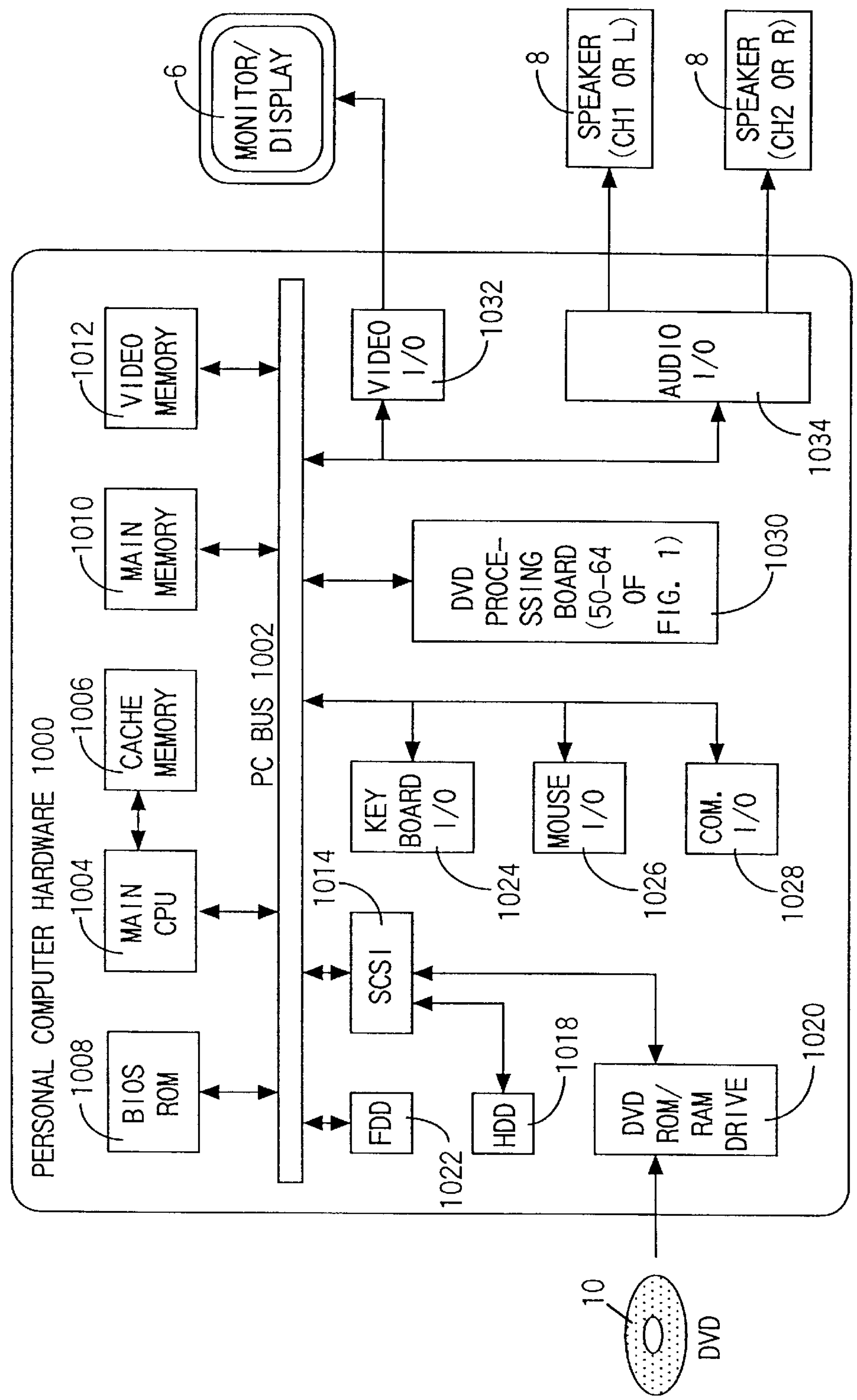
FIG. 102 is a block diagram for explaining a personal computer system having a function (function of a virtual DVD player) equivalent to the reproduction apparatus of FIG. 1.

FIG. 102 is a block diagram for explaining a personal computer system having a function (function of a virtual DVD player) equivalent to the reproduction apparatus of FIG. 1. Personal computer 1000 in FIG. 102 may have an exclusive hardware configuration, or may be a conventional versatile personal computer.

More specifically, personal computer 1000 has internal bus 1002. Connected to bus 1002 are main CPU 1004, basic input/output system ROM (BIOS ROM) 1008, main memory 1010, video memory 1012, floppy disk drive (FDD) 1022, keyboard I/O device 1024, mouse I/O device 1026, communication I/O device 1028, and so on. Cache memory 1006 is directly coupled to main CPU 1004 via an exclusive high-speed bus.

Internal bus 1002 of personal computer 1000 is provided with a plurality of general bus slots (not shown). Small Computer System Interface (SCSI card) 1014, DVD processing board 1030, video I/O device (video card) 1032, audio I/O device (audio card) 1034, etc. are inserted in these bus slots.

Connected to SCSI type board 1014 are SCSI type hard disk drive (HDD) 1018 and SCSI type DVD ROM drive (or DVD ROM/RAM compatible drive) 1020.

High-resolution bit-map display (analog RGB type) 6 is connected to video card 1032, and 2-channel stereo-pair speakers 8 are connected to audio card 1034. Incidentally, when card 1034 does not have audio power amplifiers, each speaker 8 may be provided with a power amplifier, or a stereo power amplifier (not shown) may be provided between card 1034 and speakers 8.

Processing board 1030 in FIG. 102 has hardware configurations corresponding to devices 50 to 64 in FIG. 1. Disk drive 30 in FIG. 1 corresponds to DVD ROM/RAM drive 1020 in FIG. 102. It is possible, according to circumstances, to use a part of memory 1010 or 1012 as a part of ROM/RAM 52 or RAM 56 in FIG. 1.

The function of key operator 4 in FIG. 1 can be assigned to a keyboard connected to keyboard I/O device 1024 in FIG. 102. The function of remote controller 5 in FIG. 1 can be assigned to the keyboard connected to keyboard I/O device 1024, or to a mouse connected to mouse I/O device 1026, or to an external controller (not shown) connected to communication I/O device 1028 in FIG. 102.

Figure 103:
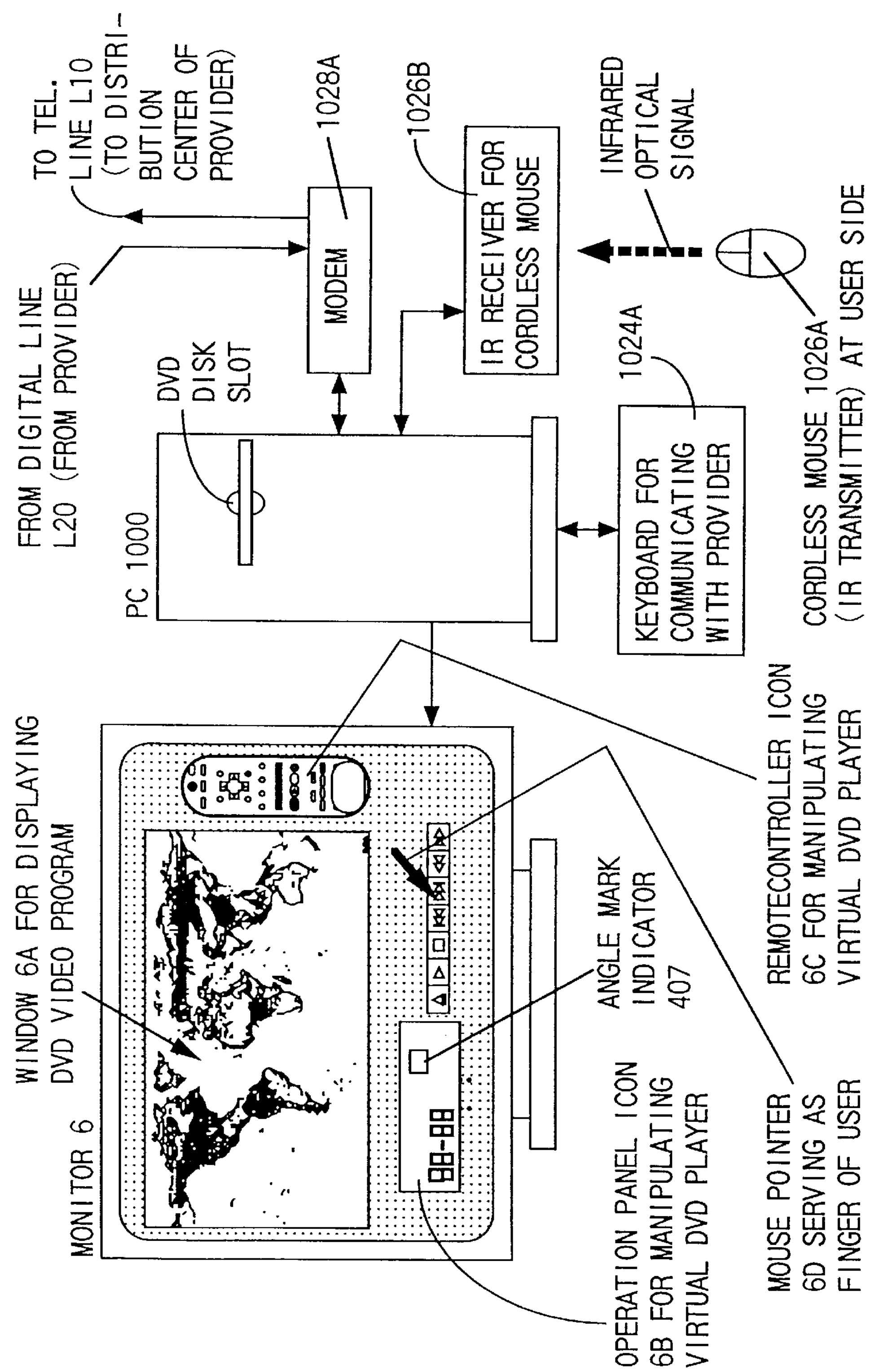
FIG. 103 shows examples of operation panel icons and visual contents of a DVD program respectively displayed on a bit-map display of the personal computer system of FIG. 102, wherein the personal computer system serves as a virtual DVD player.

FIG. 103 shows examples of operation panel icons and visual contents of a DVD program respectively displayed on a bit-map display of the personal computer system of FIG. 102, wherein the personal computer system serves as a virtual DVD player.

More specifically, DVD window 6A for displaying a DVD video program is output at the upper side of the monitor screen of monitor 6. Within DVD window 6A, movie pictures, still pictures and/or menus are presented with a full-color display mode (a 24-bit RGB display mode is preferable, but 8- to 16-bit RGB display mode may be used for a plain color presentation).

On the other hand, at the lower side of the monitor screen of monitor 6 (or at a free space of the monitor screen not used for the DVD window display), operation panel icon 6B corresponding to display window 4*w* (or a DVD operation display panel) as shown in FIG. 7 is output.

In place of or in addition to operation panel icon 6B, remote controller icon 6C representing DVD operation remote controller 5 having a configuration as shown in FIG. 8 may be output to the free space of the monitor screen.

Operation panel icon 6B and/or remote controller icon 6C displayed on the free space of the monitor screen can be manipulated using cordless mouse 1026A. A user (or an audience of DVD video) of personal computer 1000 can send his or her operation commands to infrared receiver 1026B via IR optical signals generated by cordless mouse 1026A.

For instance, when the user moves mouse 1026A on a table (not shown) in front of him or her, the two-dimensional move-ment of mouse 1026A on the table plane is changed to two-phase pulses, and these two-phase pulses are converted into an IR optical signal. The IR optical signal is sent from mouse 1026A to IR receiver 1026B. Then, CPU 1004 of FIG. 102 responds to the contents of the two-phase pulses sent from mouse 1026A, so that the displayed position of mouse pointer 6D on the screen of monitor 6 is moved.

Assume that mouse pointer 6D is placed on the chapter skip icon of DVD operation panel icon 6B. If the user clicks the mouse button of mouse 1026A under this assumption, a chapter skip is performed. Then, the contents of display of DVD window 6A is changed, for instance, from chapter "1" (or from part-of-title "1-1" of video title set "1" being played back) to chapter "2" (or part-of-title "1-2" of video title set "1").

An angle change may be similarly performed. Assume that DVD operation panel icon 6B as well as remote controller icon 6C are displayed in the free space of the monitor screen, and angle mark indicator 407 of DVD operation panel icon 6B indicates that an angle block is currently played back (e.g., indicator 407 formed of a camera icon continuously flashes or glints). When the user shifts mouse pointer 6D to the icon of angle button 5 ang and clicks the mouse button under this assumption, an angle change is performed. Thus, the contents of display of DVD window 6A is changed, for instance, from the moving picture of angle "1" to that of angle "2".

The above-mentioned explanation of operations can be applied not only to a case where DVD disk 10 is loaded in DVD drive 1020, but also to a case where a DVD program is received from an exterior.

For example, suppose that a user of personal computer 1000, who is a subscriber of a DVD video-on-demand system, accesses a provider of the video-on-demand system using his or her keyboard 1024A, so that demand information containing the user's ID and the desired DVD program name(s) is sent to the provider. This demand information sending is performed by modem 1028A via telephone line L10. When the provider receives the demand information from the subscriber (or user), the provider confirms the subscriber's ID and sends an undecoded digital signal containing the desired DVD program(s) to the subscriber. (Incidentally, if the desired DVD program(s) requires a certain charge, the computer of the provider draws the corresponding money from the subscriber's bank account. When the desired DVD program(s) is charge free (or no charge program) but associated with a given commercial or advertisement, the desired DVD program(s) is sent to the subscriber provided that the associated commercial or advertisement be reproduced at the monitor of the subscriber.)

Personal computer 1000 of FIG. 102 or FIG. 103, which is provided with a DVD drive, may serve as a virtual DVD player. In order to change personal computer 1000 to the virtual DVD player, it is necessary to control system CPU 50 in DVD processing board 1030 by main CPU 1004 and also to run a special software program on main CPU 1004 for providing an operation environment (user interface) of the virtual DVD player on the screen of monitor 6.

The core of the above-mentioned special software program is common to the process for obtaining DVD digital data from DVD disk 10 and to the process for receiving DVD digital data from the provider via digital line L20. The main difference between the former process and the latter process is that the latter process requires communication lines (L10, L20) between DVD disk 10 or DVD contents source and DVD processing board 1030. In the following, explanation will be given to a case where the DVD contents are obtained from DVD disk 10.

As shown in FIG. 3 and FIG. 10, DVD disk 10 has lead-in area 27 at the center side thereof. Video manager recording area 71 is located outside the lead-in area 27. Areas 72 for recording one or more video title sets VTS#n are located outside the recording area 71. At least one video title set recording area 72 includes an angle block being formed of a plurality of angle cells AGL_C#i (FIG. 32 or FIG. 38). Angle cells AGL_C#i contain video data pieces (corresponding to cell 84 of FIG. 11) respectively obtained by photographing a target(s) with different angles of view.

Video manager information VMGI (FIG. 12) is recorded in video manager VMG of DVD disk 10. Video manager information VMGI contains title search pointer table TT_SRPT (FIG. 16). Title search pointer table TT_SRPT contains title search pointer TT_SRP (FIG. 18). Title search pointer TT_SRP contains the number of angles AGL_Ns.

In this case, a computer program for selectively reproducing from DVD disk 10 the video data (corresponding to VOBU 85 in FIG. 11) within angle cell AGL_C#i constitutes a part of the special software program by which personal computer 1000 with a DVD drive may have functions of a virtual DVD player.

The special software program can be obtained by compiling various program modules. These program modules include the step (ST34) for turning on the angle mark 407 for indicating the existence of angle cell AGL_C#i, if it is detected that the number of angles AGL_Ns is two or more (YES at ST30 in FIG. 98) as a result of inquiry of this number (ST16C in FIG. 89).

Or, the special software program may be obtained by compiling other program modules. These program modules include not only the step (ST34) for turning on the angle mark 407 for indicating the existence of angle cell AGL_C#i, if it is detected that the number of angles AGL_Ns is two or more (YES at ST30 in FIG. 98) as a result of inquiry of this number (ST16C in FIG. 89), but also the step (ST36) for turning off the angle mark 407 if the number of angles AGL_Ns is one (NO at ST30 in FIG. 98).

Or, the special software program may be obtained by compiling other program modules. These program modules include the step (ST34) for turning on the angle mark 407 for indicating the existence of angle cell AGL_C#i, if it is detected that the number of angles AGL_Ns is two or more (YES at ST30 in FIG. 98) as a result of inquiry of this number (ST16C in FIG. 89); the step (ST36) for turning off the angle mark 407 if the number of angles AGL_Ns is one (NO at ST30 in FIG. 98); and steps (NO at ST32, ST36) for optionally turning off the angle mark 407 even if the number of angles AGL_Ns is two or more (YES at ST30).

Or, the special software program may be obtained by compiling other program modules. These program modules include the step (ST34) for turning on the angle mark 407 for indicating the existence of angle cell AGL_C#i, if it is detected that the number of angles AGL_Ns is two or more (YES at ST30 in FIG. 98) as a result of inquiry of this number (ST16C in FIG. 89); and the step (ST68 in FIG. 100), which refers to the respective address data (NSML_AGL_Cn_DSTA) of the angle cells AGL_C#i if the number of angles AGL_Ns is two or more (YES at ST30 in FIG. 98), for nonseamlessly changing the target of reproduction from the currently reproduced angle cell to another angle cell along a time axis with going backward.

Or, the special software program may be obtained by compiling other program modules. These program modules include the step (ST34) for turning on the angle mark 407 for indicating the existence of angle cell AGL_C#i, if it is detected that the number of angles AGL_Ns is two or more (YES at ST30 in FIG. 98) as a result of inquiry of this number (ST16C in FIG. 89); the step (ST52) for flashing the angle mark 407 or modifying the shape of mark 407 or changing the display color of mark 407, if the contents of the cell block type (FIG. 42) in cell category C_CAT indicate (binary "01") that an angle block is currently reproduced (YES at ST50 in FIG. 99); and the step (ST68 in FIG. 100), which refers to the respective address data (SML_AGL_Cn_DSTA) of the angle cells AGL_C#i when the cell block type (FIG. 42) of cell category C_CAT indicates that the angle block is currently reproduced (YES at ST30 in FIG. 98; YES at ST46 in FIG. 99) and if the seamless angle change flag (FIG. 42) in cell category C_CAT indicates (binary "1") that a seamless angle change be performed (YES at ST50 in FIG. 99), for seamlessly changing the target of reproduction from the currently reproduced angle cell to another angle cell along a time axis with going forward.

Figure 104:
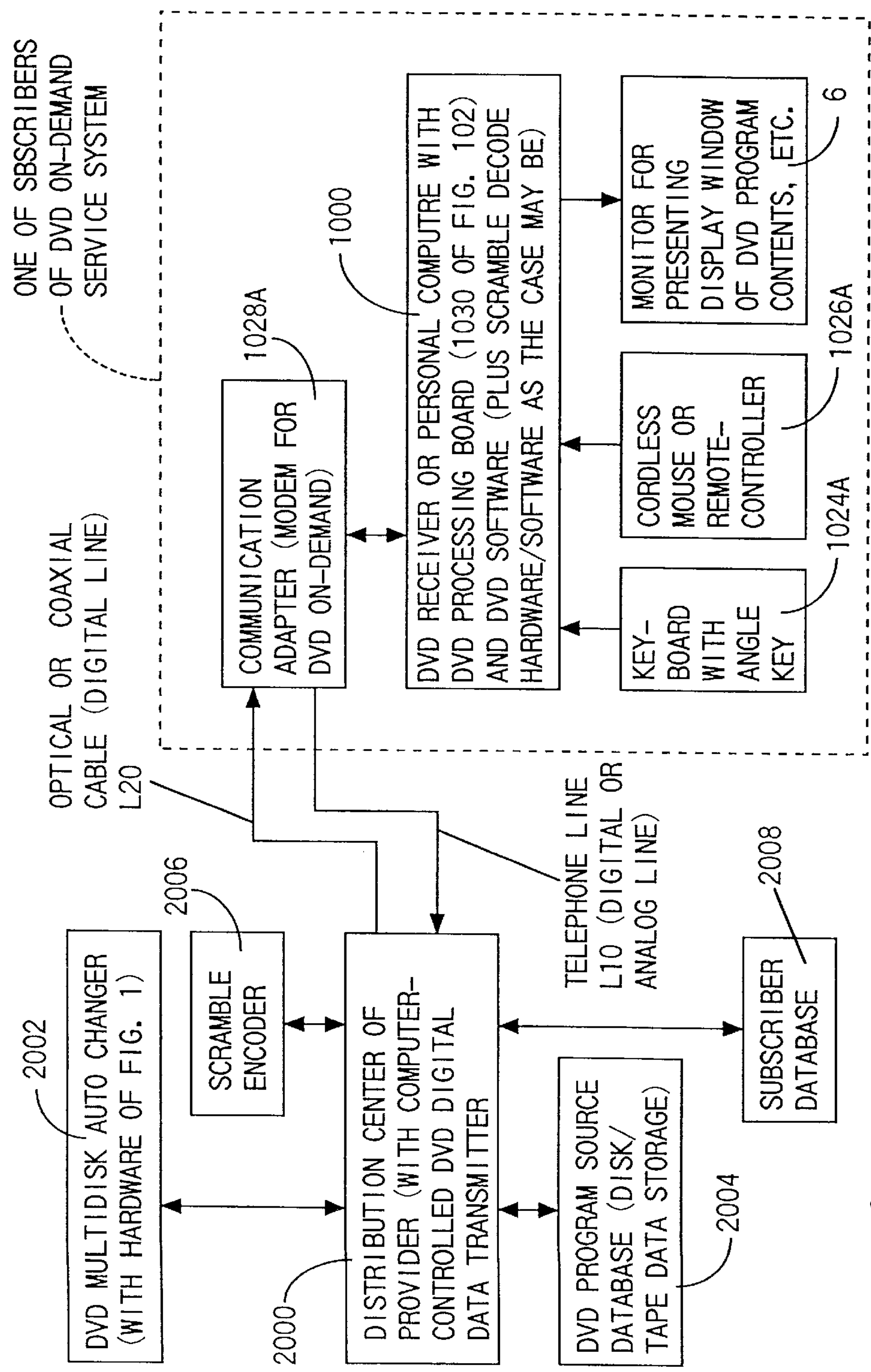
FIG. 104 is a block diagram for explaining a DVD video-on-demand system wherein the provider of DVD software and each subscriber are connected via signal lines, and each subscriber comprises the main portion of the reproduction apparatus of FIG. 1 or comprises the virtual DVD player of FIG. 102.

FIG. 104 is a block diagram for explaining a DVD video-on-demand system wherein the provider of DVD software and each subscriber are connected via signal lines, and each subscriber comprises the main portion of the reproduction apparatus of FIG. 1 or comprises the virtual DVD player of FIG. 102.

FIG. 104 shows a specific example wherein each subscriber has a DVD receiver (or a DVD system comprising an exclusive DVD machine or personal computer plus a DVD board plus virtual DVD player software), and each subscriber's DVD receiver (or subscriber's DVD system) is connected to the distribution center of the provider via a digital line.

Distribution center 2000 of the provider has database 2008 containing each ID code of registered subscribers and registered bank account of each of the subscribers, and a computer-controlled digital signal transmitter for automatically distributing requested DVD program sources to the corresponding subscribers.

Connected to distribution center 2000 are DVD autochanger 2002 and DVD program source database 2004. A large number of DVD disks are installed in autochanger 2002. Database 2004 is formed of a large-capacity disk array or a large-capacity tape-cartridge bank.

Further, distribution center 2000 is provided with scramble encoder 2006 for suitably scrambling the distributed DVD programs in order to prevent wrong or illegal reproduction of fee-charging DVD programs. (when the distribution of DVD programs is performed by satellite broadcasting, for example, such scrambling will be necessary.

Incidentally, in order to restrict the above-mentioned wrong reproduction of fee-charging DVD programs or to prevent an illegal copy of copyrighted DVD contents, a specific watermark may be embedded in the digital signal of the distributed DVD programs.

Distribution center 2000 can be selectively connected to the receiver apparatus (exclusive receiver or personal computer 1000 exemplified with reference to FIG. 103) of respective subscribers, via communication lines. These communication lines are formed of telephone line (analog or digital line) L10 used for transmitting a demand (request of a specific DVD program) from each subscriber to distribution center 2000; and digital line (optical cable line or coaxial cable line) L20 used for transmitting the requested DVD program to the subscriber.

The receiver apparatus of respective subscribers may have a configuration as shown in FIG. 102, wherein communication adapter (modem) 1028A, keyboard 1024A with an angle key, cordless mouse (serving as a remote controller) 1026A, monitor 6 for displaying a DVD window, etc. are provided.

When a subscriber wishes to enjoy a program(s), he (or she) accesses the computer of provider 2000 via telephone line L10, so that a list of currently available DVD programs is displayed on his monitor 6. When he (or she) finds his favorite program in the displayed list, he (or she) selects the title box or icon of that program using his mouse 1026A, and he (or she) double-clicks the selected title box or selected icon. Then, introduction to the contents of the double-clicked title, a short demonstration (or summary) of movie picture thereof, the amount of charge, etc. are suitably displayed on his monitor 6.

When the subscriber wishes to enjoy the whole contents of the demonstrated program, he (or she) double-clicks the demonstrated title box or that icon. Then, a YES/NO box with an alert "Are you sure to enjoy this program with the charge of $xxx ?" are displayed on his (or her) monitor 6.

When the YES box is in a default selection state, the subscriber may simply hit the return key or enter key of his (or her) keyboard 1024A, or he (or she) may double-click the YES box using his mouse. This subscriber's action indicates that the above-mentioned demonstrated program is actually selected.

Then, the code (or program number) of the subscriber's selected program (demanded program) as well as the subscriber's ID code are automatically sent to the computer of provider 2000 via telephone line L10.

The computer of provider 2000 searches database 2008 according to the ID code sent from the subscriber, and automatically draws a prescribed amount of charge from the registered bank account of the subscriber. After completing this bank account processing, the computer of provider 2000 accesses to autochanger 2002 so that a specific DVD disk corresponding to the demanded program is played back. Then, the reproduction output (undecoded serial digital signal) of the played back DVD disk is transmitted to the communication adapter (modem) 1028A of the subscriber via digital line L20.

The contents of the digital signal to be transmitted from distribution center 2000 of the provider to personal computer 1000 of the subscriber represent a DVD reproduction signal. Thus, the DVD video signal containing information of a multiangle (e.g., AGL_Ns in FIG. 18; NSML_AGLI in FIG. 30; SML_AGLI in FIG. 36; C_CAT in FIG. 42) is transmitted to the subscriber.

Therefore, when AGL_Ns of FIG. 18 is "2" or more and the cell block type in C_CAT of FIG. 42 is "01b" (=binary "01") which indicates an angle block, and if the seamless angle change flag in C_CAT of FIG. 42 is "1b" which indicates a seamless angle change, the subscriber can know from flashing of angle mark 407 displayed on monitor 6 that the camera angle of the currently played back video picture in window 6A can be seamlessly changed to another camera angle. In this case, for instance, the subscriber can perform a seamless angle change by clicking with his (or her) mouse the angle button (corresponding to Sang shown in FIG. 8) of remote controller icon 6C of FIG. 103.

Incidentally, when personal computer 1000 as shown in FIG. 103 or FIG. 104 serves as a virtual DVD player, the function keys (not shown) of keyboard 1024A may be assigned for a playback start function, playback stop function, pause (still playback) function, fast forward function, rewind function, slow forward playback function, slow backward playback function, chapter skip (forward skip and backward skip) function, menu call function, menu selection enter function, angle change function, and so on.

Further, the cursor function for menu operation may be assigned to the cursor keys (not shown) of keyboard 1024A. The direct designation function such as direct title number designation may be assigned to the ten-key (numeric keys; not shown) of keyboard 1024A.

In the same manner, all user-available functions at the time of DVD playback may be assigned to any of keys of keyboard 1024A (this key assignment includes a key combination of two or more keys to be simultaneously turn-on).

According to a multiangle block reproduction system (including a reproduction apparatus or method) of the present invention, at least one of the following three items can be used as a user interface associated with multiangle reproduction.

(1) A common indicator (a camera type angle mark or camera type icon; a kind of user interface) for notifying the viewer (the user of the reproduction apparatus) of the state in which a multiangle block is being reproduced is displayed on the display panel (the video monitor screen or the display unit of the remote controller).

(2) By a characteristic change (e.g., a change in color, flickering, or deformation) of the indicator (angle mark), the viewer is notified of a mode in which an arbitrary angle can be selected by a ten-key input or any other method during reproduction of a multiangle block.

(3) The viewer who already knows that the multiangle block is being reproduced can turn off this indicator if he determines that the display bothers him.

With the above arrangement, when optical disk 10 on which a multiangle block is recorded is reproduced, the user (viewer) can easily recognize whether the multiangle block is recorded on this disk (or a title in this disk) or whether the currently reproduced video image is within the multiangle block (i.e., whether the angle change is possible).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A system capable of selectively reproducing a plurality of images recorded in an angle block of a recording medium having a format with which a set of a plurality of images obtained by photographing or imaging a photographic target at a variety of camera angles can be recorded in the form of the angle block, wherein when the recording medium on which a program source containing the angle block is recorded is set, an angle mark notifying a "program source with an angle block" is turned on, and when a portion of the angle block of the program source is set while reproducing the image, the angle mark notifying that a "change in angle is possible" is flickered, modified, or changed in color.

2. A remote controller used for said multiangle block reproduction system of claim 1, comprising an angle key to send an angle change instruction to said reproduction system when the angle mark is flickered, modified, or changed in color.

3. A remote controller used for said multiangle block reproduction system of claim 1, comprising an angle mark ON/OFF key to selectively set the ON state of the angle mark to an ON/OFF state when the angle mark is set in an ON state.

4. A remote controller used for said multiangle block reproduction system of claim 1, comprising a display for displaying the angle mark.

5. A remote controller used for said multiangle block reproduction system of claim 1, wherein said angle mark has a shape for illustrating a camera angle direction.

6. A multiangle block reproduction system of claim 1, wherein said system comprises a display window having the angle mark, and the angle mark displayed in the display window has a shape for illustrating a camera angle direction.

7. A remote controller used for said multiangle block reproduction system of claim 1, wherein said remote controller includes a key for changing an angle number contained in the angle block.

8. A multiangle block reproduction system according to claim 1, comprising means for displaying an angle number contained in the angle block.

9. A multiangle block reproduction system according to claim 1, comprising means for displaying an angle number of the angle block under reproduction.

10. A reproduction apparatus for selectively reproducing video data in an angle cell from a disk-like recording medium having a lead-in area on a central side, an area for recording a video manager outside the lead-in area, and at least one area for recording a video title set outside the video manager recording area, said at least one video title set recording area having an angle block constituted by a plurality of angle cells, and the angle cells containing different video data obtained by photographing a photographic target at a variety of camera angles, wherein the video manager of the disk-like recording medium has video manager information, the video manager information contains a title search pointer table, the title search pointer table contains a title search pointer, and the title search pointer contains an angle count, wherein the angle count represents the number of angles, and said reproduction apparatus comprises an angle mark for notifying the presence of the angle cell, and means for checking the angle count, and when the angle count represents a plurality of angles, turning on the angle mark.

11. A reproduction apparatus for selectively reproducing video data in an angle cell from a disk-like recording medium having a lead-in area on a central side, an area for recording a video manager outside the lead-in area, and at least one area for recording a video title set outside the video manager recording area, said at least one video title set recording area having an angle block constituted by a plurality of angle cells, and the angle cells containing different video data obtained by photographing a photographic target at a variety of camera angles, wherein the video manager of the disk-like recording medium has video manager information, the video manager information contains a title search pointer table, the title search pointer table contains a title search pointer, and the title search pointer contains an angle count, wherein the angle count represents the number of angles, and said reproduction apparatus comprises an angle mark for notifying the presence of the angle cell, first means for checking the angle count, and when the angle count represents a plurality of angles, turning on the angle mark, and second means for, when the angle count represents only one angle, turning off the angle mark.

12. A reproduction apparatus for selectively reproducing video data in an angle cell from a disk-like recording medium having a lead-in area on a central side, an area for recording a video manager outside the lead-in area, and at least one area for recording a video title set outside the video manager recording area, said at least one video title set recording area having an angle block constituted by a plurality of angle cells, and the angle cells containing different video data obtained by photographing a photographic target at a variety of camera angles, wherein the video manager of the disk-like recording medium has video manager information, the video manager information contains a title search pointer table, the title search pointer table contains a title search pointer, and the title search pointer contains an angle count, wherein the angle count represents the number of angles, and said reproduction apparatus comprises an angle mark for notifying the presence of the angle cell, first means for checking the angle count, and when the angle count represents a plurality of angles, turning on the angle mark, second means for, when the angle count represents only one angle, turning off the angle mark, and third means for, even when the angle count represents the plurality of angles, forcibly turning off the angle mark.

13. A reproduction apparatus for selectively reproducing video data in an angle cell from a disk-like recording medium having a lead-in area on a central side, an area for recording a video manager outside the lead-in area, and at least one area for recording a video title set outside the video manager recording area, said at least one video title set recording area having an angle block constituted by a plurality of angle cells, and the angle cells containing different video data obtained by photographing a photographic target at a variety of camera angles, wherein the video manager of the disk-like recording medium has video manager information, the video manager information contains a title search pointer table, the title search pointer table contains a title search pointer, and the title search pointer contains an angle count, wherein the angle count represents the number of angles, and said reproduction apparatus comprises an angle mark for notifying the presence of the angle cell, first means for checking the angle count, and when the angle count represents a plurality of angles, turning on the angle mark, second means for, when the angle count represents only one angle, turning off the angle mark, third means for, even when the angle count represents the plurality of angles, turning on or off the angle mark, and a remote controller having an angle mark ON/OFF key for instructing an ON/OFF operation of the angle mark to said third means.

14. A reproduction apparatus for selectively reproducing video data in an angle cell from a disk-like recording medium having a lead-in area on a central side, an area for recording a video manager outside the lead-in area, and at least one area for recording a video title set outside the video manager recording area, said at least one video title set recording area having an angle block constituted by a plurality of angle cells, and the angle cells containing different video data obtained by photographing a photographic target at a variety of camera angles, wherein the video title set of the disk-like recording medium contains at least one video object set, the video object set contains at least one video object, the video object contains at least one cell including the angle cell, said cell contains at least one video object unit, each of said at least one video object unit contains a navigation pack at a head thereof, the navigation pack contains presentation control information, and the presentation control information contains nonseamless angle information having address data of each angle cell, and the video manager of the disk-like recording medium has video manager information, the video manager information contains a title search pointer table, the title search pointer table contains a title search pointer, and the title search pointer contains an angle count, wherein the angle count represents the number of angles, said reproduction apparatus comprises an angle mark notifying the presence of the angle block, first means for checking the angle count, and when the angle count represents a plurality of angles, turning on the angle mark, and second means for, when the angle count represents the plurality of angles, referring to the address data of each angle cell, returning to another angle cell different from the angle cell under reproduction along a reproduction time axis, and nonseamlessly switching the reproduction target.

15. A reproduction apparatus for selectively reproducing video data in an angle cell from a disk-like recording medium having a lead-in area on a central side, an area for recording a video manager outside the lead-in area, and at least one area for recording a video title set outside the video manager recording area, said at least one video title set recording area having an angle block constituted by a plurality of angle cells, and the angle cells containing different video data obtained by photographing a photographic target at a variety of camera angles, wherein the video title set of the disk-like recording medium contains at least one video object set, the video object set contains at least one video object, the video object contains at least one cell including the angle cell, said cell contains at least one video object unit, each of said at least one video object unit contains a navigation pack at a head thereof, the navigation pack contains data search information, and the data search information contains seamless angle information having address data of each angle cell, the video title set of the disk-like recording medium contains a program chain constituted by at least one cell including the angle cell, the program chain contains program chain information, the program chain information contains a cell playback information table, the cell playback information table contains at least one cell playback information, each of the at least one cell playback information contains a cell category, and the cell category contains a cell block type representing the angle block or not and a seamless angle change flag representing a seamless angle change or not, and the video manager of the disk-like recording medium has video manager information, the video manager information contains a title search pointer table, the title search pointer table contains a title search pointer, and the title search pointer contains an angle count, wherein the angle count represents the number of angles, said reproduction apparatus comprises an angle mark notifying the presence of the angle block, first means for checking the angle count, and when the angle count represents a plurality of angles, turning on the angle mark, second means for, when the cell block type of the cell category represents a current angle block, flickering, flashing or modifying the angle mark or displaying the angle mark in another color, and third means for, when the cell block type of the cell category represents the current angle block and the seamless angle change flag of the category represents a seamless angle change, referring to the address data of each angle cell and seamlessly switching the reproduction target to another angle cell different from the angle cell under reproduction without returning along a reproduction time axis.

16. An angle mark turn-on method in a reproduction apparatus for selectively reproducing video data in an angle cell from a disk-like recording medium having a lead-in area on a central side, an area for recording a video manager outside the lead-in area, and at least one area for recording a video title set outside the video manager recording area, said at least one video title set recording area having an angle block constituted by a plurality of angle cells, and the angle cells containing different video data obtained by photographing a photographic target at a variety of camera angles, said method comprising:

recording video manager information on the video manager of the disk-like recording medium, recording a title search pointer table on the video manager information, recording a title search pointer on the title search pointer table, recording an angle count on the title search pointer, wherein the angle count represents the number of angles, and checking the angle count, and when the angle count represents a plurality of angles, turning on the angle mark notifying the presence of the angle cell.

17. An angle mark turn-on/off method in a reproduction apparatus for selectively reproducing video data in an angle cell from a disk-like recording medium having a lead-in area on a central side, an area for recording a video manager outside the lead-in area, and at least one area for recording a video title set outside the video manager recording area, said at least one video title set recording area having an angle block constituted by a plurality of angle cells, and the angle cells containing different video data obtained by photographing a photographic target at a variety of camera angles, said method comprising:

recording video manager information on the video manager of the disk-like recording medium, recording a title search pointer table on the video manager information, recording a title search pointer on the title search pointer table, recording an angle count on the title search pointer, wherein the angle count represents the number of angles, checking the angle count, and when the angle count represents a plurality of angles, turning on the angle mark notifying the presence of the angle cell, and when the angle count represents only one angle, turning off the angle mark.

18. An angle mark turn-on/off method in a reproduction apparatus for selectively reproducing video data in an angle cell from a disk-like recording medium having a lead-in area on a central side, an area for recording a video manager outside the lead-in area, and at least one area for recording a video title set outside the video manager recording area, said at least one video title set recording area having an angle block constituted by a plurality of angle cells, and the angle cells containing different video data obtained by photographing a photographic target at a variety of camera angles, said method comprising:

recording video manager information on the video manager of the disk-like recording medium, recording a title search pointer table on the video manager information, recording a title search pointer on the title search pointer table, recording an angle count on the title search, wherein the angle count represents the number of angles, checking the angle count, and when the angle count represents a plurality of angles, turning on the angle mark notifying the presence of the angle cell, when the angle count represents only one angle, turning off the angle mark, and even when the angle count represents the plurality of angles, arbitrarily turning off the angle mark.

19. A nonseamless angle change method in a reproduction apparatus for selectively reproducing video data in an angle cell from a disk-like recording medium having a lead-in area on a central side, an area for recording a video manager outside the lead-in area, and at least one area for recording a video title set outside the video manager recording area, said at least one video title set recording area having an angle block constituted by a plurality of angle cells, and the angle cells containing different video data obtained by photographing a photographic target at a variety of camera angles, said method comprising:

recording at least one video object set on the video title set of the disk-like recording medium, recording at least one video object on the video object set, recording at least one cell including the angle cell on the video object, recording at least one video object unit on the cell, recording a navigation pack at a head of each of said at least one object unit, recording presentation control information on the navigation pack, recording nonseamless angle information including address data of each angle cell on the presentation control information, recording video manager information on the video manager of the disk-like recording medium, recording a title search pointer table on the video manager information, recording a title search pointer on the title search pointer table, recording an angle count on the title search pointer, wherein the angle count represents the number of angles, checking the angle count, and when the angle count represents a plurality of angles, turning on an angle mark notifying the presence of the angle block, and when the angle count represents the plurality of angles, referring to the address data of each angle cell, returning to another angle cell different from the angle cell under reproduction along a reproduction time axis, and nonseamlessly switching the reproduction target.

20. A seamless angle change method in a reproduction apparatus for selectively reproducing video data in an angle cell from a disk-like recording medium having a lead-in area on a central side, an area for recording a video manager outside the lead-in area, and at least one area for recording a video title set outside the video manager recording area, said at least one video title set recording area having an angle block constituted by a plurality of angle cells, and the angle cells containing different video data obtained by photographing a photographic target at a variety of camera angles, said method comprising:

recording at least one video object set on the video title set of the disk-like recording medium, recording at least one video object on the video object set, recording at least one cell including the angle cell on the video object, recording at least one video object unit on the cell, recording a navigation pack at a head of each of said at least one object unit, recording data search information on the navigation pack, recording seamless angle information including the address data of each angle cell on the data search information, recording, on the video title set, a program chain constituted by at least one cell including the angle cell, recording program chain information on the program chain, recording a cell playback information table on the program chain information, recording at least one cell playback information on the cell playback information table, recording a cell category on each of said at least one cell playback information, recording, on the cell category, a cell block type representing the angle block or not and a seamless angle change flag representing a seamless angle change or not, recording video manager information on the video manager of the disk-like recording medium, recording a title search pointer table on the video manager information, recording a title search pointer on the title search pointer table, recording an angle count on the title search pointer, wherein the angle count represents the number of angles, checking the angle count, and when the angle count represents a plurality of angles, returning on the angle mark notifying the presence of the angle block, when the cell block type of the cell category represents a current angle block, flickering or modifying the angle mark or displaying the angle mark in another color, and when the cell block type of the cell category represents the current angle block and the seamless angle change flag of the category represents a seamless angle change, referring to the address data of each angle cell and seamlessly switching the reproduction target to another angle cell different from the angle cell under reproduction without returning along a reproduction time axis.

21. A computer-readable program which is adapted to a disk-like recording medium comprising a lead-in area on a central side, an area for recording a video manager outside the lead-in area, and at least one area for recording a video title set outside the video manager recording area, the at least one video title set recording area having an angle block constituted by a plurality of angle cells, and the angle cells containing different video data obtained by photographing or imaging a photographic target at a variety of camera angles, wherein when the video manager of the disk-like recording medium includes video manager information, the video manager information includes a title search pointer table, the title search pointer table includes a title search pointer, the title search pointer includes an angle count, wherein the angle count represents the number of angles, said computer-readable program for selectively reproducing video data in the angle cells from the disk-like recording medium comprising:

checking the number of the angles; and when the checked number is two or more, turning-on an angle mark so as to indicate the existence of the angle cells.

22. A computer-readable program which is adapted to a disk-like recording medium comprising a lead-in area on a central side, an area for recording a video manager outside the lead-in area, and at least one area for recording a video title set outside the video manager recording area, the at least one video title set recording area having an angle block constituted by a plurality of angle cells, and the angle cells containing different video data obtained by photographing or imaging a photographic target at a variety of camera angles, wherein when the video manager of the disk-like recording medium includes video manager information, the video manager information includes a title search pointer table, the title search pointer table includes a title search pointers the title search pointer includes an angle count, wherein the angle count represents the number of angles, said computer-readable program for selectively reproducing video data from the disk-like recording medium comprising:

checking the number of the angles;

when the checked number is two or more, turning on an angle mark so as to indicate the existence of the angle cells; and when the checked number is one, turning-off the angle mark.

23. A computer-readable program which is adapted to a disk-like recording medium comprising a lead-in area on a central side, an area for recording a video manager outside the lead-in area, and at least one area for recording a video title set outside the video manager recording area, the at least one video title set recording area having an angle block constituted by a plurality of angle cells, and the angle cells containing different video data obtained by photographing or imaging a photographic target at a variety of camera angles, wherein when the video manager of the disk-like recording medium includes video manager information, the video manager information includes a title search pointer table, the title search pointer table includes a title search pointer, the title search pointer includes an angle count, wherein the angle count represents the number of angles, said computer-readable program for selectively reproducing video data in the angle cells from the disk-like recording medium comprising:

checking the number of the angles;

when the checked number is two or more, turning-on an angle mark so as to indicate the existence of the angle cells;

when the checked number is one, turning-off the angle mark; and even if the checked number is two or more, arbitrary turning-off the angle mark.

24. A computer-readable program which is adapted to a disk-like recording medium comprising a lead-in area on a central side, an area for recording a video manager outside the lead-in area, and at least one area for recording a video title set outside the video manager recording area, the at least one video title set recording area having an angle block constituted by a plurality of angle cells, and the angle cells containing different video data obtained by photographing or imaging a photographic target at a variety of camera angles, wherein when the video title set of the disk-like recording medium includes one or more video object sets, the video object set includes one or more video object sets, the video object set contains one or more cells including the angle cells, and the cell includes one or more video object units; when each of the video object units is provided with a navigation pack at the head portion thereof, the navigation pack includes presentation control information, the presentation control information contains nonseamless angle information including respective address data of the angle cells; and when the video manager of the disk-like recording medium includes video manager information, the video manager information includes a title search pointer table, the title search pointer table includes a title search pointer, the title search pointer includes an angle count, wherein the angle count represents the number of angles;

said computer-readable program for selectively reproducing video data in the angle cells from the disk-like recording medium comprising:

checking the number of the angles;

when the checked number is two or more, turning-on an angle mark so as to indicate the existence of the angle cells;

when the checked number is two or more, nonseamlessly changing the target of presentation from the currently presented angle cell to another angle cell with reference to the respective address data of the angle cells.

25. A computer-readable program which is adapted to a disk-like recording medium comprising a lead-in area on a central side, an area for recording a video manager outside the lead-in area, and at least one area for recording a video title set outside the video manager recording area, the at least one video title set recording area having an angle block constituted by a plurality of angle cells, and the angle cells containing different video data obtained by photographing or imaging a photographic target at a variety of camera angles, wherein when the video title set of the disk-like recording medium includes one or more video object sets, the video object set includes one or more video object sets, the video object set contains one or more cells including the angle cells, and the cell includes one or more video object units; when each of the video object units is provided with a navigation pack at the head portion thereof, the navigation pack includes data search information, the data search information contains seamless angle information including respective address data of the angle cells; and when the video title set contains a program chain constituted by one or more cells including the angle cells, the program chain contains program chain information, the program chain information contains a cell playback information table, the cell playback information table contains one or more cell playback information, each of the cell playback information contains a cell category, and the cell category contains a cell block type representing the angle block or not and a seamless angle change flag representing a seamless angle change or not;

said computer-readable program for selectively reproducing video data in the angle cells from the disk-like recording medium comprising:

checking an angle count wherein the angle count represents the number of the angles;

when the checked number is two or more, turning-on an angle mark so as to indicate the existence of the angle cells;

when the cell block type of the cell category represents the current angle block, flashing the angle mark or modifying the shape of the angle mark or changing the color of the angle mark; and when the cell block type of the cell category represents the current angle block and the seamless angle change flag of the category represents a seamless angle change, seamlessly changing the target of presentation from the currently presented angle cell to another angle cell with reference to the respective address data of the angle cells.

26. A reproduction apparatus for selectively reproducing video data in an angle cell from a disk-like recording medium having a lead-in area on a central side, an area for recording a video manager outside the lead-in area, and at least one area for recording a video title set outside the video manager recording area, the at least one video title set recording area having an angle block constituted by a plurality of angle cells, and the angle cells containing different video data obtained by photographing a photographic target at a variety of camera angles, wherein the video manager of the disk-like recording medium has video manager information, the video manager information contains a title search pointer table, the title search pointer table contains a title search pointer, and the title search pointer contains an angle count, wherein the angle count represents the number of angles, and the reproduction apparatus comprises:

an angle mark for notifying the presence of the angle cell, means for checking the angle count, and when the angle count represents a plurality of angles, generating a signal representing the angle mark, and means for mixing the signal of the angle mark with another video signal reproduced from the disk-like recording medium.

27. A reproduction apparatus for selectively reproducing video data in an angle cell from a disk-like recording medium having a lead-in area on a central side, an area for recording a video manager outside the lead-in area, and at least one area for recording a video title set outside the video manager recording area, said at least one video title set recording area having an angle block constituted by a plurality of angle cells, and the angle cells containing different video data obtained by photographing a photographic target at a variety of camera angles, wherein the video title set of the disk-like recording medium contains at least one video object set, the video object set contains at least one video object, the video object contains at least one cell including the angle cell, said cell contains at least one video object unit, each of said at least one video object unit contains a navigation pack at a head thereof, the navigation pack contains presentation control information, and the presentation control information contains nonseamless angle information having address data of each angle cell, and the video manager of the disk-like recording medium has video manager information, the video manager information contains a title search pointer table, the title search pointer table contains a title search pointer, and the title search pointer contains an angle count, wherein the angle count represents the number of angles, said reproduction apparatus comprises:

an angle mark notifying the presence of the angle block, and first means for checking the angle count, and when the angle count represents a plurality of angles, turning on the angle mark.

* * * * *